United States Patent
Coukos et al.

(10) Patent No.: US 12,473,346 B2
(45) Date of Patent: Nov. 18, 2025

(54) A2/NY-ESO-1 SPECIFIC T CELL RECEPTORS AND USES THEREOF

(71) Applicant: LUDWIG INSTITUTE FOR CANCER RESEARCH LTD, Zurich (CH)

(72) Inventors: George Coukos, Épalinges (CH); Melita Irving, Épalinges (CH); Vincent Zoete, Épalinges (CH); Olivier Michielin, Lausanne (CH)

(73) Assignee: LUDWIG INSTITUTE FOR CANCER RESEARCH LTD, Zurich (CH)

( * ) Notice: Subject to any disclaimer, the term of this patent is extended or adjusted under 35 U.S.C. 154(b) by 1099 days.

(21) Appl. No.: 17/440,136

(22) PCT Filed: Mar. 17, 2020

(86) PCT No.: PCT/IB2020/000140
§ 371 (c)(1),
(2) Date: Sep. 16, 2021

(87) PCT Pub. No.: WO2020/188348
PCT Pub. Date: Sep. 24, 2020

(65) Prior Publication Data
US 2022/0152109 A1   May 19, 2022

Related U.S. Application Data

(60) Provisional application No. 62/819,988, filed on Mar. 18, 2019.

(51) Int. Cl.
| | | |
|---|---|---|
| *C07K 14/725* | (2006.01) | |
| *A61K 40/11* | (2025.01) | |
| *A61K 40/32* | (2025.01) | |
| *A61K 40/42* | (2025.01) | |
| *A61P 35/00* | (2006.01) | |

(52) U.S. Cl.
CPC .......... *C07K 14/7051* (2013.01); *A61K 40/11* (2025.01); *A61K 40/32* (2025.01); *A61K 40/4269* (2025.01); *A61P 35/00* (2018.01); *A61K 2239/31* (2023.05); *A61K 2239/38* (2023.05)

(58) Field of Classification Search
CPC .................................................. C07K 14/7051
See application file for complete search history.

(56) References Cited

U.S. PATENT DOCUMENTS

| | | |
|---|---|---|
| 7,608,410 B2 | 10/2009 | Dunn |
| 7,763,718 B2 | 7/2010 | Jakobsen et al. |
| 9,822,163 B2 | 11/2017 | Boulter et al. |
| 9,944,911 B2 | 4/2018 | Ring et al. |
| 9,976,121 B2 | 5/2018 | Laugel et al. |
| 10,124,023 B2 | 11/2018 | Brentjens et al. |
| 10,130,721 B2 | 11/2018 | Jakobsen et al. |
| 2010/0034834 A1 | 2/2010 | Robbins |
| 2010/0297093 A1 | 11/2010 | Robbins et al. |
| 2012/0071420 A1* | 3/2012 | Robbins .............. C07K 14/7051 514/19.3 |
| 2019/0002523 A1 | 1/2019 | Chester et al. |
| 2022/0154190 A1 | 5/2022 | Zhao et al. |

FOREIGN PATENT DOCUMENTS

| | | |
|---|---|---|
| CN | 107249606 | 10/2017 |
| CN | 108456247 | 8/2018 |
| CN | 109476723 | 3/2019 |
| JP | 2007-537743 A | 12/2007 |
| JP | 2008-509090 A | 3/2008 |
| WO | 2008037943 A1 | 4/2008 |
| WO | 2017087723 A1 | 5/2017 |

OTHER PUBLICATIONS

Robbins et al., Single and dual amino acid substitutions in TCR CDRs can enhance antigen-specific T cell functions. J Immunol. May 1, 2008;180(9):6116-31. (Year: 2008).*
Zoete et al., "Structure-based, rational design of T cell receptors". Front. Immunol. Sep. 11, 2013. 4:268 (Year: 2013).*
Alberts, et al. "Molecular Biology of the Cell, Fifth Edition". New York: Garland Science, 2008. pp. 1-3 and 367. (Year: 2008).*
Office Action issued Aug. 13, 2024 in connection with Japanese Patent Application No. 2021-556481 (including English Translation).
Office Action issued Jan. 26, 2024 in connection with Chinese Application for Invention No. 202080031738.8.
Chen, J-L. et al., "Structural and Kinetic Basis for Heightened Immunogenicity of T Cell Vaccines" Journal of Experimental Medicine (2005) vol. 201, No. 8, pp. 1243-1255.
Communication (International Search Report) issued by the International Searching Authority in International Application No. PCT/IB2020/000140 dated Nov. 6, 2020, 8 pages total.
Communication (Written Opinion) issued by the International Searching Authority in International Application No. PCT/IB2020/000140 dated Nov. 6, 2020, 11 pages total.

(Continued)

*Primary Examiner* — Christopher M Babic
*Assistant Examiner* — Hanan Isam Abuzeineh
(74) *Attorney, Agent, or Firm* — Troutman Pepper Locke LLP

(57) ABSTRACT

The application provides genetically modified cell receptors (TCRs) specific for an epitope from cancer antigen NY-ESO-1. Also provided are related polypeptides and proteins, as well as related nucleic acids, recombinant expression vectors, host cells, and populations of cells, including but not limited to genetically engineered cells, and pharmaceutical compositions. The application further provides the use of such modified T cell receptors (TCRs) and related compositions for cancer immunotherapy (e.g., adoptive cell therapy).

22 Claims, 38 Drawing Sheets
Specification includes a Sequence Listing.

(56) References Cited

OTHER PUBLICATIONS

McCormack, E. et al., "Bi-Specific TCR-Anti CD3 Redirected T-Cell Targeting of NY-ESO-1- and LAGE-1-Positive Tumors" Cancer Immunol Immunother (2013) vol. 62, pp. 773-785.

Robbins, P.F. et al., "Single and Dual Amino Acid Substitutions in TCR CDRs Can Enhance Antigen-Specific T Cell Functions" J Immunol. (2008) vol. 180, No. 9, pp. 6116-6131.

Schmetterer, K.G. et al., "Overexpression of PDE4A Acts as Checkpoint Inhibitor Against cAMP-Mediated Immunosuppression in Vitro" Frontiers in Immunology (2019) vol. 10, Article 1790, 15 pages total.

Tsai, A.K. et al., "Producer T Cells: Using Genetically Engineered T Cells as Vehicles to Generate and Deliver Therapeutics to Tumors" Oncommunology (2016) vol. 5, No. 5, e1122158, 9 pages total.

Weiskopf, K. et al., "Engineered SIRPa Variants as Immunotherapeutic Adjuvants to Anticancer Antibodies" Science (2013) vol. 341, pp. 88-91.

Office Action issued Feb. 26, 2024 in connection with Japanese Patent Application No. 2021-556481.

Zoete, V. et al., Structure-based, rational design of T cell Receptors, Front Immunol., vol. 4, Sep. 12, 2013, 268.

Office Action issued Feb. 24, 2025 in connection with European Application No. 20721721.7,.

Database Geneseq [Online] May 17, 2018 (May 17, 2018), Human anti-MAGEA1 antibody TCR beta chain (R37P1C9), SEQ ID 60., retrieved from EBI accession No. GS_PROT:BFE29615 Database accession No. BFE29615.

Database Geneseq [Online] Dec. 12, 2019 (Dec. 12, 2019), "T cell receptor beta chain (TRAV15/02F), SEQ ID5.", retrieved from EBI accession No. GS_PROT:BGX26409 Database accession No. BGX26409.

* cited by examiner

Fig. 1A

BC1 WT Alpha Chain:
METLLGLLILWLQLQWVSSKQEVTQIPAALSVPEGENLVLNCSFTDSAIYNLQWFRQDP
GKGLTSLLLIQSSQREQTSGRLNASLDKSSGRSTLYIAASQPGDSATYLCAVRPQTGGSYI
PTFGRGTSLIVHPYIQNPDPAVYQLRDSKSSDKSVCLFTDFDSQTNVSQSKDSDVYITDK
TVLDMRSMDFKSNSAVAWSNKSDFACANAFNNSIIPEDTFFPSPESSCDVKLVEKSFETD
TNLNFQNLSVIGFRILLLKVAGFNLLMTLRLWSS* (SEQ ID NO: 7)

BC1 WT Beta Chain (Residue 53 highlighted in bold):
MAPRLLCCAALSLLWAGPVNAGVTQTPKFQVLKTGQSMTLQCAQDMNHEYMSWYRQ
DPGMGLRLIHYSVGAGITDQGEVPNGYNVSRSTTEDFPLRLLSAAPSQTSVYFCASSYV
GAAGELFFGEGSRLTVLEDLNKVFPPEVAVFEPSEAEISHTQKATLVCLATGFFPDHVEL
SWWVNGKEVHSGVSTDPQPLKEQPALNDSRYCLSSRLRVSATFWQNPRNHFRCQVQFY
GLSENDEWTQDRAKPVTQIVSAEAWGRADCGFTSVSYQQGVLSATILYEILLGKATLYA
VLVSALVLMAMVKRKDSRG* (SEQ ID NO: 1)

Fig. 1B

I53E Alpha Chain:
METLLGLLILWLQLQWVSSKQEVTQIPAALSVPEGENLVLNCSFTDSAIYNLQWFRQDP
GKGLTSLLLIQSSQREQTSGRLNASLDKSSGRSTLYIAASQPGDSATYLCAVRPQTGGSYI
PTFGRGTSLIVHPYIQNPDPAVYQLRDSKSSDKSVCLFTDFDSQTNVSQSKDSDVYITDK
TVLDMRSMDFKSNSAVAWSNKSDFACANAFNNSIIPEDTFFPSPESSCDVKLVEKSFETD
TNLNFQNLSVIGFRILLLKVAGFNLLMTLRLWSS* (SEQ ID NO: 7)

I53E Beta Chain (Residue 53 highlighted in bold):
MAPRLLCCAALSLLWAGPVNAGVTQTPKFQVLKTGQSMTLQCAQDMNHEYMSWYRQ
DPGMGLRLIHYSVGAGETDQGEVPNGYNVSRSTTEDFPLRLLSAAPSQTSVYFCASSYV
GAAGELFFGEGSRLTVLEDLNKVFPPEVAVFEPSEAEISHTQKATLVCLATGFFPDHVEL
SWWVNGKEVHSGVSTDPQPLKEQPALNDSRYCLSSRLRVSATFWQNPRNHFRCQVQFY
GLSENDEWTQDRAKPVTQIVSAEAWGRADCGFTSVSYQQGVLSATILYEILLGKATLYA
VLVSALVLMAMVKRKDSRG* (SEQ ID NO: 2)

Fig. 1C

I53F Alpha Chain:
METLLGLLILWLQLQWVSSKQEVTQIPAALSVPEGENLVLNCSFTDSAIYNLQWFRQDP
GKGLTSLLLIQSSQREQTSGRLNASLDKSSGRSTLYIAASQPGDSATYLCAVRPQTGGSYI
PTFGRGTSLIVHPYIQNPDPAVYQLRDSKSSDKSVCLFTDFDSQTNVSQSKDSDVYITDK
TVLDMRSMDFKSNSAVAWSNKSDFACANAFNNSIIPEDTFFPSPESSCDVKLVEKSFETD
TNLNFQNLSVIGFRILLLKVAGFNLLMTLRLWSS* (SEQ ID NO: 7)

I53F Beta Chain (Residue 53 highlighted in bold):
MAPRLLCCAALSLLWAGPVNAGVTQTPKFQVLKTGQSMTLQCAQDMNHEYMSWYRQ
DPGMGLRLIHYSVGAGFTDQGEVPNGYNVSRSTTEDFPLRLLSAAPSQTSVYFCASSYV
GAAGELFFGEGSRLTVLEDLNKVFPPEVAVFEPSEAEISHTQKATLVCLATGFFPDHVEL
SWWVNGKEVHSGVSTDPQPLKEQPALNDSRYCLSSRLRVSATFWQNPRNHFRCQVQFY
GLSENDEWTQDRAKPVTQIVSAEAWGRADCGFTSVSYQQGVLSATILYEILLGKATLYA
VLVSALVLMAMVKRKDSRG* (SEQ ID NO: 3)

Fig. 1D

I53W Alpha Chain:
METLLGLLILWLQLQWVSSKQEVTQIPAALSVPEGENLVLNCSFTDSAIYNLQWFRQDP
GKGLTSLLLIQSSQREQTSGRLNASLDKSSGRSTLYIAASQPGDSATYLCAVRPQTGGSYI
PTFGRGTSLIVHPYIQNPDPAVYQLRDSKSSDKSVCLFTDFDSQTNVSQSKDSDVYITDK
TVLDMRSMDFKSNSAVAWSNKSDFACANAFNNSIIPEDTFFPSPESSCDVKLVEKSFETD
TNLNFQNLSVIGFRILLLKVAGFNLLMTLRLWSS* (SEQ ID NO: 7)

I53W Beta Chain (Residue 53 highlighted in bold):
MAPRLLCCAALSLLWAGPVNAGVTQTPKFQVLKTGQSMTLQCAQDMNHEYMSWYRQ
DPGMGLRLIHYSVGAGWTDQGEVPNGYNVSRSTTEDFPLRLLSAAPSQTSVYFCASSY
VGAAGELFFGEGSRLTVLEDLNKVFPPEVAVFEPSEAEISHTQKATLVCLATGFFPDHVE
LSWWVNGKEVHSGVSTDPQPLKEQPALNDSRYCLSSRLRVSATFWQNPRNHFRCQVQF
YGLSENDEWTQDRAKPVTQIVSAEAWGRADCGFTSVSYQQGVLSATILYEILLGKATLY
AVLVSALVLMAMVKRKDSRG* (SEQ ID NO: 4)

Fig. 1E

D55E Alpha Chain:
METLLGLLILWLQLQWVSSKQEVTQIPAALSVPEGENLVLNCSFTDSAIYNLQWFRQDP
GKGLTSLLLIQSSQREQTSGRLNASLDKSSGRSTLYIAASQPGDSATYLCAVRPQTGGSYI
PTFGRGTSLIVHPYIQNPDPAVYQLRDSKSSDKSVCLFTDFDSQTNVSQSKDSDVYITDK
TVLDMRSMDFKSNSAVAWSNKSDFACANAFNNSIIPEDTFFPSPESSCDVKLVEKSFETD
TNLNFQNLSVIGFRILLLKVAGFNLLMTLRLWSS* (SEQ ID NO: 7)

D55E Beta Chain (Residue 55 highlighted in bold):
MAPRLLCCAALSLLWAGPVNAGVTQTPKFQVLKTGQSMTLQCAQDMNHEYMSWYRQ
DPGMGLRLIHYSVGAGITEQGEVPNGYNVSRSTTEDFPLRLLSAAPSQTSVYFCASSYV
GAAGELFFGEGSRLTVLEDLNKVFPPEVAVFEPSEAEISHTQKATLVCLATGFFPDHVEL
SWWVNGKEVHSGVSTDPQPLKEQPALNDSRYCLSSRLRVSATFWQNPRNHFRCQVQFY
GLSENDEWTQDRAKPVTQIVSAEAWGRADCGFTSVSYQQGVLSATILYEILLGKATLYA
VLVSALVLMAMVKRKDSRG* (SEQ ID NO: 5)

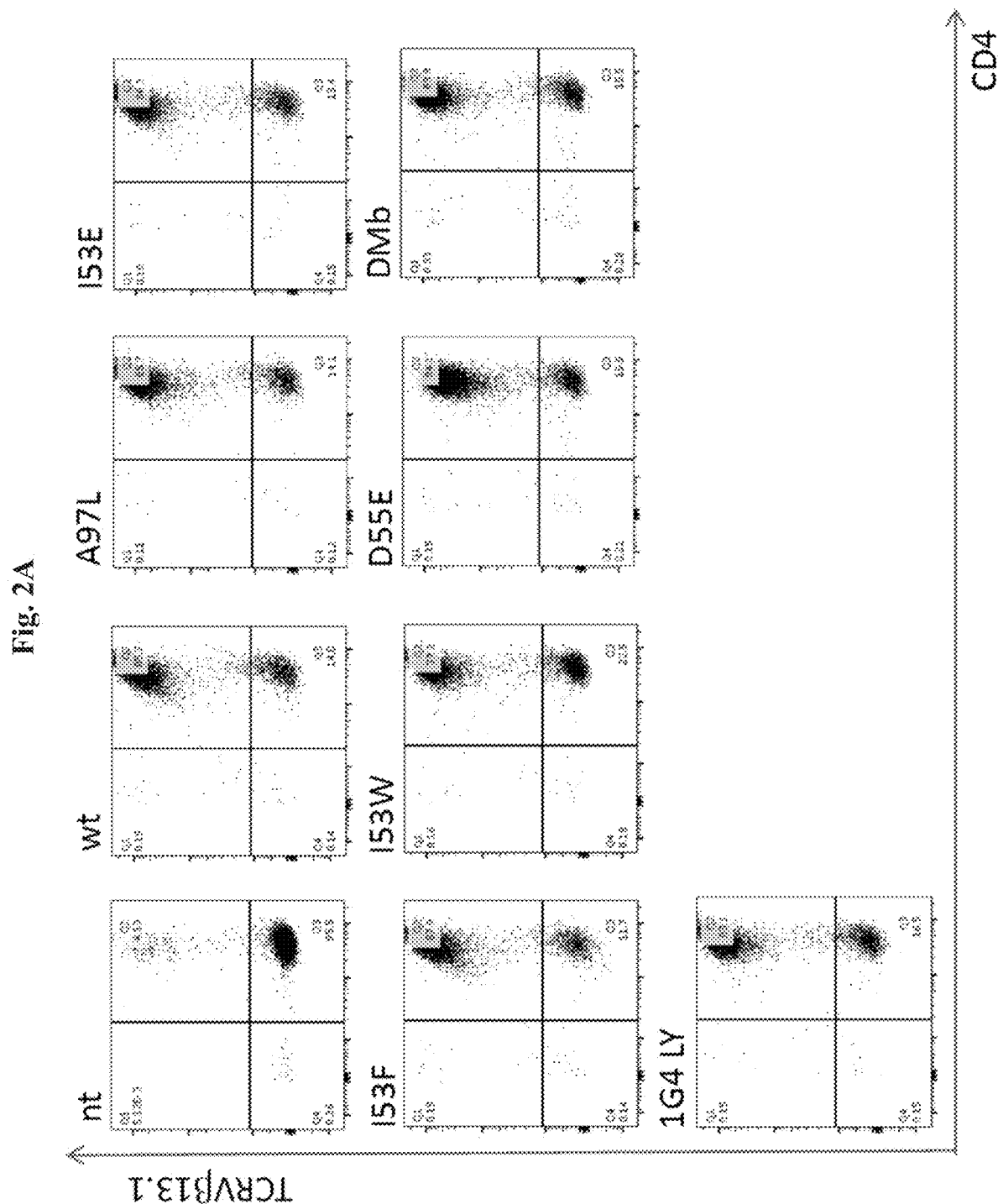

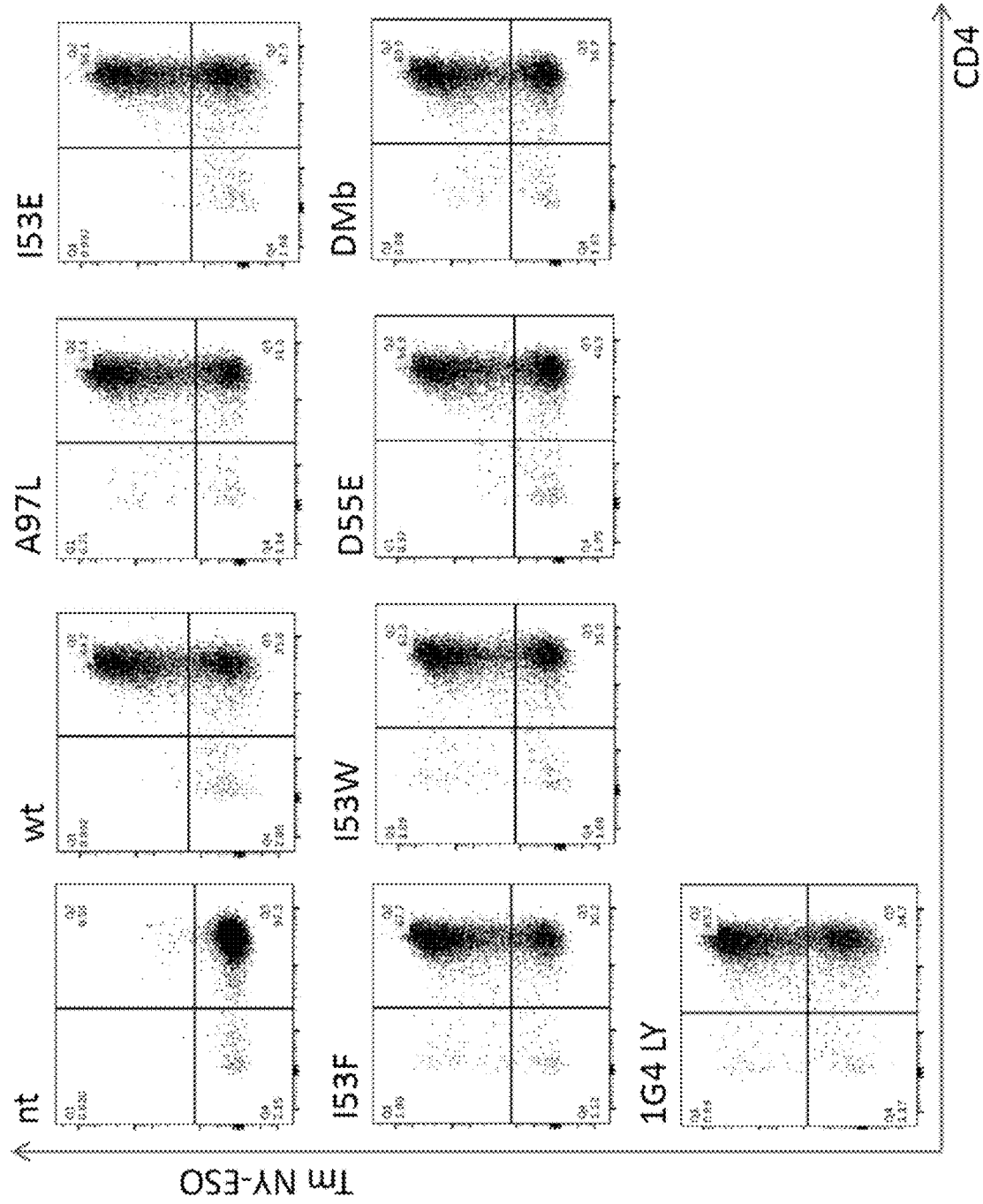

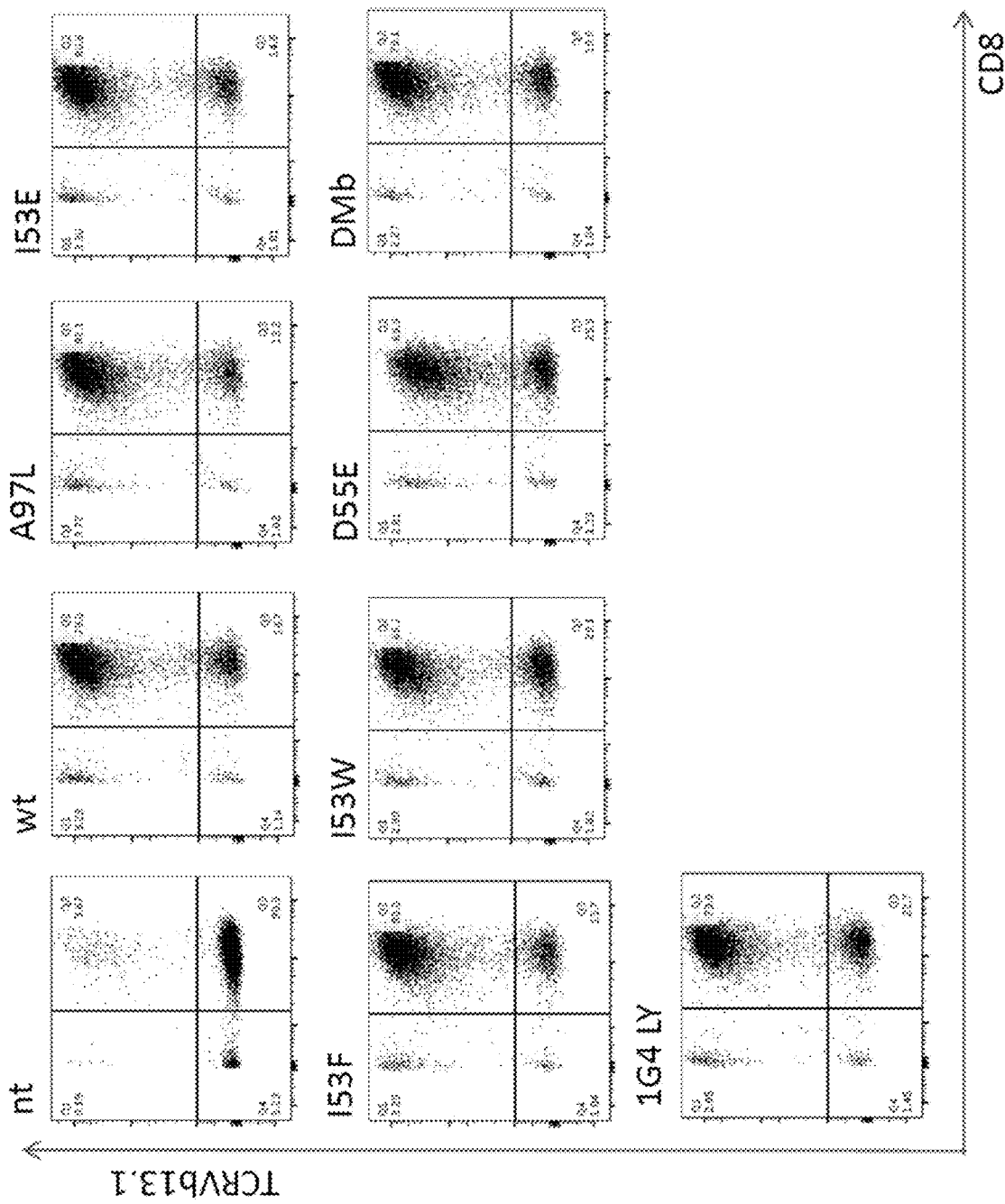

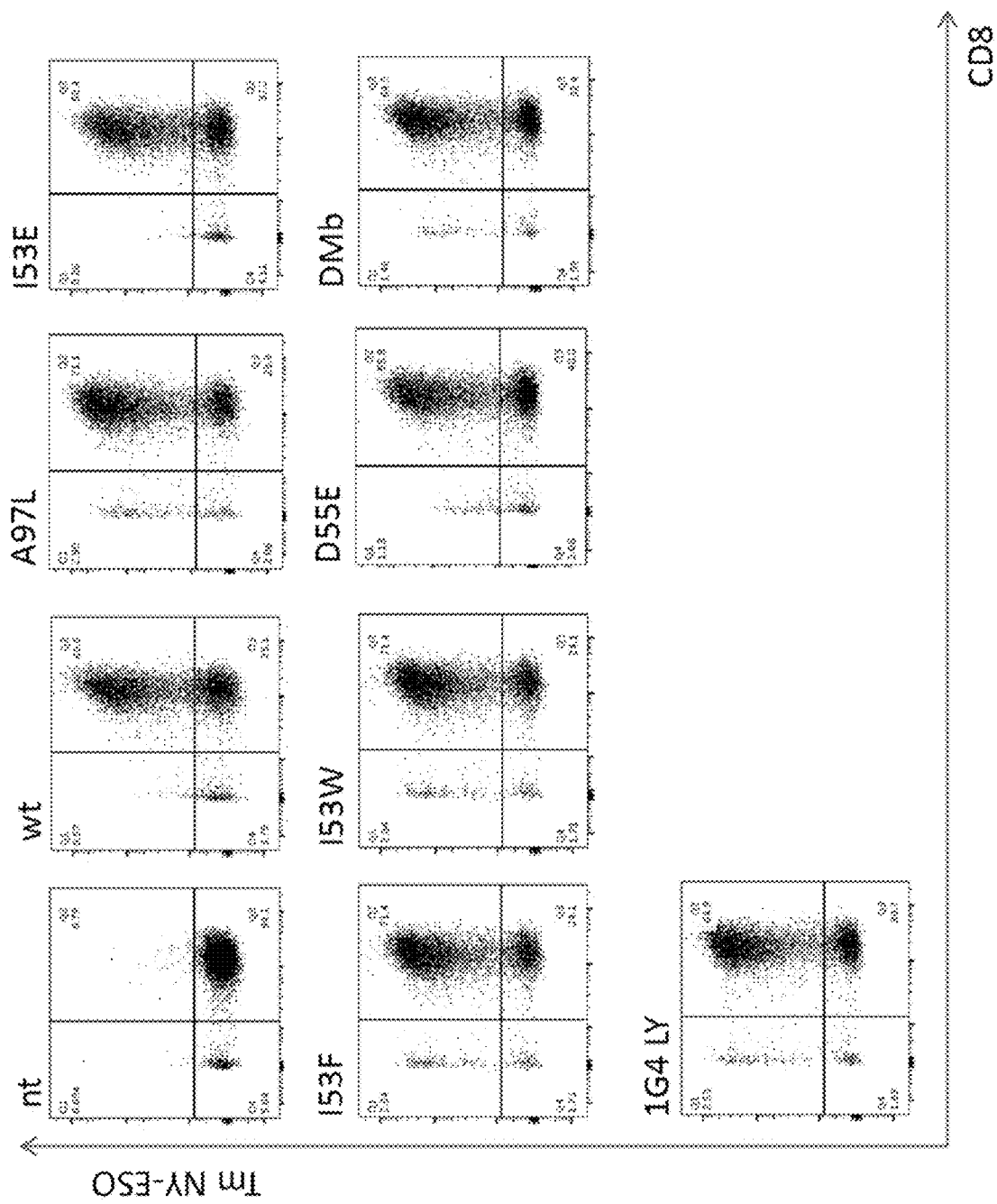

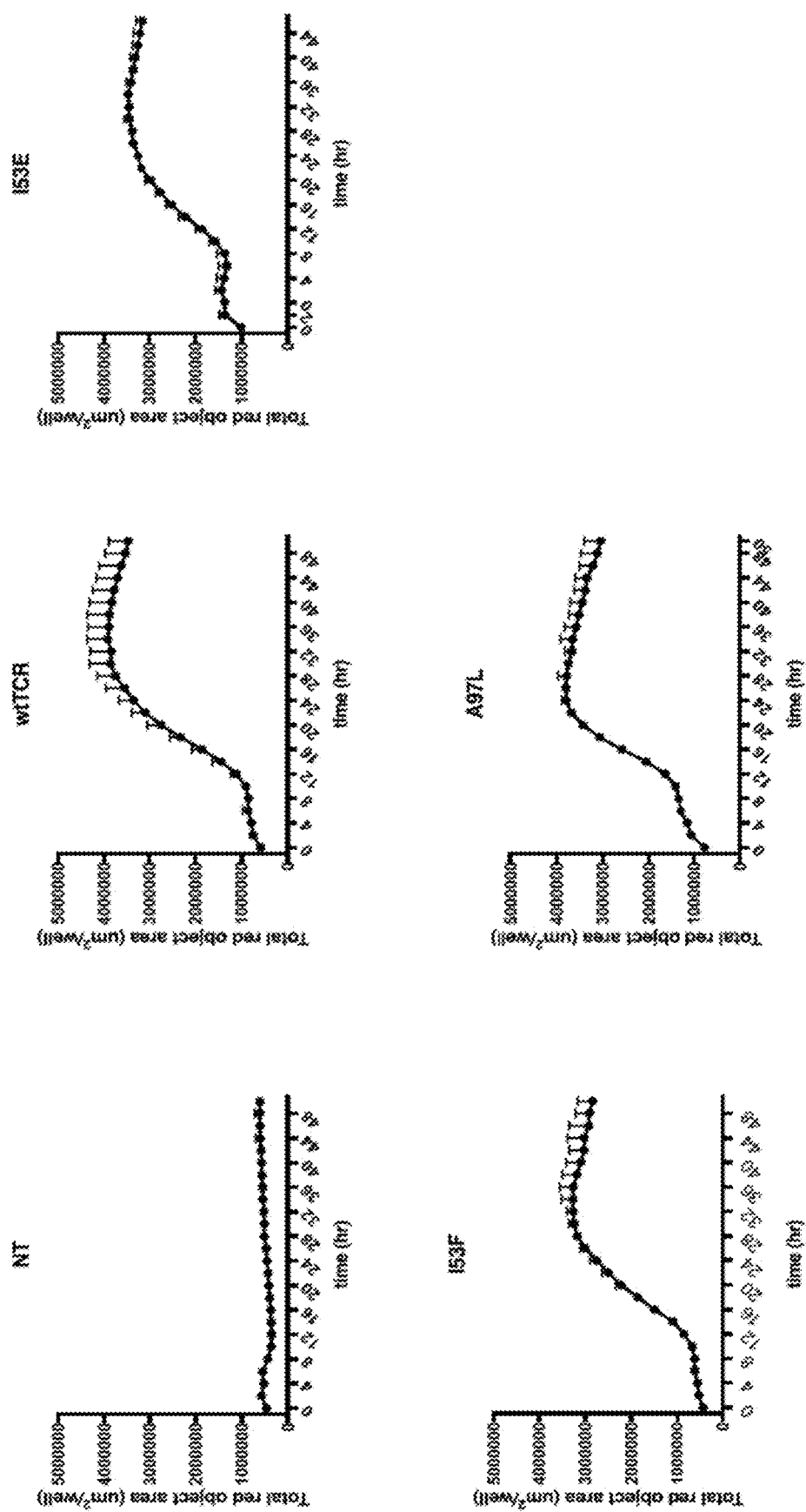

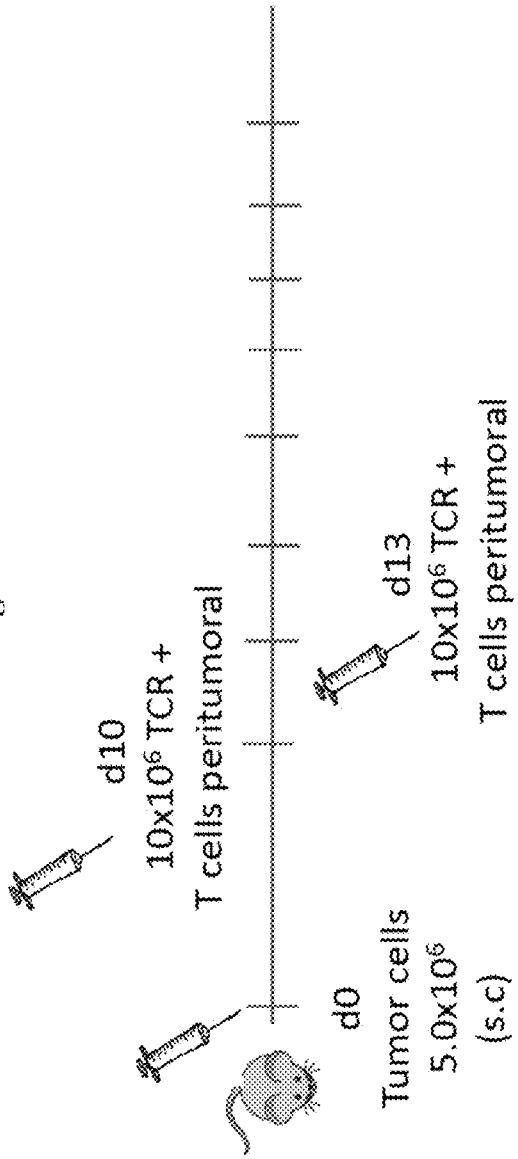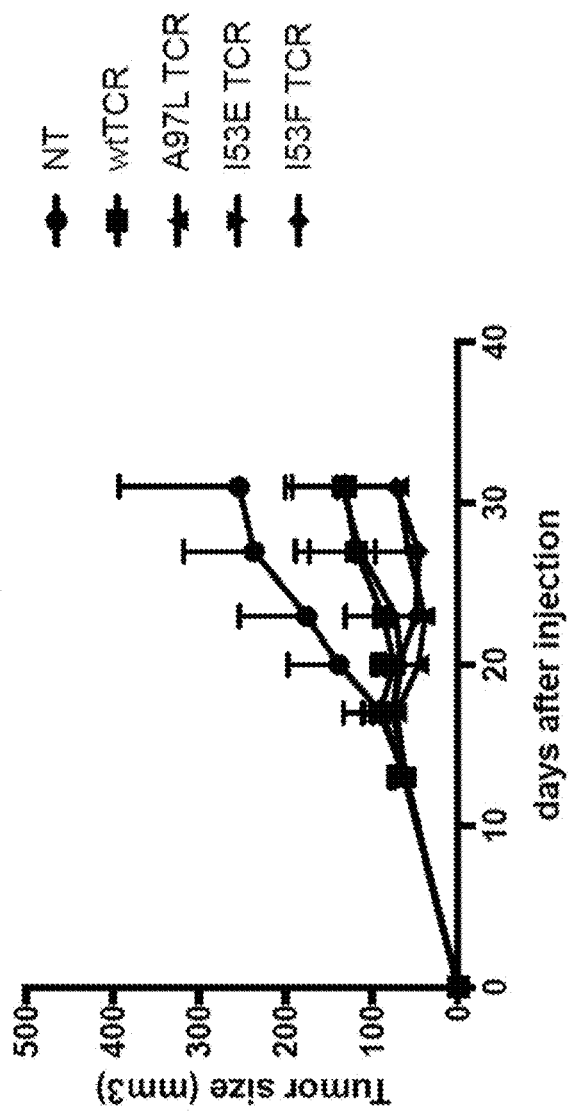
Fig. 14A
Fig. 14B

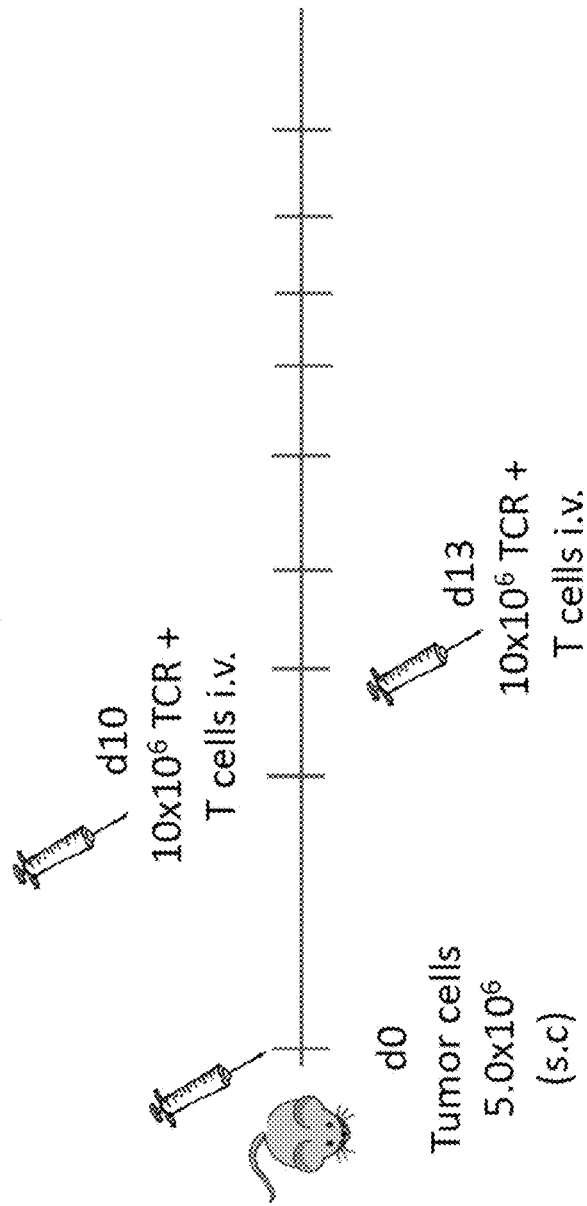
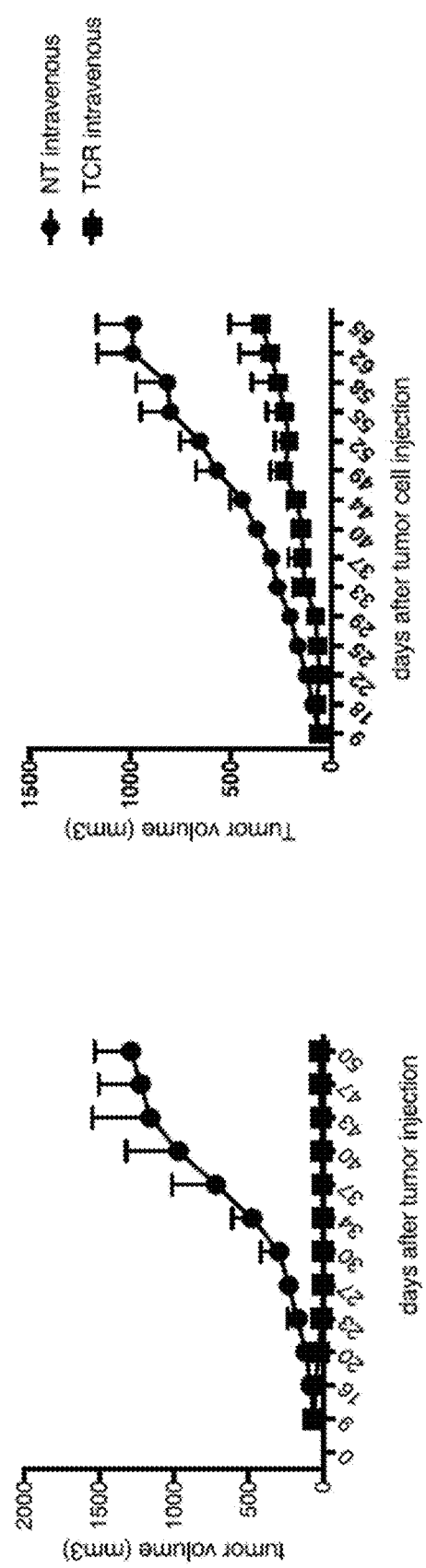
Fig. 15A
Fig. 15B

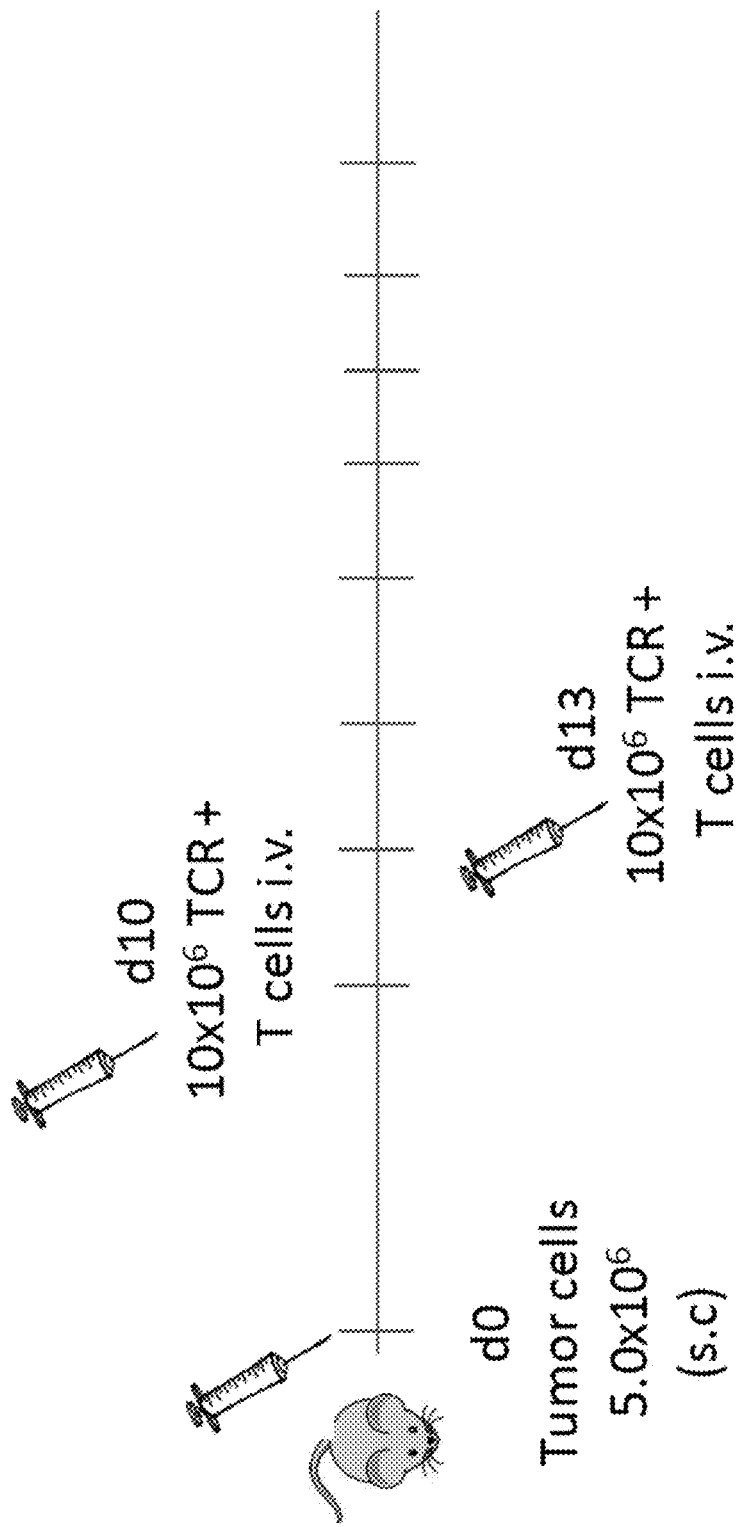

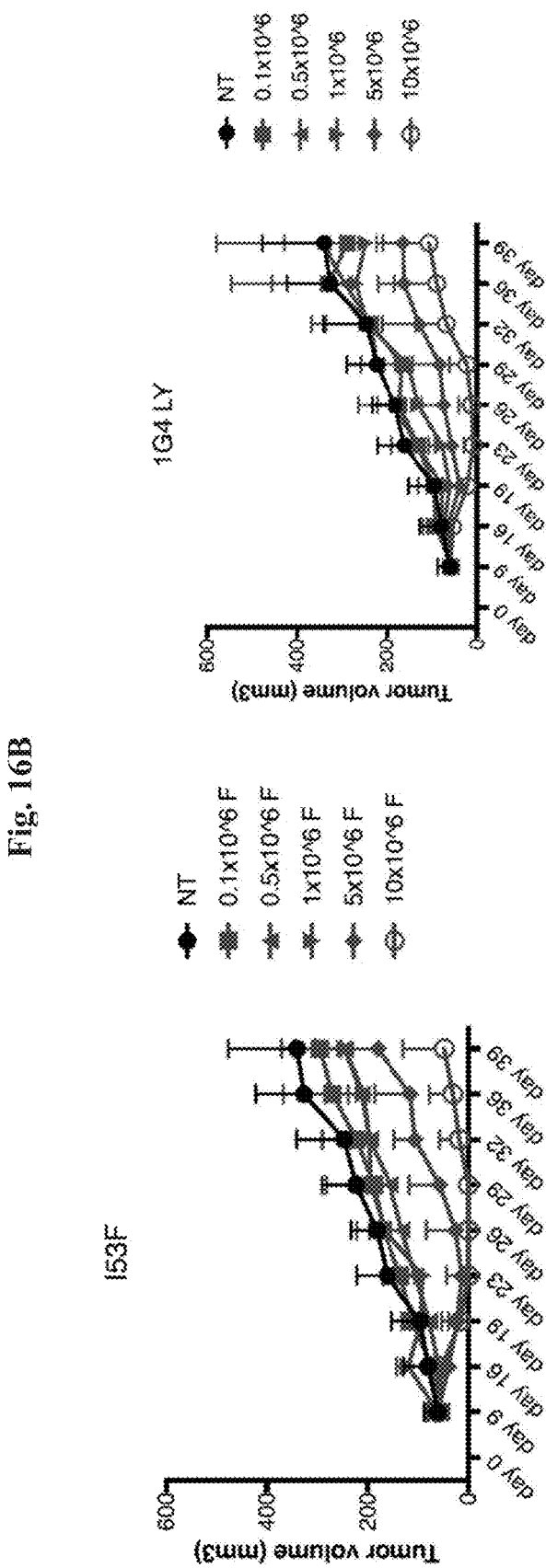

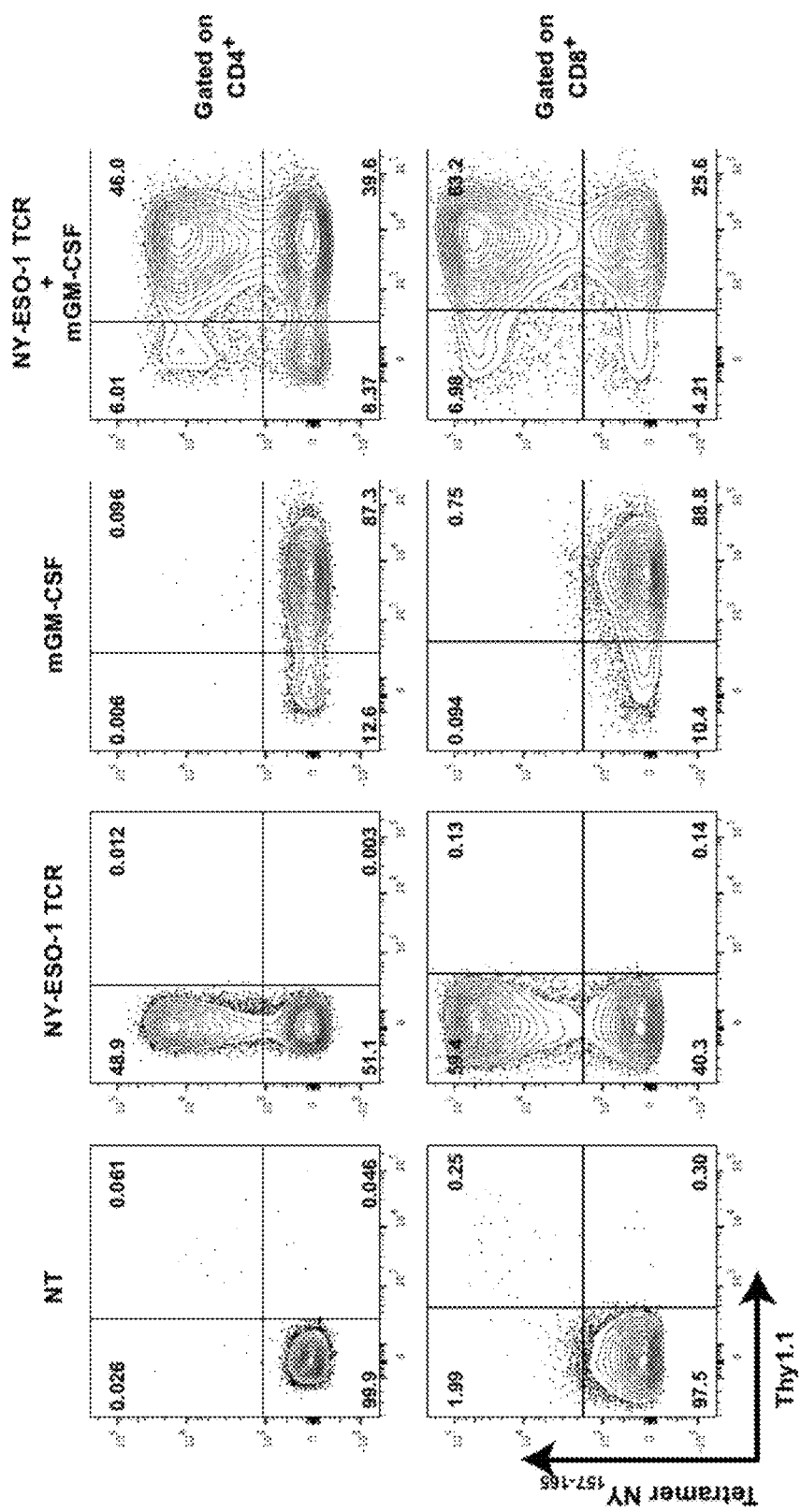

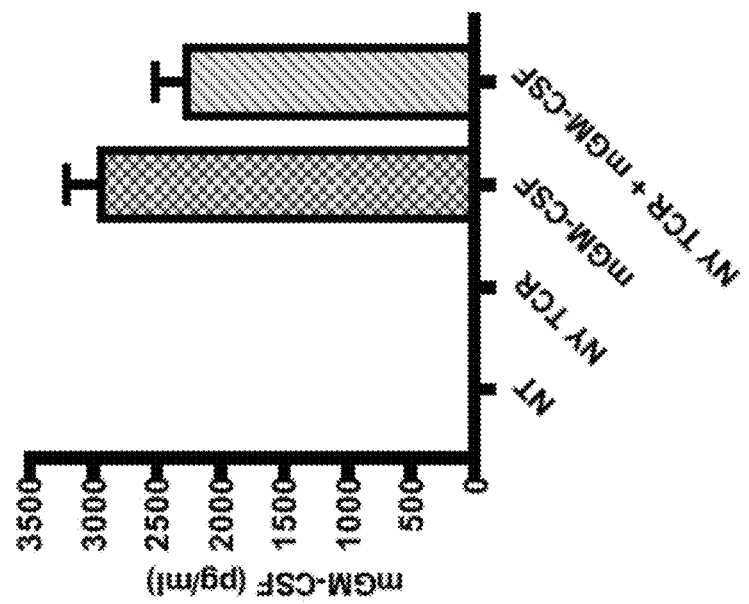

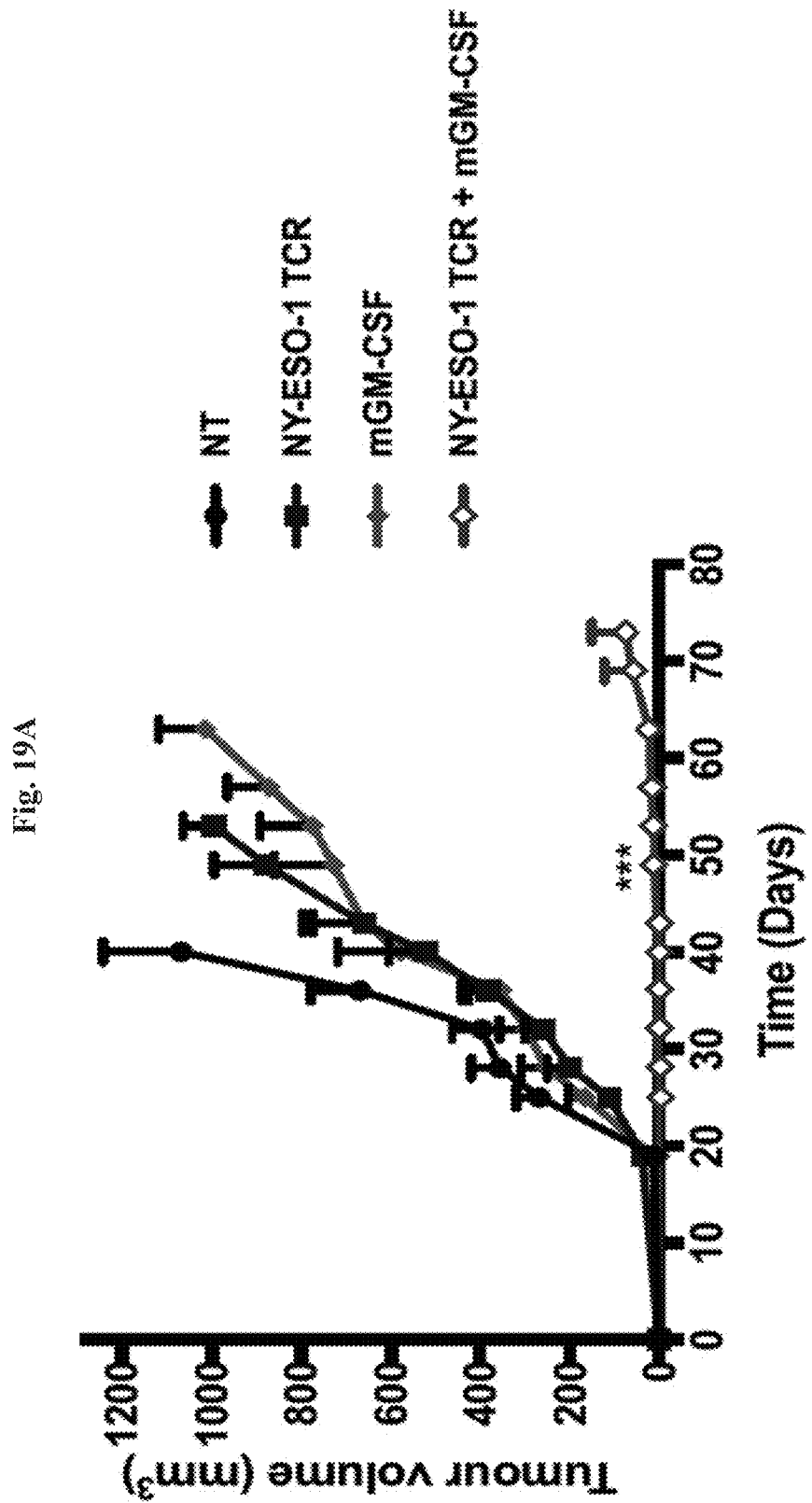

Fig. 20A

Mouse GM-CSF:
(UniProtKB-P01587)

Full protein = 1-141 (141aa, 16.1kDa)
Signal peptide = 1-17 (17aa)
Active soluble GM-CSF = 18-141 (124aa, 14.2kDa)

Protein sequence:
MWLQNLLFLGIVVYSLSAPTRSPITVTRPWKHVEAIKEALNLLDDMPVTLNEEVEVVSNEFSFKKLTCVQTRLKIFEQGLRGNFTKLKGALNMTASYYQTYCPPTPET
DCETQVTTYADFIDSLKTFLTDIPFECKKPGQK (SEQ ID NO: 15)

DNA sequence:
ATGTGGCTGCAGAATTTACTTTTCCTGGGCATTGTGGTCTACAGCCTCTCAGCACCCACCCGCTCACCCATCACTGTCACCCGGCCTTGGAAGCATGTAGAGGC
CATCAAAGAAGCCCTGAACCTCCTGGATGACATGCCTGTCACATTGAATGAAGAGGTAGAAGAGTTCTCTTCAAGAAGTTAACATGTGT
GCAGACCCGCCTGAAGATATTCGAGCAGATATTCACGGGGCAATTTCACCAAACTCAAGGGCGCCTTGAACATGACAGCCAGCTACTACCAGACATACTGCC
CCCCAACTCCGGAAACGGACTGTGAAACACACAAGTTACCACCTATGCGGATTTCATAGACAGCCTTAAAACCTTTCGACTGATATCCCCTTTGAATGCAAAAA
ACCAGGCCAAAAA (SEQ ID NO: 16)

Fig. 20B

Human GM-CSF:
(UniProtKB - P04141)

Full protein = 1-144 (144aa, 16.3kDa)
Signal peptide = 1-17 (17aa)
Active soluble GM-CSF = 18-144 (127aa, 14.5kDa)

Protein Sequence:
MWLQSLLLLGTVACSISAPARSPSPSTQPWEHVNAIQEARRLLNLSRDTAAEMNETVEVISEMFDLQEPTCLQTRLELYKQGLRGSLTKLKGPLTMMASHYKQHC
PPTPETSCATQTITFESFKENLKDFLLVIPFDCWEPVQE (SEQ ID NO: 21)

DNA Sequence:
ATGTGGCTGCAATCTCTGCTGCTGCTGGGCACAGTGGCCTGTGTTCTATTAGCGCCCCTGCCAGATCTCCATCTCCTAGCACACAGCCTTGGGAGCACGTGAACGC
CATCCAAGAAGCCAGAAGACTGCTGAACCTGAGCAGAGATACAGCCGCCGAGATGAATGAAACAGTGGAAGTGATCAGCGAGATGTTCGACCTGCAAGA
GCCTACCTGCCTGCAGACCAGACTGGAACTGTACAAGCAGGGCCTGAGAGGCAGCCTGACCAAGCTGAAAGGCCCTCTGACAATGATGGCCAGCCACTACA
AGCAGCACTGCCCTCCAACACCTGAGACAAGCTGTGCCACACAGACCATCACCTTCGAGAGCTTCAAAGAGAACCTGAAAGACTTCCTGCTGGTCATCCCCT
TCGACTGCTGGGAGCCCGTGCAAGAA (SEQ ID NO: 22)

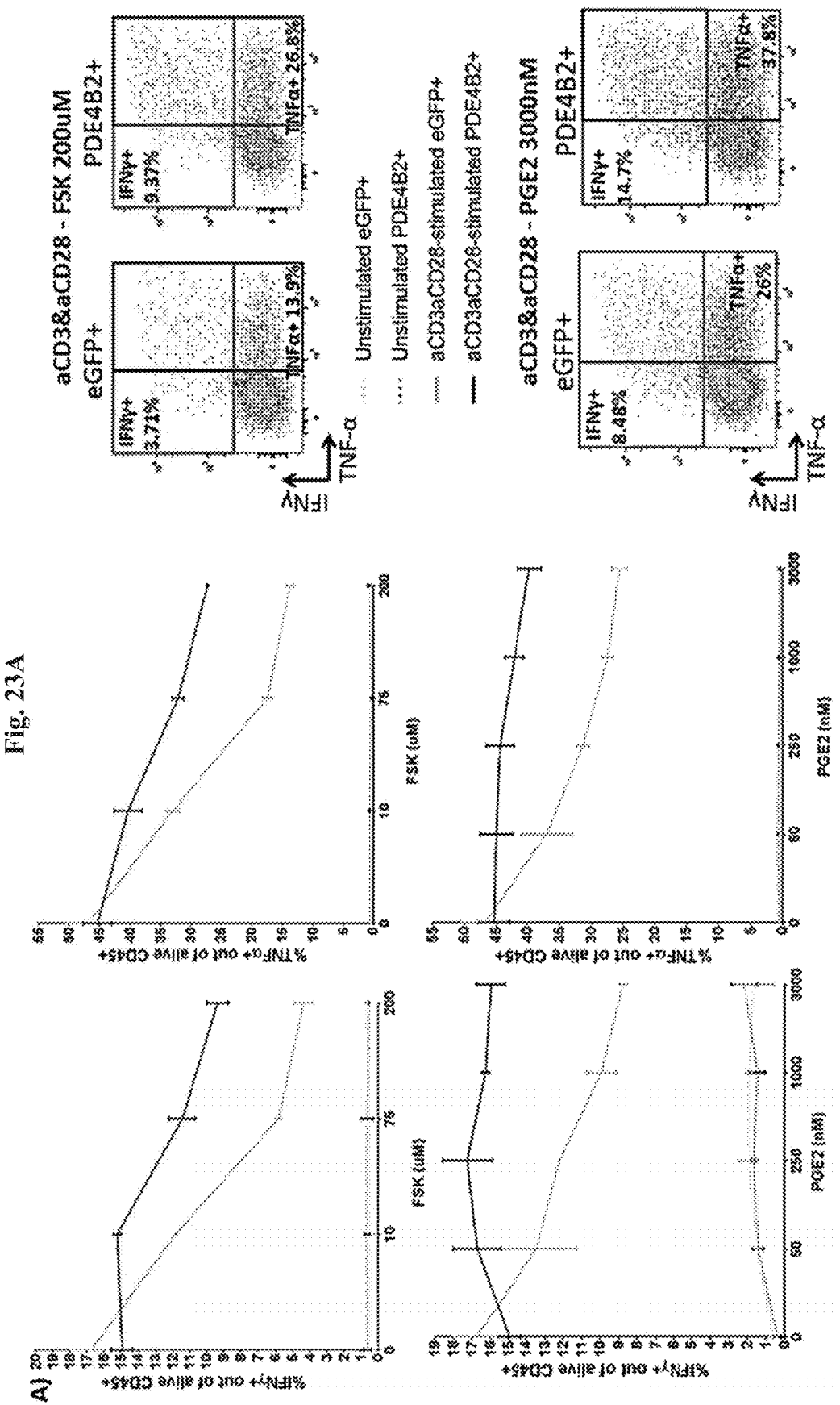

Fig. 26

Human PDE4B2 sequence: 564 amino acids

>gi|82799482|ref|NP_001032416.1| cAMP-specific 3',5'-cyclic phosphodiesterase 4B isoform 2 [Homo sapiens]
MKEHGGTFSSTGISGSGGDSAMDSLQPLQPNYMPVCLFAEESYQKLAMETLEELDWCLDQLETIQTYRSVSEMASNKFKRMLNRELTHLSE
MSRSGNQVSEYISNTFLDKQNDVEIPSPTQKDREKKKQQLMTQISGVKKLMHSSSLNNTSISRFGVNTENEDHLAKELEDLNKWGLNIFNV
AGYSHNRPLTCIMYAIFQERDLLKTFRISSDTFITYMMTLEDHYHSDVAYHNSLHAADVAQSTHVLLSTPALDAVFTDLEILAAIFAAAIHDVDH
PGVSNQFLINTNSELALMYNDESVLENHHLAVGFKLLQEEHCDIFMNLTKKQRQTLRKMVIDMVLATDMSKHMSLLADLKTMVETKKVTSS
GVLLLDNYTDRIQVLRNMVHCADLSNPTKSLELYRQWTDRIMEEFFQQGDKERERGMEISPMCDKHTASVEKSQVGFIDYIVHPLWETWA
DLVQPDAQDILDTLEDNRRNWYQSMIPQSPSPPLDEQNRDCQGLMEKFQFELTLDEEDSEGPEKEGEGHSYFSSTKTLCVIDPENRDSLGETDI
DIATEDKSPVDT (SEQ ID NO: 27)

Mouse PDE4B2 sequence: 564 amino acids

>gi|295789129|ref|NP_001171451.1| cAMP-specific 3',5'-cyclic phosphodiesterase 4B isoform 2 [Mus musculus]
MKEQGGTVSGAASSRGGGDSAMASLQPLQPNYLSVCLFPEESYQKLAMETLEELDWCLDQLETIQTYRSVSEMASNKFKRMLNRELTHLSE
MSRSGNQVSEYISNTFLDKQNDVEIPSPTQKDREKKKQQLMTQISGVKKLMHSSSLNNTSISRFGVNTENEDHLAKELEDLNKWGLNIFNV
AGYSHNRPLTCIMYAIFQERDLLKTFKISSDTFVTYMMTLEDHYHSDVAYHNSLHAADVAQSTHVLLSTPALDAVFTDLEILAAIFAAAIHDVD
HPGVSNQFLINTNSELALMYNDESVLENHHLAVGFKLLQEEHCDIFQNLTKKQRQTLRKMVIDMVLATDMSKHMSLLADLKTMVETKKVTS
SGVLLLDNYTDRIQVLRNMVHCADLSNPTKSLELYRQWTDRIMEEFFQQGDKERERGMEISPMCDKHTASVEKSQVGFIDYIVHPLWETWA
DLVQPDAQDILDTLEDNRRNWYQSMIPQSPSPPLDERSRDCQGLMEKFQFELTLEEEDSEGPEKEGEGHSYFSSTKTLCVIDPENRDSLEETDID
IATEDKSPIDT (SEQ ID NO: 29)

SEQUENCE LISTING

<160> NUMBER OF SEQ ID NOS: 82

<210> SEQ ID NO 1
<211> LENGTH: 311
<212> TYPE: PRT
<213> ORGANISM: Unknown
<220> FEATURE:
<221> NAME/KEY: source
<223> OTHER INFORMATION: /note="Description of Unknown:
      BC1 WT beta chain sequence"

<400> SEQUENCE: 1

Met Ala Pro Arg Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Ala Ala Gly Glu Leu Phe Phe Gly Glu Gly Ser Arg
        115                 120                 125

Leu Thr Val Leu Glu Asp Leu Asn Lys Val Phe Pro Pro Glu Val Ala
    130                 135                 140

Val Phe Glu Pro Ser Glu Ala Glu Ile Ser His Thr Gln Lys Ala Thr
145                 150                 155                 160

Leu Val Cys Leu Ala Thr Gly Phe Phe Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Cys Leu
        195                 200                 205

Ser Ser Arg Leu Arg Val Ser Ala Thr Phe Trp Gln Asn Pro Arg Asn
    210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Cys Gly Phe Thr Ser Val Ser Tyr Gln Gln
            260                 265                 270

Gly Val Leu Ser Ala Thr Ile Leu Tyr Glu Ile Leu Leu Gly Lys Ala
        275                 280                 285

Thr Leu Tyr Ala Val Leu Val Ser Ala Leu Val Leu Met Ala Met Val
    290                 295                 300

Lys Arg Lys Asp Ser Arg Gly
305                 310

<210> SEQ ID NO 2
<211> LENGTH: 311
<212> TYPE: PRT
<213> ORGANISM: Artificial Sequence

```
<220> FEATURE:
<221> NAME/KEY: source
<223> OTHER INFORMATION: /note="Description of Artificial Sequence:
      Synthetic polypeptide"

<400> SEQUENCE: 2

Met Ala Pro Arg Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Glu Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Ala Ala Gly Glu Leu Phe Phe Gly Glu Gly Ser Arg
        115                 120                 125

Leu Thr Val Leu Glu Asp Leu Asn Lys Val Phe Pro Pro Glu Val Ala
    130                 135                 140

Val Phe Glu Pro Ser Glu Ala Glu Ile Ser His Thr Gln Lys Ala Thr
145                 150                 155                 160

Leu Val Cys Leu Ala Thr Gly Phe Phe Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Cys Leu
        195                 200                 205

Ser Ser Arg Leu Arg Val Ser Ala Thr Phe Trp Gln Asn Pro Arg Asn
    210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Cys Gly Phe Thr Ser Val Ser Tyr Gln Gln
            260                 265                 270

Gly Val Leu Ser Ala Thr Ile Leu Tyr Glu Ile Leu Leu Gly Lys Ala
        275                 280                 285

Thr Leu Tyr Ala Val Leu Val Ser Ala Leu Val Leu Met Ala Met Val
    290                 295                 300

Lys Arg Lys Asp Ser Arg Gly
305                 310

<210> SEQ ID NO 3
<211> LENGTH: 311
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 3
```

Met Ala Pro Arg Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
50                  55                  60

Ile His Tyr Ser Val Gly Ala Gly Phe Thr Asp Gln Gly Glu Val Pro
65                  70                  75                  80

Asn Gly Tyr Asn Val Ser Arg Ser Thr Thr Glu Asp Phe Pro Leu Arg
            85                  90                  95

Leu Leu Ser Ala Ala Pro Ser Gln Thr Ser Val Tyr Phe Cys Ala Ser
            100                 105                 110

Ser Tyr Val Gly Ala Ala Gly Glu Leu Phe Phe Gly Glu Gly Ser Arg
            115                 120                 125

Leu Thr Val Leu Glu Asp Leu Asn Lys Val Phe Pro Pro Glu Val Ala
        130                 135                 140

Val Phe Glu Pro Ser Glu Ala Glu Ile Ser His Thr Gln Lys Ala Thr
145                 150                 155                 160

Leu Val Cys Leu Ala Thr Gly Phe Phe Pro Asp His Val Glu Leu Ser
            165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Cys Leu
        195                 200                 205

Ser Ser Arg Leu Arg Val Ser Ala Thr Phe Trp Gln Asn Pro Arg Asn
        210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
            245                 250                 255

Ala Trp Gly Arg Ala Asp Cys Gly Phe Thr Ser Val Ser Tyr Gln Gln
            260                 265                 270

Gly Val Leu Ser Ala Thr Ile Leu Tyr Glu Ile Leu Leu Gly Lys Ala
        275                 280                 285

Thr Leu Tyr Ala Val Leu Val Ser Ala Leu Val Leu Met Ala Met Val
        290                 295                 300

Lys Arg Lys Asp Ser Arg Gly
305                 310

<210> SEQ ID NO 4
<211> LENGTH: 311
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 4

Met Ala Pro Arg Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His

```
                35                  40                  45
Glu Tyr Met Ser Trp Tyr Arg Gln Asp Pro Gly Met Gly Leu Arg Leu
 50                  55                  60

Ile His Tyr Ser Val Gly Ala Gly Trp Thr Asp Gln Gly Glu Val Pro
 65                  70                  75                  80

Asn Gly Tyr Asn Val Ser Arg Ser Thr Thr Glu Asp Phe Pro Leu Arg
                 85                  90                  95

Leu Leu Ser Ala Ala Pro Ser Gln Thr Ser Val Tyr Phe Cys Ala Ser
                100                 105                 110

Ser Tyr Val Gly Ala Ala Gly Glu Leu Phe Phe Gly Glu Gly Ser Arg
                115                 120                 125

Leu Thr Val Leu Glu Asp Leu Asn Lys Val Phe Pro Pro Glu Val Ala
130                 135                 140

Val Phe Glu Pro Ser Glu Ala Glu Ile Ser His Thr Gln Lys Ala Thr
145                 150                 155                 160

Leu Val Cys Leu Ala Thr Gly Phe Phe Pro Asp His Val Glu Leu Ser
                165                 170                 175

Trp Trp Val Asn Gly Lys Glu Val His Ser Gly Val Ser Thr Asp Pro
                180                 185                 190

Gln Pro Leu Lys Glu Gln Pro Ala Leu Asn Asp Ser Arg Tyr Cys Leu
                195                 200                 205

Ser Ser Arg Leu Arg Val Ser Ala Thr Phe Trp Gln Asn Pro Arg Asn
210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Cys Gly Phe Thr Ser Val Ser Tyr Gln Gln
                260                 265                 270

Gly Val Leu Ser Ala Thr Ile Leu Tyr Glu Ile Leu Leu Gly Lys Ala
                275                 280                 285

Thr Leu Tyr Ala Val Leu Val Ser Ala Leu Val Leu Met Ala Met Val
290                 295                 300

Lys Arg Lys Asp Ser Arg Gly
305                 310

<210> SEQ ID NO 5
<211> LENGTH: 311
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 5

Met Ala Pro Arg Leu Leu Cys Cys Ala Ala Leu Ser Leu Leu Trp Ala
 1               5                  10                  15

Gly Pro Val Asn Ala Gly Val Thr Gln Thr Pro Lys Phe Gln Val Leu
                 20                  25                  30

Lys Thr Gly Gln Ser Met Thr Leu Gln Cys Ala Gln Asp Met Asn His
                 35                  40                  45

Glu Tyr Met Ser Trp Tyr Arg Gln Asp Pro Gly Met Gly Leu Arg Leu
 50                  55                  60

Ile His Tyr Ser Val Gly Ala Gly Ile Thr Glu Gln Gly Glu Val Pro
 65                  70                  75                  80
```

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Ala Ala Gly Glu Leu Phe Phe Gly Glu Gly Ser Arg
        115                 120                 125

Leu Thr Val Leu Glu Asp Leu Asn Lys Val Phe Pro Pro Glu Val Ala
130                 135                 140

Val Phe Glu Pro Ser Glu Ala Glu Ile Ser His Thr Gln Lys Ala Thr
145                 150                 155                 160

Leu Val Cys Leu Ala Thr Gly Phe Phe Pro Asp His Val Glu Leu Ser
                165                 170                 175

Trp Trp Val Asn Gly Lys Glu Val His Ser Gly Val Ser Thr Asp Pro
                180                 185                 190

Gln Pro Leu Lys Glu Gln Pro Ala Leu Asn Asp Ser Arg Tyr Cys Leu
            195                 200                 205

Ser Ser Arg Leu Arg Val Ser Ala Thr Phe Trp Gln Asn Pro Arg Asn
        210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Cys Gly Phe Thr Ser Val Ser Tyr Gln Gln
                260                 265                 270

Gly Val Leu Ser Ala Thr Ile Leu Tyr Glu Ile Leu Leu Gly Lys Ala
            275                 280                 285

Thr Leu Tyr Ala Val Leu Val Ser Ala Leu Val Leu Met Ala Met Val
        290                 295                 300

Lys Arg Lys Asp Ser Arg Gly
305                 310

<210> SEQ ID NO 6
<211> LENGTH: 311
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 6

Met Ala Pro Arg Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

```
Ser Tyr Val Gly Leu Ala Gly Glu Leu Phe Phe Gly Glu Gly Ser Arg
            115                 120                 125

Leu Thr Val Leu Glu Asp Leu Asn Lys Val Phe Pro Pro Glu Val Ala
            130                 135                 140

Val Phe Glu Pro Ser Glu Ala Glu Ile Ser His Thr Gln Lys Ala Thr
145                 150                 155                 160

Leu Val Cys Leu Ala Thr Gly Phe Phe Pro Asp His Val Glu Leu Ser
                165                 170                 175

Trp Trp Val Asn Gly Lys Glu Val His Ser Gly Val Ser Thr Asp Pro
                180                 185                 190

Gln Pro Leu Lys Glu Gln Pro Ala Leu Asn Asp Ser Arg Tyr Cys Leu
                195                 200                 205

Ser Ser Arg Leu Arg Val Ser Ala Thr Phe Trp Gln Asn Pro Arg Asn
            210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Cys Gly Phe Thr Ser Val Ser Tyr Gln Gln
                260                 265                 270

Gly Val Leu Ser Ala Thr Ile Leu Tyr Glu Ile Leu Leu Gly Lys Ala
            275                 280                 285

Thr Leu Tyr Ala Val Leu Val Ser Ala Leu Val Leu Met Ala Met Val
            290                 295                 300

Lys Arg Lys Asp Ser Arg Gly
305                 310

<210> SEQ ID NO 7
<211> LENGTH: 274
<212> TYPE: PRT
<213> ORGANISM: Unknown
<220> FEATURE:
<221> NAME/KEY: source
<223> OTHER INFORMATION: /note="Description of Unknown:
      BC1 WT alpha chain sequence"

<400> SEQUENCE: 7

Met Glu Thr Leu Leu Gly Leu Leu Ile Leu Trp Leu Gln Leu Gln Trp
1               5                   10                  15

Val Ser Ser Lys Gln Glu Val Thr Gln Ile Pro Ala Ala Leu Ser Val
                20                  25                  30

Pro Glu Gly Glu Asn Leu Val Leu Asn Cys Ser Phe Thr Asp Ser Ala
            35                  40                  45

Ile Tyr Asn Leu Gln Trp Phe Arg Gln Asp Pro Gly Lys Gly Leu Thr
        50                  55                  60

Ser Leu Leu Leu Ile Gln Ser Ser Gln Arg Glu Gln Thr Ser Gly Arg
65              70                  75                  80

Leu Asn Ala Ser Leu Asp Lys Ser Ser Gly Arg Ser Thr Leu Tyr Ile
                85                  90                  95

Ala Ala Ser Gln Pro Gly Asp Ser Ala Thr Tyr Leu Cys Ala Val Arg
            100                 105                 110

Pro Gln Thr Gly Gly Ser Tyr Ile Pro Thr Phe Gly Arg Gly Thr Ser
            115                 120                 125

Leu Ile Val His Pro Tyr Ile Gln Asn Pro Asp Pro Ala Val Tyr Gln
            130                 135                 140

Leu Arg Asp Ser Lys Ser Ser Asp Lys Ser Val Cys Leu Phe Thr Asp
```

```
                145                 150                 155                 160
        Phe Asp Ser Gln Thr Asn Val Ser Gln Ser Lys Asp Ser Asp Val Tyr
                        165                 170                 175
        Ile Thr Asp Lys Thr Val Leu Asp Met Arg Ser Met Asp Phe Lys Ser
                        180                 185                 190
        Asn Ser Ala Val Ala Trp Ser Asn Lys Ser Asp Phe Ala Cys Ala Asn
                        195                 200                 205
        Ala Phe Asn Asn Ser Ile Ile Pro Glu Asp Thr Phe Phe Pro Ser Pro
                210                 215                 220
        Glu Ser Ser Cys Asp Val Lys Leu Val Glu Lys Ser Phe Glu Thr Asp
        225                 230                 235                 240
        Thr Asn Leu Asn Phe Gln Asn Leu Ser Val Ile Gly Phe Arg Ile Leu
                        245                 250                 255
        Leu Leu Lys Val Ala Gly Phe Asn Leu Leu Met Thr Leu Arg Leu Trp
                        260                 265                 270
        Ser Ser

<210> SEQ ID NO 8
<211> LENGTH: 9
<212> TYPE: PRT
<213> ORGANISM: Homo sapiens

<400> SEQUENCE: 8

Ser Leu Leu Met Trp Ile Thr Gln Cys
1               5

<210> SEQ ID NO 9
<211> LENGTH: 822
<212> TYPE: DNA
<213> ORGANISM: Unknown
<220> FEATURE:
<221> NAME/KEY: source
<223> OTHER INFORMATION: /note="Description of Unknown:
      BC1 WT alpha chain sequence"

<400> SEQUENCE: 9
atggaaaccc tgctgggcct gctgatcctg tggctgcagc tgcagtgggt gtccagcaag      60
caggaagtga cccagatccc tgccgccctg agcgtgcccg agggcgagaa cctggtgctg     120
aactgcagct tcaccgacag cgccatctac aacctgcagt ggttccggca ggaccccggc     180
aagggcctga ccagcctgct gctgatccag agcagccagc gggagcagac cagcggcagg     240
ctgaacgcca gcctggacaa gagcagcggc agaagcaccc tgtacatcgc cgccagccag     300
cccggcgact ccgccaccta cctgtgcgcc gtgcggcctc agaccggcgg cagctacatc     360
cccaccttcg caggggcac cagcctgatc gtgcacccct acatccagaa ccccgacccc     420
gccgtgtacc agctgcggga cagcaagtcc agcgacaaga gcgtgtgcct gttcaccgac     480
ttcgacagcc agaccaacgt gagccagagc aaggacagcg acgtgtacat caccgacaag     540
accgtgctgg acatgcggag catggacttc aagagcaaca cgccgtggc ctggtccaac     600 aagagcgact tcgcctgcgc caacgccttc aacaacagca tcatccccga ggacaccttt     660
ttccccagcc ccgagagcag ctgcgacgtg aaactggtgg agaagagctt cgagaccgac     720
accaacctga acttccagaa cctgagcgtg atcggcttca gaattctgct gctgaaggtg     780
gccggcttca acctgctgat gaccctgcgg ctgtggagca gt                        822

<210> SEQ ID NO 10
<211> LENGTH: 936
```

```
<212> TYPE: DNA
<213> ORGANISM: Unknown
<220> FEATURE:
<221> NAME/KEY: source
<223> OTHER INFORMATION: /note="Description of Unknown:
      BC1 WT beta chain sequence"

<400> SEQUENCE: 10
atggccccgc ggctgctgtg ttgtgccgcc ctgagcctgc tgtgggccgg acctgtgaac    60
gccggcgtga cccagacccc caagttccag gtgctgaaaa ccggccagag catgaccctg   120
cagtgcgccc aggacatgaa ccacgagtac atgagctggt acaggcagga ccccggcatg   180
ggcctgcggc tgatccacta cagcgtggga gccggcatca ccgaccaggg cgaggtgccc   240
aacggctaca acgtgagcag aagcaccacc gaggacttcc ccctgaggct gctgtctgcc   300
gcccctagcc agaccagcgt gtacttctgc gccagcagct atgtgggagc cgccggagag   360
ctgttcttcg gcgagggcag ccggctgacc gtgctggaag atctgaacaa agtgttcccc   420
cccgaagtgg ccgtgttcga gcccagcgag gccgagatca gccacaccca gaaggccacc   480
ctggtgtgtc tggccaccgg cttcttcccc gaccacgtgg agctgtcctg gtgggtgaac   540
ggcaaggaag tgcacagcgg cgtgtccacc gaccccagc cctgaagga gcagcccgcc   600 ctgaacgata gcagatactg cctgagcagc cggctgagag tgagcgccac cttctggcag   660
aaccccggaa ccacttcag atgccaggtg cagttctacg gcctgagcga gaacgacgag   720
tggacccagg atagagccaa gcccgtgacc cagatcgtgt ccgccgaggc ctggggcaga   780
gccgactgcg gcttcaccag cgtgtcctac cagcagggcg tgctgagcgc cacaatcctg   840
tacgagatcc tgctgggcaa ggccacactg tacgccgtgc tggtgtccgc cctggtgctg   900
atggctatgg tgaagcggaa ggacagcagg ggctga                            936

<210> SEQ ID NO 11
<211> LENGTH: 936
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 11
atggccccgc ggctgctgtg ttgtgccgcc ctgagcctgc tgtgggccgg acctgtgaac    60
gccggcgtga cccagacccc caagttccag gtgctgaaaa ccggccagag catgaccctg   120
cagtgcgccc aggacatgaa ccacgagtac atgagctggt acaggcagga ccccggcatg   180
ggcctgcggc tgatccacta cagcgtggga gccggcgaga ccgaccaggg cgaggtgccc   240
aacggctaca acgtgagcag aagcaccacc gaggacttcc ccctgaggct gctgtctgcc   300
gcccctagcc agaccagcgt gtacttctgc gccagcagct atgtgggagc cgccggagag   360
ctgttcttcg gcgagggcag ccggctgacc gtgctggaag atctgaacaa agtgttcccc   420
cccgaagtgg ccgtgttcga gcccagcgag gccgagatca gccacaccca gaaggccacc   480
ctggtgtgtc tggccaccgg cttcttcccc gaccacgtgg agctgtcctg gtgggtgaac   540
ggcaaggaag tgcacagcgg cgtgtccacc gaccccagc cctgaagga gcagcccgcc   600 ctgaacgata gcagatactg cctgagcagc cggctgagag tgagcgccac cttctggcag   660
aaccccggaa ccacttcag atgccaggtg cagttctacg gcctgagcga gaacgacgag   720
tggacccagg atagagccaa gcccgtgacc cagatcgtgt ccgccgaggc ctggggcaga   780
```

| gccgactgcg gcttcaccag cgtgtcctac cagcagggcg tgctgagcgc cacaatcctg | 840 |
| tacgagatcc tgctgggcaa ggccacactg tacgccgtgc tggtgtccgc cctggtgctg | 900 |
| atggctatgg tgaagcggaa ggacagcagg ggctga | 936 |

<210> SEQ ID NO 12
<211> LENGTH: 936
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 12

| atggccccgc ggctgctgtg ttgtgccgcc ctgagcctgc tgtgggccgg acctgtgaac | 60 |
| gccggcgtga cccagacccc caagttccag gtgctgaaaa ccggccagag catgaccctg | 120 |
| cagtgcgccc aggacatgaa ccacgagtac atgagctggt acaggcagga ccccggcatg | 180 |
| ggcctgcggc tgatccacta cagcgtggga ccggcttca ccgaccaggg cgaggtgccc | 240 |
| aacggctaca cgtgagcag aagcaccacc gaggacttcc ccctgaggct gctgtctgcc | 300 |
| gcccctagcc agaccagcgt gtacttctgc gccagcagct atgtgggagc cgccggagag | 360 |
| ctgttcttcg gcgagggcag ccggctgacc gtgctggaag atctgaacaa agtgttcccc | 420 |
| cccgaagtgg ccgtgttcga gcccagcgag gccgagatca gccacaccca gaaggccacc | 480 |
| ctggtgtgtc tggccaccgg cttcttcccc gaccacgtgg agctgtcctg gtgggtgaac | 540 |
| ggcaaggaag tgcacagcgg cgtgtccacc gaccccagc cctgaagga gcagcccgcc | 600 |
| ctgaacgata gcagatactg cctgagcagc cggctgagag tgagcgccac cttctggcag | 660 |
| aaccccggaa ccacttcag atgccaggtg cagttctacg gcctgagcga gaacgacgag | 720 |
| tggacccagg atagagccaa gcccgtgacc cagatcgtgt ccgccgaggc ctggggcaga | 780 |
| gccgactgcg gcttcaccag cgtgtcctac cagcagggcg tgctgagcgc cacaatcctg | 840 |
| tacgagatcc tgctgggcaa ggccacactg tacgccgtgc tggtgtccgc cctggtgctg | 900 |
| atggctatgg tgaagcggaa ggacagcagg ggctga | 936 |

<210> SEQ ID NO 13
<211> LENGTH: 936
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 13

| atggccccgc ggctgctgtg ttgtgccgcc ctgagcctgc tgtgggccgg acctgtgaac | 60 |
| gccggcgtga cccagacccc caagttccag gtgctgaaaa ccggccagag catgaccctg | 120 |
| cagtgcgccc aggacatgaa ccacgagtac atgagctggt acaggcagga ccccggcatg | 180 |
| ggcctgcggc tgatccacta cagcgtggga ccggcttga ccgaccaggg cgaggtgccc | 240 |
| aacggctaca cgtgagcag aagcaccacc gaggacttcc ccctgaggct gctgtctgcc | 300 |
| gcccctagcc agaccagcgt gtacttctgc gccagcagct atgtgggagc cgccggagag | 360 |
| ctgttcttcg gcgagggcag ccggctgacc gtgctggaag atctgaacaa agtgttcccc | 420 |
| cccgaagtgg ccgtgttcga gcccagcgag gccgagatca gccacaccca gaaggccacc | 480 |
| ctggtgtgtc tggccaccgg cttcttcccc gaccacgtgg agctgtcctg gtgggtgaac | 540 |

```
ggcaaggaag tgcacagcgg cgtgtccacc gaccccagc ccctgaagga gcagcccgcc    600
ctgaacgata gcagatactg cctgagcagc cggctgagag tgagcgccac cttctggcag    660 aaccccgga accacttcag atgccaggtg cagttctacg gcctgagcga gaacgacgag    720
tggacccagg atagagccaa gcccgtgacc cagatcgtgt ccgccgaggc ctggggcaga    780
gccgactgcg gcttcaccag cgtgtcctac cagcagggcg tgctgagcgc cacaatcctg    840
tacgagatcc tgctgggcaa ggccacactg tacgccgtgc tggtgtccgc cctggtgctg    900
atggctatgg tgaagcggaa ggacagcagg ggctga                             936
```

<210> SEQ ID NO 14
<211> LENGTH: 936
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 14

```
atggccccgc ggctgctgtg ttgtgccgcc ctgagcctgc tgtgggccgg acctgtgaac    60
gccggcgtga cccagacccc caagttccag gtgctgaaaa ccggccagag catgaccctg    120
cagtgcgccc aggacatgaa ccacgagtac atgagctggt acaggcagga ccccggcatg    180
ggcctgcggc tgatccacta cagcgtggga gccggcatca ccgagcaggg cgaggtgccc    240
aacggctaca acgtgagcag aagcaccacc gaggacttcc ccctgaggct gctgtctgcc    300 gccccctagcc agaccagcgt gtacttctgc gccagcagct atgtgggagc cgccggagag    360
ctgttcttcg gcgagggcag ccggctgacc gtgctggaag atctgaacaa agtgttcccc    420
cccgaagtgg ccgtgttcga gcccagcgag gccgagatca gccacaccca gaaggccacc    480
ctggtgtgtc tggccaccgg cttcttcccc gaccacgtgg agctgtcctg gtgggtgaac    540
ggcaaggaag tgcacagcgg cgtgtccacc gaccccagc ccctgaagga gcagcccgcc    600
ctgaacgata gcagatactg cctgagcagc cggctgagag tgagcgccac cttctggcag    660 aaccccgga accacttcag atgccaggtg cagttctacg gcctgagcga gaacgacgag    720
tggacccagg atagagccaa gcccgtgacc cagatcgtgt ccgccgaggc ctggggcaga    780
gccgactgcg gcttcaccag cgtgtcctac cagcagggcg tgctgagcgc cacaatcctg    840
tacgagatcc tgctgggcaa ggccacactg tacgccgtgc tggtgtccgc cctggtgctg    900
atggctatgg tgaagcggaa ggacagcagg ggctga                             936
```

<210> SEQ ID NO 15
<211> LENGTH: 141
<212> TYPE: PRT
<213> ORGANISM: Mus musculus

<400> SEQUENCE: 15

Met Trp Leu Gln Asn Leu Leu Phe Leu Gly Ile Val Val Tyr Ser Leu
1               5                   10                  15

Ser Ala Pro Thr Arg Ser Pro Ile Thr Val Thr Arg Pro Trp Lys His
            20                  25                  30

Val Glu Ala Ile Lys Glu Ala Leu Asn Leu Leu Asp Asp Met Pro Val
        35                  40                  45

Thr Leu Asn Glu Glu Val Glu Val Val Ser Asn Glu Phe Ser Phe Lys
    50                  55                  60

Lys Leu Thr Cys Val Gln Thr Arg Leu Lys Ile Phe Glu Gln Gly Leu
65                  70                  75                  80

Arg Gly Asn Phe Thr Lys Leu Lys Gly Ala Leu Asn Met Thr Ala Ser
            85                  90                  95

Tyr Tyr Gln Thr Tyr Cys Pro Pro Thr Pro Glu Thr Asp Cys Glu Thr
        100                 105                 110

Gln Val Thr Thr Tyr Ala Asp Phe Ile Asp Ser Leu Lys Thr Phe Leu
            115                 120                 125

Thr Asp Ile Pro Phe Glu Cys Lys Lys Pro Gly Gln Lys
    130                 135                 140

<210> SEQ ID NO 16
<211> LENGTH: 423
<212> TYPE: DNA
<213> ORGANISM: Mus musculus

<400> SEQUENCE: 16
atgtggctgc agaatttact tttcctgggc attgtggtct acagcctctc agcacccacc      60
cgctcaccca tcactgtcac ccggccttgg aagcatgtag aggccatcaa agaagccctg     120
aacctcctgg atgacatgcc tgtcacattg aatgaagagg tagaagtcgt ctctaacgag     180
ttctccttca gaagctaaca atgtgtgcag acccgcctga agatattcga gcagggtcta     240
cggggcaatt tcaccaaact caagggcgcc ttgaacatga cagccagcta ctaccagaca     300
tactgccccc caactccgga aacggactgt gaaacacaag ttaccaccta tgcggatttc     360
atagacagcc ttaaaacctt tctgactgat atccccttg aatgcaaaaa accaggccaa     420
aaa                                                                  423

<210> SEQ ID NO 17
<211> LENGTH: 17
<212> TYPE: PRT
<213> ORGANISM: Mus musculus

<400> SEQUENCE: 17

Met Trp Leu Gln Asn Leu Leu Phe Leu Gly Ile Val Val Tyr Ser Leu
1               5                   10                  15

Ser

<210> SEQ ID NO 18
<211> LENGTH: 51
<212> TYPE: DNA
<213> ORGANISM: Mus musculus

<400> SEQUENCE: 18
atgtggctgc agaatttact tttcctgggc attgtggtct acagcctctc a              51

<210> SEQ ID NO 19
<211> LENGTH: 124
<212> TYPE: PRT
<213> ORGANISM: Mus musculus

<400> SEQUENCE: 19

Ala Pro Thr Arg Ser Pro Ile Thr Val Thr Arg Pro Trp Lys His Val
1               5                   10                  15

Glu Ala Ile Lys Glu Ala Leu Asn Leu Leu Asp Asp Met Pro Val Thr
            20                  25                  30

Leu Asn Glu Glu Val Glu Val Val Ser Asn Glu Phe Ser Phe Lys Lys
        35                  40                  45

```
Leu Thr Cys Val Gln Thr Arg Leu Lys Ile Phe Glu Gln Gly Leu Arg
    50                  55                  60

Gly Asn Phe Thr Lys Leu Lys Gly Ala Leu Asn Met Thr Ala Ser Tyr
65                  70                  75                  80

Tyr Gln Thr Tyr Cys Pro Pro Thr Pro Glu Thr Asp Cys Glu Thr Gln
                85                  90                  95

Val Thr Thr Tyr Ala Asp Phe Ile Asp Ser Leu Lys Thr Phe Leu Thr
                100                 105                 110

Asp Ile Pro Phe Glu Cys Lys Lys Pro Gly Gln Lys
            115                 120
```

<210> SEQ ID NO 20
<211> LENGTH: 372
<212> TYPE: DNA
<213> ORGANISM: Mus musculus

<400> SEQUENCE: 20

```
gcacccaccc gctcacccat cactgtcacc cggccttgga agcatgtaga ggccatcaaa      60
gaagccctga acctcctgga tgacatgcct gtcacattga atgaagaggt agaagtcgtc     120
tctaaccgagt tctccttcaa gaagctaaca tgtgtgcaga cccgcctgaa gatattcgag     180
cagggtctac ggggcaattt caccaaactc aagggcgcct tgaacatgac agccagctac     240
taccagacat actgcccccc aactccggaa acggactgtg aaacacaagt taccacctat     300
gcggatttca tagacagcct taaaaccttt ctgactgata tccccttga atgcaaaaaa     360
ccaggccaaa aa                                                          372
```

<210> SEQ ID NO 21
<211> LENGTH: 144
<212> TYPE: PRT
<213> ORGANISM: Homo sapiens

<400> SEQUENCE: 21

```
Met Trp Leu Gln Ser Leu Leu Leu Leu Gly Thr Val Ala Cys Ser Ile
1               5                   10                  15

Ser Ala Pro Ala Arg Ser Pro Ser Pro Ser Thr Gln Pro Trp Glu His
                20                  25                  30

Val Asn Ala Ile Gln Glu Ala Arg Arg Leu Leu Asn Leu Ser Arg Asp
            35                  40                  45

Thr Ala Ala Glu Met Asn Glu Thr Val Glu Val Ile Ser Glu Met Phe
50                  55                  60

Asp Leu Gln Glu Pro Thr Cys Leu Gln Thr Arg Leu Glu Leu Tyr Lys
65                  70                  75                  80

Gln Gly Leu Arg Gly Ser Leu Thr Lys Leu Lys Gly Pro Leu Thr Met
                85                  90                  95

Met Ala Ser His Tyr Lys Gln His Cys Pro Pro Thr Pro Glu Thr Ser
                100                 105                 110

Cys Ala Thr Gln Thr Ile Thr Phe Glu Ser Phe Lys Glu Asn Leu Lys
            115                 120                 125

Asp Phe Leu Leu Val Ile Pro Phe Asp Cys Trp Glu Pro Val Gln Glu
130                 135                 140
```

<210> SEQ ID NO 22
<211> LENGTH: 432
<212> TYPE: DNA
<213> ORGANISM: Homo sapiens

<400> SEQUENCE: 22

-continued

```
atgtggctgc aatctctgct gctgctgggc acagtggcct gttctattag cgcccctgcc    60
agatctccat ctcctagcac acagccttgg gagcacgtga acgccatcca agaagccaga   120
cggctgctga acctgagcag agatacagcc gccgagatga acgagacagt ggaagtgatc   180
agcgagatgt tcgacctgca agagcctacc tgcctgcaga ccagactgga actgtacaag   240
cagggcctga gaggcagcct gaccaagctg aaaggccctc tgacaatgat ggccagccac   300
tacaagcagc actgccctcc aacacctgag acaagctgtg ccacacagac catcaccttc   360
gagagcttca agagaaacct gaaggacttc ctgctggtca tccccttcga ctgctgggag   420
cccgtgcaag aa                                                      432
```

<210> SEQ ID NO 23
<211> LENGTH: 17
<212> TYPE: PRT
<213> ORGANISM: Homo sapiens

<400> SEQUENCE: 23

Met Trp Leu Gln Ser Leu Leu Leu Gly Thr Val Ala Cys Ser Ile
1               5                   10                  15

Ser

<210> SEQ ID NO 24
<211> LENGTH: 51
<212> TYPE: DNA
<213> ORGANISM: Homo sapiens

<400> SEQUENCE: 24

```
atgtggctgc aatctctgct gctgctgggc acagtggcct gttctattag c             51
```

<210> SEQ ID NO 25
<211> LENGTH: 127
<212> TYPE: PRT
<213> ORGANISM: Homo sapiens

<400> SEQUENCE: 25

Ala Pro Ala Arg Ser Pro Ser Pro Ser Thr Gln Pro Trp Glu His Val
1               5                   10                  15

Asn Ala Ile Gln Glu Ala Arg Arg Leu Leu Asn Leu Ser Arg Asp Thr
            20                  25                  30

Ala Ala Glu Met Asn Glu Thr Val Glu Val Ile Ser Glu Met Phe Asp
        35                  40                  45

Leu Gln Glu Pro Thr Cys Leu Gln Thr Arg Leu Glu Leu Tyr Lys Gln
    50                  55                  60

Gly Leu Arg Gly Ser Leu Thr Lys Leu Lys Gly Pro Leu Thr Met Met
65                  70                  75                  80

Ala Ser His Tyr Lys Gln His Cys Pro Pro Thr Pro Glu Thr Ser Cys
                85                  90                  95

Ala Thr Gln Thr Ile Thr Phe Glu Ser Phe Lys Glu Asn Leu Lys Asp
            100                 105                 110

Phe Leu Leu Val Ile Pro Phe Asp Cys Trp Glu Pro Val Gln Glu
        115                 120                 125

<210> SEQ ID NO 26
<211> LENGTH: 381
<212> TYPE: DNA
<213> ORGANISM: Homo sapiens

<400> SEQUENCE: 26

```
gcccctgcca gatctccatc tcctagcaca cagccttggg agcacgtgaa cgccatccaa    60
gaagccagac ggctgctgaa cctgagcaga gatacagccg ccgagatgaa cgagacagtg   120
gaagtgatca gcgagatgtt cgacctgcaa gagcctacct gcctgcagac cagactggaa   180
ctgtacaagc agggcctgag aggcagcctg accaagctga aaggccctct gacaatgatg   240
gccagccact acaagcagca ctgccctcca cacctgaga caagctgtgc cacacagacc   300
atcaccttcg agagcttcaa agagaacctg aaggacttcc tgctggtcat ccccttcgac   360
tgctgggagc ccgtgcaaga a                                              381
```

<210> SEQ ID NO 27
<211> LENGTH: 564
<212> TYPE: PRT
<213> ORGANISM: Homo sapiens

<400> SEQUENCE: 27

```
Met Lys Glu His Gly Gly Thr Phe Ser Ser Thr Gly Ile Ser Gly Gly
1               5                   10                  15

Ser Gly Asp Ser Ala Met Asp Ser Leu Gln Pro Leu Gln Pro Asn Tyr
                20                  25                  30

Met Pro Val Cys Leu Phe Ala Glu Glu Ser Tyr Gln Lys Leu Ala Met
            35                  40                  45

Glu Thr Leu Glu Glu Leu Asp Trp Cys Leu Asp Gln Leu Glu Thr Ile
        50                  55                  60

Gln Thr Tyr Arg Ser Val Ser Glu Met Ala Ser Asn Lys Phe Lys Arg
65                  70                  75                  80

Met Leu Asn Arg Glu Leu Thr His Leu Ser Glu Met Ser Arg Ser Gly
                85                  90                  95

Asn Gln Val Ser Glu Tyr Ile Ser Asn Thr Phe Leu Asp Lys Gln Asn
                100                 105                 110

Asp Val Glu Ile Pro Ser Pro Thr Gln Lys Asp Arg Glu Lys Lys Lys
            115                 120                 125

Lys Gln Gln Leu Met Thr Gln Ile Ser Gly Val Lys Lys Leu Met His
    130                 135                 140

Ser Ser Ser Leu Asn Asn Thr Ser Ile Ser Arg Phe Gly Val Asn Thr
145                 150                 155                 160

Glu Asn Glu Asp His Leu Ala Lys Glu Leu Glu Asp Leu Asn Lys Trp
                165                 170                 175

Gly Leu Asn Ile Phe Asn Val Ala Gly Tyr Ser His Asn Arg Pro Leu
            180                 185                 190

Thr Cys Ile Met Tyr Ala Ile Phe Gln Glu Arg Asp Leu Leu Lys Thr
        195                 200                 205

Phe Arg Ile Ser Ser Asp Thr Phe Ile Thr Tyr Met Met Thr Leu Glu
    210                 215                 220

Asp His Tyr His Ser Asp Val Ala Tyr His Asn Ser Leu His Ala Ala
225                 230                 235                 240

Asp Val Ala Gln Ser Thr His Val Leu Leu Ser Thr Pro Ala Leu Asp
                245                 250                 255

Ala Val Phe Thr Asp Leu Glu Ile Leu Ala Ala Ile Phe Ala Ala Ala
            260                 265                 270

Ile His Asp Val Asp His Pro Gly Val Ser Asn Gln Phe Leu Ile Asn
        275                 280                 285

Thr Asn Ser Glu Leu Ala Leu Met Tyr Asn Asp Glu Ser Val Leu Glu
    290                 295                 300
```

```
Asn His His Leu Ala Val Gly Phe Lys Leu Leu Gln Glu Glu His Cys
305                 310                 315                 320

Asp Ile Phe Met Asn Leu Thr Lys Lys Gln Arg Gln Thr Leu Arg Lys
            325                 330                 335

Met Val Ile Asp Met Val Leu Ala Thr Asp Met Ser Lys His Met Ser
        340                 345                 350

Leu Leu Ala Asp Leu Lys Thr Met Val Glu Thr Lys Lys Val Thr Ser
    355                 360                 365

Ser Gly Val Leu Leu Leu Asp Asn Tyr Thr Asp Arg Ile Gln Val Leu
370                 375                 380

Arg Asn Met Val His Cys Ala Asp Leu Ser Asn Pro Thr Lys Ser Leu
385                 390                 395                 400

Glu Leu Tyr Arg Gln Trp Thr Asp Arg Ile Met Glu Glu Phe Phe Gln
            405                 410                 415

Gln Gly Asp Lys Glu Arg Glu Arg Gly Met Glu Ile Ser Pro Met Cys
        420                 425                 430

Asp Lys His Thr Ala Ser Val Glu Lys Ser Gln Val Gly Phe Ile Asp
    435                 440                 445

Tyr Ile Val His Pro Leu Trp Glu Thr Trp Ala Asp Leu Val Gln Pro
450                 455                 460

Asp Ala Gln Asp Ile Leu Asp Thr Leu Glu Asp Asn Arg Asn Trp Tyr
465                 470                 475                 480

Gln Ser Met Ile Pro Gln Ser Pro Ser Pro Pro Leu Asp Glu Gln Asn
            485                 490                 495

Arg Asp Cys Gln Gly Leu Met Glu Lys Phe Gln Phe Glu Leu Thr Leu
        500                 505                 510

Asp Glu Glu Asp Ser Glu Gly Pro Glu Lys Glu Gly Glu Gly His Ser
    515                 520                 525

Tyr Phe Ser Ser Thr Lys Thr Leu Cys Val Ile Asp Pro Glu Asn Arg
530                 535                 540

Asp Ser Leu Gly Glu Thr Asp Ile Asp Ile Ala Thr Glu Asp Lys Ser
545                 550                 555                 560

Pro Val Asp Thr

<210> SEQ ID NO 28
<211> LENGTH: 1692
<212> TYPE: DNA
<213> ORGANISM: Homo sapiens

<400> SEQUENCE: 28
atgaaggaac acggcggcac ctttagcagc acaggcatct ctggtggcag cggcgatagc      60
gccatggatt ctctgcaacc cctgcagcct aactacatgc ccgtgtgcct gttcgccgag     120
gaaagctacc agaaactggc catggaaacc ctggaagaac tggactggtg cctggaccag     180
ctggaaacca tccagaccta cagatccgtg tccgagatgg ccagcaacaa gttcaagcgg     240
atgctgaaca gagagctgac ccacctgagc gagatgagcc gctctggaaa tcaggtgtcc     300
gagtatatca gcaacacctt cctggacaag cagaacgacg tggaaatccc atctcctaca     360
cagaaggacc gcgagaagaa gaaaaagcag cagctgatga cccagatcag cggcgtgaag     420
aaactgatgc acagcagcag cctgaacaac accagcatca gcagattcgg cgtgaacacc     480
gagaacgagg accacctggc caaagagctg aagatctga caaatggggg cctgaacatc     540
ttcaacgtgg ccggctacag ccacaacaga cccctgacct gcattatgta cgccatcttc     600
```

```
caagagcggg acctgctgaa aaccttccgg atcagcagcg acaccttcat cacctacatg    660
atgacccttg aggaccacta ccacagcgac gtggcctacc acaatagcct gcatgccgct    720
gatgtggccc agagcacaca cgtgctgctg tctacaccag ctctggatgc cgtgttcacc    780
gacctggaaa ttctggccgc catctttgcc gccgctatcc acgatgttga tcaccccggc    840
gtgtccaacc agttcctgat caataccaac agcgagctgg ccctgatgta caacgacgag    900
agcgtgctgg aaaaccacca tctggccgtg ggcttcaagc tgctgcaaga ggaacactgc    960
gacatcttca tgaacctgac caagaagcag cggcagaccc tgcggaagat ggtcatcgat   1020
atggtgctgg ccaccgacat gagcaagcac atgtctctgc tggccgacct gaaaaccatg   1080
gtcgagacaa agaaagtgac cagcagcggc gttctgctgc tggacaacta caccgacaga   1140
atccaggtgc tgagaaacat ggtgcactgc gccgatctga gcaacccac caagagcctg   1200
gaactgtaca cagtggac cgaccggatc atggaagagt ctttcagca aggcgacaaa   1260
gaacgcgagc gcggcatgga aatctcccca atgtgcgata gcacaccgc cagcgtggaa   1320
aagtcccaag tgggctttat cgactacatc gtgcaccctc tgtgggagac atgggccgat   1380
ctggttcagc ctgacgctca ggacatcctg acacactgg aagataaccg gaactggtat   1440
cagagcatga tccctcagag cccctctcca cctctggatg agcagaacag agattgccag   1500
ggcctgatgg aaaagttcca gttcgagctg acactggacg aagaggactc tgagggcccc   1560
gagaaagaag cgagggcca cagctacttc agcagcacaa agaccctgtg cgtgatcgac   1620
cccgagaaca gggatagcct gggcgagaca gacatcgaca ttgccaccga ggacaagagc   1680
cccgtggata ca                                                        1692
```

<210> SEQ ID NO 29
<211> LENGTH: 564
<212> TYPE: PRT
<213> ORGANISM: Mus musculus

<400> SEQUENCE: 29

```
Met Lys Glu Gln Gly Gly Thr Val Ser Gly Ala Ala Ser Ser Arg Gly
1               5                   10                  15

Gly Gly Asp Ser Ala Met Ala Ser Leu Gln Pro Leu Gln Pro Asn Tyr
            20                  25                  30

Leu Ser Val Cys Leu Phe Pro Glu Glu Ser Tyr Gln Lys Leu Ala Met
        35                  40                  45

Glu Thr Leu Glu Glu Leu Asp Trp Cys Leu Asp Gln Leu Glu Thr Ile
    50                  55                  60

Gln Thr Tyr Arg Ser Val Ser Glu Met Ala Ser Asn Lys Phe Lys Arg
65                  70                  75                  80

Met Leu Asn Arg Glu Leu Thr His Leu Ser Glu Met Ser Arg Ser Gly
                85                  90                  95

Asn Gln Val Ser Glu Tyr Ile Ser Asn Thr Phe Leu Asp Lys Gln Asn
            100                 105                 110

Asp Val Glu Ile Pro Ser Pro Thr Gln Lys Asp Arg Glu Lys Lys Lys
        115                 120                 125

Lys Gln Gln Leu Met Thr Gln Ile Ser Gly Val Lys Lys Leu Met His
    130                 135                 140

Ser Ser Ser Leu Asn Asn Thr Ser Ile Ser Arg Phe Gly Val Asn Thr
145                 150                 155                 160

Glu Asn Glu Asp His Leu Ala Lys Glu Leu Glu Asp Leu Asn Lys Trp
                165                 170                 175
```

Gly Leu Asn Ile Phe Asn Val Ala Gly Tyr Ser His Asn Arg Pro Leu
                180                 185                 190

Thr Cys Ile Met Tyr Ala Ile Phe Gln Glu Arg Asp Leu Leu Lys Thr
            195                 200                 205

Phe Lys Ile Ser Ser Asp Thr Phe Val Thr Tyr Met Met Thr Leu Glu
        210                 215                 220

Asp His Tyr His Ser Asp Val Ala Tyr His Asn Ser Leu His Ala Ala
225                 230                 235                 240

Asp Val Ala Gln Ser Thr His Val Leu Leu Ser Thr Pro Ala Leu Asp
                245                 250                 255

Ala Val Phe Thr Asp Leu Glu Ile Leu Ala Ala Ile Phe Ala Ala Ala
            260                 265                 270

Ile His Asp Val Asp His Pro Gly Val Ser Asn Gln Phe Leu Ile Asn
        275                 280                 285

Thr Asn Ser Glu Leu Ala Leu Met Tyr Asn Asp Glu Ser Val Leu Glu
    290                 295                 300

Asn His His Leu Ala Val Gly Phe Lys Leu Leu Gln Glu Glu His Cys
305                 310                 315                 320

Asp Ile Phe Gln Asn Leu Thr Lys Lys Gln Arg Gln Thr Leu Arg Lys
                325                 330                 335

Met Val Ile Asp Met Val Leu Ala Thr Asp Met Ser Lys His Met Ser
            340                 345                 350

Leu Leu Ala Asp Leu Lys Thr Met Val Glu Thr Lys Lys Val Thr Ser
        355                 360                 365

Ser Gly Val Leu Leu Leu Asp Asn Tyr Thr Asp Arg Ile Gln Val Leu
    370                 375                 380

Arg Asn Met Val His Cys Ala Asp Leu Ser Asn Pro Thr Lys Ser Leu
385                 390                 395                 400

Glu Leu Tyr Arg Gln Trp Thr Asp Arg Ile Met Glu Glu Phe Phe Gln
                405                 410                 415

Gln Gly Asp Lys Glu Arg Glu Arg Gly Met Glu Ile Ser Pro Met Cys
            420                 425                 430

Asp Lys His Thr Ala Ser Val Glu Lys Ser Gln Val Gly Phe Ile Asp
        435                 440                 445

Tyr Ile Val His Pro Leu Trp Glu Thr Trp Ala Asp Leu Val Gln Pro
    450                 455                 460

Asp Ala Gln Asp Ile Leu Asp Thr Leu Glu Asp Asn Arg Asn Trp Tyr
465                 470                 475                 480

Gln Ser Met Ile Pro Gln Ser Pro Ser Pro Leu Asp Glu Arg Ser
                485                 490                 495

Arg Asp Cys Gln Gly Leu Met Glu Lys Phe Gln Phe Glu Leu Thr Leu
            500                 505                 510

Glu Glu Glu Asp Ser Glu Gly Pro Glu Lys Glu Gly Glu Gly His Ser
        515                 520                 525

Tyr Phe Ser Ser Thr Lys Thr Leu Cys Val Ile Asp Pro Glu Asn Arg
    530                 535                 540

Asp Ser Leu Glu Glu Thr Asp Ile Asp Ile Ala Thr Glu Asp Lys Ser
545                 550                 555                 560

Pro Ile Asp Thr

<210> SEQ ID NO 30
<211> LENGTH: 1692
<212> TYPE: DNA
<213> ORGANISM: Mus musculus

<400> SEQUENCE: 30

```
atgaaggaac agggcggcac cgtgtctggc gccgcttcta gtagaggcgg aggcgatagc    60
gccatggcca gtctgcagcc actgcagccc aactacctga gcgtgtgcct gttccccgag   120
gaaagctacc agaaactggc tatggaaacc ctggaagaac tggactggtg cctggaccag   180
ctggaaacca tccagaccta cagatccgtg tccgagatgg ccagcaacaa gttcaagagg   240
atgctgaaca gagagctgac ccacctgagc gagatgagca gatccggcaa ccaggtgtcc   300
gagtatatca gcaacacctt cctggacaag cagaacgacg tggaaatccc cagccccacc   360
cagaaggacc gcgagaagaa gaaaaagcag cagctgatga cccagatcag cggcgtgaag   420
aaactgatgc acagcagcag cctgaacaac accagcatca gcagattcgg cgtgaacacc   480
gagaacgagg accacctggc caagagctg aagatctga acaaatgggg cctgaacatc   540
ttcaacgtgg ccggctacag ccacaacaga cccctgacct gcattatgta cgccatcttc   600
caggaacggg acctgctgaa aaccttcaag atcagcagcg acaccttcgt gacctacatg   660
atgacactgg aagatcacta ccacagcgac gtggcctacc acaactctct gcacgccgcc   720
gatgtggccc agagcactca tgtgctgctg agcaccccctg ccctggacgc cgtgttcacc   780
gatctggaaa tcctggccgc tatcttcgcc gctgccatcc acgatgtgga ccaccctggc   840
gtgtccaacc agttcctgat caacacaaac agcgagctgg ccctgatgta caacgacgag   900
agcgtgctgg aaaaccacca tctggccgtg ggcttcaagc tgctgcagga agaacactgc   960
gacatctttc agaacctgac caagaagcag aggcagaccc tgagaaagat ggtcatcgac  1020
atggtgctgg ccaccgacat gagcaagcac atgtccctgc tggccgacct gaaaaccatg  1080
gtggaaacaa gaaagtgac cagctccggc gtgctgctgc tggacaacta caccgacaga  1140
atccaggtgc tgaggaacat ggtgcactgc gccgacctgt ccaaccccac caagagcctg  1200
gaactgtaca cagagtggac cgacaggatc atggaagagt tctttcagca aggcgacaaa  1260
gaacgcgaga ggggcatgga aatcagcccc atgtgcgaca gcacaccgc cagcgtggaa  1320
aagtcccaag tgggctttat cgactacatc gtgcaccccc tgtgggagac atgggccgat  1380
ctggtgcagc ctgacgccca ggacatcctg gacactctgg aagataaccg gaactggtat  1440
cagagcatga tccccagag cccccagccct ccactggacg agagatccag agactgccag  1500
ggcctgatgg aaaagttcca gttcgagctg actctggaag aagaggacag cgagggcccc  1560
gagaaagaag gcgagggcca ctcttacttc agcagcacca agacactgtg cgtgatcgac  1620
cccgagaaca gggacagcct cgaagagact gacatcgaca ttgccaccga ggacaagagc  1680
cccatcgata ca                                                     1692
```

<210> SEQ ID NO 31
<211> LENGTH: 6
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"

<400> SEQUENCE: 31

```
gccacc                                                                6
```

<210> SEQ ID NO 32
<211> LENGTH: 4
<212> TYPE: PRT

<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 32

Asp Gly Gly Gly
1

<210> SEQ ID NO 33
<211> LENGTH: 53
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 33

Gly Lys Pro Ile Pro Asn Pro Leu Leu Gly Leu Asp Ser Thr Gly Gly
1               5                   10                  15

Ser Gly Gly Gly Lys Pro Ile Pro Asn Pro Leu Leu Gly Leu Asp Ser
            20                  25                  30

Thr Gly Ser Gly Ser Gly Ser Gly Lys Pro Ile Pro Asn Pro Leu Leu
        35                  40                  45

Gly Leu Asp Ser Thr
    50

<210> SEQ ID NO 34
<211> LENGTH: 144
<212> TYPE: PRT
<213> ORGANISM: Homo sapiens

<400> SEQUENCE: 34

Met Trp Leu Gln Ser Leu Leu Leu Leu Gly Thr Val Ala Cys Ser Ile
1               5                   10                  15

Ser Ala Pro Ala Arg Ser Pro Ser Pro Ser Thr Gln Pro Trp Glu His
            20                  25                  30

Val Asn Ala Ile Gln Glu Ala Arg Arg Leu Leu Asn Leu Ser Arg Asp
        35                  40                  45

Thr Ala Ala Glu Met Asn Glu Thr Val Glu Val Ile Ser Glu Met Phe
    50                  55                  60

Asp Leu Gln Glu Pro Thr Cys Leu Gln Thr Arg Leu Glu Leu Tyr Lys
65                  70                  75                  80

Gln Gly Leu Arg Gly Ser Leu Thr Lys Leu Lys Gly Pro Leu Thr Met
                85                  90                  95

Met Ala Ser His Tyr Lys Gln His Cys Pro Pro Thr Pro Glu Thr Ser
            100                 105                 110

Cys Ala Thr Gln Ile Ile Thr Phe Glu Ser Phe Lys Glu Asn Leu Lys
        115                 120                 125

Asp Phe Leu Leu Val Ile Pro Phe Asp Cys Trp Glu Pro Val Gln Glu
    130                 135                 140

<210> SEQ ID NO 35
<211> LENGTH: 432
<212> TYPE: DNA
<213> ORGANISM: Homo sapiens

<400> SEQUENCE: 35
atgtggctgc aatctctgct gctgctgggc acagtggcct gttctattag cgcccctgcc      60

```
agatctccat ctcctagcac acagccttgg gagcacgtga acgccatcca agaagccaga    120
cggctgctga acctgagcag agatacagcc gccgagatga acgagacagt ggaagtgatc    180
agcgagatgt tcgacctgca agagcctacc tgcctgcaga ccagactgga actgtacaag    240
cagggcctga gaggcagcct gaccaagctg aaaggccctc tgacaatgat ggccagccac    300
tacaagcagc actgccctcc aacacctgag acaagctgtg ccacacagat catcaccttc    360
gagagcttca agagaaccct gaaggacttc ctgctggtca tcccttcga ctgctgggag    420 cccgtgcaag aa                                                       432

<210> SEQ ID NO 36
<211> LENGTH: 127
<212> TYPE: PRT
<213> ORGANISM: Homo sapiens

<400> SEQUENCE: 36

Ala Pro Ala Arg Ser Pro Ser Pro Ser Thr Gln Pro Trp Glu His Val
1               5                   10                  15

Asn Ala Ile Gln Glu Ala Arg Arg Leu Leu Asn Leu Ser Arg Asp Thr
            20                  25                  30

Ala Ala Glu Met Asn Glu Thr Val Glu Val Ile Ser Glu Met Phe Asp
        35                  40                  45

Leu Gln Glu Pro Thr Cys Leu Gln Thr Arg Leu Glu Leu Tyr Lys Gln
    50                  55                  60

Gly Leu Arg Gly Ser Leu Thr Lys Leu Lys Gly Pro Leu Thr Met Met
65                  70                  75                  80

Ala Ser His Tyr Lys Gln His Cys Pro Pro Thr Pro Glu Thr Ser Cys
                85                  90                  95

Ala Thr Gln Ile Ile Thr Phe Glu Ser Phe Lys Glu Asn Leu Lys Asp
            100                 105                 110

Phe Leu Leu Val Ile Pro Phe Asp Cys Trp Glu Pro Val Gln Glu
        115                 120                 125

<210> SEQ ID NO 37
<211> LENGTH: 381
<212> TYPE: DNA
<213> ORGANISM: Homo sapiens

<400> SEQUENCE: 37
gcccctgcca gatctccatc tcctagcaca cagccttggg agcacgtgaa cgccatccaa     60
gaagccagac ggctgctgaa cctgagcaga gatacagccg ccgagatgaa cgagacagtg    120
gaagtgatca gcgagatgtt cgacctgcaa gagcctacct gcctgcagac cagactggaa    180
ctgtacaagc agggcctgag aggcagcctg accaagctga aaggccctct gacaatgatg    240
gccagccact acaagcagca ctgccctcca acacctgaga caagctgtgc cacacagatc    300
atcaccttcg agagcttcaa agagaacctg aaggacttcc tgctggtcat cccttcgac    360 tgctgggagc ccgtgcaaga a                                              381

<210> SEQ ID NO 38
<211> LENGTH: 4
<212> TYPE: PRT
<213> ORGANISM: Unknown
<220> FEATURE:
<221> NAME/KEY: source
<223> OTHER INFORMATION: /note="Description of Unknown:
      WT TCR (BC 1) sequence"
```

```
<400> SEQUENCE: 38

Gln Ser Ser Gln
1

<210> SEQ ID NO 39
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 39

Gln Thr Ser Gln
1

<210> SEQ ID NO 40
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 40

Gln Ser Thr Gln
1

<210> SEQ ID NO 41
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 41

Gln Ser Asn Gln
1

<210> SEQ ID NO 42
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 42

Gln Ser Ser Trp
1

<210> SEQ ID NO 43
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 43

Gln Ser Ser Gln
1
```

```
<210> SEQ ID NO 44
<211> LENGTH: 4
<212> TYPE: PRT
<213> ORGANISM: Unknown
<220> FEATURE:
<221> NAME/KEY: source
<223> OTHER INFORMATION: /note="Description of Unknown:
      WT TCR (BC 1) sequence"

<400> SEQUENCE: 44

Gln Thr Gly Gly
1

<210> SEQ ID NO 45
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 45

Gln Thr Gly Gly
1

<210> SEQ ID NO 46
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 46

Gln Glu Gly Gly
1

<210> SEQ ID NO 47
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 47

Gln Tyr Gly Gly
1

<210> SEQ ID NO 48
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 48

Gln Thr Gly Ala
1

<210> SEQ ID NO 49
<211> LENGTH: 4
```

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 49

Gln Thr Gly Ser
1

<210> SEQ ID NO 50
<211> LENGTH: 7
<212> TYPE: PRT
<213> ORGANISM: Unknown
<220> FEATURE:
<221> NAME/KEY: source
<223> OTHER INFORMATION: /note="Description of Unknown:
      WT TCR (BC 1) sequence"

<400> SEQUENCE: 50

Val Gly Ala Gly Ile Thr Asp
1               5

<210> SEQ ID NO 51
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 51

Val Gly Ala Gly Ile Thr Asp
1               5

<210> SEQ ID NO 52
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 52

Val Val Ala Gly Ile Thr Asp
1               5

<210> SEQ ID NO 53
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 53

Val Gly Asp Gly Ile Thr Asp
1               5

<210> SEQ ID NO 54
<211> LENGTH: 7
<212> TYPE: PRT
<213> ORGANISM: Artificial Sequence
<220> FEATURE:
<221> NAME/KEY: source
```

```
<223> OTHER INFORMATION: /note="Description of Artificial Sequence:
      Synthetic peptide"

<400> SEQUENCE: 54

Val Ala Asp Gly Ile Thr Asp
1               5

<210> SEQ ID NO 55
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 55

Val Gly Ala Gln Ile Thr Asp
1               5

<210> SEQ ID NO 56
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 56

Val Gly Ala Gly Phe Thr Asp
1               5

<210> SEQ ID NO 57
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 57

Val Gly Ala Gly Trp Thr Asp
1               5

<210> SEQ ID NO 58
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 58

Val Gly Ala Gly Glu Thr Asp
1               5

<210> SEQ ID NO 59
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 59
```

```
Val Gly Ala Gly Ile Thr Glu
1               5

<210> SEQ ID NO 60
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 60

Val Ala Glu Gly Ile Thr Asp
1               5

<210> SEQ ID NO 61
<211> LENGTH: 4
<212> TYPE: PRT
<213> ORGANISM: Unknown
<220> FEATURE:
<221> NAME/KEY: source
<223> OTHER INFORMATION: /note="Description of Unknown:
      WT TCR (BC 1) sequence"

<400> SEQUENCE: 61

Tyr Val Gly Ala
1

<210> SEQ ID NO 62
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 62

Tyr Val Gly Ala
1

<210> SEQ ID NO 63
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 63

Asn Val Gly Ala
1

<210> SEQ ID NO 64
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 64

Tyr Leu Gly Ala
1
```

```
<210> SEQ ID NO 65
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 65

Tyr Ile Gly Ala
1

<210> SEQ ID NO 66
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 66

Tyr Val Ser Ala
1

<210> SEQ ID NO 67
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 67

Tyr Val Gly Val
1

<210> SEQ ID NO 68
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 68

Tyr Val Gly Ile
1

<210> SEQ ID NO 69
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 69

Tyr Val Gly Leu
1

<210> SEQ ID NO 70
<211> LENGTH: 4
<212> TYPE: PRT
```

```
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 70

Tyr Val Gly Asp
1

<210> SEQ ID NO 71
<211> LENGTH: 8
<212> TYPE: PRT
<213> ORGANISM: Unknown
<220> FEATURE:
<221> NAME/KEY: source
<223> OTHER INFORMATION: /note="Description of Unknown:
      WT (Lau155 BV13c1) 'BC1' sequence"

<400> SEQUENCE: 71

Ser Val Gly Ala Gly Ile Thr Asp
1               5

<210> SEQ ID NO 72
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 72

Ser Val Gly Ala Gly Ile Thr Asp
1               5

<210> SEQ ID NO 73
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 73

Ser Val Gly Ala Gly Glu Thr Asp
1               5

<210> SEQ ID NO 74
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 74

Ser Val Gly Ala Gly Phe Thr Asp
1               5

<210> SEQ ID NO 75
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
```

Synthetic peptide"

<400> SEQUENCE: 75

Ser Val Gly Ala Gly Trp Thr Asp
1               5

<210> SEQ ID NO 76
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 76

Ser Val Gly Ala Gly Ile Thr Glu
1               5

<210> SEQ ID NO 77
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 77

Ser Val Ala Glu Gly Ile Thr Asp
1               5

<210> SEQ ID NO 78
<211> LENGTH: 4
<212> TYPE: PRT
<213> ORGANISM: Unknown
<220> FEATURE:
<221> NAME/KEY: source
<223> OTHER INFORMATION: /note="Description of Unknown:
      WT (Lau155 BV13c1) 'BC1' sequence"

<400> SEQUENCE: 78

Gly Ala Ala Gly
1

<210> SEQ ID NO 79
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 79

Gly Leu Ala Gly
1

<210> SEQ ID NO 80
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 80

```
Gly Ala Ala Gly
1

<210> SEQ ID NO 81
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 81

Gly Asn Thr Gly
1

<210> SEQ ID NO 82
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 82

Gly Leu Tyr Gly
1
```

A2/NY-ESO-1 SPECIFIC T CELL RECEPTORS AND USES THEREOF

CROSS-REFERENCE TO RELATED APPLICATIONS

This application is a U.S. National Phase application under 35 U.S.C. § 371 of International Patent Application No. PCT/IB2020/000140, filed on Mar. 17, 2020, which claims priority to U.S. Provisional Application No. 62/819,988, filed Mar. 18, 2019, the disclosure of both of which is herein incorporated by reference in its entirety.

SEQUENCE LISTING

The instant application contains a Sequence Listing which has been submitted electronically in ASCII format and is hereby incorporated by reference in its entirety. Said ASCII copy, created on Jul. 16, 2020, is named 252457_000009_SL.txt and is 65,448 bytes in size.

FIELD OF THE INVENTION

The invention relates to genetically modified T cell receptors (TCRs) specific for an epitope from the cancer antigen NY-ESO-1. The invention relates to related polypeptides and proteins, as well as related nucleic acids, recombinant expression vectors, host cells, and populations of cells, including but not limited to genetically engineered cells, and pharmaceutical compositions. The invention further relates to the use of such modified TCRs and related compositions for cancer immunotherapy.

BACKGROUND

Cancer immunotherapy has established itself as a viable alternative and powerful supplement to standard-of-care approaches like cytotoxic chemotherapy, radiotherapy and surgery, by utilizing and/or enhancing a patient's own immune responses against cancer cells (Mellman, I., G. Coukos, and G. Dranoff, Nature, 2011. 480: p. 480). Among its numerous facets, adoptive T cell therapy has since long proven its effectiveness in the clinic (Restifo, N. P., M. E. Dudley, and S. A. Rosenberg, Nature Reviews Immunology, 2012. 12: p. 269). In this type of cancer treatment, patients receive autologous ex vivo expanded tumor-infiltrating lymphocytes that can naturally recognize and kill their tumor targets (Rosenberg, S. A., et al., Clin Cancer Res, 2011. 17(13): p. 4550-7). Alternatively, patients' peripheral blood T cells can be genetically modified to recognize tumor cells through ectopic expression of tumor-specific T cell receptors (TCRs) or chimeric antigen receptors (CARs) prior to expansion and adoptive transfer. NY-ESO-1 TCR-based (Robbins, P. F., et al., J Clin Oncol, 2011. 29(7): p. 917-24) and CD19 CAR-based (Kochenderfer, J. N., et al., Blood, 2012. 119: p. 2709-2720) T cell therapies are extraordinary examples of cancer immunotherapy that have shown great promise in the clinic, in solid and hematological malignancies, respectively.

NY-ESO-1 or New York esophageal squamous cell carcinoma 1 is a tumor antigen that is expressed by a range of tumors (Chen, Y. T. et al., Proc Natl Acad Sci USA, 1997. 94(5): p. 1914-1918). Class I human leukocyte antigen (HLA) molecules of these cancerous cells present peptides from this antigen, including a 9-amino acid fragment from position 157-165 (SLLMWITQC (SEQ ID NO: 8)). Therefore, the NY-ESO-1$_{157-165}$ epitope-HLA-A2 complex provides a cancer marker that TCRs can target, for example, in adoptive cell transfer therapy where patients receive autologous cells that are transduced with nucleic acids encoding a T cell receptor (TCR) specific for the NY-ESO-1$_{157-165}$ epitope (SLLMWITQC (SEQ ID NO: 8)). However, for that purpose it would be desirable if the TCR had a higher affinity for the peptide-HLA complex than native TCRs specific for that complex.

Because TCR against "self" tumor antigens may be of lower affinity than a viral epitope-specific TCR, for example, due to thymic negative selection, there is a need in the art for developing higher affinity TCRs that maintain specificity (i.e., do not cross-react with healthy tissue) while enabling higher activity.

Extremely powerful a strategy as the immunotherapy may be, many patients still show no clinical benefit from adoptive T cell therapy or fail to sustain prolonged responses and, as a result, its application remains limited. Although therapy-associated toxicities remain a major concern (Gust, J., et al. Cancer Discovery, 2017. 7: p. 1404-1419), the main reason why adoptively transferred T cells fail to achieve efficient tumor control resides in the immune-suppressive microenvironment of the tumor itself (Zou, W. Nature Reviews Cancer, 2005. 5: p. 263). Tumors deploy numerous strategies to evade detection by the immune system. Among them are alterations of their chemokine expression profile to prevent T cell chemoattraction; enhancement of physical barriers through collagen fortification of the surrounding tissue and promotion of an abnormal intra-tumoral vasculature to impede proper T cell extravasation; establishment of an unfavorable for T cell function metabolic microenvironment characterized by low glucose levels; chemoattraction of immune-suppressive cells like regulatory T cells ($T_{reg}$) and myeloid-derived suppressor cells (MDSCs) into the tumor microenvironment or polarization of others to acquire immune-suppressive phenotypes, like M2 macrophages; and, finally, direct inhibition of T cell function through upregulation of immune checkpoint receptors and other membrane-bound or soluble factors with similar properties (Baruch, E. N., et al., Cancer, 2017. 123(S11): p. 2154-2162).

These obstacles can be overcome via combinatorial therapeutic strategies that enhance the activity of the adoptively transferred T cells by tackling the different aspects of the immunosuppressive tumor microenvironment. Countless approaches are currently being tested at the pre-clinical and clinical level including immune checkpoint blockade antibodies, cytokine therapies, metabolic enzyme inhibitors, agents that normalize the tumor vasculature and suppressive immune cell-depleting antibodies in combination with chemotherapy and radiotherapy (Zhang, H. and J. Chen, Journal of Cancer, 2018. 9(10): p. 1773-1781). An alternative, more elegant and targeted approach, involves fine-tuning of transferred T cells through genetic modification with molecules that impact directly T cell activity or target the tumor microenvironment. T cell engineering with chemokine receptors has been shown to enhance trafficking of T cells to the tumor site, CARs targeting VEGF receptor lead to vasculature normalization and overexpression or integration of co-stimulatory ligands into CARs gives an extra edge to transferred T cells. In addition, targeting of T-cell associated checkpoint ligands may alleviate tumor-derived checkpoint-mediated T cell suppression (Kunert, A. and R. Debets, Current Opinion in Immunology, 2018. 51: p. 133-139).

Although it is not surprising that most engineering-based strategies aim to improve directly T cell activity (Yoon, D. H., et al., International journal of molecular sciences, 2018.

19(2): p. 340), there is currently no described effort to modify adoptively transferred T cells with agents that may exploit or boost the potentially beneficial activity of other tumor-resident immune cells. Tumor-associated macrophages and granulocytes have emerged as key players in the establishment or obstruction of a successful anti-tumor response and stimulation of their anti-tumor versus tumor-promoting properties could be of great importance (Noy, R. and J. W. Pollard, Immunity, 2014. 41(1): p. 49-61; Fridlender, Z. G. and S. M. Albelda, Carcinogenesis, 2012. 33(5): p. 949-55). Towards the same direction, immune-attraction and stimulation of dendritic cells (DCs) by ectopically-expressed tumor-derived soluble factors has shown to elicit strong anti-tumoral responses mediated by activated endogenous T cells (Mach, N., et al., Cancer Res, 2000. 60(12): p. 3239-46). These observations highlight the need for suitable T cell engineering candidate agents that can efficiently harness the anti-tumor potential of aforementioned tumor-resident immune cell lineages.

The invention disclosed herein addresses this need and other related needs.

SUMMARY OF THE INVENTION

There is a great need in the art for developing higher affinity TCRs for cancer antigens. The present invention addresses this and other needs by providing modified TCRs specific for the cancer antigen NY-ESO-1$_{157-165}$ epitope, and related compositions and methods for using such TCRs for cancer immunotherapy (e.g., adoptive cell therapy).

In one aspect, provided herein is a polynucleotide encoding a modified T cell receptor (TCR), or functional fragment thereof, wherein the modified TCR comprises a single amino acid substitution within a complementary determining region (CDR) 2 of a beta chain of the modified TCR relative to a CDR2 of a beta chain of an unsubstituted wild-type (WT) TCR.

In some embodiments, outside of the CDR2 region of the beta chain of the modified TCR, or functional fragment thereof, the beta chain sequence of the modified TCR comprises an amino acid sequence at least 80% identical to the beta chain of the unsubstituted WT TCR, or functional fragment thereof.

In some embodiments, the beta chain of the modified TCR, or functional fragment thereof, comprises the amino acid sequence of the beta chain of the unsubstituted WT TCR, or functional fragment thereof, with the single amino acid substitution in the CDR2 region.

In some embodiments, the beta chain of the unsubstituted WT TCR comprises the amino acid sequence of SEQ ID NO: 1.

In some embodiments, the single amino acid substitution occurs at residues 50, 51, 53, or 55 relative to the WT TCR. In some embodiments, the single amino acid substitution occurs at residues 53 or 55 relative to the WT TCR. In some embodiments, the single amino acid substitution is I53E, I53F, I53W, or D55E.

In some embodiments, the modified TCR binds to a cancer antigen at a higher binding affinity than the WT TCR. In some embodiments, the cancer antigen is NY-ESO-1$_{157-165}$ epitope (SEQ ID NO: 8).

In some embodiments, the binding affinity of the modified TCR to the cancer antigen is about 5 to about 75 times higher as compared to the binding affinity of the WT TCR to the cancer antigen. In some embodiments, the binding affinity of the modified TCR to the cancer antigen is about 10 to about 75 times higher as compared to the binding affinity of the WT TCR to the cancer antigen. In some embodiments, the binding affinity of the modified TCR to the cancer antigen is about 25 to about 75 times higher as compared to the binding affinity of the WT TCR to the cancer antigen. In some embodiments, the binding affinity of the modified TCR to the cancer antigen is about 40 to about 75 times higher as compared to the binding affinity of the WT TCR to the cancer antigen. In some embodiments, the binding affinity of the modified TCR to the cancer antigen is about 40 to about 60 times higher as compared to the binding affinity of the WT TCR to the cancer antigen. In some embodiments, the binding affinity of the modified TCR to the cancer antigen is about 40 to about 50 times higher as compared to the binding affinity of the WT TCR to the cancer antigen. In some embodiments, the binding affinity of the modified TCR to the cancer antigen is approximately about 50 times higher as compared to the binding affinity of the WT TCR to the cancer antigen.

In some embodiments, the dissociation constant ($K_D$) of the modified TCR to the cancer antigen is between about 0.30 and about 4.5 µM. In some embodiments, the dissociation constant ($K_D$) of the modified TCR to the cancer antigen is between about 0.30 and about 2 µM. In some embodiments, the dissociation constant ($K_D$) of the modified TCR to the cancer antigen is between about 2 µM and about 3 µM. In some embodiments, the dissociation constant ($K_D$) of the modified TCR to the cancer antigen is between about 3 µM and about 4 µM. In some embodiments, the dissociation constant ($K_D$) of the modified TCR to the cancer antigen is about 0.41 µM. In some embodiments, the dissociation constant ($K_D$) of the modified TCR to the cancer antigen is about 3.89 µM.

In some embodiments, the modified TCR comprises the amino acid sequence of any one of SEQ ID NOs: 2-5, or functional fragment thereof, or an amino acid sequence that has at least 80% sequence identity to any one of SEQ ID NOs: 2-5.

In some embodiments, the modified TCR is encoded by the nucleotide sequence of any one of SEQ ID NOs: 11-14, or a nucleotide sequence that has at least 80% sequence identity to any one of SEQ ID NOs: 11-14.

In some embodiments, the polynucleotide is operably linked to at least one regulator element for expression of the modified TCR. In some embodiments, the at least one regulatory element is a promoter.

In various embodiments, the polynucleotide is a DNA molecule.

In various embodiments, the polynucleotide is an RNA molecule or a derivative thereof.

In another aspect, provided herein is a recombinant vector comprising the polynucleotide as described herein, wherein the polynucleotide is operably linked to at least one regulatory element for expression of the modified T cell receptor (TCR).

In some embodiments, the vector is a viral vector. In some embodiments, the viral vector is a retroviral vector, a lentiviral vector, an adenoviral vector, an adeno-associated virus vector, an alphaviral vector, a herpes virus vector, or a vaccinia virus vector.

In some embodiments, the vector is a non-viral vector.

In another aspect, provided herein is a modified T cell receptor (TCR), comprising a beta chain of the modified TCR, or functional fragment thereof, encoded by the polynucleotide described herein.

In another aspect, provided herein is a modified T cell receptor (TCR), comprising a) a beta chain of the modified TCR, or functional fragment thereof, encoded by the polynucleotide described herein and b) an alpha chain, or a functional fragment thereof.

In another aspect, provided herein is a modified T cell receptor (TCR), comprising CDRs of the beta chain of the modified TCR encoded by the polynucleotide described herein.

In another aspect, provided herein is a modified T cell receptor (TCR), comprising a) a functional fragment of a beta chain of the modified TCR, wherein the functional fragment comprises the CDRs of a beta chain encoded by the polynucleotide described herein and b) a functional fragment of an alpha chain, wherein the functional fragment comprises the CDRs of an alpha chain.

In some embodiments, the functional fragment of a) further comprises a constant region of a TCR beta chain and/or the functional fragment of b) further comprises a constant region of a TCR alpha chain. In one embodiment, either of the constant regions are of human origin. In one embodiment, either of the constant regions are of mouse origin.

In some embodiments, the alpha chain comprises the alpha chain of a WT TCR, or functional fragment thereof. In one embodiment, the alpha chain of the WT TCR comprises the amino acid sequence of SEQ ID NO: 7.

In some embodiments, the modified TCR comprises the amino acid sequence of any one of SEQ ID NOs: 2-5, or fragment thereof, or an amino acid sequence that has at least 80% sequence identity to any one of SEQ ID NOs: 2-5.

In another aspect, provided herein is a modified T cell receptor (TCR) comprising an alpha chain comprising the amino acid sequence of SEQ ID NO: 7 and a beta chain comprising the amino acid sequence of any one of SEQ ID NOs: 2-5.

In another aspect, provided herein is an isolated host cell comprising the modified T cell receptor (TCR) described herein.

In another aspect, provided herein is an isolated host cell comprising the polynucleotide described herein. In some embodiments, the polynucleotide is operably linked to at least one regulatory element which is capable of mediating expression of the modified T cell receptor (TCR) in the host cell.

In another aspect, provided herein is an isolated host cell comprising the vector described herein.

In some embodiments, the host cell is a mammalian cell. In some embodiments, the host cell is a lymphoid cell. In some embodiments, the lymphoid cell is a T cell. In some embodiments, the lymphoid cell is a natural killer (NK) cell.

In various embodiments, the host cells are obtained from peripheral blood mononuclear cells (PBMC), tumor draining lymph nodes or tumor infiltrates.

In various embodiments, the host cell has been activated and/or expanded ex vivo.

In various embodiments, the host cell is an allogeneic cell.

In various embodiments, the host cell is an autologous cell.

In various embodiments, the host cell is isolated from a subject having a disease. In some embodiments, the disease is cancer. In some embodiments, the cancer presents cancer antigen NY-ESO-1$_{157-165}$ epitope (SEQ ID NO: 8) on the surface of its cells. In some embodiments, the cancer is myeloma, melanoma, sarcoma, bladder cancer, esophageal cancer, hepatocellular cancer, head and neck cancer, breast cancer, prostate cancer, urinary bladder cancer, skin cancer, lung cancer, ovarian cancer, or brain cancer.

In various embodiments, the host cell is further engineered to express one or more exogenous molecule. In some embodiments, the one or more exogenous molecule is an immune signaling molecule.

In some embodiments, the immune signaling molecule is a cytokine.

In some embodiments, the immune signaling molecule is a chemokine.

In some embodiments, the immune signaling molecule is a growth factor. In one embodiment, the growth factor is granulocyte-macrophage colony-stimulating factor (GM-CSF).

Also provided herein is an isolated host cell comprising a T cell receptor (TCR), or functional fragment thereof, that binds to a cancer antigen, wherein the host cell is further engineered to express granulocyte-macrophage colony-stimulating factor (GM-CSF). In some embodiments, the cancer antigen is NY-ESO-1$_{157-165}$ epitope (SEQ ID NO: 8). In some embodiments, the T cell receptor (TCR) is a WT TCR. In one embodiment, the beta chain of the WT TCR comprises an amino acid sequence of SEQ ID NO: 1, or an amino acid sequence that has at least 80% sequence identity to SEQ ID NO: 1. In one embodiment, the alpha chain of the WT TCR comprises the amino acid sequence of SEQ ID NO: 7.

In some embodiments, the amino acid sequence for GM-CSF comprises SEQ ID NO: 21, 34 or 15, or an amino acid sequence that has at least 80% sequence identity to SEQ ID NO: 21, 34 or 15. In some embodiments, the nucleotide sequence encoding GM-CSF comprises SEQ ID NO: 22, 35 or 16, or nucleotide sequence that has at least 80% sequence identity to SEQ ID NO: 22, 35 or 16.

In some embodiments, the one or more exogenous molecule is a soluble receptor.

In some embodiments, the one or more exogenous molecule is a ligand.

In some embodiments, the one or more exogenous molecule is an antigen binding protein. In some embodiments, the antigen binding protein is an antibody, or an antibody fragment.

In some embodiments, the one or more exogenous molecule is a phosphodiesterase. In some embodiments, the phosphodiesterase is PDE4B2.

Also provided herein is an isolated host cell comprising a T cell receptor (TCR), or functional fragment thereof, that binds to a cancer antigen, wherein the host cell is further engineered to express PDE4B2. In some embodiments, the cancer antigen is NY-ESO-1$_{157-165}$ epitope (SEQ ID NO: 8). In some embodiments, the T cell receptor (TCR) is a WT TCR. In one embodiment, the beta chain of the WT TCR comprises an amino acid sequence of SEQ ID NO: 1, or an amino acid sequence that has at least 80% sequence identity to SEQ ID NO: 1. In one embodiment, the alpha chain of the WT TCR comprises the amino acid sequence of SEQ ID NO: 7.

In some embodiments, the amino acid sequence of PDE4B2 comprises SEQ ID NO: 27 or 29, or an amino acid sequence that has at least 80% sequence identity to SEQ ID NO: 27 or 29. In some embodiments, the nucleotide sequence encoding PDE4B2 comprises SEQ ID NO: 28 or 30, or a nucleotide sequence that has at least 80% sequence identity to SEQ ID NO: 28 or 30.

In some embodiments, the one or more exogenous molecule is a cell surface receptor. In some embodiments, the cell surface receptor is a chimeric antigen receptor. In some embodiments, the cell surface receptor is a T cell receptor that does not bind the cancer antigen NY-ESO-1$_{157-165}$ epitope (SEQ ID NO: 8).

In another aspect, provided herein is a bifunctional molecule comprising the modified T cell receptor (TCR) described herein, or a functional fragment thereof, and an immune effector polypeptide that specifically binds to a cell surface protein on a T cell. In some embodiments, the immune effector polypeptide comprises an antibody, or an antibody fragment. In some embodiments, the immune effector polypeptide comprises a single-chain variable fragment (scFv).

In some embodiments, the immune effector polypeptide specifically binds to CD3. In some embodiments, the immune effector polypeptide comprises the antibody or an antibody fragment derived from OKT3, UCHT-1, BMA031, or 12F6. In some embodiments, the immune effector polypeptide comprises the antibody or an antibody fragment (e.g., scFV) derived from OKT3. In some embodiments, the immune effector polypeptide comprises the antibody or antibody fragment (e.g., scFV) derived from UCHT-1. In some embodiments, the immune effector polypeptide comprises the antibody or antibody fragment (e.g., scFV) derived from BMA031. In some embodiments, the immune effector polypeptide comprises the antibody or antibody fragment (e.g., scFV) derived from 12F6.

In another aspect, provided herein is a pharmaceutical composition comprising the host cell described herein, or the bifunctional molecule described herein, and a pharmaceutically acceptable carrier and/or excipient. In some embodiments, the composition is used in adoptive cell transfer therapy.

In another aspect, provided herein is a method of producing the host cells described herein, comprising genetically engineering the host cells with the polynucleotides described herein or the vector described herein.

In another aspect, provided herein is a method of genetically engineering host cells to express the modified T cell receptor (TCR), or functional fragment thereof, described herein. In some embodiments, the method comprises genetically engineering the host cells with the polynucleotides described herein or the vector described herein. In some embodiments, the genetic engineering step is conducted via viral gene delivery. In some embodiments, the genetic engineering step is conducted via non-viral gene delivery. In some embodiments, the method is conducted ex vivo. In some embodiments, the method further comprises activation and/or expansion of the host cells ex vivo.

In some embodiments of the cell engineering methods, the modified TCR comprises the amino acid sequence of any one of SEQ ID NOs: 2-5, or fragment thereof, or an amino acid sequence that has at least 80% sequence identity to any one of SEQ ID NOs: 2-5.

In some embodiments of the cell engineering methods, the method further comprises genetically engineering the host cells to further express one or more exogenous molecule. In some embodiments, the one or more exogenous molecule is an immune signaling molecule. In some embodiments the exogenous molecule is a cytokine, chemokine, growth factor, soluble receptor, ligand, phosphodiesterase, antigen binding protein, or a cell surface receptor.

In some embodiments of the cell engineering methods, the growth factor is granulocyte-macrophage colony-stimulating factor (GM-CSF). In one embodiment, the amino acid sequence for GM-CSF comprises SEQ ID NO: 21, 34 or 15, or an amino acid sequence that has at least 80% sequence identity to SEQ ID NO: 21, 34 or 15. In one embodiment, the nucleotide sequence encoding GM-CSF comprises SEQ ID NO: 22, 35 or 16, or nucleotide sequence that has at least 80% sequence identity to SEQ ID NO: 22, 35 or 16.

In some embodiments of the cell engineering methods, the phosphodiesterase is PDE4B2. In one embodiment, the amino acid sequence of PDE4B2 comprises SEQ ID NO: 27 or 29, or an amino acid sequence that has at least 80% sequence identity to SEQ ID NO: 27 or 29. In one embodiment, the nucleotide sequence encoding PDE4B2 comprises SEQ ID NO: 28 or 30, or a nucleotide sequence that has at least 80% sequence identity to SEQ ID NO: 28 or 30.

In some embodiments of the cell engineering methods, the antigen binding protein is an antibody, or an antibody fragment.

In some embodiments of the cell engineering methods, the cell surface receptor is a chimeric antigen receptor or a T cell receptor that does not bind the cancer antigen NY-ESO-1$_{157-165}$ epitope (SEQ ID NO: 8).

In various embodiments of the cell engineering methods, the host cell is a mammalian cell. In some embodiments, the host cell is a lymphoid cell. In some embodiments, the lymphoid cell is a T cell. In some embodiments, the lymphoid cell is a natural killer (NK) cell.

In various embodiments of the cell engineering methods, the host cells are obtained from peripheral blood mononuclear cells (PBMC), tumor draining lymph nodes or tumor infiltrates.

In various embodiments, the host cell has been activated and/or expanded ex vivo.

In various embodiments, the host cell is an allogeneic cell.

In various embodiments, the host cell is an autologous cell.

In various embodiments, the host cell is isolated from a subject having a disease. In some embodiments, the disease is cancer. In some embodiments, the cancer presents cancer antigen NY-ESO-1$_{157-165}$ epitope (SEQ ID NO: 8) on the surface of its cells. In some embodiments, the cancer is myeloma, melanoma, sarcoma, bladder cancer, esophageal cancer, hepatocellular cancer, head and neck cancer, breast cancer, prostate cancer, urinary bladder cancer, skin cancer, lung cancer, ovarian cancer, or brain cancer.

In another aspect, provided herein is a method for stimulating or enhancing an immune response in a mammal in need thereof comprising administering to said mammal an effective amount of the lymphoid cells comprising the modified T cell receptors (TCRs) described herein, the host cells described herein, the bifunctional molecule described herein, the composition described herein, or the host cells produced by the method described herein.

In another aspect, provided herein is a method of treatment of a cancer in a subject in need thereof, comprising administering to a subject an effective amount of the lymphoid cells comprising the modified T cell receptors (TCRs) described herein, the host cells described herein, the bifunctional molecule described herein, the composition described herein, or the host cells produced by the method described herein. In some embodiments, the cells of the cancer present cancer antigen NY-ESO-1$_{157-165}$ epitope (SEQ ID NO: 8) on their surface.

In some embodiments of the therapeutic methods, the cancer is myeloma, melanoma, sarcoma, bladder cancer, esophageal cancer, hepatocellular cancer, head and neck cancer, breast cancer, prostate cancer, urinary bladder cancer, skin cancer, lung cancer, ovarian cancer, or brain cancer.

In some embodiments, the therapeutic method comprises:
a) isolating T cells the subject or mammal;
b) genetically modifying said T cells ex vivo with the polynucleotide described herein or the vector described herein;
c) optionally, expanding and/or activating said T cells before, after or during step b); and
d) introducing the genetically modified T cells into the subject or mammal.

In various embodiments, the subject or mammal is human.

These and other aspects of the present invention will be apparent to those of ordinary skill in the art in the following description, claims and drawings.

BRIEF DESCRIPTION OF THE DRAWINGS

FIGS. 1A-1E show the amino acid sequence of the alpha and beta chains of NY-ESO TCR mutants. FIG. 1A shows the amino acid sequence of TCR BC1 alpha and beta chains. FIG. 1B shows the amino acid sequence of TCR I53E alpha and beta chains. FIG. 1C shows the amino acid sequence of TCR I53F alpha and beta chains. FIG. 1D shows the amino acid sequence of TCR I53W alpha and beta chains. FIG. 1E shows the amino acid sequence of TCR D55E alpha and beta chains.

FIGS. 2A-2B show flowcytometric analysis of CD4$^+$ T cells transduced with different NY-ESO TCR mutants. FIG. 2A shows flowcytometric TCRVb13.1 analysis of CD4$^+$ T cells transduced with different NY-ESO TCR mutants. FIG. 2B shows flowcytometric HLA-A2.1 NY-ESO tetramer analysis of CD4$^+$ T cells transduced with different NY-ESO TCR mutants.

FIGS. 3A-3B show flowcytometric analysis of CD8$^+$ T cells transduced with different NY-ESO TCR mutants. FIG. 3A shows flowcytometric TCRVb13.1 analysis of CD8$^+$ T cells transduced with different NY-ESO TCR mutants. FIG. 3B shows flow cytometric HLA-A2.1 NY-ESO tetramer analysis of CD8$^+$ T cells transduced with different NY-ESO TCR mutants.

FIG. 12 shows the cell killing activity (measured via IncuCyte) by CD8$^+$ cells expressing wild type BC1 TCR, I53E TCR and I53F TCR at different time points. "NT" refers to non-transduced cells.

FIG. 13A shows a schematic representation of the assay. FIG. 13B shows the results of the assay. The HLA-A2$^+$/NY-ESO$^+$ tumor cell line Me275 were mixed with NY-ESO transduced T cells and injected subcutaneously in the right flank of NSG mice. Percentages of CD4$^+$ and CD8$^+$ was 30% and 70%, respectively. Tumor size was measured twice per weekly.

FIGS. 14A-14B show in vivo assessment of NY-ESO TCR transgenic cells using NSG mice. FIG. 14A shows a schematic representation of the assay. FIG. 14B shows the results of the assay. On day 0.5×10$^6$ Me275 cells were injected subcutaneously in the flank of NSG mice. When the tumors were approximately 50-100 mm$^3$ in size, 10×10$^6$ NY-ESO specific T cells were injected in the peritumor on day 10 and 13. Percentage CD4$^+$ and CD8$^+$ T cells were 30% and 70% respectively.

FIGS. 15A-15B show in vivo assessment of NY-ESO TCR transgenic cells using NSG mice. FIG. 15A shows a schematic representation of the assay. FIG. 15B shows the results of the assay. On day 0.5×10$^6$ Me275 cells were injected subcutaneously in the flank of NSG mice. When the tumors were approximately 50-100 mm$^3$ in size, 10×10$^6$ NY-ESO specific T cells were injected intravenously on day 10 and 13. Percentage CD4$^+$ and CD8$^+$ T cells were 30% and 70%, respectively.

FIGS. 16A-16B show in vivo assessment of NY-ESO TCR transgenic cells using NSG mice. FIG. 16A shows a schematic representation of the assay. FIG. 16B shows the results of the assay. On day 0.5×10$^6$ Me275 cells were injected subcutaneously in the flank of NSG mice. When the tumors were approximately 50-100 mm$^3$ in size, different numbers of NY-ESO specific T cells were injected intravenously on day 10 and 13. Percentage CD4$^+$ and CD8$^+$ T cells were 30% and 70% respectively.

FIGS. 17A-17C demonstrate that human T cells can be efficiently co-engineered to stably express NY-ESO-1 TCR and secrete mouse GM-CSF. FIG. 17A depicts a schematic representation of retroviral mouse GM-CSF and lentiviral NY-ESO-1 TCR constructs. FIG. 17B shows representative contour plots of human CD8$^+$ and CD4$^+$ T cells at day 7 post-viral transduction. Expression of NY-ESO-1 TCR was confirmed using an HLA-A2-restricted NY-ESO-1$_{157-165}$ tetramer, whereas expression of mouse GM-CSF was followed via detection of the surface Thy1.1 reporter protein. FIG. 17C shows that secreted mouse GM-CSF can be detected by ELISA in supernatants of transduced CD8+ T cell cultures. "NT" refers to non-transduced T cells.

FIG. 18A shows that detection of IFNγ secreted by NY-ESO-1 TCR-engineered T cells is upon recognition of HLA-A2+ NY-ESO-1+ tumor cells. There is no effect of mouse GM-CSF on IFNγ levels. FIG. 18B shows that NY-ESO-1 TCR-engineered T cells can readily kill HLA-A2+ NY-ESO-1+ tumor cells and their cytotoxic activity is not affected by mouse GM-CSF. FIGS. 18A and 18B refer to the same experiment. "NT" refers to non-transduced. Statistical significance was determined by one-way ANOVA test. ****p<0.0001.

FIGS. 19A-19C demonstrate that T-cell derived mouse GM-CSF secreted in the tumor microenvironment can significantly enhance control of tumor growth by NY-ESO-1-specific T cells in an NSG human melanoma xenograft mouse model. FIG. 19A shows tumor growth in mice from a Winn assay. Human NY-ESO-1 TCR-expressing T cells co-engineered to secrete mouse GM-CSF can efficiently slow down the engraftment and establishment of Me275 melanoma cells compared to control T cells expressing NY-ESO-1 TCR alone. FIG. 19B shows percent survival of mice from the Winn assay. 40% of the mice treated with NY-ESO-1 TCR-expressing mouse GM-CSF-secreting T cells were tumor-free. FIG. 19C show that adoptive transfer of 2×10$^7$ NY-ESO-1 TCR-expressing mouse GM-CSF-secreting T cells demonstrated better tumor control of established Me275 tumors compared to NY-ESO-1 TCR alone. "NT" refers to non-transduced T cells. Statistical significance of in vivo responses was determined by one-way ANOVA or unpaired t-test for individual timepoints. *p<0.001. Statistical significance of survival curves was determined by Mantel-Cox log-rank test. p<0.01.

FIGS. 20A-20B provide exemplary protein and nucleotide sequences for mouse and human GM-CSF.

FIGS. 23A-23B show Th-1 cytokine production by PDE4B2-transduced T cells. FIG. 23A shows the production of IFNγ or TNF-α by rested eGFP- or PDE4B2-transduced CD4 T cells as determined via intracellular cytokine staining (ICS) 7 hours upon stimulation with plate-bound αCD3 and soluble αCD28 (continuous lines), or without (dotted lines) in the presence of Forskolin or PGE$_2$. Depicted are the percentages of IFNγ+ or TNF-α+ cells, within alive CD45+ eGFP+ (gray lines) or alive CD45+ exogenous PDE4B2+ (black lines) lymphocytes as well as representative plots. Results shown are from a single experiment where all conditions were performed in duplicate. Error bars represent SD. FIG. 23B shows the secretion of IFNγ by rested eGFP-, PDE4B2-, eGFP&NY-ESO-1 TCR- or PDE4B2-&NY-ESO-1 TCR-transduced CD8 T cells, as assessed via ELISA, in response to 48 hours co-culture with the NY-ESO-1-presenting melanoma cells A375 in the presence of PGE$_2$ or of Forskolin. Depicted are IFNγ concentrations of co-culture supernatants. Error bars represent SD.

FIG. 26 provides exemplary protein sequences for human and murine PDE4B2.

DETAILED DESCRIPTION

Figure 4A:
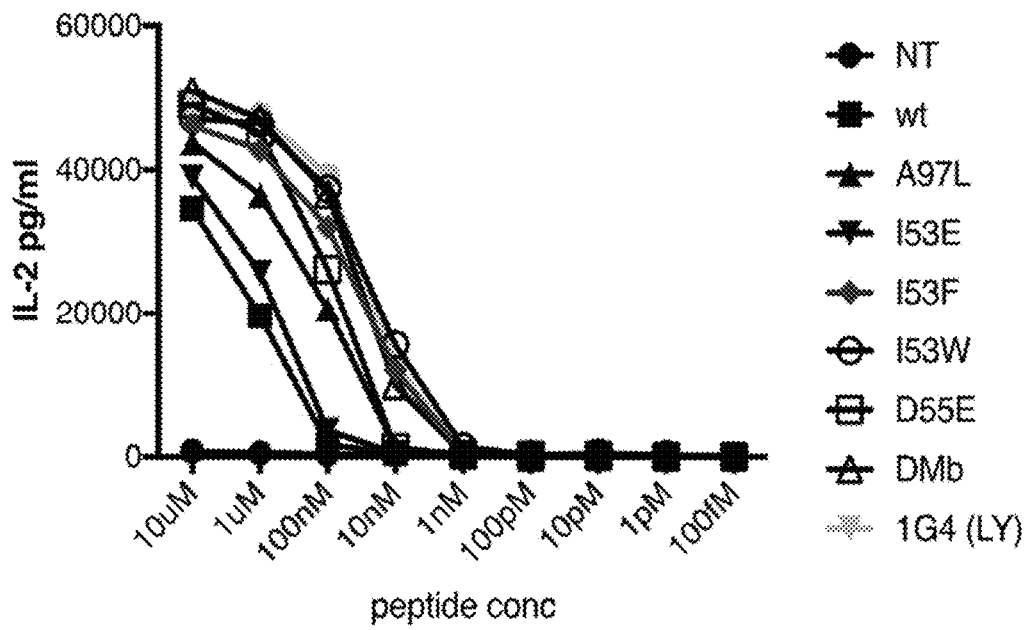
FIGS. 4A-4B show functional avidity analysis of NY-ESO specific TCR transgenic CD4$^+$ and CD8$^+$ T cells. Interleukin-2 production by CD4$^+$ T cells (FIG. 4A) and interferon-gamma (IFN-g) production by CD8$^+$ T cells (FIG. 4B) transduced with different NY-ESO TCR mutants. Target cells used were the HLA-A2.1 positive cell line T2 loaded with serial 10-fold dilutions of NY-ESO$_{157-165}$ peptide. "NT" refers to non-transduced cells.

The invention generally provides modified T cell receptors (TCRs) that have improved binding affinity to cancer antigen NY-ESO-1$_{157-165}$ epitope.

The invention also provides related polypeptides and proteins, as well as related nucleic acids, recombinant expression vectors, host cells, and populations of cells, including but not limited to genetically engineered cells. Further, the invention provides genetically engineered cells with modified TCRs. Further provided by the invention are pharmaceutical compositions relating to the modified TCRs and cells of the invention.

Further, the invention provides a method of genetically engineering of lymphoid cells that express modified TCRs. Further provided by the invention are genetically engineered lymphoid cells that express a modified TCR and additional receptor(s), including but not limited a chimeric antigen receptor or a receptor that is not against the cancer antigen NY-ESO-1$_{157-165}$ epitope or soluble proteins including but not limed to cytokines, chemokines, growth factors, soluble receptors, ligands, antibody fragments, and antigen binding domains. Also provided herein are methods of using such genetically engineered lymphoid cells in adoptive cell transfer therapy.

Also provided by the invention is a method of treating cancer in a subject. The method comprises administering to the subject suffering such cancer an effective amount of lymphoid cells presenting the modified TCRs of the invention. Also provided by the invention is a method for stimulating or enhancing an immune response in a mammal which comprises administering to the mammal an effective amount the genetically engineered lymphoid cells of this invention.

In one aspect, provided herein is a genetically engineered lymphoid cell that expresses a modified TCR and a cytokine and/or chemokine from the colony-stimulating factor cytokine/chemokine family. Members of the colony-stimulating factor cytokine/chemokine family are known to act on most of these myeloid cells and regulate their activity (Ushach, I. and A. Zlotnik, Journal of Leukocyte Biology, 2016. 100: p. 481-489). Specifically granulocyte macrophage-colony stimulating factor (GM-CSF) has been known to play an immune-stimulatory role in the biology of monocytes, macrophages, granulocytes and dendritic cells (DCs). GM-CSF, initially described as a hematopoietic growth factor, has emerged as a key immune modulator in numerous pathological conditions, including autoimmune disease and cancer. GM-CSF is secreted by cells of both hematopoietic, i.e. macrophages, natural killer (NK) cells, activated T cells and non-hematopoietic origin, such as endothelial cells and fibroblasts. Undetectable in the serum of healthy individuals, GM-CSF levels rapidly increase during inflammation (Becher, B., S. Tugues, and M. Greter, Immunity, 2016. 45: p. 963-973). GM-CSF exerts its pleiotropic effects through its cognate receptor, namely GM-CSF receptor (GM-CSF-R), found primarily on cells of the monocyte/macrophage and granulocytic lineages, as well as DCs. Upon ligand binding, the GM-CSF receptor transduces signals related to cell survival, proliferation, differentiation and activation (Hercus, T. R., et al., Blood. 2009. 114: p. 1289-1298). By controlling the fate of such professional antigen presenting cells (APCs), GM-CSF can indirectly regulate T cell activity, thus acting as a bridge between adaptive and innate immunity (Shi, Y., et al., Cell Res. 2006. 16(2):126-33).

In cancer therapy, GM-CSF has played a central role in the supportive care of cancer patients as well as accelerating and enhancing recovery of the myeloid compartment of the immune system after chemotherapy and/or stem cell transplantation regimens (Arellano, M. and S. Lonial, Biologics. 2008. 2(1):13-27). Additionally, its pivotal role in DC development and differentiation has placed GM-CSF in the core of DC-based immunotherapies, in the form of either DC-activating GM-CSF-secreting cancer vaccines (Gupta, R. and L. A. Emens. Discovery medicine, 2010. 10(50): p. 52-60) or adoptive transfer of GM-CSF-activated/skewed DCs as primary immunotherapy (Mookerjee, A., M. Graciotti, and L. Kandalaft, BioImpacts: BI, 2018. 8(3): p. 211-221). DCs have also emerged as the key mediators of robust anti-tumor responses in pre-clinical studies using tumors forcibly over-expressing GM-CSF (Shi, F. S., et al., Cancer Gene Ther, 1999. 6(1): p. 81-8) or after administration of soluble GM-CSF in cancer patients (Nasi, M. L., et al., Cytokines Cell Mol Ther, 1999. 5(3): p. 139-44). Despite promising results, use of GM-CSF as single adjuvant therapy in the clinic has proven rather unsatisfactory (Lawson, D. H., et al., J Clin Oncol, 2015. 33(34): p. 4066-76) and has been limited by the emergence of dose-related toxicities (Antman, K. S., et al., N Engl J Med, 1988. 319(10): p. 593-8). Interestingly, another set of studies have revealed a GM-CSF-driven immunosuppressive mechanism of anti-tumor response, where tumor-derived GM-CSF is responsible for immune-attraction of $CD11b^+$ $Gr-1^+$ myeloid-derived suppressor cells (MDSCs) in the tumor microenvironment which, in turn, promote tumor evasion (Pylayeva-Gupta, Y., et al., Cancer Cell, 2012. 21: p. 836-847).

To maximize the benefit of adoptive T cell transfer strategies and to exploit the immunomodulatory anti-cancer properties of GM-CSF, while avoiding any undesirable side-effects and off-target toxicities, a combinatorial approach was developed where T cells are genetically co-engineered to ectopically express a high affinity NY-ESO-1-specific TCR and GM-CSF. One embodiment of the T cells expressing a NY-ESO-1-specific TCR and GM-CSF is exemplified in Example 6 below. It was shown that human T cells efficiently secreted fully functional soluble GM-CSF without affecting their proliferative capacity or anti-tumor activity and elicited strong anti-tumoral responses against human NY-ESO-$1^+$ melanoma tumors in vivo.

In another aspect, provided herein is a genetically engineered lymphoid cell that expresses a modified TCR and a phosphodiesterase. In some embodiments, the phosphodiesterase is phosphodiesterase 4B2 (PDE4B2). The intracellular second messenger cyclic AMP (cAMP) acts as a potent immunosuppressive signaling molecule in T-cells and is up-regulated by multiple tumor-relevant suppressive factors including prostaglandin E2 ($PGE_2$), adenosine and the functions of regulatory T-cells. Overexpression of phosphodiesterases can reduce cAMP signaling and increase the resistance of anti-tumor T cells to the inhibition of the suppressive factors such as $PGE_2$. See, U.S. Pat. No. 9,976,121, and Schmetterer, K G., Front. Immunol., 30 Jul. 2019, which are hereby incorporated by reference in their entirety for all purposes.

Definitions

Unless defined otherwise, all technical and scientific terms used herein have the same meaning as commonly understood by one of ordinary skill in the art to which this invention belongs.

As used herein, the term "antigen" is a molecule and/or substance that can bind specifically to an antibody or generate peptide fragments that are recognized by a T cell receptor, and/or induces an immune response. An antigen may contain one or more "epitopes". In certain embodiments, the antigen has several epitopes. An epitope is recognized by an antibody or a lymphocyte in the context of an WIC molecule. In various embodiments, the antigen is NY-ESO-1. In various embodiments, the epitope is NY-ESO-$1_{157-165}$.

As used herein the terms "tumor antigen" or "cancer antigen", used interchangeably, are broadly defined as an antigen specifically expressed by a tumor or cancer cell, or associated to tumors, such as overexpressed or aberrantly expressed antigens, antigens produced by oncogenic viruses, oncofetal antigens, altered cell surface glycolipids and glycoproteins antigens, cell type-specific differentiation antigens. A tumor antigen which is present on the surface of cancer cells is an antigen which is not present on the surface of normal somatic cells of the individual i.e. the antigen is exposed to the immune system in cancer cells but not in normal somatic cells. The antigen may be expressed at the cell surface of the tumor cell where it is recognized by components of the humoral immune system such as B lymphocytes (B cells). Intracellular tumor antigens are processed into shorter peptide fragments which form complexes with major histocompatibility complex (MHC) molecules and are presented on the cell surface of cancer cells, where they are recognized by the T cell receptors (TCR's) of T lymphocytes (T cells) or natural killer cells. Preferably, the tumor antigen is one, which is not expressed by normal cells, or at least not expressed to the same level as in tumor cells.

The term "functional fragment" as used herein refers to a fragment of the polypeptide or protein, or a polynucleotide encoding the polypeptide or protein, that retains at least one function of the full-length polypeptide or protein. A functional fragment may comprise an amino acid sequence of at least 5 contiguous amino acid residues, at least 6 contiguous amino acid residues, at least 7 contiguous amino acid residues, at least 8 contiguous amino acid residues, at least 9 contiguous amino acid residues, at least 10 contiguous amino acid residues, at least 11 contiguous amino acid residues, at least 12 contiguous amino acid residues, at least 13 contiguous amino acid residues, at least 14 contiguous amino acid residues, at least 15 contiguous amino acid residues, at least 20 contiguous amino acid residues, at least 25 contiguous amino acid residues, at least 40 contiguous amino acid residues, at least 50 contiguous amino acid residues, at least 60 contiguous amino residues, at least 70 contiguous amino acid residues, at least contiguous 80 amino acid residues, at least contiguous 90 amino acid residues, at least contiguous 100 amino acid residues, at least contiguous 125 amino acid residues, at least 150 contiguous amino acid residues, at least contiguous 175 amino acid residues, at least contiguous 200 amino acid residues, or at least contiguous 250 amino acid residues of the amino acid sequence of the full-length polypeptide or protein. The functional fragment of a polypeptide or protein may retain one, two, three, four, five, or more functions of the full-length protein or polypeptide. For example, a functional fragment of a TCR that immunospecifically binds to a particular antigen (or epitope) may retain the ability to immunospecifically bind to the antigen (or epitope). In some embodiments, a functional fragment of a TCR comprises one or more complementary determining regions (CDRs) of the alpha chain and/or beta chain of the TCR. In some embodiments, a functional fragment of a TCR comprises an alpha chain and/or a beta chain of the TCR.

The term "variant" as used herein refers to a modified polypeptide, protein, or polynucleotide that has substantial or significant sequence identity or similarity to a wild type polypeptide, protein, or polynucleotide. The variant may retain the same, or have altered (e.g., improved, reduced or abolished) biological activity relative to the wild type polypeptide, protein, or polynucleotide of which it is a variant. The variant may contain an insertion, a deletion, a substitution of at least one amino acid residue or nucleotide.

The term "antigen binding protein" refers to any protein that binds to an antigen of interest or a polypeptide or fragment thereof. The protein may be either naturally derived or synthetic. Examples of antigen binding proteins include, but are not limited to, antibodies; polypeptides or fragments derived from antibodies, such as, for example, single chain variable fragments (scFv), Fab, Fab', F(ab')$_2$, and Fv fragments; polypeptides derived from T-cell receptors, such as, for example, TCR variable domains; secreted factors (e.g., cytokines, growth factors) that can be artificially fused to signaling domains (e.g., "zytokines"); and any ligand or receptor fragment (e.g., CD27, NKG2D) that binds to the antigen of interest. Combinatorial libraries could also be used to identify peptides binding with high affinity to the therapeutic target.

As used herein, the terms "antibody" and "antibodies" refer to polyclonal antibodies, monoclonal antibodies, multispecific antibodies, human antibodies, humanized antibodies, chimeric antibodies, and antibody fragments (e.g., single chain antibodies, Fab fragments, Fv fragments, single-chain Fv fragments (scFv), a divalent antibody fragment such as an (Fab)2'-fragment, F(ab') fragments, disulfide-linked Fvs (sdFv), intrabodies, minibodies, diabodies, triabodies, decabodies, and other domain antibodies (e.g., Holt, L. J., et al., Trends Biotechnol. (2003), 21, 11, 484-490)). The terms "antibody" and "antibodies" also refer to covalent diabodies such as those disclosed in U.S. Pat. Appl. Pub. 2007/0004909 and Ig-DARTS such as those disclosed in U.S. Pat. Appl. Pub. 2009/0060910. Antibodies useful in the methods described herein include immunoglobulin molecules of any type (e.g., IgG, IgE, IgM, IgD, IgA and IgY), class (e.g., IgG1, IgG2, IgG3, IgG4, IgA1, and IgA2) or subclass.

The terms "vector", "cloning vector" and "expression vector" mean the vehicle by which a DNA or RNA sequence (e.g., a foreign gene) can be introduced into a host cell, so as to genetically modify the host and promote expression (e.g., transcription and translation) of the introduced sequence. Vectors include plasmids, synthesized RNA and DNA molecules, transposons, phages, viruses, etc. In certain embodiments, the vector is a viral vector such as, but not limited to, an adenoviral, adeno-associated, alphaviral, herpes, lentiviral, retroviral, or vaccinia vector.

The term "regulatory element" refers to any cis-acting genetic element that controls some aspect of the expression of nucleic acid sequences. In some embodiments, the term "promoter" comprises essentially the minimal sequences required to initiate transcription. In some embodiments, the term "promoter" includes the sequences to start transcription, and in addition, also include sequences that can upregulate or downregulate transcription, commonly termed "enhancer elements" and "repressor elements", respectively. In some embodiments, the promoter is a lymphocyte-specific promoter.

The term "operably linked" as used herein means a nucleotide sequence is placed in a functional relationship with another nucleotide sequence. For example, if a coding sequence is operably linked to a promoter sequence, this generally means that the promoter may promote transcription of the coding sequence. Operably linked means that the DNA sequences being linked are typically contiguous and, where necessary to join two protein coding regions, contiguous and in reading frame. However, since enhancers may function when separated from the promoter by several kilobases and intronic sequences may be of variable length, some nucleotide sequences may be operably linked but not contiguous.

The terms "T cell" and "T lymphocyte" are interchangeable and used synonymously herein. As used herein, T-cell includes thymocytes, naive T lymphocytes, immature T lymphocytes, mature T lymphocytes, resting T lymphocytes, or activated T lymphocytes. A T-cell can be a T helper (Th) cell, for example a T helper 1 (Th1) or a T helper 2 (Th2) cell. The T-cell can be a helper T-cell (HTL; CD4$^+$ T-cell) CD4$^+$ T-cell, a cytotoxic T-cell (CTL; CD8$^+$ T-cell), a tumor infiltrating cytotoxic T-cell (TIL; CD8$^+$ T-cell), CD4$^+$CD8$^+$ T-cell, or any other subset of T-cells. Other illustrative populations of T-cells suitable for use in particular embodiments include naive T-cells and memory T-cells. Also included are "NKT cells", which refer to a specialized population of T-cells that express a semi-invariant αβ T-cell receptor, but also express a variety of molecular markers that are typically associated with NK cells, such as NK1.1. NKT cells include NK1.1$^+$ and NK1.1$^-$, as well as CD4$^+$, CD4$^-$, CD8$^+$ and CD8$^-$ cells. The TCR on NKT cells is unique in that it recognizes glycolipid antigens presented by the MHC I-like molecule CD Id. NKT cells can have either protective or deleterious effects due to their abilities to produce cytokines that promote either inflammation or immune tolerance. Also included are "gamma-delta T-cells (γδ T-cells)," which refer to a specialized population that to a small subset of T-cells possessing a distinct TCR on their surface, and unlike the majority of T-cells in which the TCR is composed of two glycoprotein chains designated α- and β-TCR chains, the TCR in γδ T-cells is made up of a γ-chain and a δ-chain. γδ T-cells can play a role in immunosurveillance and immunoregulation, and were found to be an important source of IL-17 and to induce robust $CD8^+$ cytotoxic T-cell response. Also included are "regulatory T-cells" or "Tregs" refers to T-cells that suppress an abnormal or excessive immune response and play a role in immune tolerance. Tregs cells are typically transcription factor Foxp3-positive $CD4^+$ T cells and can also include transcription factor Foxp3-negative regulatory T-cells that are IL-10-producing $CD4^+$ T cells.

The terms "natural killer cell" and "NK cell" are used interchangeable and used synonymously herein. As used herein, NK cell refers to a differentiated lymphocyte with a CD 16+ CD56+ and/or CD57+ TCR– phenotype. NKs are characterized by their ability to bind to and kill cells that fail to express "self" MHC/HLA antigens by the activation of specific cytolytic enzymes, the ability to kill tumor cells or other diseased cells that express a ligand for NK activating receptors, and the ability to release protein molecules called cytokines that stimulate or inhibit the immune response.

As used herein, an "exogenous" refers to any molecule that does not originate from a particular cell as found in nature. The exogenous molecule may be expressed from a nucleic acid molecule introduced into the host cell by artificial or natural means.

The terms "treat" or "treatment" of a state, disorder or condition include: (1) preventing, delaying, or reducing the incidence and/or likelihood of the appearance of at least one clinical or sub-clinical symptom of the state, disorder or condition developing in a subject that may be afflicted with or predisposed to the state, disorder or condition, but does not yet experience or display clinical or subclinical symptoms of the state, disorder or condition; or (2) inhibiting the state, disorder or condition, i.e., arresting, reducing or delaying the development of the disease or a relapse thereof or at least one clinical or sub-clinical symptom thereof; or (3) relieving the disease, i.e., causing regression of the state, disorder or condition or at least one of its clinical or sub-clinical symptoms. The benefit to a subject to be treated is either statistically significant or at least perceptible to the patient or to the physician.

The term "effective" applied to dose or amount refers to that quantity of a compound or pharmaceutical composition that is sufficient to result in a desired activity upon administration to a subject in need thereof. Note that when a combination of active ingredients is administered, the effective amount of the combination may or may not include amounts of each ingredient that would have been effective if administered individually. The exact amount required will vary from subject to subject, depending on the species, age, and general condition of the subject, the severity of the condition being treated, the particular drug or drugs employed, the mode of administration, and the like.

The phrase "pharmaceutically acceptable", as used in connection with compositions described herein, refers to molecular entities and other ingredients of such compositions that are physiologically tolerable and do not typically produce untoward reactions when administered to a mammal (e.g., a human). Preferably, the term "pharmaceutically acceptable" means approved by a regulatory agency of the Federal or a state government or listed in the U.S. Pharmacopeia or other generally recognized pharmacopeia for use in mammals, and more particularly in humans.

The terms "patient", "individual", "subject", and "animal" are used interchangeably herein and refer to mammals, including, without limitation, human and veterinary animals (e.g., cats, dogs, cows, horses, sheep, pigs, etc.) and experimental animal models. In a preferred embodiment, the subject is a human.

The term "carrier" refers to a diluent, adjuvant, excipient, or vehicle with which the compound is administered. Such pharmaceutical carriers can be sterile liquids, such as water and oils, including those of petroleum, animal, vegetable or synthetic origin, such as peanut oil, soybean oil, mineral oil, sesame oil and the like. Water or aqueous solution saline solutions and aqueous dextrose and glycerol solutions are preferably employed as carriers, particularly for injectable solutions. Alternatively, the carrier can be a solid dosage form carrier, including but not limited to one or more of a binder (for compressed pills), a glidant, an encapsulating agent, a flavorant, and a colorant. Suitable pharmaceutical carriers are described in "Remington's Pharmaceutical Sciences" by E. W. Martin.

Singular forms "a", "an", and "the" include plural references unless the context clearly dictates otherwise. Thus, for example, a reference to "a method" includes one or more methods, and/or steps of the type described herein and/or which will become apparent to those persons skilled in the art upon reading this disclosure.

The term "about" or "approximately" includes being within a statistically meaningful range of a value. Such a range can be within an order of magnitude, preferably within 50%, more preferably within 20%, still more preferably within 10%, and even more preferably within 5% of a given value or range. The allowable variation encompassed by the term "about" or "approximately" depends on the particular system under study, and can be readily appreciated by one of ordinary skill in the art.

Recitation of ranges of values herein are merely intended to serve as a shorthand method of referring individually to each separate value falling within the range and each endpoint, unless otherwise indicated herein, and each separate value and endpoint is incorporated into the specification as if it were individually recited herein.

The practice of the present invention employs, unless otherwise indicated, conventional techniques of statistical analysis, molecular biology (including recombinant techniques), microbiology, cell biology, and biochemistry, which are within the skill of the art. Such tools and techniques are described in detail in e.g., Sambrook et al. (2001) Molecular Cloning: A Laboratory Manual. 3rd ed. Cold Spring Harbor Laboratory Press: Cold Spring Harbor, New York; Ausubel et al. eds. (2005) Current Protocols in Molecular Biology. John Wiley and Sons, Inc.: Hoboken, NJ; Bonifacino et al. eds. (2005) Current Protocols in Cell Biology. John Wiley and Sons, Inc.: Hoboken, NJ; Coligan et al. eds. (2005) Current Protocols in Immunology, John Wiley and Sons, Inc.: Hoboken, NJ; Coico et al. eds. (2005) Current Protocols in Microbiology, John Wiley and Sons, Inc.: Hoboken, NJ; Coligan et al. eds. (2005) Current Protocols in Protein Science, John Wiley and Sons, Inc.: Hoboken, NJ; and Enna et al. eds. (2005) Current Protocols in Pharmacology, John Wiley and Sons, Inc.: Hoboken, NJ.

Modified T Cell Receptors

In one aspect, the invention provides a modified T cell receptor (TCR), or functional fragment thereof, wherein the modified TCR comprises a single amino acid substitution within a complementary determining region (CDR) 2 of a beta chain of the modified TCR relative to a CDR2 of a beta chain of an unsubstituted wild-type (WT) TCR.

In one embodiment, the invention provides a modified T cell receptor (TCR) comprising an amino acid sequence of a wild-type (WT) TCR with no more than a single amino acid substitution, located in a complementary determining region (CDR) 2 of a beta chain of the TCR, wherein the modified TCR retains the antigen specificity of the WT TCR and, as compared to WT TCR, has a higher binding affinity to a cancer antigen and comprises the amino acid sequence of SEQ ID NO: 1 with no more than a single amino acid substitution located in the CDR2 of SEQ ID NO: 1.

In certain embodiments, the binding affinity of the modified TCR to the cancer antigen is about 5 times, about 10 times, about 15 times, about 20 times, about 25 times, about 30 times, about 35 times, about 40 times, about 45 times, about 50 times, about 55 times, about 60 times, about 65 times, about 70 times, about 75 times, about 80 times, about 85 times, about 90 times, about 95 times, or more than 100 times higher as compared to the binding affinity of WT TCR to the cancer antigen.

Dissociation constant ($K_D$) may be used to evaluate the binding affinity of a modified TCR to the cancer antigen. In certain embodiments, the dissociation constant ($K_D$) of a modified TCR to the cancer antigen is between about 0.1 and about 10 μM. As a non-limiting example, the dissociation constant ($K_D$) of a modified TCR to the cancer antigen may be about 0.1 μM, about 0.2 μM, about 0.3 μM, about 0.4 μM, about 0.5 μM, about 0.6 μM, about 0.7 μM, about 0.8 μM, about 0.9 μM, about 1 μM, about 1.2 μM, about 1.5 μM, about 1.7 μM, about 2 μM, about 2.2 μM, about 2.5 μM, about 2.7 μM, about 3 μM, about 3.2 μM, about 3.5 μM, about 3.7 μM, about 3.9 μM, about 4 μM, about 4.2 μM, about 4.5 μM, about 5 μM, about 5.5 μM, about 6 μM, about 6.5 μM, about 7 μM, about 7.5 μM, about 8 μM, about 8.5 μM, about 9 μM, about 9.5 μM, or about 10 μM.

In one embodiment, the invention provides a modified T cell receptor (TCR) comprising an amino acid sequence of a wild-type (WT) TCR with no more than a single amino acid substitution, located in a complementary determining region (CDR) 2 of a beta chain of the TCR, wherein the modified TCR retains the antigen specificity of the WT TCR and, as compared to WT TCR, has a higher binding affinity to cancer antigen NY-ESO-1$_{157-165}$ epitope (SEQ ID NO: 8) and comprises the amino acid sequence of SEQ ID NO: 1 with no more than a single amino acid substitution located in the CDR2 of SEQ ID NO: 1.

In certain embodiments, the binding affinity of the modified TCR to cancer antigen NY-ESO-1 is between about 2 times to about 100 times higher as compared to the binding affinity of WT TCR to cancer antigen NY-ESO-1. As an non-limiting example, the binding affinity of the modified TCR to cancer antigen NY-ESO-1 may be about 5 times, about 10 times, about 15 times, about 20 times, about 25 times, about 30 times, about 35 times, about 40 times, about 45 times, about 50 times, about 55 times, about 60 times, about 65 times, about 70 times, about 75 times, about 80 times, about 85 times, about 90 times, about 95 times, or more than 100 times higher as compared to the binding affinity of WT TCR to cancer antigen NY-ESO-1. In various embodiments, the epitope is NY-ESO-1$_{157-165}$.

In one embodiment, the binding affinity of the modified TCR to cancer antigen NY-ESO-1 is about 5 to about 75 times higher as compared to the binding affinity of WT TCR to cancer antigen NY-ESO-1. In one embodiment, the binding affinity of the modified TCR to cancer antigen NY-ESO-1 is about 10 to about 75 times higher as compared to the binding affinity of WT TCR to cancer antigen NY-ESO-1. In one embodiment, the binding affinity of the modified TCR to cancer antigen NY-ESO-1 is about 25 to about 75 times higher as compared to the binding affinity of WT TCR to cancer antigen NY-ESO-1. In one embodiment, the binding affinity of the modified TCR to cancer antigen NY-ESO-1 is about 40 to about 75 times higher as compared to the binding affinity of WT TCR to cancer antigen NY-ESO-1. In one embodiment, the binding affinity of the modified TCR to cancer antigen NY-ESO-1 is about 40 to about 60 times higher as compared to the binding affinity of WT TCR to cancer antigen NY-ESO-1. In one embodiment, the binding affinity of the modified TCR to cancer antigen NY-ESO-1 is about 40 to about 50 times higher as compared to the binding affinity of WT TCR to cancer antigen NY-ESO-1. In one embodiment, the binding affinity of the modified TCR to cancer antigen NY-ESO-1 is about 50 times higher as compared to the binding affinity of WT TCR to cancer antigen NY-ESO-1. In various embodiments, the epitope is NY-ESO-1$_{157-165}$.

Dissociation constant ($K_D$) may be used to evaluate the binding affinity of a modified TCR to cancer antigen NY-ESO-1. In certain embodiments, the dissociation constant ($K_D$) of a modified TCR to cancer antigen NY-ESO-1 is between about 0.1 and about 10 μM. As a non-limiting example, the dissociation constant ($K_D$) of a modified TCR to cancer antigen NY-ESO-1 may be about 0.1 μM, about 0.2 μM, about 0.3 μM, about 0.4 μM, about 0.5 μM, about 0.6 μM, about 0.7 μM, about 0.8 μM, about 0.9 μM, about 1 μM, about 1.2 μM, about 1.5 μM, about 1.7 μM, about 2 μM, about 2.2 μM, about 2.5 μM, about 2.7 μM, about 3 μM, about 3.2 μM, about 3.5 μM, about 3.7 μM, about 3.9 μM, about 4 μM, about 4.2 μM, about 4.5 μM, about 5 μM, about 5.5 μM, about 6 μM, about 6.5 μM, about 7 μM, about 7.5 μM, about 8 μM, about 8.5 μM, about 9 μM, about 9.5 μM, or about 10 μM. In various embodiments, the epitope is NY-ESO-1$_{157-165}$.

In one embodiment, the dissociation constant ($K_D$) of a modified TCR to cancer antigen NY-ESO-1 is between about 0.3 and about 4.5 μM. In one embodiment, the dissociation constant ($K_D$) of a modified TCR to cancer antigen NY-ESO-1 is between about 0.3 and about 2 μM. In one embodiment, the dissociation constant ($K_D$) of a modified TCR to cancer antigen NY-ESO-1 is between about 2 and about 3 μM. In one embodiment, the dissociation constant ($K_D$) of a modified TCR to cancer antigen NY-ESO-1 is between about 3 and about 4 μM. In one embodiment, the dissociation constant ($K_D$) of a modified TCR to cancer antigen NY-ESO-1 is about 0.4 μM. In one embodiment, the dissociation constant ($K_D$) of a modified TCR to cancer antigen NY-ESO-1 is about 0.41 μM. In one embodiment, the dissociation constant ($K_D$) of a modified TCR to cancer antigen NY-ESO-1 is about 3.9 μM. In one embodiment, the dissociation constant ($K_D$) of a modified TCR to cancer antigen NY-ESO-1 is about 3.89 μM. In various embodiments, the epitope is NY-ESO-1$_{157-165}$.

In certain embodiments, the modified TCR comprises a single amino acid substitution located at residue 53 in the CDR2 of a beta chain of the TCR. The single amino acid substitution may include, but not limited to, I53E, I53F and I53W.

In certain embodiments, the modified TCR comprises a single amino acid substitution located at residue 55 in the CDR2 of a beta chain of the TCR. The single amino acid substitution may include, but not limited to, D55E.

In certain embodiments, the modified TCR comprises a single amino acid substitution located at residue 50, 51, or 52 in the CDR2 of a beta chain of the TCR. The single amino acid substitution may include, but not limited to, G50V, G50A, A51D, A51E, or G52Q.

In certain embodiment, the beta chain sequence of the modified TCR comprises an amino acid sequence that is at least 70%, at least 75%, at least 80%, at least 85%, at least 90%, at least 91%, at least 92%, at least 93%, at least 94%, at least 95%, at least 96%, at least 97%, at least 98%, or at least 99% identical to the beta chain of the unsubstituted WT TCR, or functional fragment thereof, outside of the CDR2 region of the beta chain of the modified TCR, or functional fragment thereof. In one embodiment, the beta chain of the modified TCR, or functional fragment thereof, comprises the amino acid sequence of the beta chain of the unsubstituted WT TCR, or functional fragment thereof, with the single amino acid substitution in the CDR2 region. In one embodiment, the beta chain of the unsubstituted WT TCR comprises the amino acid sequence of SEQ ID NO: 1.

In certain embodiments, the modified TCR comprises an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to an amino acid sequence selected from any one of SEQ ID NOs: 2-5. In one embodiment, the modified TCR comprises an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to an amino acid sequence of SEQ ID NO: 2. In one embodiment, the modified TCR comprises an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to an amino acid sequence of SEQ ID NO: 3. In one embodiment, the modified TCR comprises an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to an amino acid sequence of SEQ ID NO: 4. In one embodiment, the modified TCR comprises an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to an amino acid sequence of SEQ ID NO: 5. In any of above embodiments, the modified TCR comprises a single amino acid substitution within the CDR2 of a beta chain relative to the unsubstituted WT TCR beta chain (e.g., as set forth in SEQ ID NO: 1).

In certain embodiments, the modified TCR comprises an amino acid sequence selected from any one of SEQ ID NOs: 2-5. In one embodiment, the modified TCR comprises the amino acid sequence of SEQ ID NO: 2. In one embodiment, the modified TCR comprises the amino acid sequence of SEQ ID NO: 3. In one embodiment, the modified TCR comprises the amino acid sequence of SEQ ID NO: 4. In one embodiment, the modified TCR comprises the amino acid sequence of SEQ ID NO: 5.

In certain embodiments, the modified TCR comprises an amino acid sequence that is encoded by a nucleotide sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to a nucleotide sequence selected from any one of SEQ ID NOs: 11-14. In one embodiment, the modified TCR comprises an amino acid sequence that is encoded by a nucleotide sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the nucleotide sequence of SEQ ID NO: 11. In one embodiment, the modified TCR comprises an amino acid sequence that is encoded by a nucleotide sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the nucleotide sequence of SEQ ID NO: 12. In one embodiment, the modified TCR comprises an amino acid sequence that is encoded by a nucleotide sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the nucleotide sequence of SEQ ID NO: 13. In one embodiment, the modified TCR comprises an amino acid sequence that is encoded by a nucleotide sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the nucleotide sequence of SEQ ID NO: 14. In any of above embodiments, the modified TCR comprises a single amino acid substitution within the CDR2 of a beta chain relative to the unsubstituted WT TCR beta chain (e.g., as set forth in SEQ ID NO: 1).

In certain embodiments, the modified TCR comprises an amino acid sequence that is encoded by a nucleotide sequence selected from any one of SEQ ID NOs: 11-14. In one embodiment, the modified TCR comprises an amino acid sequence that is encoded by the nucleotide sequence of SEQ ID NO: 11. In one embodiment, the modified TCR comprises an amino acid sequence that is encoded by the nucleotide sequence of SEQ ID NO: 12. In one embodiment, the modified TCR comprises an amino acid sequence that is encoded by the nucleotide sequence of SEQ ID NO: 13. In one embodiment, the modified TCR comprises an amino acid sequence that is encoded by the nucleotide sequence of SEQ ID NO: 14.

In one aspect, the invention provides a modified T cell receptor (TCR) comprising an alpha chain comprising the amino acid sequence of SEQ ID NO: 7, and a beta chain comprising an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to an amino acid sequence selected from any one of SEQ ID NOs: 2-5. In one embodiment, the modified T cell receptor (TCR) comprises an alpha chain comprising the amino acid sequence of SEQ ID NO: 7, and a beta chain comprising an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the amino acid sequence of SEQ ID NO: 2. In one embodiment, the modified T cell receptor (TCR) comprises an alpha chain comprising the amino acid sequence of SEQ ID NO: 7, and a beta chain comprising an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the amino acid sequence of SEQ ID NO: 3. In one embodiment, the modified T cell receptor (TCR) comprises an alpha chain comprising the amino acid sequence of SEQ ID NO: 7, and a beta chain comprising an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the amino acid sequence of SEQ ID NO: 4. In one embodiment, the modified T cell receptor (TCR) comprises an alpha chain comprising the amino acid sequence of SEQ ID NO: 7, and a beta chain comprising an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the amino acid sequence of SEQ ID NO: 5. In any of above embodiments, the modified TCR comprises a single amino acid substitution within the CDR2 of a beta chain relative to the unsubstituted WT TCR beta chain (e.g., as set forth in SEQ ID NO: 1).

In one aspect, the invention provides a modified T cell receptor (TCR) comprising an alpha chain comprising the amino acid sequence of SEQ ID NO: 7, and a beta chain comprising the amino acid sequence of any one of SEQ ID NOs: 2-5. In one embodiment, the modified T cell receptor (TCR) comprises an alpha chain comprising the amino acid sequence of SEQ ID NO: 7, and a beta chain comprising the amino acid sequence of SEQ ID NO: 2. In one embodiment, the modified T cell receptor (TCR) comprises an alpha chain comprising the amino acid sequence of SEQ ID NO: 7, and a beta chain comprising the amino acid sequence of SEQ ID NO: 3. In one embodiment, the modified T cell receptor (TCR) comprises an alpha chain comprising the amino acid sequence of SEQ ID NO: 7, and a beta chain comprising the amino acid sequence of SEQ ID NO: 4. In one embodiment, the modified T cell receptor (TCR) comprises an alpha chain comprising the amino acid sequence of SEQ ID NO: 7, and a beta chain comprising the amino acid sequence of SEQ ID NO: 5.

In one aspect, the invention provides a modified T cell receptor (TCR) comprising an alpha chain encoded by the nucleotide sequence of SEQ ID NO: 9, and a beta chain encoded by a nucleotide sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to a nucleotide sequence selected from any one of SEQ ID NOs: 11-14. In one embodiment, the modified T cell receptor (TCR) comprises an alpha chain encoded by the nucleotide sequence of SEQ ID NO: 9, and a beta chain encoded by a nucleotide sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the nucleotide sequence of SEQ ID NO: 11. In one embodiment, the modified T cell receptor (TCR) comprises an alpha chain encoded by the nucleotide sequence of SEQ ID NO: 9, and a beta chain encoded by a nucleotide sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the nucleotide sequence of SEQ ID NO: 12. In one embodiment, the modified T cell receptor (TCR) comprises an alpha chain encoded by the nucleotide sequence of SEQ ID NO: 9, and a beta chain encoded by a nucleotide sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the nucleotide sequence of SEQ ID NO: 13. In one embodiment, the modified T cell receptor (TCR) comprises an alpha chain encoded by the nucleotide sequence of SEQ ID NO: 9, and a beta chain encoded by a nucleotide sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the nucleotide sequence of SEQ ID NO: 14. In any of above embodiments, the modified TCR comprises a single amino acid substitution within the CDR2 of a beta chain relative to the unsubstituted WT TCR beta chain (e.g., as set forth in SEQ ID NO: 1).

In one aspect, the invention provides a modified T cell receptor (TCR) comprising an alpha chain encoded by the nucleotide sequence of SEQ ID NO: 9, and a beta chain encoded by a nucleotide sequence of any of SEQ ID NOs: 11-14. In one embodiment, the modified T cell receptor (TCR) comprises an alpha chain encoded by the nucleotide sequence of SEQ ID NO: 9, and a beta chain encoded by the nucleotide sequence of SEQ ID NO: 11. In one embodiment, the modified T cell receptor (TCR) comprises an alpha chain encoded by the nucleotide sequence of SEQ ID NO: 9, and a beta chain encoded by the nucleotide sequence of SEQ ID NO: 12. In one embodiment, the modified T cell receptor (TCR) comprises an alpha chain encoded by the nucleotide sequence of SEQ ID NO: 9, and a beta chain encoded by the nucleotide sequence of SEQ ID NO: 13. In one embodiment, the modified T cell receptor (TCR) comprises an alpha chain encoded by the nucleotide sequence of SEQ ID NO: 9, and a beta chain encoded by the nucleotide sequence of SEQ ID NO: 14.

The invention also provides related polypeptides and proteins, as well as related nucleic acids, recombinant expression vectors, host cells, and populations of cells, including but not limited to genetically engineered cells.

In one aspect, the invention provides isolated polypeptides comprising a functional portion of a modified TCR described herein, wherein the functional portion comprises variable regions of alpha and beta chains of the TCR and wherein the functional portion comprises the amino acid substitution. In certain embodiments, the isolated polypeptide comprises an amino acid sequence selected from SEQ ID NOs: 2-5.

In one aspect, the invention provides isolated polypeptides comprising a functional portion of a modified TCR described herein, wherein the functional portion further comprises constant regions of alpha and beta chains of the TCR. In certain embodiments, the constant regions are of human origin. In other embodiments, the constant regions are of mouse origin.

In one aspect, the invention provides nucleic acid sequences encoding any of the amino acid sequences of the modified TCRs described herein.

It will be appreciated that conservative amino acid substitutions may be introduced to the polypeptide of any of those described herein, to achieve a polypeptide having, for example, 70%, 75%, 80%, 85%, 90%, 95%, 98% or 99% sequence identity the referenced sequence, and preferably with retention of activity of that sequence. Conservative amino acid substitutions, as known in the art and as referred to herein, involve substituting amino acids in a protein with amino acids having similar side chains in terms of, for example, structure, size and/or chemical properties. For example, the amino acids within each of the following groups may be interchanged with other amino acids in the same group: amino acids having aliphatic side chains, including glycine, alanine, valine, leucine and isoleucine; amino acids having non-aromatic, hydroxyl-containing side chains, such as serine and threonine; amino acids having acidic side chains, such as aspartic acid and glutamic acid; amino acids having amide side chains, including glutamine and asparagine; basic amino acids, including lysine, arginine and histidine; amino acids having aromatic ring side chains, including phenylalanine, tyrosine and tryptophan; and amino acids having sulfur-containing side chains, including cysteine and methionine. Additionally, amino acids having acidic side chains, such as aspartic acid and glutamic acid, are considered interchangeable herein with amino acids having amide side chains, such as asparagine and glutamine.

Examples of sequences useful in various embodiments of the invention are provided below.

BC1 WT beta chain
(SEQ ID NO: 1)
MAPRLLCCAALSLLWAGPVNAGVTQTPKFQVLKTGQSMTLQCAQDMNHEYM

SWYRQDPGMGLRLIHYSVGAGITDQGEVPNGYNVSRSTTEDFPLRLLSAAP

SQTSVYFCASSYVGAAGELFFGEGSRLTVLEDLNKVFPPEVAVFEPSEAEI

SHTQKATLVCLATGFFPDHVELSWWVNGKEVHSGVSTDPQPLKEQPALNDS

RYCLSSRLRVSATFWQNPRNHFRCQVQFYGLSENDEWTQDRAKPVTQIVSA

EAWGRADCGFTSVSYQQGVLSATILYEILLGKATLYAVLVSALVLMAMVKR

KDSRG*

I53E beta chain
(SEQ ID NO: 2)
MAPRLLCCAALSLLWAGPVNAGVTQTPKFQVLKTGQSMTLQCAQDMNHEYM

SWYRQDPGMGLRLIHYSVGAGETDQGEVPNGYNVSRSTTEDFPLRLLSAAP

SQTSVYFCASSYVGAAGELFFGEGSRLTVLEDLNKVFPPEVAVFEPSEAEI

SHTQKATLVCLATGFFPDHVELSWWVNGKEVHSGVSTDPQPLKEQPALNDS

RYCLSSRLRVSATFWQNPRNHFRCQVQFYGLSENDEWTQDRAKPVTQIVSA

EAWGRADCGFTSVSYQQGVLSATILYEILLGKATLYAVLVSALVLMAMVKR

KDSRG*

I53F beta chain
(SEQ ID NO: 3)
MAPRLLCCAALSLLWAGPVNAGVTQTPKFQVLKTGQSMTLQCAQDMNHEYM

SWYRQDPGMGLRLIHYSVGAGFTDQGEVPNGYNVSRSTTEDFPLRLLSAAP

SQTSVYFCASSYVGAAGELFFGEGSRLTVLEDLNKVFPPEVAVFESEAEIS

HTQKATLVCLATGFFPDHVELSWWVNGKEVHSGVSTDPQPLKEQPALNDSR

YCLSSRLRVSATFWQNPRNHFRCQVQFYGLSENDEWTQDRAKPVTQIVSAE

AWGRADCGFTSVSYQQGVLSATILYEILLGKATLYAVLVSALVLMAMVKRK

DSRG*

I53W beta chain
(SEQ ID NO: 4)
MAPRLLCCAALSLLWAGPVNAGVTQTPKFQVLKTGQSMTLQCAQDMNHEYM

SWYRQDPGMGLRLIHYSVGAGWTDQGEVPNGYNVSRSTTEDFPLRLLSAAP

SQTSVYFCASSYVGAAGELFFGEGSRLTVLEDLNKVFPPEVAVFEPSEAEI

SHTQKATLVCLATGFFPDHVELSWWVNGKEVHSGVSTDPQPLKEQPALNDS

RYCLSSRLRVSATFWQNPRNHFRCQVQFYGLSENDEWTQDRAKPVTQIVSA

EAWGRADCGFTSVSYQQGVLSATILYEILLGKATLYAVLVSALVLMAMVKR

KDSRG*

D55E beta chain
(SEQ ID NO: 5)
MAPRLLCCAALSLLWAGPVNAGVTQTPKFQVLKTGQSMTLQCAQDMNHEYM

SWYRQDPGMGLRLIHYSVGAGITEQGEVPNGYNVSRSTTEDFPLRLLSAAP

SQTSVYFCASSYVGAAGELFFGEGSRLTVLEDLNKVFPPEVAVFEPSEAEI

SHTQKATLVCLATGFFPDHVELSWWVNGKEVHSGVSTDPQPLKEQPALNDS

RYCLSSRLRVSATFWQNPRNHFRCQVQFYGLSENDEWTQDRAKPVTQIVSA

EAWGRADCGFTSVSYQQGVLSATILYEILLGKATLYAVLVSALVLMAMVKR

KDSRG*

A97L beta chain
(SEQ ID NO: 6)
MAPRLLCCAALSLLWAGPVNAGVTQTPKFQVLKTGQSMTLQCAQDMNHEYM

SWYRQDPGMGLRLIHYSVGAGITDQGEVPNGYNVSRSTTEDFPLRLLSAAP

SQTSVYFCASSYVGLAGELFFGEGSRLTVLEDLNKVFPPEVAVFEPSEAEI

SHTQKATLVCLATGFFPDHVELSWWVNGKEVHSGVSTDPQPLKEQPALNDS

RYCLSSRLRVSATFWQNPRNHFRCQVQFYGLSENDEWTQDRAKPVTQIVSA

EAWGRADCGFTSVSYQQGVLSATILYEILLGKATLYAVLVSALVLMAMVKR

KDSRG*

BC1 WT alpha chain
(SEQ ID NO: 7)
METLLGLLILWLQLQWVSSKQEVTQIPAALSVPEGENLVLNCSFTDSAIYN

LQWFRQDPGKGLTSLLLIQSSQREQTSGRLNASLDKSSGRSTLYIAASQPG

DSATYLCAVRPQTGGSYIPTFGRGTSLIVHPYIQNPDPAVYQLRDSKSSDK

SVCLFTDFDSQTNVSQSKDSDVYITDKTVLDMRSMDFKSNSAVAWSNKSDF

ACANAFNNSIIPEDTFFPSPESSCDVKLVEKSFETDTNLNFQNLSVIGFRI

LLLKVAGFNLLMTLRLWSS*

NY-ESO-1$_{157-165}$ peptide
(SEQ ID NO: 8)
SLLMWITQC

BC1 WT alpha chain
(SEQ ID NO: 9)
ATGGAAACCCTGCTGGGCCTGCTGATCCTGTGGCTGCAGCTGCAGTGGGTG

TCCAGCAAGCAGGAAGTGACCCAGATCCCTGCCGCCCTGAGCGTGCCCGAG

GGCGAGAACCTGGTGCTGAACTGCAGCTTCACCGACAGCGCCATCTACAAC

CTGCAGTGGTTCCGGCAGGACCCCGGCAAGGGCCTGACCAGCCTGCTGCTG

ATCCAGAGCAGCCAGCGGGAGCAGACCAGCGGCAGGCTGAACGCCAGCCTG

GACAAGAGCAGCGGCAGAAGCACCCTGTACATCGCCGCCAGCCAGCCCGGC

GACTCCGCCACCTACCTGTGCGCCGTGCGGCCTCAGACCGGCGGCAGCTAC

ATCCCCACCTTCGGCAGGGGCACCAGCCTGATCGTGCACCCCTACATCCAG

AACCCCGACCCCGCCGTGTACCAGCTGCGGGACAGCAAGTCCAGCGACAAG

AGCGTGTGCCTGTTCACCGACTTCGACAGCCAGACCAACGTGAGCCAGAGC

```
-continued
AAGGACAGCGACGTGTACATCACCGACAAGACCGTGCTGGACATGCGGAGC
ATGGACTTCAAGAGCAACAGCGCCGTGGCCTGGTCCAACAAGAGCGACTTC
GCCTGCGCCAACGCCTTCAACAACAGCATCATCCCCGAGGACACCTTTTTC
CCCAGCCCCGAGAGCAGCTGCGACGTGAAACTGGTGGAGAAGAGCTTCGAG
ACCGACACCAACCTGAACTTCCAGAACCTGAGCGTGATCGGCTTCAGAATT
CTGCTGCTGAAGGTGGCCGGCTTCAACCTGCTGATGACCCTGCGGCTGTGG
AGCAGT BC1 WT beta chain
                                           (SEQ ID NO: 10)
ATGGCCCCGCGGCTGCTGTGTTGTGCCGCCCTGAGCCTGCTGTGGGCCGGA
CCTGTGAACGCCGGCGTGACCCAGACCCCCAAGTTCCAGGTGCTGAAAACC
GGCCAGAGCATGACCCTGCAGTGCGCCCAGGACATGAACCACGAGTACATG
AGCTGGTACAGGCAGGACCCCGGCATGGGCCTGCGGCTGATCCACTACAGC
GTGGGAGCCGGCATCACCGACCAGGGCGAGGTGCCCAACGGCTACAACGTG
AGCAGAAGCACCACCGAGGACTTCCCCCTGAGGCTGCTGTCTGCCGCCCCT
AGCCAGACCAGCGTGTACTTCTGCGCCAGCAGCTATGTGGGAGCCGCCGGA
GAGCTGTTCTTCGGCGAGGGCAGCCGGCTGACCGTGCTGGAAGATCTGAAC
AAAGTGTTCCCCCCCGAAGTGGCCGTGTTCGAGCCCAGCGAGGCCGAGATC
AGCCACACCCAGAAGGCCACCCTGGTGTGTCTGGCCACCGGCTTCTTCCCC
GACCACGTGGAGCTGTCCTGGTGGGTGAACGGCAAGGAAGTGCACAGCGGC
GTGTCCACCGACCCCCAGCCCCTGAAGGAGCAGCCCGCCCTGAACGATAGC
AGATACTGCCTGAGCAGCCGGCTGAGAGTGAGCGCCACCTTCTGGCAGAAC
CCCCGGAACCACTTCAGATGCCAGGTGCAGTTCTACGGCCTGAGCGAGAAC
GACGAGTGGACCCAGGATAGAGCCAAGCCCGTGACCCAGATCGTGTCCGCC
GAGGCCTGGGGCAGAGCCGACTGCGGCTTCACCAGCGTGTCCTACCAGCAG
GGCGTGCTGAGCGCCACAATCCTGTACGAGATCCTGCTGGGCAAGGCCACA
CTGTACGCCGTGCTGGTGTCCGCCCTGGTGCTGATGGCTATGGTGAAGCGG
AAGGACAGCAGGGGCTGA I53E beta chain
                                           (SEQ ID NO: 11)
ATGGCCCCGCGGCTGCTGTGTTGTGCCGCCCTGAGCCTGCTGTGGGCCGGA
CCTGTGAACGCCGGCGTGACCCAGACCCCCAAGTTCCAGGTGCTGAAAACC
GGCCAGAGCATGACCCTGCAGTGCGCCCAGGACATGAACCACGAGTACATG
AGCTGGTACAGGCAGGACCCCGGCATGGGCCTGCGGCTGATCCACTACAGC
GTGGGAGCCGGCGAGACCGACCAGGGCGAGGTGCCCAACGGCTACAACGTG
AGCAGAAGCACCACCGAGGACTTCCCCCTGAGGCTGCTGTCTGCCGCCCCT
AGCCAGACCAGCGTGTACTTCTGCGCCAGCAGCTATGTGGGAGCCGCCGGA
GAGCTGTTCTTCGGCGAGGGCAGCCGGCTGACCGTGCTGGAAGATCTGAAC
AAAGTGTTCCCCCCCGAAGTGGCCGTGTTCGAGCCCAGCGAGGCCGAGATC
AGCCACACCCAGAAGGCCACCCTGGTGTGTCTGGCCACCGGCTTCTTCCCC
GACCACGTGGAGCTGTCCTGGTGGGTGAACGGCAAGGAAGTGCACAGCGGC
GTGTCCACCGACCCCCAGCCCCTGAAGGAGCAGCCCGCCCTGAACGATAGC
AGATACTGCCTGAGCAGCCGGCTGAGAGTGAGCGCCACCTTCTGGCAGAAC
CCCCGGAACCACTTCAGATGCCAGGTGCAGTTCTACGGCCTGAGCGAGAAC
GACGAGTGGACCCAGGATAGAGCCAAGCCCGTGACCCAGATCGTGTCCGCC
GAGGCCTGGGGCAGAGCCGACTGCGGCTTCACCAGCGTGTCCTACCAGCAG
GGCGTGCTGAGCGCCACAATCCTGTACGAGATCCTGCTGGGCAAGGCCACA
CTGTACGCCGTGCTGGTGTCCGCCCTGGTGCTGATGGCTATGGTGAAGCGG
AAGGACAGCAGGGGCTGA I53F beta chain
                                           (SEQ ID NO: 12)
ATGGCCCCGCGGCTGCTGTGTTGTGCCGCCCTGAGCCTGCTGTGGGCCGGA
CCTGTGAACGCCGGCGTGACCCAGACCCCCAAGTTCCAGGTGCTGAAAACC
GGCCAGAGCATGACCCTGCAGTGCGCCCAGGACATGAACCACGAGTACATG
AGCTGGTACAGGCAGGACCCCGGCATGGGCCTGCGGCTGATCCACTACAGC
GTGGGAGCCGGCTTCACCGACCAGGGCGAGGTGCCCAACGGCTACAACGTG
AGCAGAAGCACCACCGAGGACTTCCCCCTGAGGCTGCTGTCTGCCGCCCCT
AGCCAGACCAGCGTGTACTTCTGCGCCAGCAGCTATGTGGGAGCCGCCGGA
GAGCTGTTCTTCGGCGAGGGCAGCCGGCTGACCGTGCTGGAAGATCTGAAC
AAAGTGTTCCCCCCCGAAGTGGCCGTGTTCGAGCCCAGCGAGGCCGAGATC
AGCCACACCCAGAAGGCCACCCTGGTGTGTCTGGCCACCGGCTTCTTCCCC
GACCACGTGGAGCTGTCCTGGTGGGTGAACGGCAAGGAAGTGCACAGCGGC
GTGTCCACCGACCCCCAGCCCCTGAAGGAGCAGCCCGCCCTGAACGATAGC
AGATACTGCCTGAGCAGCCGGCTGAGAGTGAGCGCCACCTTCTGGCAGAAC
CCCCGGAACCACTTCAGATGCCAGGTGCAGTTCTACGGCCTGAGCGAGAAC
GACGAGTGGACCCAGGATAGAGCCAAGCCCGTGACCCAGATCGTGTCCGCC
GAGGCCTGGGGCAGAGCCGACTGCGGCTTCACCAGCGTGTCCTACCAGCAG
GGCGTGCTGAGCGCCACAATCCTGTACGAGATCCTGCTGGGCAAGGCCACA
CTGTACGCCGTGCTGGTGTCCGCCCTGGTGCTGATGGCTATGGTGAAGCGG
AAGGACAGCAGGGGCTGA I53W beta chain
                                           (SEQ ID NO: 13)
ATGGCCCCGCGGCTGCTGTGTTGTGCCGCCCTGAGCCTGCTGTGGGCCGGA
CCTGTGAACGCCGGCGTGACCCAGACCCCCAAGTTCCAGGTGCTGAAAACC
GGCCAGAGCATGACCCTGCAGTGCGCCCAGGACATGAACCACGAGTACATG
AGCTGGTACAGGCAGGACCCCGGCATGGGCCTGCGGCTGATCCACTACAGC
GTGGGAGCCGGCTGGACCGACCAGGGCGAGGTGCCCAACGGCTACAACGTG
AGCAGAAGCACCACCGAGGACTTCCCCCTGAGGCTGCTGTCTGCCGCCCCT
AGCCAGACCAGCGTGTACTTCTGCGCCAGCAGCTATGTGGGAGCCGCCGGA
GAGCTGTTCTTCGGCGAGGGCAGCCGGCTGACCGTGCTGGAAGATCTGAAC
AAAGTGTTCCCCCCCGAAGTGGCCGTGTTCGAGCCCAGCGAGGCCGAGATC
AGCCACACCCAGAAGGCCACCCTGGTGTGTCTGGCCACCGGCTTCTTCCCC
GACCACGTGGAGCTGTCCTGGTGGGTGAACGGCAAGGAAGTGCACAGCGGC
GTGTCCACCGACCCCCAGCCCCTGAAGGAGCAGCCCGCCCTGAACGATAGC
AGATACTGCCTGAGCAGCCGGCTGAGAGTGAGCGCCACCTTCTGGCAGAAC
```

-continued
```
CCCCGGAACCACTTCAGATGCCAGGTGCAGTTCTACGGCCTGAGCGAGAAC

GACGAGTGGACCCAGGATAGAGCCAAGCCCGTGACCCAGATCGTGTCCGCC

GAGGCCTGGGGCAGAGCCGACTGCGGCTTCACCAGCGTGTCCTACCAGCAG

GGCGTGCTGAGCGCCACAATCCTGTACGAGATCCTGCTGGGCAAGGCCACA

CTGTACGCCGTGCTGGTGTCCGCCCTGGTGCTGATGGCTATGGTGAAGCGG

AAGGACAGCAGGGGCTGA
```

D55E beta chain (SEQ ID NO: 14)
```
ATGGCCCCGCGGCTGCTGTGTTGTGCCGCCCTGAGCCTGCTGTGGGCCGGA

CCTGTGAACGCCGGCGTGACCCAGACCCCCAAGTTCCAGGTGCTGAAAACC

GGCCAGAGCATGACCCTGCAGTGCGCCCAGGACATGAACCACGAGTACATG

AGCTGGTACAGGCAGGACCCCGGCATGGGCCTGCGGCTGATCCACTACAGC

GTGGGAGCCGGCATCACCGAGCAGGGCGAGGTGCCCAACGGCTACAACGTG

AGCAGAAGCACCACCGAGGACTTCCCCCTGAGGCTGCTGTCTGCCGCCCCT

AGCCAGACCAGCGTGTACTTCTGCGCCAGCAGCTATGTGGGAGCCGCCGGA

GAGCTGTTCTTCGGCGAGGGCAGCCGGCTGACCGTGCTGGAAGATCTGAAC

AAAGTGTTCCCCCCGAAGTGGCCGTGTTCGAGCCCAGCGAGGCCGAGATC

AGCCACACCCAGAAGGCCACCCTGGTGTGTCTGGCCACCGGCTTCTTCCCC

GACCACGTGGAGCTGTCCTGGTGGGTGAACGGCAAGGAAGTGCACAGCGGC

GTGTCCACCGACCCCCAGCCCCTGAAGGAGCAGCCCGCCCTGAACGATAGC

AGATACTGCCTGAGCAGCCGGCTGAGAGTGAGCGCCACCTTCTGGCAGAAC

CCCCGGAACCACTTCAGATGCCAGGTGCAGTTCTACGGCCTGAGCGAGAAC

GACGAGTGGACCCAGGATAGAGCCAAGCCCGTGACCCAGATCGTGTCCGCC

GAGGCCTGGGGCAGAGCCGACTGCGGCTTCACCAGCGTGTCCTACCAGCAG

GGCGTGCTGAGCGCCACAATCCTGTACGAGATCCTGCTGGGCAAGGCCACA

CTGTACGCCGTGCTGGTGTCCGCCCTGGTGCTGATGGCTATGGTGAAGCGG

AAGGACAGCAGGGGCTGA
```

Genetically Engineering Cells

In one aspect, the invention provides a method of genetically engineering of lymphoid cells that express a modified TCR described herein. In one embodiment, the lymphoid cells are genetically engineered to express a modified TCR comprising the amino acid sequence of SEQ ID NO: 2, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 2. In one embodiment, the lymphoid cells are genetically engineered to express a modified TCR comprising the amino acid sequence of SEQ ID NO: 3, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 3. In one embodiment, the lymphoid cells are genetically engineered to express a modified TCR comprising amino acid sequence of SEQ ID NO: 4, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 4. In one embodiment, the lymphoid cells are genetically engineered to express a modified TCR comprising the amino acid sequence of SEQ ID NO: 5, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 5. The lymphoid cells may be obtained from PBMC, tumor draining lymph nodes or tumor infiltrates. In certain embodiments, the genetically engineered lymphoid cells are further engineered to express one or more exogenous molecules. In certain embodiments, the genetically engineered lymphoid cells are further engineered to express one or more cell surface receptor(s). Examples of cell surface receptors include, but are not limited to, chimeric antigen receptors and T cell receptors that are not against the cancer antigen NY-ESO-$1_{157-165}$ epitope (SEQ ID NO: 8). In certain embodiments, the genetically engineered lymphoid cells are further engineered to express one or more soluble protein(s). Examples of soluble proteins include, but are not limited to, cytokines, chemokines, growth factors, soluble receptors, ligands, antibodies, antibody fragments, and antigen binding domains. In certain embodiments, the genetically engineered lymphoid cells are further engineered to express one or more additional receptor(s) and soluble protein(s).

In one aspect, the invention provides genetically engineered lymphoid cells that express a modified TCR described herein. In one embodiment, the genetically engineered lymphoid cells express a modified TCR comprising the amino acid sequence of SEQ ID NO: 2, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 2. In one embodiment, the genetically engineered lymphoid cells express a modified TCR comprising the amino acid sequence of SEQ ID NO: 3, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 3. In one embodiment, the genetically engineered lymphoid cells express a modified TCR comprising the amino acid sequence of SEQ ID NO: 4, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 4. In one embodiment, the genetically engineered lymphoid cells express a modified TCR comprising the amino acid sequence of SEQ ID NO: 5, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 5. In any of above embodiments, the modified TCR comprises a single amino acid substitution within the CDR2 of a beta chain relative to the unsubstituted WT TCR beta chain (e.g., as set forth in SEQ ID NO: 1).

The lymphoid cells may be obtained from PBMC, tumor draining lymph nodes or tumor infiltrates. In certain embodiments, the genetically engineered lymphoid cells are further engineered to express additional receptor(s). Additional receptors include, but are not limited to, chimeric antigen receptors and T cell receptors that are not against the cancer antigen NY-ESO-$1_{157-165}$ epitope (SEQ ID NO: 8). In certain embodiments, the genetically engineered lymphoid cells are further engineered to express soluble protein(s). Soluble proteins include, but are not limited to, cytokines, chemokines, growth factors, soluble receptors, ligands, antibodies, antibody fragments, and antigen binding domains. In certain embodiments, the genetically engineered lymphoid cells are further engineered to express additional receptor(s) and soluble protein(s).

In one embodiment, provided herein is a genetically engineered lymphoid cell expressing a modified TCR comprising an amino acid sequence of SEQ ID NO: 2, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 2.

In one embodiment, provided herein is a genetically engineered lymphoid cell expressing a modified TCR comprising an amino acid sequence of SEQ ID NO: 3, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 3.

In one embodiment, provided herein is a genetically engineered lymphoid cell expressing a modified TCR comprising an amino acid sequence of SEQ ID NO: 4, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 4.

In one embodiment, provided herein is a genetically engineered lymphoid cell expressing a modified TCR comprising an amino acid sequence of SEQ ID NO: 5, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 5.

In various embodiments, the genetically engineered lymphoid cell expresses a modified TCR comprising a single amino acid substitution within the CDR2 of a beta chain relative to the unsubstituted WT TCR beta chain (e.g., as set forth in SEQ ID NO: 1).

In some embodiments, the genetically engineered lymphoid cells provided herein may be genetically engineered to further express one or more exogenous molecule.

Lymphoid cells are cells of the immune system that react specifically with antigens and elaborate specific cell products. The sample containing the lymphoid cells can be obtained from numerous sources in the subject, including but not limited to such as but not limited to, a tissue (including tumor tissue. viral infected tissue, tissue at the site of inflammation, site of lymphocyte infiltration, and site of leukocyte infiltration), thymus, tumor tissue (e.g., samples, fragments), or enzymatically digested tissue, dissociated/suspended cells, a lymph node sample, or a bodily fluid sample (e.g., blood, ascites, lymph). Exemplary tissues include skin, adipose tissue, cardiovascular tissue such as veins, arteries, capillaries, valves; neural tissue, bone marrow, breast, gastrointestinal, pulmonary tissue, ocular tissue such as corneas and lens, cartilage, bone, and mucosal tissue.

The sample can be an untreated, enzymatically treated, and/or dissociated/suspended to form a cell suspension. When the sample is enzymatically treated, non-limiting examples of enzymes that can be used include collagenase, dispase, hyaluronidase, liberase, and deoxyribonuclease (DNase).

In certain embodiments, lymphoid cells for use in the invention include tumor-infiltrating immune cells. Tumor-infiltrating immune cells consist of both mononuclear and polymorphonuclear immune cells, (i.e., T cells, B cells, natural killer cells, macrophages, neutrophils, dendritic cells, mast cells, eosinophils, basophils, etc.) in variable proportions. In certain embodiments, lymphocytes for use in the invention include tumor-infiltrating lymphocytes (TILs). TILs are white blood cells that have left the bloodstream and migrated towards a tumor. TILs can often be found in the tumor stroma and within the tumor itself.

In certain embodiments, lymphoid cells for use in the invention include peripheral blood lymphocytes (PBLs). In certain embodiments, lymphoid cells for use in the invention include T lymphocytes (T cells) and/or natural killer cells (NK cells).

In certain embodiments, lymphoid cells for use in the invention are T cells. In certain embodiments, the T cells are $CD8^+$ T cells. In certain embodiments, the T cells are $CD4^+$ cells. In certain embodiments, the T cells are regulatory T cells.

In certain embodiments, lymphoid cells for use in the invention are NK cells. In certain embodiments, the NK cells are $CD16^+$ $CD56^+$ and/or $CD57^+$ NK cells. NKs are characterized by their ability to bind to and kill cells that fail to express "self" MHC/HLA antigens by the activation of specific cytolytic enzymes, the ability to kill tumor cells or other diseased cells that express a ligand for NK activating receptors, and the ability to release protein molecules called cytokines that stimulate or inhibit the immune response.

Conditions appropriate for lymphocyte culture include an appropriate media (e.g., Minimal Essential Media (MEM), RPMI Media 1640, Lonza RPMI 1640, Advanced RPMI, Clicks, AIM-V, DMEM, a-MEM, F-12, TexMACS, X-Vivo 15, and X-Vivo 20, Optimizer, with added amino acids, sodium pyruvate, and vitamins, either serum-free or supplemented with an appropriate amount of serum (or plasma) or a defined set of hormones, and/or an amount of cytokine(s) sufficient for the growth and expansion).

Examples of other additives for lymphocyte expansion include, but are not limited to, surfactant, piasmanate, pH buffers such as HEPES, and reducing agents such as N-acetyl-cysteine and 2-mercaptoethanol, Antibiotics (e.g., penicillin and streptomycin), are included only in experimental cultures, not in cultures of cells that are to be infused into a subject. The target cells are maintained under conditions necessary to support growth, for example, an appropriate temperature (e.g., 37° C.) and atmosphere (e.g., air plus 5% $CO_2$).

Expansion of the lymphoid cells may be carried out using the methods and conditions known in the art. In certain embodiments, expansion of the lymphoid cells is carried out according to the methods described in the International Application No. PCT/EP2018/080343.

Genetic engineering of lymphoid cells may be accomplished by at least one of transfection, transduction, or temporary cell membrane disruption (i.e., cell squeeze) to introduce at least one polynucleotide encoding the modified TCR into the lymphoid cell. In certain embodiments, the polynucleotide(s) are introduced into the lymphoid cells by transducing a substantially homogeneous cell population with a recombinant expression vector. Such vectors may be a viral vector or non-viral vector. Exemplary viral vectors for use in the invention include, but are not limited to, a retroviral vector (including lentiviral vectors), an adenoviral vector, an adeno-associated viral (AAV) vector, a herpes viral vector, or a baculoviral vector. In one embodiment, the viral vector for use in the invention is a lentiviral vector.

Additional receptor(s) may be engineered into the genetically engineered lymphoid cells expressing a modified TCR. Having additional receptor(s) on the genetically engineered lymphoid cell may enhance the lymphoid cell function (e.g., anti-tumor function).

In certain embodiments, the additional receptor is a chimeric antigen receptor (CAR). Chimeric antigen receptors (CARs) typically have an antigen-binding domain that is fused to an intracellular signaling domain which is capable of activating or stimulating an immune cell. The CAR's extracellular binding domain may be composed of a single chain variable fragment (scFv) derived from fusing the variable heavy and light regions of a murine or humanized monoclonal antibody. Alternatively, scFvs may be used that are derived from Fab's (instead of from an antibody, e.g., obtained from Fab libraries). The scFv may be fused to a transmembrane domain and then to an intracellular signaling domain. The CAR can be a first-generation, second generation or third-generation CAR. "First-generation" CARs include those that solely provide CD3ζ signals upon antigen binding. "Second-generation" CARs include those that provide both costimulation (e.g. CD28 or CD137) and activation (CD3ζ). "Third-generation" CARs include those that provide multiple costimulation (e.g. CD28 and CD137) and activation (CD3ζ). The CAR may specifically recognize a cancer antigen.

In certain embodiments, the additional receptor is a TCR that is not specific for the cancer antigen NY-ESO-1$_{157-165}$ epitope. Such TCR may specifically recognize a cancer antigen other than the NY-ESO-1$_{157-165}$ epitope.

In certain embodiments, the cancer antigen may be selected from CD7, CD74, CDS, CEA, EGP-2, EGP-40, EpCAM, erb-B2,3,4, FBP, Fetal acetylcholine receptor, folate receptor-a, GD2, GD3, HER2, hTERT, IL-13R-a2, KDR, K-light chain, LeY, L1 cell, MAGE-Al, Mesothelin, MUC1, MUC16, NKG2D ligands, NY-ESO-1, oncofetal antigen (h5T4), PSCA, PSMA, ROR1, TAG-72, VEGF-R2, and WT-1.

Genetically engineered lymphoid cells expressing a modified TCR may be engineered to express and secrete a soluble protein or multiple soluble proteins. Soluble proteins for use in the present invention include, but are not limited to, cytokines, chemokines, growth factors, soluble receptors, ligands, antibodies, antibody fragments, and antigen binding domains and functional variants thereof.

Cytokines that may be expressed and/or secreted by the genetically engineered lymphoid cells described herein include, but are not limited to, interleukin-2 (IL-2), interleukin-3 (IL-3), interleukin-6 (IL-6), interleukin-7 (IL-7), interleukin-9 (IL-9), interleukin-11 (IL-11), interleukin-12 (IL-12), interleukin-15 (IL-15), interleukin-17 (IL-17), interleukin-18 (IL-18), interleukin-21 (IL-21), interleukin-33 (IL-33), granulocyte macrophage colony stimulating factor (GM-CSF), interferon alpha (IFN-alpha or IFN-α), interferon beta (IFN-beta or IFN-β), interferon gamma (IFN-gamma or IFN-γ), transforming growth factor-beta (TGF-β), CCL19 and erythropoietin. In some embodiments, the cytokine expressed by the genetically engineered lymphoid cell is IL-2. In some embodiments, the cytokine expressed by the genetically engineered lymphoid cell is IFN-gamma. In some embodiments, the cytokine expressed by the genetically engineered lymphoid cell is GM-CSF.

Chemokines that may be expressed and/or secreted by the genetically engineered lymphoid cells described herein include, but are not limited to, CXC-chemokines such as interleukin-8 (IL-8), neutrophil-activating protein-1 (NAP-1), neutrophil-activating protein-2 (NAP-2), GRO, GROβ, GROγ, ENA-78, GCP-2, IP-10, MIG, CXCL1, CXCL12, CXCL16, CXCL19 and PF4; and CC chemokines, RANTES, MIP-1α, MIP-2β, monocyte chemotactic protein-1 (MCP-1), MCP-2, MCP-3, CCL5, and eotaxin. Suitable chemokines described in the International Publication No. WO2000078334A1 (e.g., Table 1), which is incorporated herein by reference in its entirety, are also contemplated by the present invention.

Growth factors that may be expressed and/or secreted by the genetically engineered lymphoid cells described herein include, but are not limited to, granulocyte macrophage-colony stimulating factor (GM-CSF), granulocyte-colony stimulating factor, macrophage-colony stimulating factor, tumor necrosis factor, transforming growth factors, epidermal growth factors, stem cell factor, platelet-derived growth factors, nerve growth factors, fibroblast growth factors, insulin-like growth factor, growth hormone, interleukin-1 (IL-1), interleukin-2 (IL-2), keratinocyte growth factor, ciliary neurotrophic growth factor, Schwann cell-derived growth factor, vaccinia virus growth factor, bombyxin, neu differentiation factor, v-Sis and glial growth factor.

Soluble receptors that may be expressed and/or secreted by the genetically engineered lymphoid cells described herein include, but are not limited to, soluble cytokine receptors such as IL-1RI, IL-1RII, TNFRI, TNFRII, IFN-α/βR, IL-4 receptor, IL-6 receptor, IL-10 receptor, IL-11 receptor, IL-13 receptor, IL-18 binding protein, and TGF-β receptor; and soluble growth factor receptors such as soluble epidermal growth factor receptors (sEGFRs), soluble vascular endothelial growth factor receptors and PD-1 ectodomain, and soluble VEGFR-1 and SIRP-alpha molecules. Soluble receptors that may be expressed and/or secreted by the genetically engineered lymphoid cells described herein may further be fused to CD28 endodomain or 41BB endodomain or any other co-stimulatory endodomains known in the art.

Ligands that may be expressed and/or secreted by the genetically engineered lymphoid cells described herein include, but are not limited to, tumor necrosis factor (TNF) ligands such as nerve growth factor (NGF), CD40L (CD154), CD137L/4-1BBL, tumor necrosis factor alpha (TNFα), CD134L/OX40L/CD252, CD27L/CD70, Fas ligand (FasL), Fas ligand agonist (FasL agonist), LAG3 ligands, VEGFR1 ligands, TIM3 ligands, TIGIT ligand, SIRP-alpha ligand, CD30L/CD153, tumor necrosis factor beta (TNFβ)/lymphotoxin-alpha (LTα), lymphotoxin-beta (LTβ), CD257/B cell activating factor (BAFF)/Blys/THANK/Ta11-1, glucocorticoid-induced TNF Receptor ligand (GITRL), and TNF-related apoptosis-inducing ligand (TRAIL), and LIGHT (TNFSF14); immunoglobulin superfamily ligands such as CD80 and CD86; and ligands to toll-like receptors (TLRs), 4-1BB ligand, agonist, OX40 ligand agonist, ICOS ligand agonist, Flt3 ligand, phosphodiesterase 4B2 (PDE4B2), phosphodiesterase 4A (PDE4A), phosphodiesterase 7A (PDE7A), phosphodiesterase 4C (PDE4C) and programmed cell death protein-1 (PD-1) ligand.

Antibodies may be expressed and/or secreted by the genetically engineered lymphoid cells described herein include those that specifically bind to a cancer antigen. Such cancer antigen may be selected from CD7, CD19, CD74, CDS, CEA, EGP-2, EGP-40, EpCAM, erb-B2,3,4, FBP, Fetal acetylcholine receptor, folate receptor-a, GD2, GD3, HER2, hTERT, IL-13R-a2, KDR, K-light chain, LeY, L1 cell, MAGE-Al, Mesothelin, MUC1, MUC16, NKG2D ligands, NY-ESO-1, oncofetal antigen (h5T4), PSCA, PSMA, ROR1, TAG-72, VEGF-R2, and WT-1. Amino acid sequences that specifically bind to said antigens are known in the art or may be prepared using methods known in the art.

In certain embodiments, the antibody is a bi-specific antibody (e.g., a bi-specific T cell antibody (BiTE)). Bi-specific antibodies are recombinant synthetic antibodies which contain two distinct antigen-binding domains. For example, one of the antigen-binding domains may target a cancer antigen while the other binds to a lymphocyte activation molecule.

Antibody fragments or antigen binding domains have affinity to a cancer antigen may be expressed by the genetically engineered lymphoid cells described herein. Antibody fragments include, but are not limited to, single chain antibodies, Fab fragments, Fv fragments, single-chain Fv fragments (scFv), a divalent antibody fragment such as an (Fab)2'-fragment, F(ab') fragments, disulfide-linked Fvs (sdFv), intrabodies, minibodies, diabodies, triabodies, and decabodies.

Genetically engineered lymphoid cells expressing a modified TCR may be engineered to further express gene knock-downs for inhibitory/checkpoint molecules including, but not limited to, PD-1, CTLA-4, LAG-3, TIGIT, VISTA, TIM-3 and Cbl-b. In some embodiments, genetically engineered lymphoid cells expressing a modified TCR that may be engineered to express gene knock-downs can be further engineered to express and secrete additional soluble proteins, such as, without limitation, IL-2, IL-33, GM-CSF, CD40 agonist, etc.

Also provided are methods of using such genetically engineered lymphoid cells in adoptive cell transfer therapy. In certain embodiments, the lymphoid cells may be autologous, allogeneic, syngeneic, or xenogeneic with respect to the subject. In certain embodiments, the lymphoid cells are autologous in order to reduce an immunoreactive response against the lymphocyte when reintroduced into the subject for immunotherapy treatment.

In one embodiment, provided herein is a genetically engineered lymphoid cell expressing a TCR and further expressing one or more proteins. In certain embodiments, at least one of the proteins is a soluble protein. The soluble protein may be, for example, a growth factor (e.g., GM-CSF). In certain embodiments, at least one of the proteins is an intercellular protein. The intercellular protein may be, for example, a phosphodiesterase (e.g., PDE4B2). The genetically engineered lymphoid cell may further express one or more cell surface receptors. In certain embodiments, the TCR is an exogenous wild-type TCR. In certain embodiments, the TCR is a modified TCR.

In one embodiment, provided herein is a genetically engineered lymphoid cell expressing a TCR comprising an amino acid sequence of SEQ ID NO: 1, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 1, and further expressing one or more soluble proteins. The soluble protein may be a growth factor. The growth factor may be a GM-CSF. The genetically engineered lymphoid cell may further express one or more cell surface receptors.

In one embodiment, provided herein is a genetically engineered lymphoid cell expressing a modified TCR comprising an amino acid sequence of SEQ ID NO: 2, or functional fragment thereof, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 2, and further expressing one or more soluble proteins. The soluble protein may be a growth factor. The growth factor may be a GM-CSF. The genetically engineered lymphoid cell may further express one or more cell surface receptors.

In one embodiment, provided herein is a genetically engineered lymphoid cell expressing a modified TCR comprising an amino acid sequence of SEQ ID NO: 3, or functional fragment thereof, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 3, and further expressing one or more soluble proteins. The soluble protein may be a growth factor. The growth factor may be a GM-CSF. The genetically engineered lymphoid cell may further express one or more cell surface receptors.

In one embodiment, provided herein is a genetically engineered lymphoid cell expressing a modified TCR comprising an amino acid sequence of SEQ ID NO: 4, or functional fragment thereof, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 4, and further expressing one or more soluble proteins. The soluble protein may be a growth factor. The growth factor may be a GM-CSF. The genetically engineered lymphoid cell may further express one or more cell surface receptors.

In one embodiment, provided herein is a genetically engineered lymphoid cell expressing a modified TCR comprising an amino acid sequence of SEQ ID NO: 5, or functional fragment thereof, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 5, and further expressing one or more soluble proteins. The soluble protein may be a growth factor. The growth factor may be a GM-CSF. The genetically engineered lymphoid cell may further express one or more cell surface receptors.

In some embodiments, the GM-CSF is mouse GM-CSF, or a functional fragment thereof. Mouse GM-CSF has a UniProt identifier of UniProtKB—P01587.

In some embodiments, the GM-CSF comprises the amino acid sequence of SEQ ID NO: 15, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 15. In one embodiment, the GM-CSF comprises the amino acid sequence of SEQ ID NO: 15. In some embodiments, the nucleotide sequence encoding the GM-CSF comprises the nucleotide sequence of SEQ ID NO: 16, or a nucleotide sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 16. In one embodiment, the nucleotide sequence encoding the GM-CSF comprises the nucleotide sequence of SEQ ID NO: 16.

In some embodiments, a functional fragment of the GM-CSF comprises the amino acid sequence of SEQ ID NO: 19, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 19. In one embodiment, a functional fragment of GM-CSF comprises the amino acid sequence of SEQ ID NO: 19. In some embodiments, the nucleotide sequence encoding the functional fragment of GM-CSF comprises the nucleotide sequence of SEQ ID NO: 20, or a nucleotide sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 20. In one embodiment, the nucleotide sequence encoding a functional fragment of the GM-CSF comprises the nucleotide sequence of SEQ ID NO: 20.

In some embodiments, the GM-CSF is human GM-CSF, or a functional fragment thereof. Human GM-CSF has a UniProt identifier of UniProtKB—P04141.

In some embodiments, the GM-CSF comprises the amino acid sequence of SEQ ID NO: 21 or 34, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 21 or 34. In one embodiment, the GM-CSF comprises the amino acid sequence of SEQ ID NO: 21 or 34. In some embodiments, the nucleotide sequence encoding the GM-CSF comprises the nucleotide sequence of SEQ ID NO: 22 or 35, or a nucleotide sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 22 or 35. In one embodiment, the nucleotide sequence encoding the GM-CSF comprises the nucleotide sequence of SEQ ID NO: 22 or 35.

In some embodiments, a functional fragment of the GM-CSF comprises the amino acid sequence of SEQ ID NO: 25 or 36, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 25 or 36. In one embodiment, a functional fragment of GM-CSF comprises the amino acid sequence of SEQ ID NO: 25 or 36. In some embodiments, the nucleotide sequence encoding the functional fragment of GM-CSF comprises the nucleotide sequence of SEQ ID NO: 26 or 37, or a nucleotide sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 26 or 37. In one embodiment, the nucleotide sequence encoding a functional fragment of the GM-CSF comprises the nucleotide sequence of SEQ ID NO: 26 or 37.

Examples of sequences useful for expressing GM-CSF, or a functional fragment thereof, are provided below.

Mouse GM-CSF (full-length protein sequence)
(SEQ ID NO: 15)
MWLQNLLFLGIVVYSLSAPTRSPITVTRPWKHVEAIKEALNLLDDMPVTLN

EEVEVVSNEFSFKKLTCVQTRLKIFEQGLRGNFTKLKGALNMTASYYQTYC

PPTPETDCETQVTTYADFIDSLKTFLTDIPFECKKPGQK

Mouse GM-CSF (full-length DNA sequence)
(SEQ ID NO: 16)
ATGTGGCTGCAGAATTTACTTTTCCTGGGCATTGTGGTCTACAGCCTCTCA

GCACCCACCCGCTCACCCATCACTGTCACCCGGCCTTGGAAGCATGTAGAG

GCCATCAAAGAAGCCCTGAACCTCCTGGATGACATGCCTGTCACATTGAAT

GAAGAGGTAGAAGTCGTCTCTAACGAGTTCTCCTTCAAGAAGCTAACATGT

GTGCAGACCCGCCTGAAGATATTCGAGCAGGGTCTACGGGGCAATTTCACC

AAACTCAAGGGCGCCTTGAACATGACAGCCAGCTACTACCAGACATACTGC

CCCCCAACTCCGGAAACGGACTGTGAAACACAAGTTACCACCTATGCGGAT

TTCATAGACAGCCTTAAAACCTTTCTGACTGATATCCCCTTTGAATGCAAA

AAACCAGGCCAAAAA

Mouse GM-CSF (protein sequence for signal peptide)
(SEQ ID NO: 17)
MWLQNLLFLGIVVYSLS Mouse GM-CSF (DNA sequence for signal peptide)
(SEQ ID NO: 18)
ATGTGGCTGCAGAATTTACTTTTCCTGGGCATTGTGGTCTACAGCCTCTCA Mouse GM-CSF (protein sequence for active soluble GM-CSF)
(SEQ ID NO: 19)
APTRSPITVTRPWKHVEAIKEALNLLDDMPVTLNEEVEVVSNEFSFKKLTC

VQTRLKIFEQGLRGNFTKLKGALNMTASYYQTYCPPTPETDCETQVTTYAD

FIDSLKTFLTDIPFECKKPGQK

Mouse GM-CSF (DNA sequence for active soluble GM-CSF)
(SEQ ID NO: 20)
GCACCCACCCGCTCACCCATCACTGTCACCCGGCCTTGGAAGCATGTAGAG

GCCATCAAAGAAGCCCTGAACCTCCTGGATGACATGCCTGTCACATTGAAT

GAAGAGGTAGAAGTCGTCTCTAACGAGTTCTCCTTCAAGAAGCTAACATGT

GTGCAGACCCGCCTGAAGATATTCGAGCAGGGTCTACGGGGCAATTTCACC

AAACTCAAGGGCGCCTTGAACATGACAGCCAGCTACTACCAGACATACTGC

CCCCCAACTCCGGAAACGGACTGTGAAACACAAGTTACCACCTATGCGGAT

TTCATAGACAGCCTTAAAACCTTTCTGACTGATATCCCCTTTGAATGCAAA

AAACCAGGCCAAAAA

Human GM-CSF (full-length protein 1)
(SEQ ID NO: 21)
MWLQSLLLLGTVACSISAPARSPSPSTQPWEHVNAIQEARRLLNLSRDTAA

EMNETVEVISEMFDLQEPTCLQTRLELYKQGLRGSLTKLKGPLTMMASHYK

QHCPPTPETSCATQTITFESFKENLKDFLLVIPFDCWEPVQE

Human GM-CSF (full-length DNA 1)
(SEQ ID NO: 22)
ATGTGGCTGCAATCTCTGCTGCTGCTGGGCACAGTGGCCTGTTCTATTAGC

GCCCCTGCCAGATCTCCATCTCCTAGCACACAGCCTTGGGAGCACGTGAAC

GCCATCCAAGAAGCCAGACGGCTGCTGAACCTGAGCAGAGATACAGCCGCC

GAGATGAACGAGACAGTGGAAGTGATCAGCGAGATGTTCGACCTGCAAGAG

CCTACCTGCCTGCAGACCAGACTGGAACTGTACAAGCAGGGCCTGAGAGGC

AGCCTGACCAAGCTGAAAGGCCCTCTGACAATGATGGCCAGCCACTACAAG

CAGCACTGCCCTCCAACACCTGAGACAAGCTGTGCCACACAGACCATCACC

TTCGAGAGCTTCAAAGAGAACCTGAAGGACTTCCTGCTGGTCATCCCCTTC

GACTGCTGGGAGCCCGTGCAAGAA

Human GM-CSF (protein sequence for signal peptide)
(SEQ ID NO: 23)
MWLQSLLLLGTVACSIS Human GM-CSF (DNA sequence for signal peptide)
(SEQ ID NO: 24)
ATGTGGCTGCAATCTCTGCTGCTGCTGGGCACAGTGGCCTGTTCTATTAGC Human GM-CSF (protein sequence for active soluble
GM-CSF 1)
(SEQ ID NO: 25)
APARSPSPSTQPWEHVNAIQEARRLLNLSRDTAAEMNETVEVISEMFDLQE

PTCLQTRLELYKQGLRGSLTKLKGPLTMMASHYKQHCPPTPETSCATQTIT

FESFKENLKDFLLVIPFDCWEPVQE

Human GM-CSF (DNA sequence for active soluble
GM-CSF 1)
(SEQ ID NO: 26)
GCCCCTGCCAGATCTCCATCTCCTAGCACACAGCCTTGGGAGCACGTGAAC

GCCATCCAAGAAGCCAGACGGCTGCTGAACCTGAGCAGAGATACAGCCGCC

GAGATGAACGAGACAGTGGAAGTGATCAGCGAGATGTTCGACCTGCAAGAG

CCTACCTGCCTGCAGACCAGACTGGAACTGTACAAGCAGGGCCTGAGAGGC

AGCCTGACCAAGCTGAAAGGCCCTCTGACAATGATGGCCAGCCACTACAAG

CAGCACTGCCCTCCAACACCTGAGACAAGCTGTGCCACACAGACCATCACC

TTCGAGAGCTTCAAAGAGAACCTGAAGGACTTCCTGCTGGTCATCCCCTTC

GACTGCTGGGAGCCCGTGCAAGAA

Human GM-CSF (full-length protein 2)
(SEQ ID NO: 34)
MWLQSLLLLGTVACSISAPARSPSPSTQPWEHVNAIQEARRLLNLSRDTAA

EMNETVEVISEMFDLQEPTCLQTRLELYKQGLRGSLTKLKGPLTMMASHYK

QHCPPTPETSCATQIITFESFKENLKDFLLVIPFDCWEPVQE

Human GM-CSF (full-length protein 2)
(SEQ ID NO: 35)
ATGTGGCTGCAATCTCTGCTGCTGCTGGGCACAGTGGCCTGTTCTATTAGC

GCCCCTGCCAGATCTCCATCTCCTAGCACACAGCCTTGGGAGCACGTGAAC

GCCATCCAAGAAGCCAGACGGCTGCTGAACCTGAGCAGAGATACAGCCGCC

GAGATGAACGAGACAGTGGAAGTGATCAGCGAGATGTTCGACCTGCAAGAG

CCTACCTGCCTGCAGACCAGACTGGAACTGTACAAGCAGGGCCTGAGAGGC

AGCCTGACCAAGCTGAAAGGCCCTCTGACAATGATGGCCAGCCACTACAAG

CAGCACTGCCCTCCAACACCTGAGACAAGCTGTGCCACACAGATCATCACC

TTCGAGAGCTTCAAAGAGAACCTGAAGGACTTCCTGCTGGTCATCCCCTTC

GACTGCTGGGAGCCCGTGCAAGAA

Human GM-CSF (protein sequence for active soluble
GM-CSF 2)
(SEQ ID NO: 36)
APARSPSPSTQPWEHVNAIQEARRLLNLSRDTAAEMNETVEVISEMFDLQE

PTCLQTRLELYKQGLRGSLTKLKGPLTMMASHYKQHCPPTPETSCATQIIT

FESFKENLKDFLLVIPFDCWEPVQE

Human GM-CSF (DNA sequence for active soluble
GM-CSF 2)
(SEQ ID NO: 37)
GCCCCTGCCAGATCTCCATCTCCTAGCACACAGCCTTGGGAGCACGTGAAC

GCCATCCAAGAAGCCAGACGGCTGCTGAACCTGAGCAGAGATACAGCCGCC

GAGATGAACGAGACAGTGGAAGTGATCAGCGAGATGTTCGACCTGCAAGAG

CCTACCTGCCTGCAGACCAGACTGGAACTGTACAAGCAGGGCCTGAGAGGC

AGCCTGACCAAGCTGAAAGGCCCTCTGACAATGATGGCCAGCCACTACAAG

CAGCACTGCCCTCCAACACCTGAGACAAGCTGTGCCACACAGATCATCACC

TTCGAGAGCTTCAAAGAGAACCTGAAGGACTTCCTGCTGGTCATCCCCTTC

GACTGCTGGGAGCCCGTGCAAGAA

In one embodiment, provided herein is a genetically engineered lymphoid cell expressing a TCR comprising an amino acid sequence of SEQ ID NO: 1, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 1, and further expressing one or more intracellular proteins. The intracellular protein may be a phosphodiesterase (e.g., PDE4B2). The genetically engineered lymphoid cell may further express one or more cell surface receptors.

In one embodiment, provided herein is a genetically engineered lymphoid cell expressing a modified TCR comprising an amino acid sequence of SEQ ID NO: 2, or functional fragment thereof, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 2, and further expressing one or more intracellular proteins. The intracellular protein may be a phosphodiesterase (e.g., PDE4B2). The genetically engineered lymphoid cell may further express one or more cell surface receptors.

In one embodiment, provided herein is a genetically engineered lymphoid cell expressing a modified TCR comprising an amino acid sequence of SEQ ID NO: 3, or functional fragment thereof, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 3, and further expressing one or more intracellular proteins. The intracellular protein may be a phosphodiesterase (e.g., PDE4B2). The genetically engineered lymphoid cell may further express one or more cell surface receptors.

In one embodiment, provided herein is a genetically engineered lymphoid cell expressing a modified TCR comprising an amino acid sequence of SEQ ID NO: 4, or functional fragment thereof, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 4, and further expressing one or more intracellular proteins. The intracellular protein may be a phosphodiesterase (e.g., PDE4B2). The genetically engineered lymphoid cell may further express one or more cell surface receptors.

In one embodiment, provided herein is a genetically engineered lymphoid cell expressing a modified TCR comprising an amino acid sequence of SEQ ID NO: 5, or functional fragment thereof, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 5, and further expressing one or more intracellular proteins. The intracellular protein may be a phosphodiesterase (e.g., PDE4B2). The genetically engineered lymphoid cell may further express one or more cell surface receptors.

In some embodiment, genetically engineered lymphoid cells disclosed herein express in addition to the modified TCRs of the invention, a phosphodiesterase. In some embodiments, the phosphodiesterase is phosphodiesterase 4B2 (PDE4B2), phosphodiesterase 4A (PDE4A), phosphodiesterase 7A (PDE7A), or phosphodiesterase 4C (PDE4C). In one embodiment, the phosphodiesterase is phosphodiesterase 4B2 (PDE4B2).

In one embodiment, the PDE4B2 is human PDE4B2, or a functional fragment thereof. Human PDE4B2 has a GenInfo Identifier of 82799482 and a NCBI accession number of NP_001032416.

In some embodiments, the PDE4B2 comprises the amino acid sequence of SEQ ID NO: 27, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 27. In one embodiment, the PDE4B2 comprises the amino acid sequence of SEQ ID NO: 27. In some embodiments, the nucleotide sequence encoding the PDE4B2 comprises the nucleotide sequence of SEQ ID NO: 28, or a nucleotide sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 28. In one embodiment, the nucleotide sequence encoding the PDE4B2 comprises the nucleotide sequence of SEQ ID NO: 28.

In one embodiment, the PDE4B2 is mouse PDE4B2, or a functional fragment thereof. Mouse PDE4B2 has a GenInfo Identifier of 295789129 and a NCBI accession number of NP_001171451.

In some embodiment, the PDE4B2 comprises the amino acid sequence of SEQ ID NO: 29, or an amino acid sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 29. In one embodiment, the PDE4B2 comprises the amino acid sequence of SEQ ID NO: 29. In some embodiments, the nucleotide sequence encoding the PDE4B2 comprises the nucleotide sequence of SEQ ID NO: 30, or a nucleotide sequence that has at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to SEQ ID NO: 30. In one embodiment, the nucleotide sequence encoding the PDE4B2 comprises the nucleotide sequence of SEQ ID NO: 30.

Examples of sequences useful for expressing PDE4B2, or a functional fragment thereof are provided below.

Human PDE4B2 amino acid sequence (SEQ ID NO: 27)
MKEHGGTFSSTGISGGSGDSAMDSLQPLQPNYMPVCLFAEESYQKLAMETL
EELDWCLDQLETIQTYRSVSEMASNKFKRMLNRELTHLSEMSRSGNQVSEY
ISNTFLDKQNDVEIPSPTQKDREKKKKQQLMTQISGVKKLMHSSSLNNTSI
SRFGVNTENEDHLAKELEDLNKWGLNIFNVAGYSHNRPLTCIMYAIFQERD
LLKTFRISSDTFITYMMTLEDHYHSDVAYHNSLHAADVAQSTHVLLSTPAL
DAVFTDLEILAAIFAAAIHDVDHPGVSNQFLINTNSELALMYNDESVLENH
HLAVGFKLLQEEHCDIFMNLTKKQRQTLRKMVIDMVLATDMSKHMSLLADL
KTMVETKKVTSSGVLLLDNYTDRIQVLRNMVHCADLSNPTKSLELYRQWTD
RIMEEFFQQGDKERERGMEISPMCDKHTASVEKSQVGFIDYIVHPLWETWA
DLVQPDAQDILDTLEDNRNWYQSMIPQSPSPPLDEQNRDCQGLMEKFQFEL
TLDEEDSEGPEKEGEGHSYFSSTKTLCVIDPENRDSLGETDIDIATEDKSP
VDT Human PDE4B2 nucleotide sequence (SEQ ID NO: 28)
ATGAAGGAACACGGCGGCACCTTTAGCAGCACAGGCATCTCTGGTGGCAGC
GGCGATAGCGCCATGGATTCTCTGCAACCCCTGCAGCCTAACTACATGCCC
GTGTGCCTGTTCGCCGAGGAAAGCTACCAGAAACTGGCCATGGAAACCCTG
GAAGAACTGGACTGGTGCCTGGACCAGCTGGAAACCATCCAGACCTACAGA
TCCGTGTCCGAGATGGCCAGCAACAAGTTCAAGCGGATGCTGAACAGAGAG
CTGACCCACCTGAGCGAGATGAGCCGCTCTGGAAATCAGGTGTCCGAGTAT
ATCAGCAACACCTTCCTGGACAAGCAGAACGACGTGGAAATCCCATCTCCT
ACACAGAAGGACCGCGAGAAGAAGAAAAAGCAGCAGCTGATGACCCAGATC
AGCGGCGTGAAGAAACTGATGCACAGCAGCAGCCTGAACAACACCAGCATC
AGCAGATTCGGCGTGAACACCGAGAACGAGGACCACCTGGCCAAAGAGCTG
GAAGATCTGAACAAATGGGGCCTGAACATCTTCAACGTGGCCGGCTACAGC
CACAACAGACCCCTGACCTGCATTATGTACGCCATCTTCCAAGAGCGGGAC
CTGCTGAAAACCTTCCGGATCAGCAGCGACACCTTCATCACCTACATGATG
ACCCTTGAGGACCACTACCACAGCGACGTGGCCTACCACAATAGCCTGCAT
GCCGCTGATGTGGCCCAGAGCACACACGTGCTGCTGTCTACACCAGCTCTG
GATGCCGTGTTCACCGACCTGGAAATTCTGGCCGCCATCTTTGCCGCCGCT
ATCCACGATGTTGATCACCCCGGCGTGTCCAACCAGTTCCTGATCAATACC
AACAGCGAGCTGGCCCTGATGTACAACGACGAGAGCGTGCTGGAAAACCAC
CATCTGGCCGTGGGCTTCAAGCTGCTGCAAGAGGAACACTGCGACATCTTC
ATGAACCTGACCAAGAAGCAGCGGCAGACCCTGCGGAAGATGGTCATCGAT
ATGGTGCTGGCCACCGACATGAGCAAGCACATGTCTCTGCTGGCCGACCTG
AAAACCATGGTCGAGACAAAGAAAGTGACCAGCAGCGGCGTTCTGCTGCTG
GACAACTACACCGACAGAATCCAGGTGCTGAGAAACATGGTGCACTGCGCC
GATCTGAGCAACCCCACCAAGAGCCTGGAACTGTACAGACAGTGGACCGAC
CGGATCATGGAAGAGTTCTTTCAGCAAGGCGACAAAGAACGCGAGCGCGGC
ATGGAAATCTCCCCAATGTGCGATAAGCACACCGCCAGCGTGGAAAAGTCC
CAAGTGGGCTTTATCGACTACATCGTGCACCCTCTGTGGGAGACATGGGCC
GATCTGGTTCAGCCTGACGCTCAGGACATCCTGGACACACTGGAAGATAAC -continued
CGGAACTGGTATCAGAGCATGATCCCTCAGAGCCCCTCTCCACCTCTGGAT

GAGCAGAACAGAGATTGCCAGGGCCTGATGGAAAAGTTCCAGTTCGAGCTG

ACACTGGACGAAGAGGACTCTGAGGGCCCCGAGAAAGAAGGCGAGGGCCAC

AGCTACTTCAGCAGCACAAAGACCCTGTGCGTGATCGACCCCGAGAACAGG

GATAGCCTGGGCGAGACAGACATCGACATTGCCACCGAGGACAAGAGCCCC

GTGGATACA

Mouse PDE4B2 amino acid sequence
(SEQ ID NO: 29)
MKEQGGTVSGAASSRGGGDSAMASLQPLQPNYLSVCLFPEESYQKLAMETL

EELDWCLDQLETIQTYRSVSEMASNKFKRMLNRELTHLSEMSRSGNQVSEY

ISNTFLDKQNDVEIPSPTQKDREKKKKQQLMTQISGVKKLMHSSSLNNTSI

SRFGVNTENEDHLAKELEDLNKWGLNIFNVAGYSHNRPLTCIMYAIFQERD

LLKTFKISSDTFVTYMMTLEDHYHSDVAYHNSLHAADVAQSTHVLLSTPAL

DAVFTDLEILAAIFAAAIHDVDHPGVSNQFLINTNSELALMYNDESVLENH

HLAVGFKLLQEEHCDIFQNLTKKQRQTLRKMVIDMVLATDMSKHMSLLADL

KTMVETKKVTSSGVLLLDNYTDRIQVLRNMVHCADLSNPTKSLELYRQWTD

RIMEEFFQQGDKERERGMEISPMCDKHTASVEKSQVGFIDYIVHPLWETWA

DLVQPDAQDILDTLEDNRNWYQSMIPQSPSPPLDERSRDCQGLMEKFQFEL

TLEEEDSEGPEKEGEGHSYFSSTKTLCVIDPENRDSLEETDIDIATEDKSP

IDT

Mouse PDE4B2 nucleotide sequence
(SEQ ID NO: 30)
ATGAAGGAACAGGGCGGCACCGTGTCTGGCGCCGCTTCTAGTAGAGGCGGA

GGCGATAGCGCCATGGCCAGTCTGCAGCCACTGCAGCCCAACTACCTGAGC

GTGTGCCTGTTCCCCGAGGAAAGCTACCAGAAACTGGCTATGGAAACCCTG

GAAGAACTGGACTGGTGCCTGGACCAGCTGGAAACCATCCAGACCTACAGA

TCCGTGTCCGAGATGGCCAGCAACAAGTTCAAGAGGATGCTGAACAGAGAG

CTGACCCACCTGAGCGAGATGAGCAGATCCGGCAACCAGGTGTCCGAGTAT

ATCAGCAACACCTTCCTGGACAAGCAGAACGACGTGGAAATCCCCAGCCCC

ACCCAGAAGGACCGCGAGAAGAAGAAAAAGCAGCAGCTGATGACCCAGATC

AGCGGCGTGAAGAAACTGATGCACAGCAGCAGCCTGAACAACACCAGCATC

AGCAGATTCGGCGTGAACACCGAGAACGAGGACCACCTGGCCAAAGAGCTG

GAAGATCTGAACAAATGGGGCCTGAACATCTTCAACGTGGCCGGCTACAGC

CACAACAGACCCCTGACCTGCATTATGTACGCCATCTTCCAGGAACGGGAC

CTGCTGAAAACCTTCAAGATCAGCAGCGACACCTTCGTGACCTACATGATG

ACACTGGAAGATCACTACCACAGCGACGTGGCCTACCACAACTCTCTGCAC

GCCGCCGATGTGGCCCAGAGCACTCATGTGCTGCTGAGCACCCCTGCCCTG

GACGCCGTGTTCACCGATCTGGAAATCCTGGCCGCTATCTTCGCCGCTGCC

ATCCACGATGTGGACCACCCTGGCGTGTCCAACCAGTTCCTGATCAACACA

AACAGCGAGCTGGCCCTGATGTACAACGACGAGAGCGTGCTGGAAAACCAC

CATCTGGCCGTGGGCTTCAAGCTGCTGCAGGAAGAACACTGCGACATCTTT

CAGAACCTGACCAAGAAGCAGAGGCAGACCCTGAGAAAGATGGTCATCGAC

ATGGTGCTGGCCACCGACATGAGCAAGCACATGTCCCTGCTGGCCGACCTG

AAAACCATGGTGGAAACAAAGAAAGTGACCAGCTCCGGCGTGCTGCTGCTG

GACAACTACACCGACAGAATCCAGGTGCTGAGGAACATGGTGCACTGCGCC

GACCTGTCCAACCCCACCAAGAGCCTGGAACTGTACAGACAGTGGACCGAC

AGGATCATGGAAGAGTTCTTTCAGCAAGGCGACAAAGAACGCGAGAGGGGC

ATGGAAATCAGCCCCATGTGCGACAAGCACACCGCCAGCGTGGAAAAGTCC

CAAGTGGGCTTTATCGACTACATCGTGCACCCCCTGTGGGAGACATGGGCC

GATCTGGTGCAGCCTGACGCCCAGGACATCCTGGACACTCTGGAAGATAAC

CGGAACTGGTATCAGAGCATGATCCCCCAGAGCCCCAGCCCTCCACTGGAC

GAGAGATCCAGAGACTGCCAGGGCCTGATGGAAAAGTTCCAGTTCGAGCTG

ACTCTGGAAGAAGAGGACAGCGAGGGCCCCGAGAAAGAAGGCGAGGGCCAC

TCTTACTTCAGCAGCACCAAGACACTGTGCGTGATCGACCCCGAGAACAGG

GACAGCCTCGAAGAGACTGACATCGACATTGCCACCGAGGACAAGAGCCCC

ATCGATACA

Bifunctional Molecules

One approach to overcome the lack of potent anti-tumor T-cell immunity is the ex vivo genetic modification of T cells to target tumors through the use of affinity-enhanced receptors generated from either T cell receptors as described above or antibody-derived receptors. A complementary approach that does not require ex vivo manipulation of T cells involves the use of fusion proteins that combine tumor recognition and T cell engaging domains to redirect T cells to target tumors. Specificity and anti-tumor activity of such fusion proteins are described in, for example, Cancer Immunol Immunother (2013) 62:773-785, Nat Med. 2012 June; 18(6):980-7), and U.S. Pat. Nos. 7,763,718; and 10,130,721, each of which is incorporated herein by reference in its entirety for all purposes.

In one aspect, provided herein is a bifunctional molecule comprising the modified TCR as disclosed herein, or a functional fragment thereof, and a polypeptide that specifically binds to a cell surface protein on a T cell. Examples of cell surface proteins on T cells include, but are not limited to, CD2, CD3, CD4, CD8, CD44, CD45RA, CD45RB, CD45RO, CD49a, CD49b, CD49c, CD49d, CD49e, CD49f, CD16, CD28, and IL-2R.

In certain embodiments, the polypeptide is an immune effector polypeptide.

As used herein, the term "immune effector polypeptide" generally refers to any molecule which induces or stimulates an immune response, through direct or indirect activation of the humoral or cellular arm of the immune system, such as by activation of T cells. Examples of immune effector polypeptides include, but are not limited to, IL-1, IL-1α, IL-3, IL-4, IL-5, IL-6, IL-7, IL-10, IL-11, IL-12, IL-13, IL-15, IL-21, IL-23, TGF-β, IFN-γ, TNFα, anti-CD2 antibody, anti-CD3 antibody, anti-CD4 antibody, anti-CD8 antibody, anti-CD44 antibody, anti-CD45RA antibody, anti-CD45RB antibody, anti-CD45RO antibody, anti-CD49a antibody, anti-CD49b antibody, anti-CD49c antibody, anti-CD49d antibody, anti-CD49e antibody, anti-CD49f antibody, anti-CD16 antibody, anti-CD28 antibody, anti-IL-2R antibodies, viral proteins and peptides, and bacterial proteins or peptides.

In some embodiments, the polypeptide comprises an antibody, or an antibody fragment. Antibody fragments may include, but are not limited to, single chain antibodies, Fab fragments, Fv fragments, single-chain Fv fragments (scFv), a divalent antibody fragment such as an (Fab)2'-fragment, F(ab') fragments, disulfide-linked Fvs (sdFv), intrabodies, minibodies, diabodies, triabodies, and decabodies. In a specific embodiment, the polypeptide comprises an scFv. In certain embodiments, the polypeptide is an immune effector polypeptide.

In some embodiment, the polypeptide specifically binds to CD3. In some embodiment, the polypeptide comprises an anti-CD3 antibody. Examples of anti-CD3 antibodies include but are not limited to OKT3, UCHT-1, BMA031 and 12F6. In some embodiment, the polypeptide comprises an scFv derived from an anti-CD3 antibody. In some embodiment, the polypeptide comprises an scFv derived from OKT3, UCHT-1, BMA031 or 12F6. In certain embodiments, the polypeptide that specifically binds to CD3 is an immune effector polypeptide.

In certain embodiments, the N-terminus of the TCR is linked to the C-terminus of the polypeptide that specifically binds to a cell surface protein on a T cell. In certain embodiments, the C-terminus of the TCR is linked to the N-terminus of the polypeptide that specifically binds to a cell surface protein on a T cell. In certain embodiments, the TCR is a heterodimeric αβ TCR polypeptide pair, or a single chain αβ TCR (scTCR) polypeptide, and the N-terminus of the α or β chain of the heterodimeric TCR polypeptide pair, or the N-terminus of the scTCR polypeptide, is linked to a C-terminal amino acid of the polypeptide that specifically binds to a cell surface protein on a T cell. In certain embodiments, the TCR is a heterodimeric αβ TCR polypeptide pair, or a single chain αβ TCR polypeptide, and the C-terminus of the α or β chain of the heterodimeric TCR polypeptide pair, or the C-terminus of the scTCR polypeptide, is linked to a N-terminal amino acid of the polypeptide that specifically binds to a cell surface protein on a T cell.

Linkage of the TCR and the polypeptide that specifically binds to a cell surface protein on a T cell may be direct, or indirect via linker sequence. Linker sequences are usually flexible, in that they are made up of amino acids such as glycine, alanine and serine which do not have bulky side chains likely to restrict flexibility. Usable or optimum lengths of linker sequences are easily determined in the case of any given TCR bifunctional molecule. In some instances, the linker will be less than about 12, such as less than about 10, or from 5-10 amino acids in length.

In some embodiments of the bifunctional molecules described herein, the modified TCR, or a functional fragment thereof, comprises a beta chain comprising an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to an amino acid sequence selected from any one of SEQ ID NOs: 2-5. In one embodiment, the modified TCR, or a functional fragment thereof, comprises a beta chain comprising an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the amino acid sequence of SEQ ID NO: 2. In one embodiment, the modified TCR, or a functional fragment thereof, comprises a beta chain comprising an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the amino acid sequence of SEQ ID NO: 3. In one embodiment, the modified TCR, or a functional fragment thereof, comprises a beta chain comprising an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the amino acid sequence of SEQ ID NO: 4. In one embodiment, the modified TCR, or a functional fragment thereof, comprises a beta chain comprising an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to the amino acid sequence of SEQ ID NO: 5. In any of above embodiments, the modified TCR, or a functional fragment thereof, comprises a single amino acid substitution within the CDR2 of a beta chain relative to the unsubstituted WT TCR beta chain (e.g., as set forth in SEQ ID NO: 1).

In certain embodiments of the bifunctional molecules described herein, the modified TCR, or a functional fragment thereof, comprises a beta chain comprising an amino acid sequence selected from any one of SEQ ID NOs: 2-5. In one embodiment, the modified TCR, or a functional fragment thereof, comprises a beta chain comprising an amino acid sequence of SEQ ID NO: 2. In one embodiment, the modified TCR, or a functional fragment thereof, comprises a beta chain comprising an amino acid sequence of SEQ ID NO: 3. In one embodiment, the modified TCR, or a functional fragment thereof, comprises a beta chain comprising an amino acid sequence of SEQ ID NO: 4. In one embodiment, the modified TCR, or a functional fragment thereof, comprises a beta chain comprising an amino acid sequence of SEQ ID NO: 5.

In certain embodiments of the bifunctional molecules described herein, the modified TCR, or a functional fragment thereof, further comprises an alpha chain comprising an amino acid sequence having at least 70%, at least 75%, at least 80%, at least 85%, at least 90%, at least 91%, at least 92%, at least 93%, at least 94%, at least 95%, at least 96%, at least 97%, at least 98%, or at least 99% sequence identity to an amino acid sequence of SEQ ID NO: 7. In one embodiment, the modified TCR, or a functional fragment thereof, further comprises an alpha chain comprising an amino acid sequence of SEQ ID NO: 7.

In various embodiments, the bifunctional molecules described herein may be used in combination with the host cells or pharmaceutical compositions described herein.

Methods of Treatment

In one aspect, provided herein is a method of treating cancer in a subject. The method comprises administering to the subject suffering such cancer an effective amount of lymphoid cells presenting the modified TCRs of the invention, or a pharmaceutical composition comprising the cells. Non-limiting examples of cancers treatable by the methods described herein include, for example, neuroblastoma, myeloma, metastatic melanoma, synovial sarcoma, bladder cancer, esophageal cancer, hepatocellular cancer, head and neck cancer, non-small cell lung cancer, ovarian cancer, prostate cancer, and breast cancer.

In one aspect, provided herein is a method for stimulating or enhancing an immune response in a mammal which comprises administering to the mammal an effective amount the genetically engineered lymphoid cells of this invention, or a pharmaceutical composition comprising the cells.

Additional examples of cancer include, but are not limited to, carcinoma, lymphoma, blastoma, sarcoma (e.g., osteosarcoma or rhabdomyosarcoma), and leukemia or lymphoid malignancies. More particular examples of such cancers include squamous cell cancer (e.g., epithelial squamous cell cancer), adenosquamous cell carcinoma, lung cancer (e.g., including small-cell lung cancer, non-small cell lung cancer, adenocarcinoma of the lung, squamous carcinoma of the lung), cancer of the peritoneum, hepatocellular cancer, gastric or stomach cancer (e.g., including gastrointestinal cancer, pancreatic cancer), cervical cancer, ovarian cancer, liver cancer, bladder cancer, cancer of the urinary tract, hepatoma, breast cancer, colon cancer, rectal cancer, colorectal cancer, endometrial or uterine carcinoma, salivary gland carcinoma, kidney or renal cancer, prostate cancer, vulval cancer, thyroid cancer, hepatic carcinoma, anal carcinoma, penile carcinoma, primary or metastatic melanoma, multiple myeloma and B-cell lymphoma, non-Hodgkin's lymphoma, Hodgkin's lymphoma, brain (e.g., high grade glioma, diffuse pontine glioma, ependymoma, neuroblastoma, or glioblastoma), as well as head and neck cancer, and associated metastases. Additional examples of tumors can be found in The Merck Manual of Diagnosis and Therapy, 19th Edition, § on Hematology and Oncology, published by Merck Sharp & Dohme Corp., 2011 (ISBN 978-0-911910-19-3); The Merck Manual of Diagnosis and Therapy, 20th Edition, § on Hematology and Oncology, published by Merck Sharp & Dohme Corp., 2018 (ISBN 978-0-911-91042-1) (2018 digital online edition at internet website of Merck Manuals); and SEER Program Coding and Staging Manual 2016, each of which are incorporated by reference in their entirety for all purposes.

In various embodiments, cancers treatable by the methods described herein present cancer antigen NY-ESO-$1_{157\text{-}165}$ epitope (SEQ ID NO: 8) on the surface of its cells.

In some embodiments of any of the therapeutic methods described above, the composition is administered in a therapeutically effective amount. The dosages of the composition administered in the methods of the invention will vary widely, depending upon the subject's physical parameters, the frequency of administration, the manner of administration, the clearance rate, and the like. The initial dose may be larger, and might be followed by smaller maintenance doses. The dose may be administered as infrequently as weekly or biweekly, or fractionated into smaller doses and administered daily, semi-weekly, etc., to maintain an effective dosage level. It is contemplated that a variety of doses will be effective to achieve in vivo persistence of modified host cells. It is also contemplated that a variety of doses will be effective to improve in vivo effector function of modified host cells.

In some embodiments, composition comprising the modified host cells manufactured by the methods described herein may be administered at a dosage of $10^2$ to $10^{10}$ cells/kg body weight, $10^5$ to $10^9$ cells/kg body weight, $10^5$ to $10^8$ cells/kg body weight, $10^5$ to $10^7$ cells/kg body weight, $10^7$ to $10^9$ cells/kg body weight, or $10^7$ to $10^8$ cells/kg body weight, including all integer values within those ranges. The number of modified host cells will depend on the therapeutic use for which the composition is intended for.

Modified host cells may be administered multiple times at dosages listed above. The modified host cells may be allogeneic, syngeneic, xenogeneic, or autologous to the patient undergoing therapy.

The compositions and methods described in the present disclosure may be utilized in conjunction with other types of therapy for tumors, such as chemotherapy, surgery, radiation, gene therapy, and so forth.

It is also contemplated that when used to treat various diseases/disorders, the compositions and methods of the present disclosure can be utilized with other therapeutic methods/agents suitable for the same or similar diseases/disorders. Such other therapeutic methods/agents can be co-administered (simultaneously or sequentially) to generate additive or synergistic effects. Suitable therapeutically effective dosages for each agent may be lowered due to the additive action or synergy.

In some embodiments of any of the above therapeutic methods, the method further comprises administering to the subject one or more additional compounds selected from the group consisting of immuno-suppressives, biologicals, probiotics, prebiotics, and cytokines (e.g., GM-CSF, IFN or IL-2).

In some embodiments, the method described herein further comprises providing exogenous GM-CSF, in addition to the GM-CSF produced by the immune cells, to enhance the function of immune cells expressing a chimeric cytokine receptor of the present disclosure. Exogenous GM-CSF may be provided by, for example and not limitation, i) injection of the FDA-approved GM-CSF drug Sargramostin (Leukine™) or ii) the use of nonviral or viral vectors to express GM-CSF (e.g., FDA-approved GM-CSF expressing oncolytic virus talimogene laherparepvec [TVEC, Imlygic™]). These drugs could be given before, with, or after the administration (e.g., infusion) of the immune cells expressing a chimeric cytokine receptor of the present disclosure to patients.

As a non-limiting example, the invention can be combined with other therapies that block inflammation (e.g., via blockage of IL1, INFα/β, IL6, TNF, IL23, etc.).

The methods and compositions of the invention can be combined with other immunomodulatory treatments such as, e.g., therapeutic vaccines (including but not limited to GVAX, DC-based vaccines, etc.), checkpoint inhibitors (including but not limited to agents that block CTLA4, PD1, LAG3, TIM3, etc.) or activators (including but not limited to agents that enhance 4-1BB, OX40, etc.). The methods of the invention can be also combined with other treatments that possess the ability to modulate NKT function or stability, including but not limited to CD1d, CD1d-fusion proteins, CD1d dimers or larger polymers of CD1d either unloaded or loaded with antigens, CD1d-chimeric antigen receptors (CD1d-CAR), or any other of the five known CD1 isomers existing in humans (CD1a, CD1b, CD1c, CD1e). The methods of the invention can also be combined with other treatments such as midostaurin, enasidenib, or a combination thereof.

Therapeutic methods of the invention can be combined with additional immunotherapies and therapies. For example, when used for treating tumors, the compositions of the invention can be used in combination with conventional therapies, such as, e.g., surgery, radiotherapy, chemotherapy or combinations thereof, depending on type of the tumor, patient condition, other health issues, and a variety of factors. In certain aspects, other therapeutic agents useful for combination tumor therapy with the inhibitors of the invention include anti-angiogenic agents. Many anti-angiogenic agents have been identified and are known in the art, including, e.g., TNP-470, platelet factor 4, thrombospondin-1, tissue inhibitors of metalloproteases (TIMP1 and TIMP2), prolactin (16-Kd fragment), angiostatin (38-Kd fragment of plasminogen), endostatin, bFGF soluble receptor, transforming growth factor beta, interferon alpha, soluble KDR and FLT-1 receptors, placental proliferin-related protein, as well as those listed by Carmeliet and Jain (2000). In one embodiment, the modified host cells of the invention can be used in combination with a VEGF antagonist or a VEGF receptor antagonist such as anti-VEGF antibodies, VEGF variants, soluble VEGF receptor fragments, aptamers capable of blocking VEGF or VEGFR, neutralizing anti-VEGFR antibodies, inhibitors of VEGFR tyrosine kinases and any combinations thereof (e.g., anti-hVEGF antibody A4.6.1, bevacizumab or ranibizumab).

Non-limiting examples of chemotherapeutic compounds which can be used in combination treatments of the present disclosure include, for example, aminoglutethimide, amsacrine, anastrozole, asparaginase, azacitidine, bcg, bicalutamide, bleomycin, buserelin, busulfan, campothecin, capecitabine, carboplatin, carmustine, chlorambucil, cisplatin, cladribine, clodronate, colchicine, cyclophosphamide, cyproterone, cytarabine, dacarbazine, dactinomycin, daunorubicin, decitabine, dienestrol, diethylstilbestrol, docetaxel, doxorubicin, epirubicin, estradiol, estramnustine, etoposide, exemestane, filgrastim, fludarabine, fludrocortisone, fluorouracil, fluoxymesterone, flutamide, gemcitabine, genistein, goserelin, hydroxyurea, idarubicin, ifosfamide, imatinib, interferon, irinotecan, ironotecan, letrozole, leucovorin, leuprolide, levamisole, lomustine, mechlorethamine, medroxyprogesterone, megestrol, melphalan, mercaptopurine, mesna, methotrexate, mitomycin, mitotane, mitoxantrone, nilutamide, nocodazole, octreotide, oxaliplatin, paclitaxel, pamidronate, pentostatin, plicamycin, porfimer, procarbazine, raltitrexed, rituximab, streptozocin, suramin, tamoxifen, temozolomide, teniposide, testosterone, thioguanine, thiotepa, titanocene dichloride, topotecan, trastuzumab, tretinoin, vinblastine, vincristine, vindesine, and vinorelbine.

These chemotherapeutic compounds may be categorized by their mechanism of action into, for example, following groups: anti-metabolites/anti-tumor agents, such as pyrimidine analogs (5-fluorouracil, floxuridine, capecitabine, gemcitabine and cytarabine) and purine analogs, folate antagonists and related inhibitors (mercaptopurine, thioguanine, pentostatin and 2-chlorodeoxyadenosine (cladribine)); antiproliferative/antimitotic agents including natural products such as vinca alkaloids (vinblastine, vincristine, and vinorelbine), microtubule disruptors such as taxane (paclitaxel, docetaxel), vincristin, vinblastin, nocodazole, epothilones and navelbine, epipidopodophyllotoxins (etoposide, teniposide), DNA damaging agents (actinomycin, amsacrine, anthracyclines, bleomycin, busulfan, camptothecin, carboplatin, chlorambucil, cisplatin, cyclophosphamide, cytoxan, dactinomycin, daunorubicin, doxorubicin, epirubicin, hexamethyhnelamineoxaliplatin, iphosphamide, melphalan, mechlorethamine, mitomycin, mitoxantrone, nitrosourea, plicamycin, procarbazine, taxol, taxotere, teniposide, triethylenethiophosphoramide and etoposide (VP16)); antibiotics such as dactinomycin (actinomycin D), daunorubicin, doxorubicin (adriamycin), idarubicin, anthracyclines, mitoxantrone, bleomycins, plicamycin (mithramycin) and mitomycin; enzymes (L-asparaginase which systemically metabolizes L-asparagine and deprives cells which do not have the capacity to synthesize their own asparagine); antiplatelet agents; antiproliferative/antimitotic alkylating agents such as nitrogen mustards (mechlorethamine, cyclophosphamide and analogs, melphalan, chlorambucil), ethylenimines and methylmelamines (hexamethylmelamine and thiotepa), alkyl sulfonates-busulfan, nitrosoureas (carmustine (BCNU) and analogs, streptozocin), trazenes-dacarbazinine (DTIC); antiproliferative/antimitotic antimetabolites such as folic acid analogs (methotrexate); platinum coordination complexes (cisplatin, carboplatin), procarbazine, hydroxyurea, mitotane, aminoglutethimide; hormones, hormone analogs (estrogen, tamoxifen, goserelin, bicalutamide, nilutamide) and aromatase inhibitors (letrozole, anastrozole); anticoagulants (heparin, synthetic heparin salts and other inhibitors of thrombin); fibrinolytic agents (such as tissue plasminogen activator, streptokinase and urokinase), aspirin, dipyridamole, ticlopidine, clopidogrel, abciximab; antimigratory agents; antisecretory agents (breveldin); immunosuppressives (cyclosporine, tacrolimus (FK-506), sirolimus (rapamycin), azathioprine, mycophenolate mofetil); anti-angiogenic compounds (e.g., TNP-470, genistein, bevacizumab) and growth factor inhibitors (e.g., fibroblast growth factor (FGF) inhibitors); angiotensin receptor blocker; nitric oxide donors; anti-sense oligonucleotides; antibodies (trastuzumab); cell cycle inhibitors and differentiation inducers (tretinoin); mTOR inhibitors, topoisomerase inhibitors (doxorubicin (adriamycin), amsacrine, camptothecin, daunorubicin, dactinomycin, eniposide, epirubicin, etoposide, idarubicin and mitoxantrone, topotecan, irinotecan), corticosteroids (cortisone, dexamethasone, hydrocortisone, methylprednisolone, prednisone, and prednisolone); growth factor signal transduction kinase inhibitors; mitochondrial dysfunction inducers and caspase activators; and chromatin disruptors.

In various embodiments of the methods described herein, the subject is a human. The subject may be a juvenile or an adult, of any age or sex.

Pharmaceutical Compositions, Dosage Forms and Administration

In one aspect, provided herein is a pharmaceutical composition comprising lymphoid cells having a modified TCR described herein, and a pharmaceutically acceptable carrier.

A carrier can be a solvent or dispersion medium containing, for example, water, saline, polyol (for example, glycerol, propylene glycol, and liquid polyethylene glycol, and the like), suitable mixtures thereof, and vegetable oils. The prevention of the action of microorganisms can be brought about by various antibacterial and antifungal agents known in the art. In many cases, it will be preferable to include isotonic agents, for example, sugars or sodium chloride.

Pharmaceutical compositions based on the population of genetically engineered lymphoid cells having a modified TCR described herein can be formulated in any conventional manner using one or more physiologically acceptable carriers and/or excipients. The lymphoid cells may be formulated for administration by, for example, injection, parenteral, vaginal, rectal administration, or by administration directly to a tumor.

The pharmaceutical compositions can be formulated for parenteral administration by injection, e.g. by bolus injection or continuous infusion. Formulations for injection can be presented in a unit dosage form, e.g. in ampoules or in multi-dose containers, with an optionally added preservative. The pharmaceutical compositions can further be formulated as suspensions, solutions or emulsions in oily or aqueous vehicles, and may contain other agents including suspending, stabilizing and/or dispersing agents.

Pharmaceutical forms suitable for injectable use can include sterile aqueous solutions or dispersions; formulations including sesame oil, peanut oil or aqueous propylene glycol; and sterile powders for the extemporaneous preparation of sterile injectable solutions or dispersions. In all cases, the form must be sterile and must be fluid. It must be stable under the conditions of manufacture and certain storage parameters (e.g. refrigeration and freezing) and must be preserved against the contaminating action of microorganisms, such as bacteria and fungi.

Upon formulation, solutions can be administered in a manner compatible with the dosage formulation and in such amount as is therapeutically effective. Dose ranges and frequency of administration can vary depending on the nature of the population of the population of genetically engineered lymphoid cells having a modified TCR described herein and the medical condition as well as parameters of a specific patient and the route of administration used.

In some embodiments, the population of genetically engineered lymphoid cells having a modified TCR described herein can be administered to a subject at a dose ranging from about $10^7$ to about $10^{12}$. A more accurate dose can also depend on the subject in which it is being administered. For example, a lower dose may be required if the subject is juvenile, and a higher dose may be required if the subject is an adult human subject. In certain embodiments, a more accurate dose can depend on the weight of the subject.

EXAMPLES

The present invention is also described and demonstrated by way of the following examples. However, the use of these and other examples anywhere in the specification is illustrative only and in no way limits the scope and meaning of the invention or of any exemplified term. Likewise, the invention is not limited to any particular preferred embodiments described here. Indeed, many modifications and variations of the invention may be apparent to those skilled in the art upon reading this specification, and such variations can be made without departing from the invention in spirit or in scope. The invention is therefore to be limited only by the terms of the appended claims along with the full scope of equivalents to which those claims are entitled.

Example 1. Binding Affinities of Soluble Rationally Designed BC1 TCR Variants

Materials and Methods

The TCR amino acid replacements were designed via structure-based computer-aided protein engineering. Starting from the experimental structure of the wild-type TCR-p-MHC complex (PDB ID 2bnr), the contribution of each TCR and pMHC residue to the binding free energy was estimated using the Molecular Mechanics-Generalized Born Surface Area (MM-GBSA). These results were used to determine sequence modifications possibly increasing the affinity of the TCR for the pMHC. The latter were introduced virtually in the TCR structure and the resulting binding free energy change was again estimated using MM-GBSA. Sequence modifications predicted in silico to increase favorably the binding free energy were retained for experimental validation. Soluble TCR were produced in both mammalian cell culture systems and from bacterial inclusion bodies. Direct titration ELISA against soluble pMHC was used to compare binding strength as compared to the wild-type TCR. TCRs of interest were produced from refolding of bacterial inclusion bodies of the alpha and beta chains were characterized by surface plasmon resonance to measure affinity and kinetics.

The wild-type TCR, named as BC1, varies by just 4 amino acids (2 in the alpha chain and 2 in the beta chain) from the well-characterized TCR 1G4 (Chen, J. L., et al., J Exp Med 2005. 201, 1243-1255, which is incorporated herein by reference in its entirety for all purposes). BC1 TCR is of clinical interest because it was derived from an immunodominant clone of a long-surviving cancer patient.

Soluble TCR Production in HEK-293 Cells and Purification

The alpha- and beta-chains of TCR BC1 were cloned separately into the expression vector pHYK8 under the control of a CMV promoter. Heterodimeric chain pairing was facilitated with an acidic-basic zipper following the strategy of Chang et al. (Chang, H. C., et al., Proc Natl Acad Sci USA, 1994. 91, 11408-11412). The TCR beta-chain was truncated after position Cys242 and replaced by a flexible linker region, a thrombin site, an acidic zipper and a HIS tag and the alpha-chain was truncated after Cys209 and replaced by a linker region, a thrombin site, and a basic zipper. Soluble TCR was produced by co-transfection of the plasmids with linear 25 kDa polyethylenimine into HEK-293 cells. The transfected cells were cultured in suspension for up to 7 days in Pro293 CDM medium (Lonza) supplemented with 4 mM valproic acid (to minimize acidification). Culture supernatant was collected by centrifugation and the TCR purified using Ni-NTA agarose (Qiagen) following the manufacturer's suggestions.

Soluble TCR and pMHC Production from Bacterial Inclusion Bodies

BL21(DE3)pLys bacterial cells were used to produce TCR alpha- and beta-chain (cloned into pGMT7) as inclusion bodies, which were solubilized and refolded by dialysis as previously described (Boulter, J. M., et al., Protein Eng 2003. 16, 707-711). The TCR were then concentrated and filtered prior to fast protein liquid chromatography HIS-tag purification with $Ni^{2+}$ immobilized metal chelating sepharose (GE Healthcare) and imidazole elution. Prior to SPR analysis the samples were concentrated on 10 kDa MWCO spin filters (Millipore) and gel-filtered into HBS-EP buffer (10 mM HEPES, pH7.4, 0.15M NaCl, 3 mM EDTA, 0.005% v/v P20 surfactant), using a S200 column to remove aggregate. Biotinylated A2/NY-ESO157-165 was prepared as previously described (Altman, J. D., et al., Science, 1996. 274, 94-96).

Titration ELISA of Rationally Developed TCRs

Biotinylated pMHC (A2/NY-ESO157-165 complexes) was captured on SA-coated plates (96 well, high-binding plates, Corning Life Sciences) blocked with 2% BSA in Tris buffered saline (TBS, pH 7.4). Plates were thoroughly washed between each step with TBS, 0.1% tween. Free sites on SA were biotin-blocked subsequent to 1.5 h incubation at room temperature with soluble TCR in TBS, 1% BSA, 0.1% tween. Bound TCR was detected with anti-beta chain TCR mAb (TCR 1151, Thermo Scientific, Rockford, IL, USA), diluted 1/1500 in TBS, 1% BSA, 0.1% tween, followed by HRP-conjugated-goat-anti-mouse IgG-Ab (Thermo Scientific), diluted 1/1500 in TBS, 0.1% tween, and HRP detection with 2,2'-azino-bis(3-ethylbenzthiazoline-6-sulphonic acid) in a citric acid-phosphate buffer containing $H_2O_2$. Plate readings were taken after 30 min. at OD405-490. The ELISA for each TCR was repeated at least three times.

In Table 1, WT BC1 TCR binding is defined as "+++", binding greater than the WT BC1 TCR is shown as "++++", binding less than WT is shown as "++", very weak binding is shown as "+", and no binding is shown as "−".

TABLE 1

Direct ELISA binding of soluble rationally designed TCR to plate-captured pMHC relative to binding of the wild-type TCR BC1

| Mutations | CDR2 alpha | | | | CD3 alpha | | | | CD1 beta | | | CD2 beta | | | | | | | CD3 beta | | | | Binding |
|---|---|---|---|---|---|---|---|---|---|---|---|---|---|---|---|---|---|---|---|---|---|---|---|
| | 51 | 52 | 53 | 54 | 95 | 96 | 97 | 98 | 27 | 28 | 29 | 49 | 50 | 51 | 52 | 53 | 54 | 55 | 94 | 95 | 96 | 97 | |
| ALPHA CHAIN | | | | | | | | | | | | | | | | | | | | | | | |
| WT TCR (BC 1) | Q | S | S | Q | Q | T | G | G | N | H | E | V | G | A | G | I | T | D | Y | V | G | A | +++ |
| α-S52T | Q | T | S | Q | Q | T | G | G | N | H | E | V | G | A | G | I | T | D | Y | V | G | A | + |
| α-S53T | Q | S | T | Q | Q | T | G | G | N | H | E | V | G | A | G | I | T | D | Y | V | G | A | + |
| α-S53N | Q | S | N | Q | Q | T | G | G | N | H | E | V | G | A | G | I | T | D | Y | V | G | A | − |
| α-Q54W | Q | S | S | W | Q | T | G | G | N | H | E | V | G | A | G | I | T | D | Y | V | G | A | + |
| α-T96E | Q | S | S | Q | Q | E | G | G | N | H | E | V | G | A | G | I | T | D | Y | V | G | A | ++ |
| α-T96Y | Q | S | S | Q | Q | Y | G | G | N | H | E | V | G | A | G | I | T | D | Y | V | G | A | ++++ |
| α-G98A | Q | S | S | Q | Q | T | G | A | N | H | E | V | G | A | G | I | T | D | Y | V | G | A | − |
| α-G98S | Q | S | S | Q | Q | T | G | S | N | H | E | V | G | A | G | I | T | D | Y | V | G | A | − |
| BETA CHAIN | | | | | | | | | | | | | | | | | | | | | | | |
| β-N27L | Q | S | S | Q | Q | T | G | G | L | H | E | V | G | A | G | I | T | D | Y | V | G | A | + |
| β-E29Q | Q | S | S | Q | Q | T | G | G | V | H | Q | V | G | A | G | I | T | D | Y | V | G | A | − |
| β-G50V | Q | S | S | Q | Q | T | G | G | N | H | E | V | V | A | G | I | T | D | Y | V | G | A | − |
| β-A51D | Q | S | S | Q | Q | T | G | G | N | H | E | V | G | D | G | I | T | D | Y | V | G | A | ++ |
| β-G50A + A51D | Q | S | S | Q | Q | T | G | G | N | H | E | V | A | D | G | I | T | D | Y | V | G | A | ++ |
| β-G52Q | Q | S | S | Q | Q | T | G | G | N | H | E | V | G | A | Q | I | T | D | Y | V | G | A | ++ |
| β-I53F | Q | S | S | Q | Q | T | G | G | N | H | E | V | G | A | G | F | T | D | Y | V | G | A | ++++ |
| β-I53W | Q | S | S | Q | Q | T | G | G | N | H | E | V | G | A | G | W | T | D | Y | V | G | A | ++++ |
| β-I53E | Q | S | S | Q | Q | T | G | G | N | H | E | V | G | A | G | E | T | D | Y | V | G | A | ++++ |
| β-D55E | Q | S | S | Q | Q | T | G | G | N | H | E | V | G | A | G | I | T | E | Y | V | G | A | ++++ |
| β-Y94N | Q | S | S | Q | Q | T | G | G | N | H | E | V | G | A | G | I | T | D | N | V | G | A | ++++ |
| β-V95L | Q | S | S | Q | Q | T | G | G | N | H | E | V | G | A | G | I | T | D | Y | L | G | A | ++ |
| β-V95I | Q | S | S | Q | Q | T | G | G | N | H | E | V | G | A | G | I | T | D | Y | I | G | A | − |
| β-G96S | Q | S | S | Q | Q | T | G | G | N | H | E | V | G | A | G | I | T | D | Y | V | S | A | − |
| β-A97V | Q | S | S | Q | Q | T | G | G | N | H | E | V | G | A | G | I | T | D | Y | V | G | V | + |
| β-A97I | Q | S | S | Q | Q | T | G | G | N | H | E | V | G | A | G | I | T | D | Y | V | G | I | − |
| β-A97L | Q | S | S | Q | Q | T | G | G | N | H | E | V | G | A | G | I | T | D | Y | V | G | L | ++++ |
| β-A97D | Q | S | S | Q | Q | T | G | G | N | H | E | V | G | A | G | I | T | D | Y | V | G | D | ++ |
| β-G50A + A51E + A97D | Q | S | S | Q | Q | T | G | G | N | H | E | V | A | E | G | I | T | D | Y | V | G | D | ++++ |

Surface Plasmon Resonance (SPR) of Rationally Developed TCRs

SPR was performed on a BIAcore 3000 and SA-coated, CM5 sensor chips (BIACore, GE Healthcare) at 25° C. Flow cells were loaded with 200 response units of biotinylated pMHC at a rate of 10 μl/min for uniform distribution. Free sites on streptavidin (SA) were biotin-blocked and a reference cell was used as a control against changes in bulk refractive index upon injection of sample solution. For kinetic analysis, six to eight serial dilutions of TCR were injected over the loaded chip at 50-100 μl/min. Data are representative from one experiment of at least two independent experiments, conducted in duplicate or in triplicate, giving the best Chi2 values. The $k_{on}$ and $k_{off}$ values for each TCR were calculated assuming 1:1 Langmuir binding and data were analyzed using BIAevaluation 4.1 and a global fit algorithm. $K_D$ was calculated by $k_{off}/k_{on}$.

In Table 2, "*" indicates that A97L and DMb are previously published TCRs that confer optimal functional activity to T cells (Irving, M., et al., JBC 2012. 287, 23068-23078, which is incorporated herein by reference in its entirety for all purposes). "" indicates that 1G4 is a wild type TCR isolated from a patient having the property of binding to NY-ESO-1$_{157-165}$ (Dunn, S. M., et al., Protein Sci 2006. 15, 710-721; Robbins, P. F., et al., J Clin Oncol 2011. 29, 917-924; Rapoport, A. P., et al., Nat Med 2015. 21, 914-921; Chen, J. L., J Exp Med 2005. 201, 1243-1255, each of which is incorporated herein by reference in its entirety for all purposes). "*" indicates that 1G4LY is high-affinity variant of 1G4 being used in clinical trials (Dunn, S. M., et al., Protein Sci 2006. 15, 710-721; Robbins, P. F., et al., J Clin Oncol 2011. 29, 917-924; Rapoport, A. P., et al., Nat Med 2015. 21, 914-921; Chen, J. L., J Exp Med 2005. 201, 1243-1255, each of which is incorporated herein by reference in its entirety for all purposes). The mutations in the BC1 TCR variants are highlighted in bold.

TABLE 2

Biocore Analysis of selected rationally designed TCR

| TCR BV13 | CDR2β | | | | | | | | CDR3β | | | | $K_D$ | | |
|---|---|---|---|---|---|---|---|---|---|---|---|---|---|---|---|
| | 48 | 49 | 50 | 51 | 52 | 53 | 54 | 55 | 96 | 97 | 98 | 99 | $K_D$ (μM) | $k_{on}$ (M$^{-1}$ sec$^{-1}$) | $k_{off}$ (s$^{-1}$) |
| WT (Lau155 BV13cl) "BC1" | S | V | G | A | G | I | T | D | G | A | A | G | 21.4 | 1.1 × 10$^4$ | 0.23 |
| A97L* | S | V | G | A | G | I | T | D | G | L | A | G | 2.7 | 2.3 × 10$^4$ | 0.061 |
| I53E | S | V | G | A | G | E | T | D | G | A | A | G | 3.89 | 6.35 × 10$^4$ | 0.247 |
| I53F | S | V | G | A | G | F | T | D | G | A | A | G | 0.41 | 2.13 × 10$^4$ | 0.009 |

TABLE 2-continued

Biocore Analysis of selected rationally designed TCR

| TCR BV13 | 48 | 49 | 50 | 51 | 52 | 53 | 54 | 55 | 96 | 97 | 98 | 99 | $K_D$ (μM) | $k_{on}$ (M$^{-1}$ sec$^{-1}$) | $k_{off}$ (s$^{-1}$) |
|---|---|---|---|---|---|---|---|---|---|---|---|---|---|---|---|
| | | | | | CDR2β | | | | | CDR3β | | | | | |
| I53W | S | V | G | A | G | W | T | D | G | A | A | G | | | |
| D55E | S | V | G | A | G | I | T | E | G | A | A | G | | | |
| DMb (G50A + A51E)* | S | V | A | E | G | I | T | D | G | A | A | G | 1.91 | 2.35 × 10$^4$ | 0.045 |
| 1G4 | S | V | G | A | G | I | T | D | G | N | T** | G | 14.2 | 1.7 × 10$^4$ | 0.12 |
| 1G4LY* | S | V | G | A | G | I | T | D | G | L | Y** | G | | | |

Results and Discussion

As described above, by rational design (MM-GBSA calculations) (Zoete, V. et al., JMR 2010. 23, 142-152; Zoete, V., and Michielin, O. Proteins 2007. 67, 1026-1047; Zoete, V., et al., Proteins 2005. 61, 79-93), a panel of HLA-A2-NY-ESO$_{157-165}$ TCRs were developed with increasing affinity and increased function as compared to the primary human T cells (Zoete, V. et al., JMR 2010. 23, 142-152; Schmid, D. A., et al., Journal of immunology 2010. 184, 4936-4946; Irving, M., et al., JBC 2012. 287, 23068-23078).

As shown in Tables 1 and 2, the panel of TCRs show increased affinity for HLA-A2-NY-ESO$_{157-165}$. Table 1 shows direct binding of the TCR to pMHC by titration ELISA and in Table 2 demonstrates the affinity and kinetics determined for a subset of those TCRs. As highlighted in bold in Table 1, there are several single amino-acid replacement TCRs that bind with higher affinity to pMHC than the WT TCR depicted with "++++" for binding. As shown in Table 2, at least two different single amino acid substitutions at residue 53 of WT BC1 TCR (I53E, and I53F) result in higher binding affinity ($K_D$ WT>I53E>I53F) when compared to WT BC1 TCR, with I53F having the highest affinity for HLA-A2-NY-ESO-1$_{157-165}$.

Flowcytometric analysis of engineered CD4$^+$ and CD8$^+$ cells with several different BC1 TCR variants stained with anti-TCR BV13.1 Ab and fluorescenated tetramer (FIGS. 2A-2B and FIGS. 3A-3B) show that all of the variants (I53E, I53F, I53W, D55E, and DMb) tested express comparable to wild type (BC1 TCR transduced cells) and positive controls A97L and 1G4LY.

Example 2. Cytokine Production by T Cells Expressing NY-ESO-1 TCR Variants

Materials and Methods

Cell Line Culture 293T and Jurkat cell lines were purchased from the ATCC. All cell lines were cultured in RPMI-1640 supplemented with 10% heat-inactivated FBS, 2 mmol/l L-glutamine, and 100 μg/ml penicillin, and 100 U/ml streptomycin. The 293T cell line was used for lentiviral packaging and preparation.

Cloning of TCRα and TCRβ Chains and Lentivirus Production

Both the TCRa23 and TCRb13.1 ORFs were incorporated into the lentiviral vector pRRL, in which most of the U3 region of the 3' long terminal repeat was deleted, resulting in a self-inactivating 3' long terminal repeat, or SIN. The TCRa and TCRb chains were separated by the picorna virus derived 2A sequence.

Lentiviruses were produced by transient transfection of 293T cells using TurboFect. In brief, 293T cells were co-transfected with the lentiviral vector pRRL encoding for the NY-ESO TCRa and TCRb chain and the lentiviral helper plasmids (R8.74 and pMD2G). Lentiviral supernatants were harvested 48 h post-transfection, filtered, and concentrated by ultracentrifugation. Pellets were resuspended in the appropriate volume of RPMI 10% FBS and either stored at −80° C. or directly used.

A total of 0.5×10$^6$ CD4$^+$ or CD8$^+$ T cells were stimulated with 1×10$^6$ αCD3/αCD28 beads in the presence of 50 IU/ml interleukin-2 for 18-20 h prior to lentiviral transduction. On day 5 beads were removed and T cells were cultured in the presence of 10 ng/ml IL-7 and 10 ng/ml IL-15. Expression of the TCR was determined on day 6 and later time points after transduction by flow cytometric analysis. Antibodies used were, PE labelled human TCRVb13.1, and APC-labeled anti-human CD4 and anti-human CD8. PE-labeled HLA-A2 tetramers presenting NY-ESO$_{157-165}$ were used to detect correct folding of the introduced TCR. Stained cells were analyzed using FlowJo software.

Cell Lines

The HLA-A2.1$^+$/NY-ESO$^+$ melanoma cell lines Mw275 and A375, and the NY-ESO negative cell line NA8 were cultured in IMDM supplemented with 10% FBS and antibiotics (100 IE/ml penicillin and 100 μg/ml streptomycin). Saos-2 (osteosarcoma) and U266 (B cell), both HLA-A2.1/NY-ESO$^+$, and OVCAr3 (ovarian) and SKO #(ovarian), both negative for NY-ESO were cultured in RPMI supplemented with 10% FBS and antibiotics.

The NY-ESO negative cell lines, U87MG (brain), A431 (skin), A673 (sarcoma), RD-ES (sarcoma), HT-29 (lung) and SK-N-AS (neuroblastoma) were cultured in DMEM supplemented with 10% FBS and antibiotics.

Primary T Cell Purification and Transduction

Primary human T cells were isolated from the peripheral blood mononuclear cells (PBMCs) of buffycoats derived from healthy donors. All blood samples were collected with informed consent of the donors, and then genetically-engineered with Ethics Approval from the Canton of Vaud. Total PBMCs were obtained via Lymphoprep (Axonlab) separation solution, using a standard protocol of centrifugation, and CD4$^+$ and CD8$^+$ T cells were isolated using a negative selection kit coupled with magnetic beads separation (easy-SEP, Stem Cell technology). T cells were cultured in complete media (RPMI 1640 with Glutamax, supplemented with 10% heat-inactivated fetal bovine serum, 100 U/ml penicillin, 100 μg/ml streptomycin sulfate (Invitrogen, Lifetechnologies), and stimulated with anti-CD3 and anti-CD28 mAbs coated beads (Lifetechnologies) in a ratio of 1:2, T cells:beads. Twelve to twenty-four hours after activation the T cells were transduced with lentiviral particles at multiplicity of infection (MOI) of ~5-10. Human recombinant interleukin-2 (h-IL2; Glaxo) was added every other day to obtain a final concentration of 50 IU/ml until 5-days post stimulation (day +5). At this time point the magnetic beads were removed and h-IL15 was added at 10 ng/mL (Miltenyi Biotec GmbH) with no further addition of IL2. A cell density of $0.5-1 \times 10^6$ cells/ml was maintained for expansion. The introduced TCR were measured 5 days post-transduction by fluorescent multimer staining. Rested engineered T cells were adjusted for identical transgene expression before all functional assays.

Cytokine Production

Cytokine release assays were performed by co-culture of $5 \times 10^4$ T cells with $5 \times 10^4$ target cells per well in duplicate in 96-well round bottom plates in a final volume of 200 µl of RPMI media. After 24 hours, co-culture supernatants were harvested and tested for presence of IFN-γ and IL-2 using an ELISA Kit, according to the manufacturer's protocol (BioLegend). The reported values represent the mean of transduced T cells derived from four healthy donors (HD).

Results and Discussion

To assess the impact of TCR binding parameters on cytokine production, non-transduced and CD4+ and CD8+ cells transduced with different TCR variants and WT BC1 TCR were incubated with T2 cells loaded with serial 10 fold dilutions of NY-ESO$_{157-165}$ peptide. For IL-2 produced in response to TCR-mediated activation, secretion reached a maximum for engineered CD4+ cells expressing TCR I53F, I53W, D55E, DMb and 1G4LY. Engineered CD4+ cells expressing TCR I53F, I53W, D55E, and DMb appear to function better in terms of IL2 production when compared WT TCR, and their function is similar to 1G4LY TCR (FIG. 4A). The engineered TCR variant, I53E, showed similar functionality to WT TCR in this assay. Under the same conditions, IL-2 was not produced by non-transduced CD4+ cells (FIG. 4A).

Figure 5:
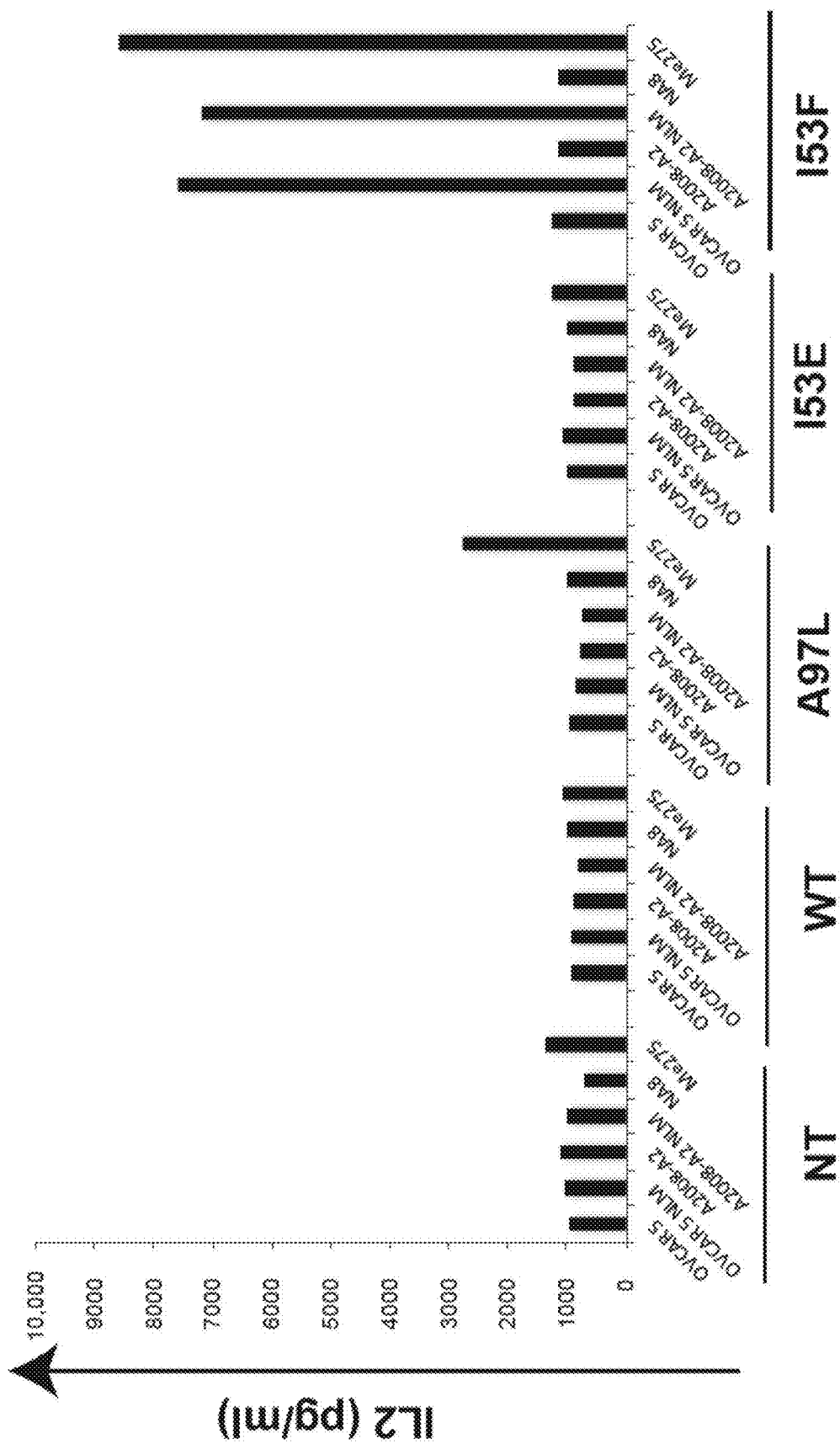
FIG. 5 shows IL-2 production of NY-ESO TCR transgenic CD4$^+$ cells. Target cells used were Me275 (tumor cell lines naturally expressing HLA/A2-NY-ESO-1), A2008-A2 NLM and OVCAR5 NLM (gene engineered cells to express HLA-A2-NY-ESO-1) and NA8, A2008-A2 and OVCAR5 (tumor cells lines not expressing HLA/A2-NY-ESO-1).

IL-2 is produced most efficiently by healthy donor (HD) T cells engineered to express TCR I53F, as compared to non-transduced (NT) cells (negative control), wild type BC1 TCR transduced cells, and cells transduced to express TCR I53E and cells transduced to express A97L, in tumor T cell lines naturally expressing HLA/A2-NY-ESO-1 (Me275) or gene-engineered to express HLA/A2-NY-Eso-1 (OVCAR5 NLM and A2008-A2-NLM). There is no cross reactivity with tumor cell lines not expressing HLA/A2-NY-ESO-1 (OVCAR5 and A2008-A2 and NA8) (FIG. 5).

Figure 6:
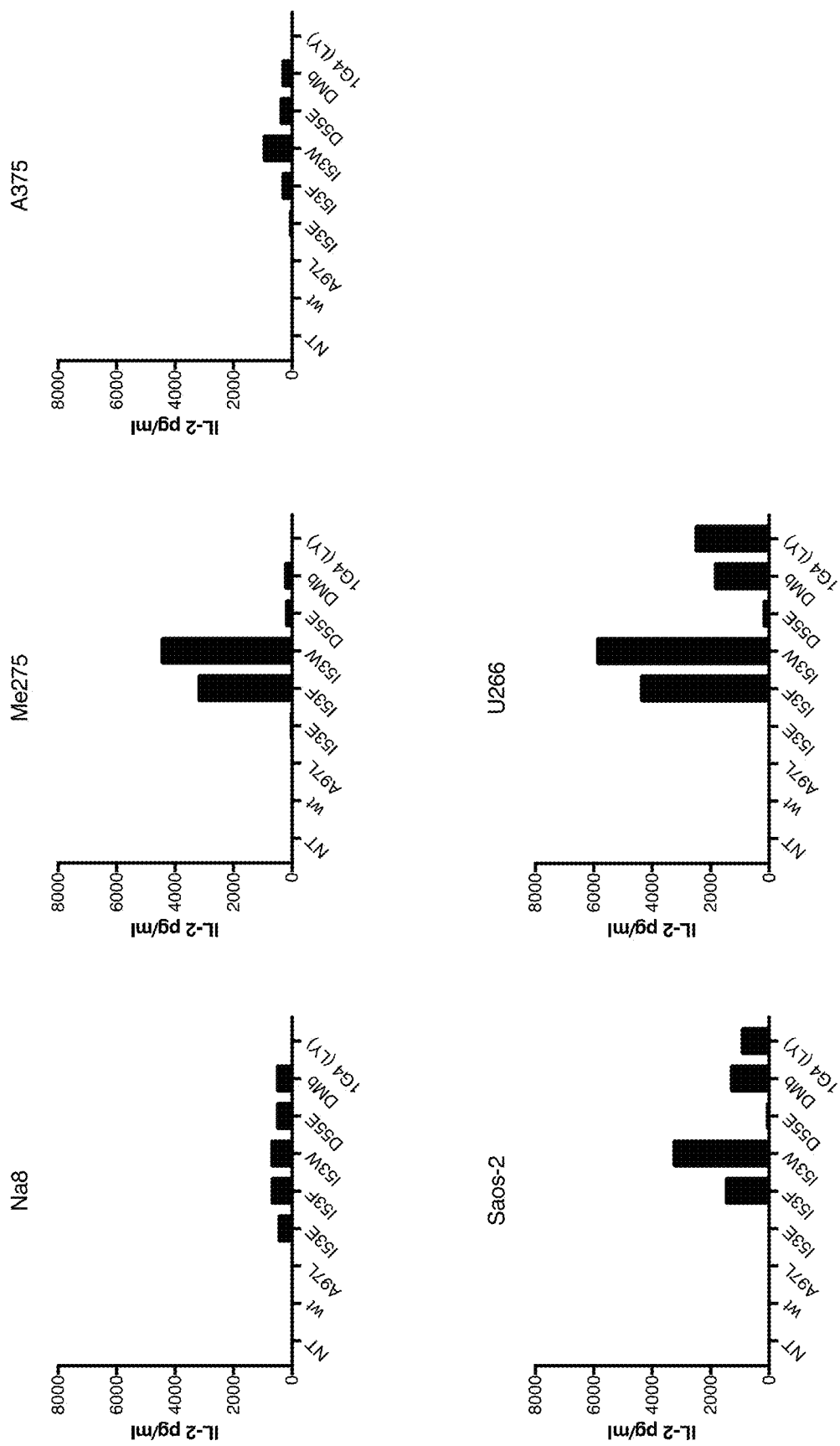
FIG. 6 shows IL-2 production of NY-ESO TCR transgenic CD4$^+$ cells. Target cells used were the HLA.A2.1 positive, NY-ESO negative cell line NA8 and the HLA.A2.1 positive, NY-ESO positive cell lines Me275, A375, Saos-2 and U266.

IL-2 is produced most efficiently by CD4+ T cells engineered to express TCR I53F, and I53W in Me275, Saos-2 and U266 cells; as compared to non-transduced (NT) cells (negative control). There is IL-2 production by CD4+ T cells engineered to express TCR DMb and 1G4LY in Saos-2 and U266 cells as compared to the other NY-ESO positive cell lines where IL-2 production is not noticeable by CD4+ T cells engineered to express TCR DMb and 1G4LY. IL-2 was not produced by CD4+ cells engineered to express TCR I53E, D55E, wild type BC1 TCR transduced cells, and cells transduced to express TCR A97L in any of the NY-ESO positive cell lines (FIG. 6). In CD4+ T cells transduced with WT BC1 TCR, the A2/NY-ESO-NY-1$_{157-165}$ recognition is CD8 receptor dependent. As this is the case, WT BC1 TCR transduced CD4+ T cells do not appear to be reactive to the NY-ESO epitope bound to MHC class I. However, when CD4+ T cells are transduced with TCR variants with higher binding affinity (as compared to the WT BC1 TCR) to the NY-ESO epitope bound to MHC class I (ie, I53F and I53W TCR), IL-2 production by these engineered T cells is observed to be higher indicating that I53F TCR transduced cells are less CD8 co-receptor dependent.

Figure 9:
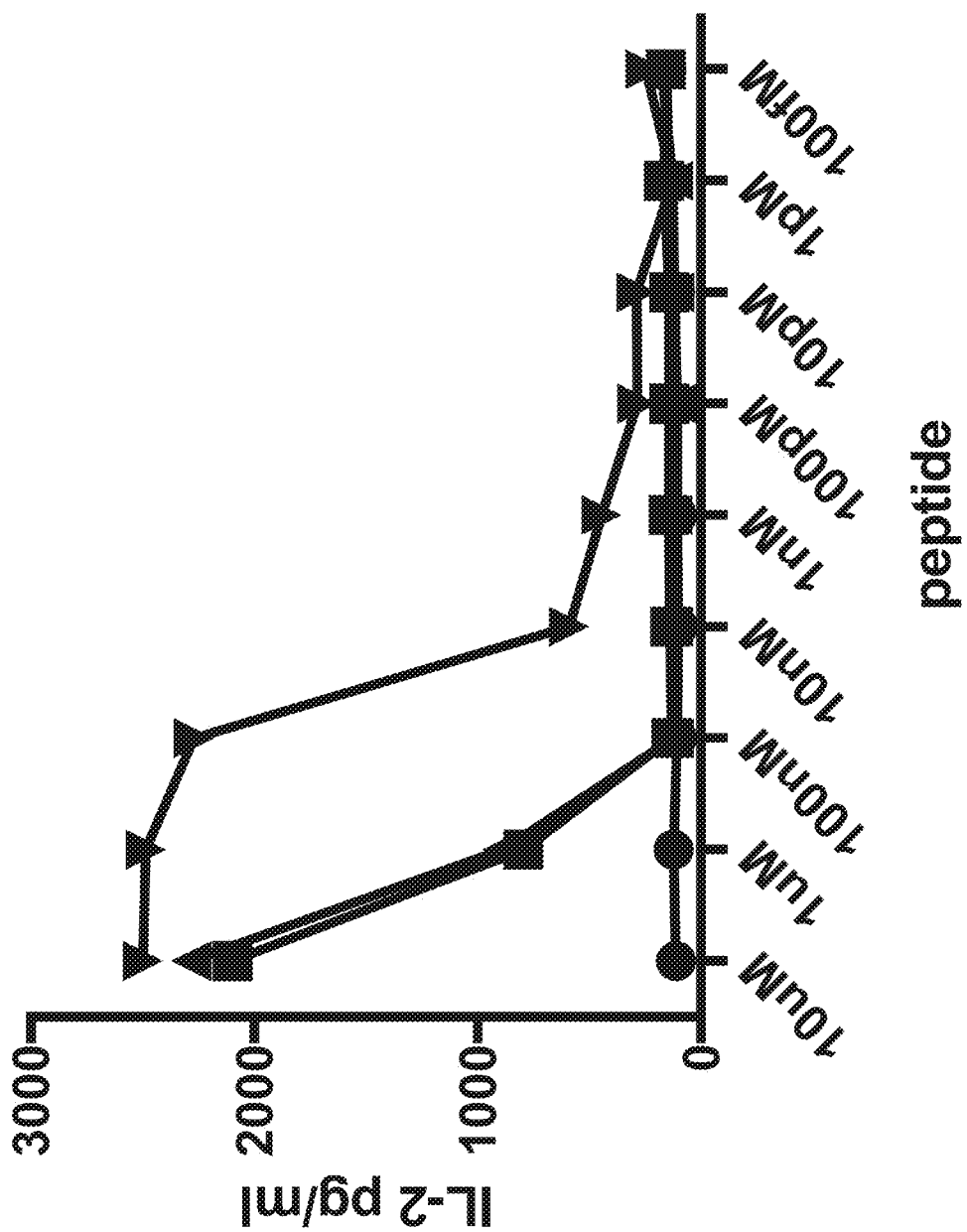
FIG. 9 shows IL-2 production of NY-ESO TCR transgenic CD4$^+$ cells (wild type BC1 TCR, I53E and I53F expressing CD4$^+$ cells) in the context of peptide-pulsed target cells. 24 hour co-culture of CD4$^+$ T cells with peptide loaded T2 target cells.

In FIG. 9, IL-2 is most efficiently produced by CD4+ T cells engineered to express TCR I53F as compared to cells engineered to express wild type BC1 TCR and I53E TCR. There is a trend for the CD4+ T cells engineered with TCR I53F to be less CD8 co-receptor dependent when compared to wild type BC1 TCR engineered cells and cells engineered to express I53E (FIG. 9) and when compared in FIG. 5, the same trend can be observed when IL-2 production by I53F TCR expressing cells are compared to wild type BC1 TCR engineered cells, cells engineered to express I53E and cells expressing A97L TCR.

Figure 4B:
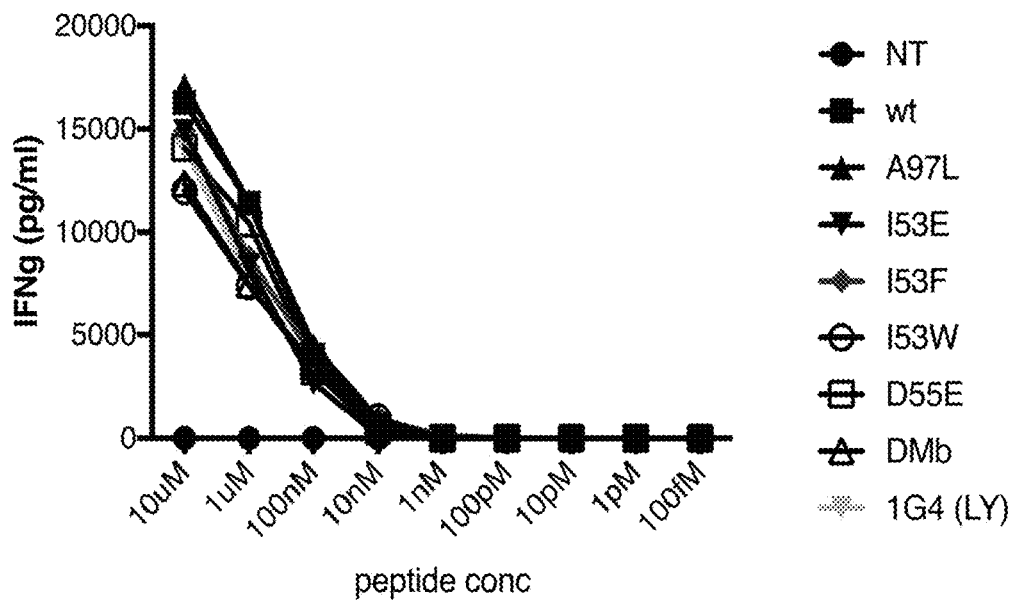

For IFN-γ produced in response to TCR-mediated activation, the engineered CD8+ cells expressing TCR A97L, I53E, I53F, I53W, D55E, DMb and 1G4LY displayed similar functionality to WT BC1 TCR in this assay. Under the same conditions, IFN-γ was not produced by non-transduced CD8+ cells (FIG. 4B).

Figure 7:
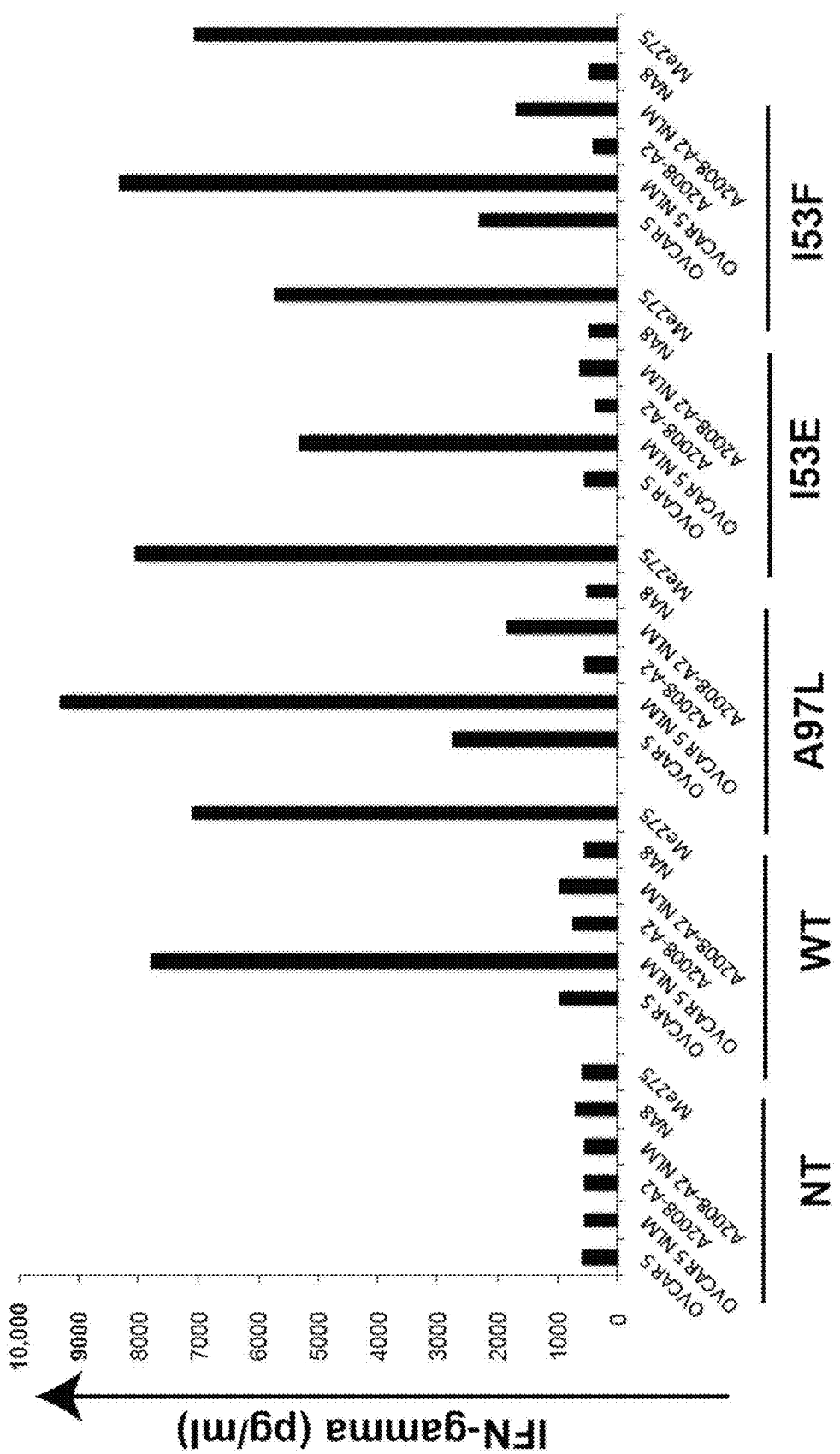
FIG. 7 shows IFN-gamma production of NY-ESO TCR transgenic CD8$^+$ cells. Target cells used were Me275 (tumor cell lines naturally expressing HLA/A2-NY-ESO-1), A2008-A2 NLM and OVCAR5 NLM (gene engineered cells to express HLA-A2-NY-ESO-1) and NA8, A2008-A2 and OVCAR5 (tumor cells lines not expressing HLA/A2-NY-ESO-1).
Figure 10:
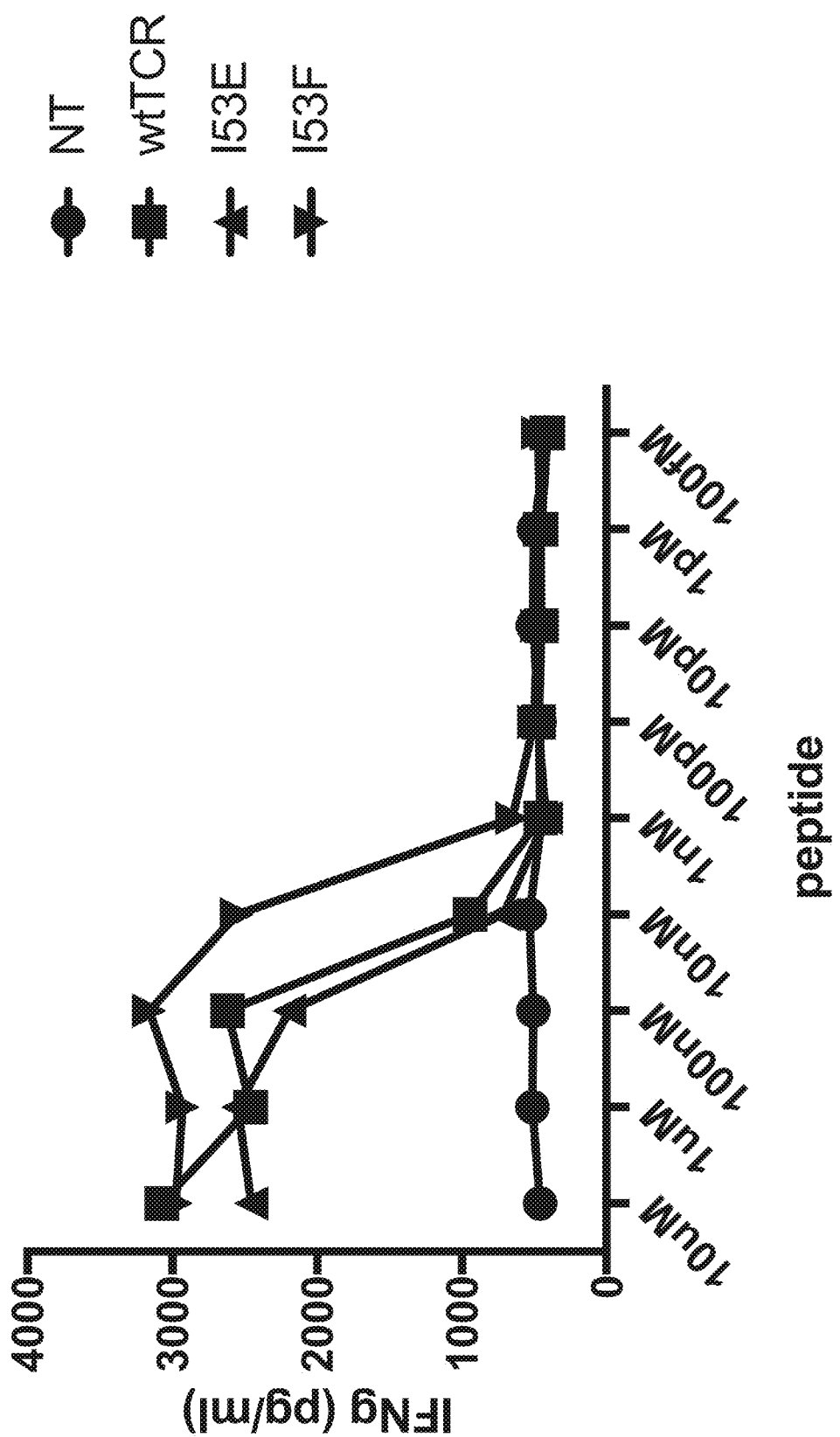
FIG. 10 shows IFN-gamma production of NY-ESO TCR transgenic CD8$^+$ cells (wild type BC1 TCR, I53E and I53F expressing CD8$^+$ cells) in the context of peptide-pulsed target cells. 24 hour co-culture of CD4$^+$ T cells with peptide loaded target cells.

IFN-gamma is efficiently produced by healthy donor (HD) T cells engineered to express TCR A97L, I53E and I53F, as compared to non-transduced (NT) cells (negative control) in tumor T cell lines naturally expressing HLA/A2-NY-ESO-1 (Me275) or gene-engineered to express HLA/A2-NY-ESO-1 (OVCAR5 NLM and A2008-A2-NLM). There is no cross reactivity with tumor cell lines not expressing HLA/A2-NY-ESO-1 (OVCAR5 and A2008-A2 and NA8). IFN-gamma production by the panel of affinity-enhanced BC1 TCR variants were similar to the T cells engineered to express wild type BC1 TCR (FIG. 7). In FIG. 10, IFN-gamma is most efficiently produced by CD8+ cells engineered to express I53F TCR when compared to wild type BC1 TCR and I53E TCR expressing cells.

Figure 8:
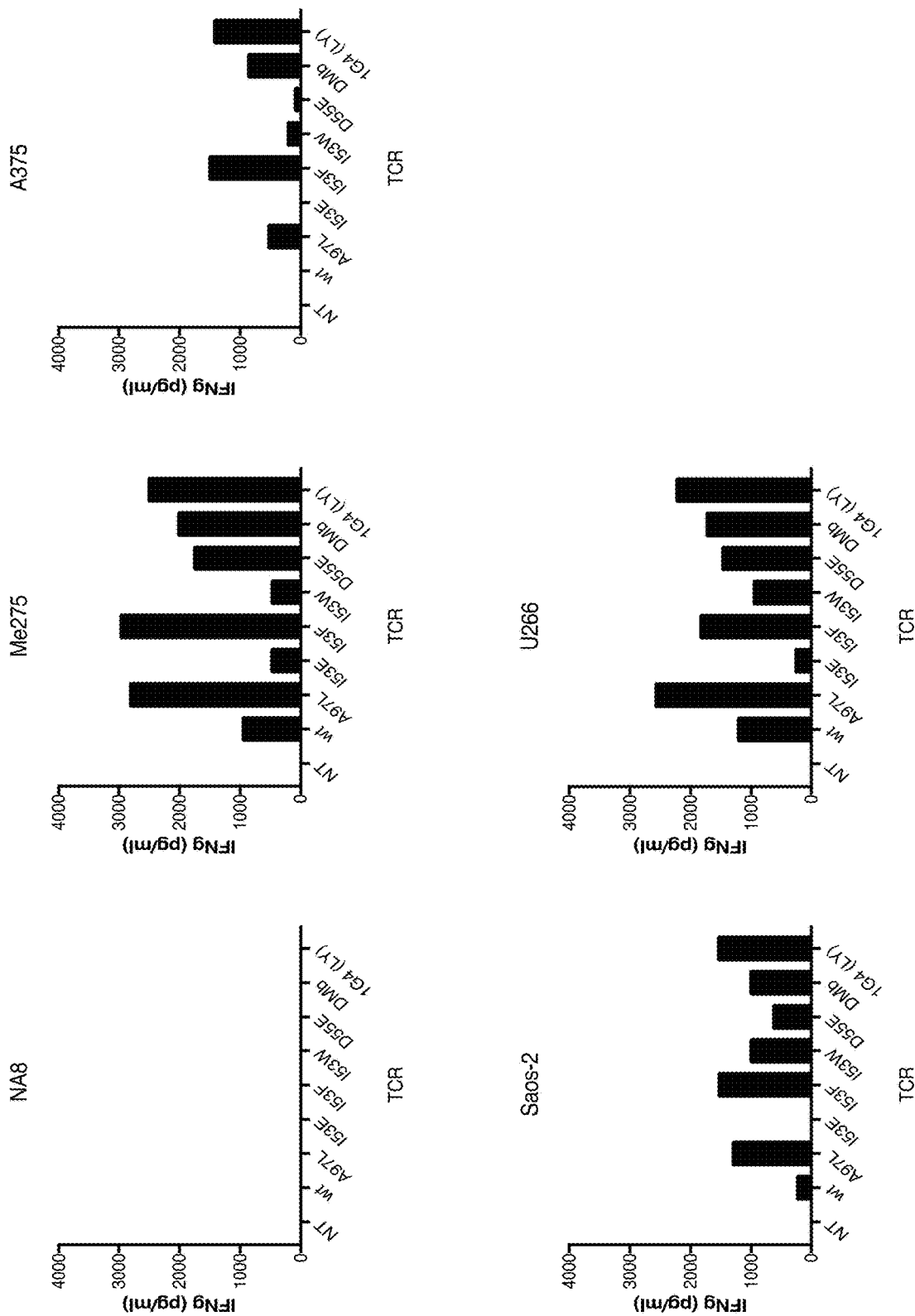
FIG. 8 shows IFN-gamma production of NY-ESO TCR transgenic CD8$^+$ cells. Target cells used were the HLA.A2.1 positive, NY-ESO negative cell line NA8 and the HLA-A2.1 positive, NY-ESO positive cell lines Me275, A375, Saos-2 and U266.

IFN-gamma is produced most efficiently by CD8+ T cells engineered to express TCR I53F, D55E and DMb in Me275 cells; I53F and DMb in A375 cells; I53F, I53W, D55E and DMb in Saos-2 cells; and I53F, I53W, D55E and DMb in U266 cells. IFN-gamma is produced efficiently by CD8+ T cells engineered to express A97L (positive control mutant for the wild type BC1 TCR) and the 1G4LY (positive control mutant for the wild type 1G4 TCR) in all of the NY-ESO positive cell lines. IFN-gamma was produced at a modest level by CD8+ T cells engineered to express wild type BC1 TCR in all NY-ESO positive cell lines except for A375 (FIG. 8).

Figure 11:
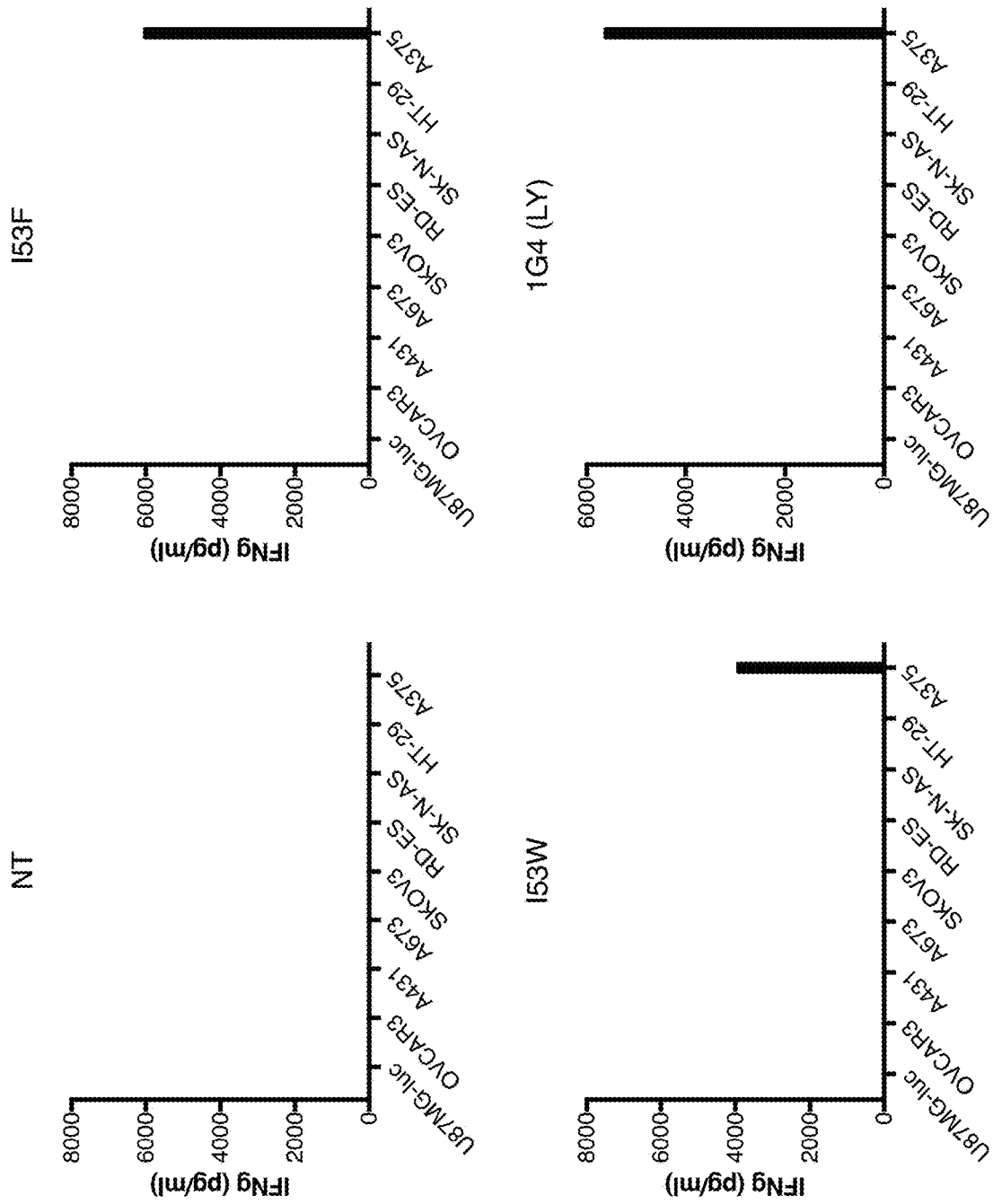
FIG. 11 shows IFN-gamma production of CD8$^+$ T cells transduced with I53F, I53W and 1G4LY TCR against different tumor cell lines. Target cells used were the NY-ESO negative cell lines U87MG, OVCAR3, A431, A673, SKOV3, RD-ES, SK-N-AS and HT-29, and the NY-ESO positive cell line A375.

CD8+ T cells engineered to express I53F TCR produced similar levels of IFN-gamma production as 1G4LY while I53W produced less IFN-gamma when compared to both I53F and 1G4(LY) when the NY-ESO positive cell line A375 was used. There was no IFN-gamma production when the NY-ESO negative cell lines were used (FIG. 11).

Example 3. Cytotoxic Activity of T Cells Expressing NY-ESO-1 TCR Variants

Cytotoxic activity of NY-ESO TCR specific CD8+ T cells was measured using the IncuCyte. Briefly, $1 \times 10^4$ T2 target cells were co-cultured with $2.5 \times 10^4$ NY-ESO tetramer positive CD8+ T cells per well in the presence of cytotoxic red reagent (Essen Bioscience, Ann Arbor, Michigan, USA). Images were taken every 2 hours using the IncuCyte zoom software.

The cytotoxic activity of CD8+ T cells transduced with I53F and I53E were similar to the cytotoxic activity of CD8+ cells expressing wild type BC1 TCR (FIG. 12).

Example 4. Anti-Tumor Activity of T Cells Expressing NY-ESO-1 TCR Variants

A Winn assay was performed where $3 \times 10^6$ Me275 cells were mixed with $6 \times 10^6$ NY-ESO specific T cells shortly before being subcutaneously injected in NOD SCID gamma KO mice (NSG). T cells comprised of 30% CD4$^+$ T cells and 70% CD8$^+$ T cells. Tumor sizes were measured twice per week. Mice were sacrificed once the tumor volume reached 1000 mm$^3$.

Figure 13A:
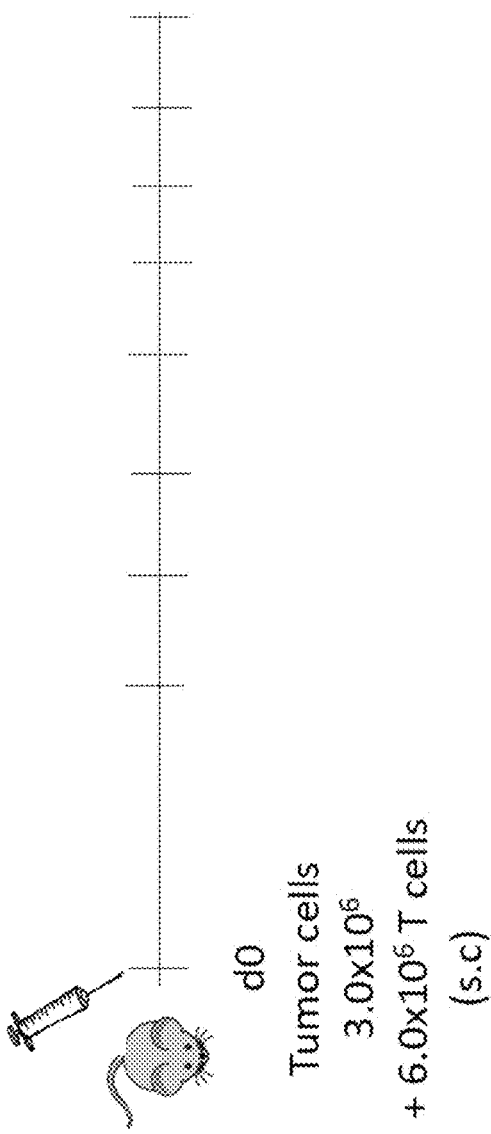
FIGS. 13A-13B show in vivo assessment of NY-ESO TCR transgenic cells using a WINN assay.
Figure 13B:
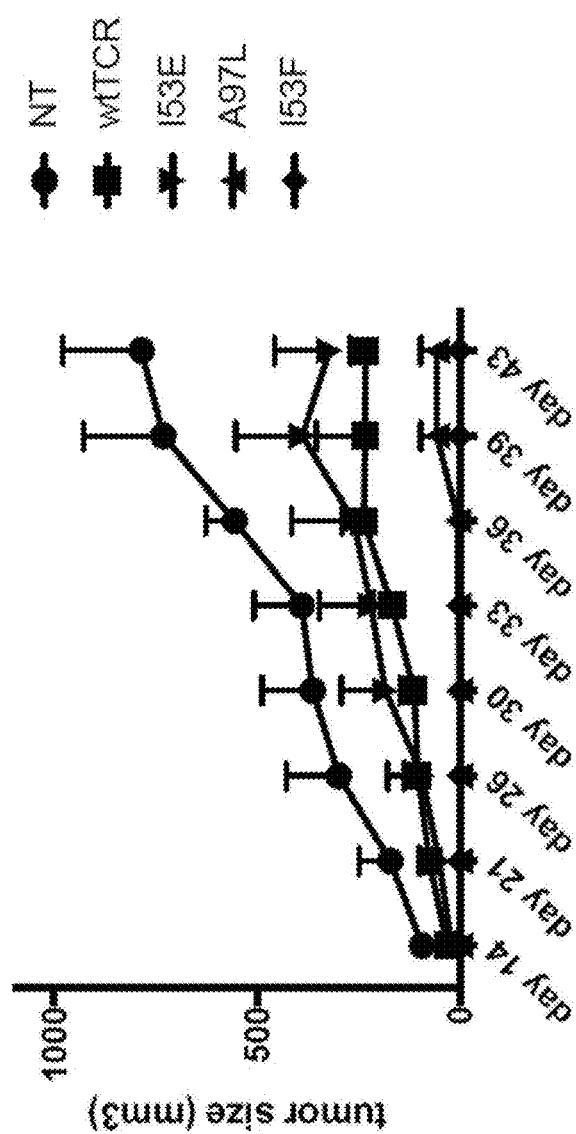

As seen in FIG. 13B, both A97L and I53F transduced T cells were efficient in keeping the tumor size at approximately 0 mm$^3$ for 43 days. I53E transduced T cells performed similar to wild type BC1 TCR transduced T cells in this assay. In the non-transduced T cells, the tumor size reached a size of approximately 700 mm$^3$ at day 43.

Example 5. Anti-Tumor Activity of T Cells Expressing NY-ESO-1 TCR Variants

NSG mice were injected with $5 \times 10^6$ Me275 cells. Once the tumors reached 50-100 mm$^3$ in size, $10 \times 10^6$ NY-ESO specific T cells were injected twice either peritumoral or intravenously (day 10 and day 13). T cells were comprised of 30% CD4$^+$ T cells and 70% CD8$^+$ T cells. Tumor sizes were measured by caliper twice per week. Once the tumors reached 1000 mm$^3$, mice were sacrificed.

A97L and I53F transduced T cells, when administrated peritumorally, were efficient in keeping the tumor size at less than 100 mm$^3$ for 30 days. I53E transduced T cells performed similar to wild type BC1 TCR transduced T cells in this assay. In the non-transduced T cells, the tumor reached a size of approximately 275 mm$^3$ at day 30 (FIG. 14B).

When administrated intravenously, T cells (obtained from healthy donor 1) transduced with I53F TCR were efficient in keeping the tumor at a negligible size over a fifty-day period (FIG. 15B, left). When T cells from another healthy donor (healthy donor 2) is used to transduce with I53F TCR, such transduced cells were efficient in keeping the tumor at less than approximately 350 mm$^3$, over a sixty five day period (FIG. 15B, right).

When administered intravenously, T cells (obtained from healthy donor 3) transduced separately with I53F and 1G4LY both were efficient and had a similar profile in keeping the tumor volume size lower when compared to non-transduced T cells at increasing titrations (FIG. 16B).

Example 6. Modified T Cells that Express a NY-ESO-1 TCR and GM-CSF

Materials and Methods

Mice

NOD.Cg-Prkdc$^{scid}$ Il2rg$^{tm1Wjl}$/SzJ (NSG) mice were bred in-house under Specific Opportunistic Pathogen Free (SOPF) conditions and all animal experiments were performed in the animal facility at the University of Lausanne under Specific Pathogen Free (SPF) conditions. All experiments were approved by the veterinary authorities of the canton of Vaud and performed in accordance to the Swiss Federal Law.

Cell Lines

Wild type parental A375 (HLA-A2$^+$, NY-ESO-1$^+$), MelAvl3 (HLA-A2$^+$, NY-ESO-1$^-$) and NA8 (HLA-A2$^+$, NY-ESO-1$^-$) melanoma, H1650 (HLA-A2$^+$, NY-ESO-1$^-$) non-small cell lung carcinoma and LN-18 (HLA-A2$^+$, NY-ESO-1$^+$) glioblastoma cell lines were purchased by ATCC. Me275 (HLA-A2$^+$, NY-ESO-1$^+$) melanoma cell line was kindly provided by Prof. D. Speiser (Lausanne branch of Ludwig Institute for Cancer Research, University of Lausanne) and was engineered to stably express luciferase to track its activity in vivo. OVCAR5 (HLA-A2$^+$, NY-ESO-1$^-$) and A2008-A2 (HLA-A2$^+$, NY-ESO-1$^-$) ovarian carcinoma cell lines were acquired from University of Pennsylvania and were engineered to stably express the full length NY-ESO-1 cancer/testis family tumor antigen sequence as well as mCherry and luciferase to track their activity in vitro and in vivo, respectively. All melanoma cell lines were maintained in IMDM+Glutamax (Thermo) supplemented with 10% FCS and 1% Penicillin/Streptomycin, whereas the remaining cell lines were maintained in RPMI (Thermo) supplemented with 10% FCS and 1% Penicillin/Streptomycin.

Molecular Cloning

The full sequence of mouse CSF2 (GM-CSF) cDNA (Uniprot: P01587) was synthesized by Invitrogen. The sequence was subsequently cloned into a pMSGV retroviral vector (Hughes, Human Gene Therapy, 2005; 16:457-472) following a Thy1.1-T2A (CD90.1) reporter gene cassette using PCR and standard molecular cloning techniques to generate pMSGV-Thy1.1-T2A-mGM-CSF retroviral plasmid. pMSGV-Thy1.1-T2A was used as a control vector.

Flow Cytometry

APC anti-human CD8, APC anti-human CD4 and APC anti-mouse Thy1.1 (CD90.1) were purchased from BioLegend. NY-ESO-1 TCR tetramer was produced in-house by the Peptide and Tetramer facility at the University of Lausanne. FITC anti-human MCSP was purchased by Miltenyi Biotec. APC anti-mouse CD45, APCCy7 anti-mouse F4/80 and PECy7 anti-mouse CD11b were kindly provided and/or produced in-house by the Flow Cytometry Facility, FBM, LICR/UNIL. Acquisition was performed in a LSRII flow cytometer (BD Biosciences) and data were analyzed on FlowJo (TreeStar).

Production of Retrovirus/Lentivirus

For the production of retroviral particles, HEK293T cells were co-transfected with pMSGV transfer plasmid and retroviral packaging plasmids pMD-Gag/Pol and pMD RD114 (Milone et al, 2018 Leukemia 32, 1529-1541) feline endogenous virus envelope glycoprotein. Culture supernatants were collected 24 h, 48 h and 72 h post-transfection and concentrated by ultracentrifugation at 24,000×g for 2 hours. Concentrated virus was stored at −80° C. until use. Viral titers and MOIs were determined by Thy1.1 reporter gene expression in HEK293T cells.

Human T Cell Stimulation and Lentiviral/Retroviral Transduction

Healthy donor apheresis products were purchased from the Transfusion Interrégionale CRS SA, Epalinges, Switzerland with written consent under an approved University Institutional Review Board protocol. PBMCs were prepared using Lymphoprep (StemCell Technologies) density gradient centrifugation and CD8 or CD4 T cells were negatively isolated using CD8 or CD4 magnetic Microbeads (Miltenyi), following the manufacturer's protocol. Isolated CD8 and CD4 T cells were stimulated with anti-CD3/CD28 beads (Invitrogen) at a 2:1 Beads:T cell ratio in the presence of human IL-2 (GlaxoSmithKline).

Lentiviral/Retroviral Transduction of Human T Cells

Lentiviral transduction of T cells was performed 24 h post-activation by direct addition of the viral particles in the culture medium (MOI 20) and was enhanced by concurrent addition of Lentiboost (Sirion Biotech). Retroviral transduction of T cells was performed 48 h post-activation. Briefly, T cells were transferred in retronectin-coated plates previously spinoculated with retroviral particles at 2000×g for 1.5 h. T cells were removed from retronectin-coated plates the next day. CD3/CD28 beads were removed 5 days post-activation and the T cells were maintained thereafter in RPMI 1640-Glutamax (ThermoFisher Scientific) supplemented with 10% heat-inactivated fetal calf serum (ThermoFisher Scientific), 1% Penicillin/Streptomycin, 10 ng/ml human IL-7 (Miltenyi) and 10 ng/ml IL-15 (Miltenyi) at 0.5-1×10$^6$ T cells/ml until downstream use.

IFNγ Production/T Cell Cytotoxicity Assay

10$^5$ rested T cells (4:1 CD8$^+$:CD4$^+$) were co-cultured with 10$^5$ tumor cells in complete medium for 48 h. T cell numbers were normalized based on transduction efficiency and non-transduced T cells were added when needed to achieve similar T cell frequencies among conditions. After 48 h, IFNγ levels in collected cell-free culture supernatants were determined by ELISA (ThermoFisher Scientific), following manufacturer's protocol. T cell cytotoxicity was determined by flow cytometry analysis of the cells and was defined as the percentage of Annexin V$^+$/DAPI$^+$ tumor cells in the culture. Results were normalized to percentage of Annexin V$^+$/DAPI$^+$ in cultures with tumor cells alone.

Transgenic Mouse GM-CSF Production by Human T Cells

T cells (CD8 or CD4) were cultured in serum-free medium supplemented with 10 ng/ml IL-7/IL-15 at a concentration of 10$^6$ T cells/ml for 24 h. Viability and cell numbers were previously determined using a hematocytometer. T cell numbers were normalized based on transduction efficiency and non-transduced T cells were added when needed to achieve similar T cell frequencies among conditions. After 24 h, mouse GM-CSF levels in collected cell-free supernatants were determined by ELISA (ThermoFisher Scientific), following manufacturer's protocol.

Generation of Bone Marrow-Derived Macrophages (BMDMs)

Whole bone marrow cells were isolated by flushing the femur and tibia of NSG mice. Macrophages were generated by incubating whole bone marrow cells in DMEM+Glutamax (Thermo) medium supplemented with 10% FCS, 1% Penicillin/Streptomycin, 50 µM β-mercaptoethanol and 50 ng/mL mouse M-CSF (Peprotech) for 7 days and harvesting the adherent fraction. Culture medium was refreshed at days 3 and 6.

Winn Assay 6-12 week-old male NSG mice were subcutaneously inoculated on the flank with 5×10$^6$ Me275 melanoma cells previously mixed with 5×10$^6$ (or otherwise indicated) NY-ESO-1 TCR-expressing, mouse GM-CSF secreting human T cells (4:1 CD8$^+$:CD4$^+$) or equivalent number of mock-transduced mouse GM-CSF secreting human T cells. Tumor growth was monitored by caliper measurements twice per week and tumor volume was calculated using the formula V=½ (L×W$^2$) where L is the greatest longitudinal diameter and width is the greatest transverse diameter. Mice were sacrificed when tumors reached 1000 mm$^3$, lost >20% of original weight or became weak and moribund. Each group consisted of mice.

Xenograft Model 6-12 week-old male NSG mice were subcutaneously inoculated on the flank with 5×10$^6$ Me275 melanoma cells. Concurrently, human T cells were activated, transduced and expanded as described above. T cells were adoptively transferred to mice when tumors reached 50-100 mm$^3$, approximately 2 weeks post-inoculation. T cells were administered twice with 1×10$^7$ NY-ESO-1 TCR-expressing, mouse GM-CSF secreting human T cells (4:1 CD8$^+$:CD4$^+$) or equivalent number of mock-transduced mouse GM-CSF secreting human T cells per injection, at days 13 and 15. Tumor growth was monitored by caliper measurements as described above.

Results and Discussion

Figure 17A:
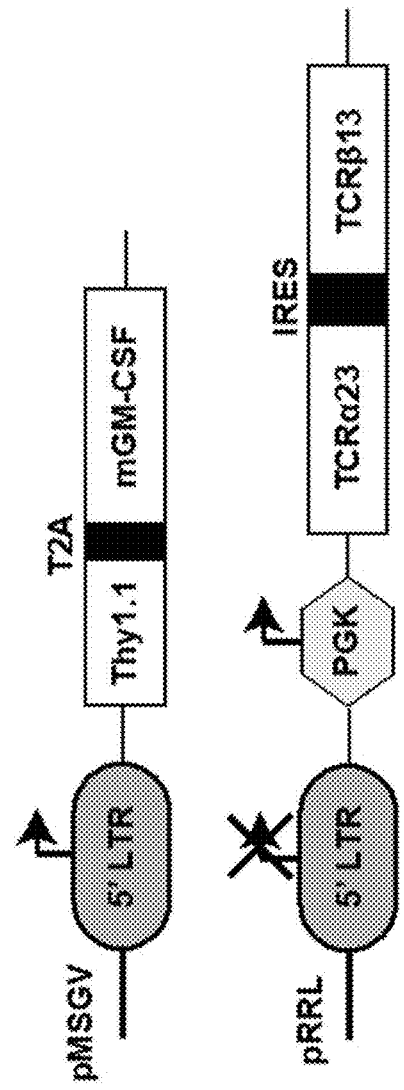

A schematic representation of retroviral mouse GM-CSF and lentiviral NY-ESO-1 TCR constructs used in the study is shown in FIG. 17A. At day 7 post-viral transduction, expression of NY-ESO-1 TCR and mouse GM-CSF by human CD8$^+$ and CD4$^+$ T cells was confirmed by flow cytometry (FIG. 17B). Secreted mouse GM-CSF can be detected by ELISA in supernatants of transduced CD8$^+$ T cell cultures (FIG. 17C). This demonstrates that human T cells can be efficiently co-engineered to stably express NY-ESO-1 TCR and secrete mouse GM-CSF.

Figure 18A:
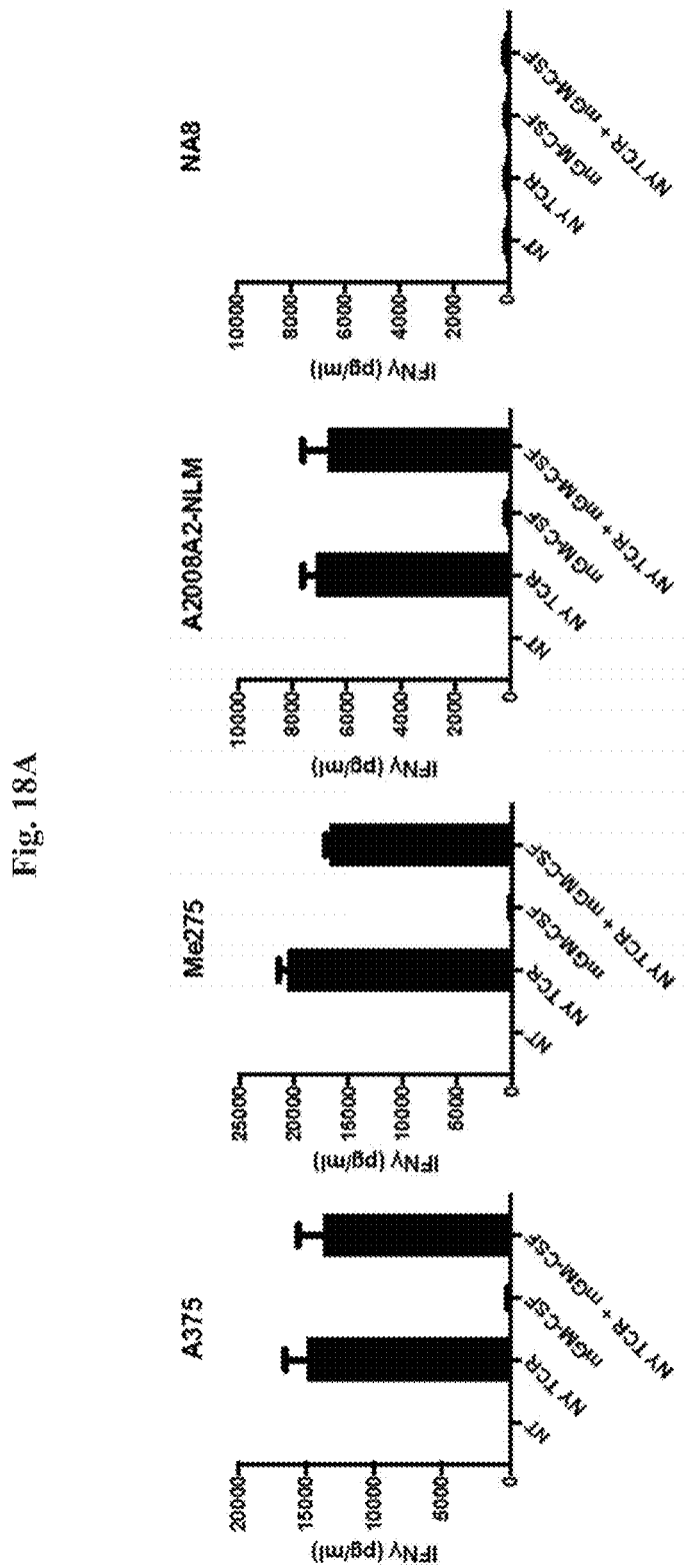
FIGS. 18A-18B demonstrate that secreted mouse GM-CSF does not have an impact on human T cell activity.
Figure 18B:
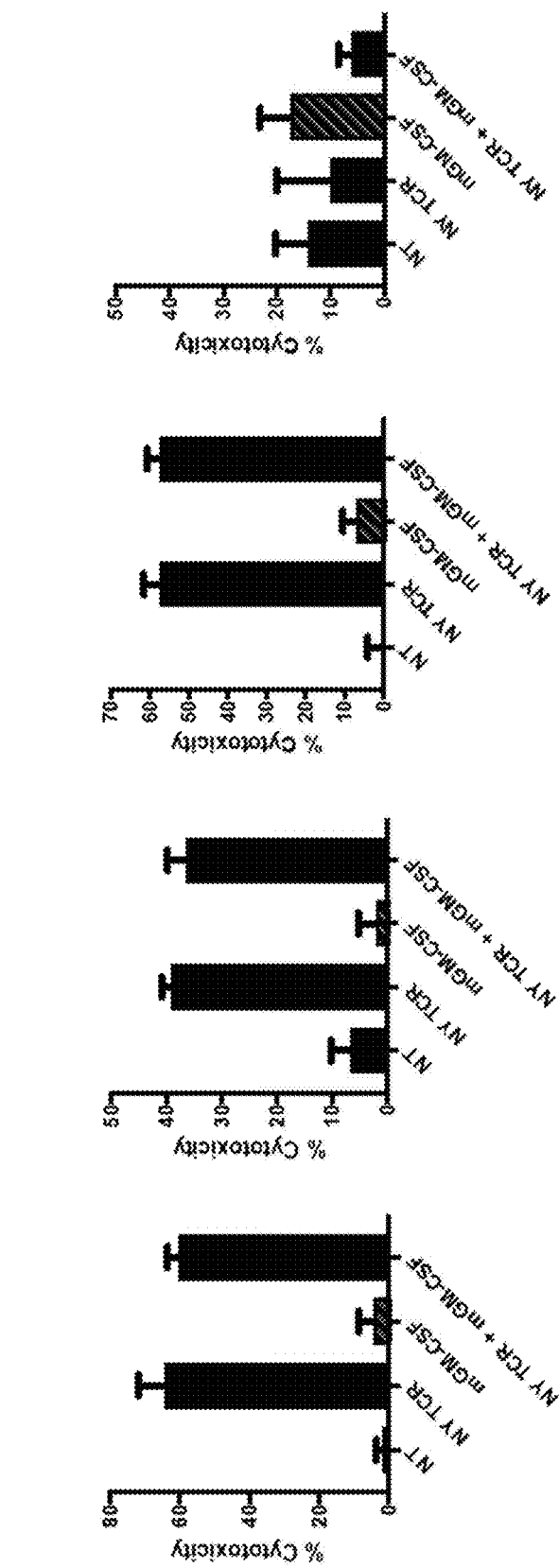

IFNγ secretion by NY-ESO-1 TCR-engineered T cells can be detected upon recognition of HLA-A2$^+$ NY-ESO-1$^+$ tumor cells (FIG. 18A). There is no effect of mouse GM-CSF on IFNγ levels. NY-ESO-1 TCR-engineered T cells can readily kill HLA-A2$^+$ NY-ESO-1$^+$ tumor cells and their cytotoxic activity is not affected by mouse GM-CSF (FIG. 18B). This demonstrates that secreted mouse GM-CSF does not have an impact on human T cell activity.

Figure 19B:
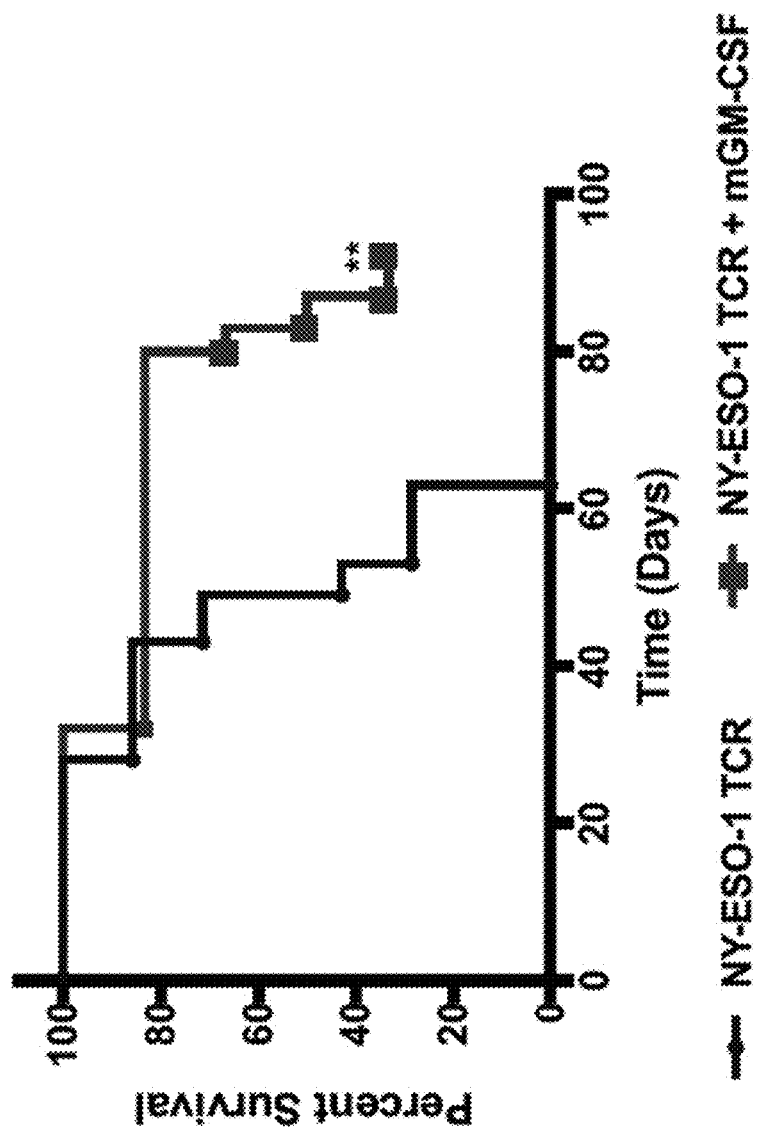
Figure 19C:
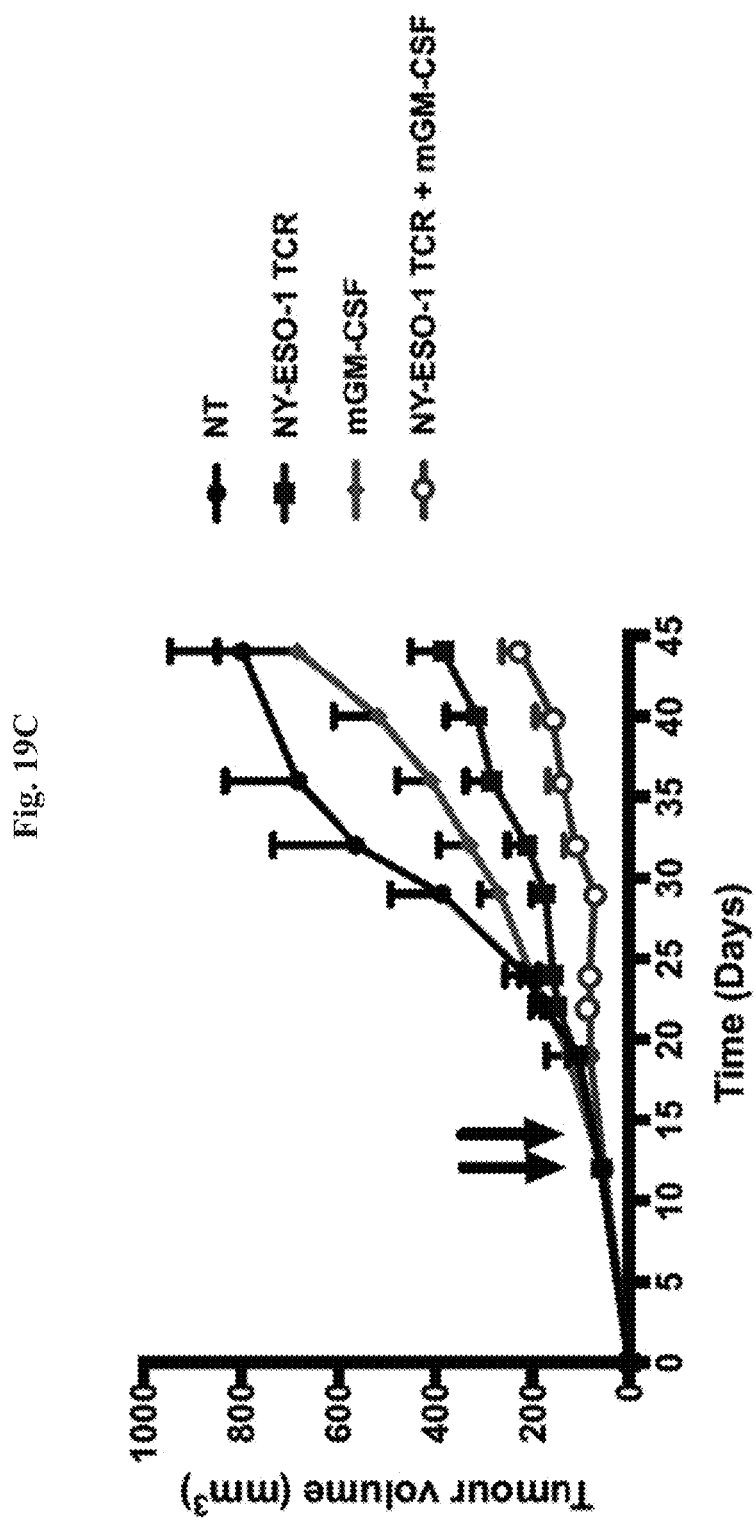

Human NY-ESO-1 TCR-expressing T cells co-engineered to secrete mouse GM-CSF can efficiently slow down the engraftment and establishment of Me275 melanoma cells compared to control T cells expressing NY-ESO-1 TCR alone (FIG. 19A). This greatly reflects on the survival of the mice with 40% of the mice treated with NY-ESO-1 TCR-expressing mouse GM-CSF-secreting T cells were tumor-free (FIG. 19B). Adoptive transfer of 2×10$^7$ NY-ESO-1 TCR-expressing mouse GM-CSF-secreting T cells demonstrated better tumor control of established Me275 tumors compared to NY-ESO-1 TCR alone (FIG. 19C). This demonstrates that T-cell derived mouse GM-CSF secreted in the tumor microenvironment can significantly enhance control of tumor growth by NY-ESO-1-specific T cells in an NSG human melanoma xenograft mouse model.

Example 7. Modified T Cells that Express NY-ESO-1 TCR "I53F" Variant and PDE4B2

Materials and Methods

Molecular Cloning

The lentiviral vector pRRL, used in Bobisse, S. et al. Cancer Res. 69, 9385-9394 (2009), was employed to overexpress the human PDE4B2 homologue in human T cells. In particular, the sequence cloned downstream of the human PGK promoter and a Kozak element (GCCACC (SEQ ID NO: 31)) codes for the human WT PDE4B2 (NCBI Reference Sequence: NP_001032416.1; SEQ ID NO: 27 in FIG. 26), and is fused via a DGGG (SEQ ID NO: 32) linker, to the following amino acid sequence: GKPIPNPLLGLD-STGGSGGGKPIPNPLLGLDSTGSGSGSGKPIPN-PLLGLDST (SEQ ID NO: 33). This sequence comprises three repeats of the V5 tag epitope as well as two linkers used in Reddy Chichili et al., Protein Sci. 22, 153-167 (2013). For the engineering of control T cells, the same pRRL vector backbone was employed into which the eGFP coding sequence was introduced downstream of the human PGK promoter and the Kozak element. To endow T cells with NY-ESO-1 antigen specificity, a SFG retroviral vector, used in Lamers, C. H. J. et al. Cancer Gene Ther. 15, 268-274 (2008), was employed which codes for the alpha as well as the beta chains of the NY-ESO-1 TCR variant β-I53F. All the DNA sequences introduced were codon optimized for protein expression in human cells.

Concentrated Lentivirus or Retrovirus Production

HEK-293T cells were transfected with the aim to produce viral particles. In brief, for the generation of lentiviral particles 18 μg of the gag/pol-encoding R8.74 plasmid, 7 μg of the envelope protein-encoding VSVG plasmid as well as 15 μg of transgene-encoding pRRL vector were diluted with 120 μl of TurboFect (R0532, Thermo Fisher Scientific) which had been premixed with 3 mL Opti-MEM (11058-021, Thermo Fisher Scientific). In similar fashion, for the production of retroviral particles 18 μg of the gag/pol-encoding PegPam, 7 μg the envelope protein-encoding RD114 plasmid, as well as 22 μg of the SFG retroviral vector were diluted with 120 μl of TurboFect that was premixed with 3 mL Opti-MEM. Of note, TurboFect/Opti-MEM solution was incubated for 5 minutes at room temperature before being used to dilute the packaging/transgene plasmids. Subsequently, the transfection mix was incubated at room temperature for 30 minutes before being added on top of fresh R10 medium, composed of RPMI 1640 (11875085, Thermo Fisher Scientific) supplemented with 10% fetal calf serum and penicillin/streptomycin (4-01F00-H, Bioconcept), in a T150 tissue-culture flask containing 90-95%-confluent HEK-293T cells. 24 hours later, the culture supernatant was replaced with fresh R10 which was harvested after the passing of another 24 hours and subjected to filtration (45 μm) as well as to 24000 g centrifugation for 2 hours. Finally, viral particles were resuspended in 400 μl R10 before being snap frozen with dry ice and placed at −80° C.

T Cell Isolation, Transduction and Culture

PBMCs from healthy donors were isolated on day 0 via standard Ficoll-Paque centrifugation and $CD4^+$ or $CD8^+$ T cells were purified by using the respective negative isolation kits (130-096-533, 130-096-495 Miltenyi) according to the manufacturers' instructions. Immediately upon isolation, T cells were stimulated in R10 with anti-CD3/CD28 coated microbeads (11132D, Thermo Fisher Scientific), at a ratio of 2 beads per T cell in the presence of 50 U/mL of recombinant human IL2 (gift from Glaxo SmithKline). T cells were activated in 48 well plates, $0.5 \times 10^6$ T cells per well, at a concentration of $1 \times 10^6$ T cells per mL. For lentiviral transduction, 100 μls of concentrated lentivirus was added per well, containing $0.5 \times 10^6$ T cells, 18-22 hours post stimulation in the presence of LentiBOOST™ (Sirion Biotech GmbH) which was used at 1:500 dilution. Retroviral transductions occurred within wells of non-treated 48 well cell culture plates. Specifically, such wells were coated overnight at 4° C. with 20 ng/mL RetroNectin (T100B, Takara) solution in PBS before being washed with PBS and successively blocked with R10 for 30 minutes at 37° C. After washing these wells with PBS, 50 μls of concentrated retrovirus were added along with 50 μl of R10 and the plates were centrifuged at 2000 g for 90 minutes at 25 degrees. To perform retrovirus co-transductions, T cells previously exposed in lentivirus were transferred into RetroNectin/retrovirus-coated wells, within 40-44 hours post stimulation, and spun down for 10 minutes at 260 g. Such T cells were transferred to tissue culture-treated wells 24 hours post retrovirus transduction. To support T cell expansion, R10 supplemented with IL2 (50 U/mL) was added to the cultures up to Day 5, time point when the T cell activation microbeads were removed. From Day 5 onwards, R10 supplemented with 10 ng/mL of recombinant human IL7 and IL15 (130-095-764, 130-095-362, Miltenyi) was added to the T cell cultures. Transduction efficiencies were assessed via FACS at day 7 while T cells were used for intracellular cAMP quantification or for functional assays anytime between Day 8-21.

Measurement of cAMP

Rested T cells were washed and exposed to various concentrations of Forskolin or $PGE_2$ for 1 hour. T cells were treated at a concentration of $1 \times 10^6$ T cells per mL in 12-well plates whereas $2.5 \times 10^6$ T cells were used per condition. Subsequently, T cells were lysed with 250 μl of 0.1 M HCl and their intracellular cAMP content was assessed with a direct cAMP ELISA kit (ADI-900-066, Enzo Life Sciences) according to the manufacturers' instructions.

Flow Cytometry

All FACS data were acquired at an LCRII flow cytometer (BD) and analyzed using FlowJo software. The fixable aqua dead dyes L34965 or L34975 (Invitrogen) were used as per manufacturer's instructions for dead cell exclusion while the following antibodies were used for T cell staining: CD45: Pac Blue (304029, BioLegend), anti-V5tag:FITC (R96325, Thermo Fisher Scientific), anti-V5tag:Dy650 (NBP2-52653C, Novus biologicals), Vb13.1:PE (IM2292, BD), IFNγ:PeCy7 (502527, BioLegend), TNF-α:PE (502909, BioLegend), anti-BrDU:APC (12-5071-42, Thermo Fisher Scientific). In order to assess intracellular cytokine production via FACS, $50 \times 10^3$ of alive T cells per well were activated with the combination of plate-coated aCD3 (5 μg/mL) and soluble αCD28 (2 μg/mL) for 7 hours in round bottom 96-well plates. To prevent cytokine secretion, Golgi stop was added (554724, BD) at a dilution of 1:400 to the wells 1.5 hours after the initiation of the assay. A standard fixation/permeabilization kit (554714, BD) was used according to manufacturer's instructions to fix and permeabilize the T cells before assessing their transduction efficiency or their capacity to produce cytokines. The BrdU staining kit for flow cytometry (8817-6600-42, Thermo Fisher Scientific) was used to quantify T cell proliferation. Briefly, $1 \times 10^5$ of alive T cells per well were activated with plate-coated αCD3 (5 μg/mL) for 48 hours within flat bottom 96-well plates and BrdU was added to the wells, at a working concentration of 10 μM, 7 hours before the termination of the assay.

Quantification of IFNγ Secretion

Rested eGFP-, PDE4B2-, eGFP&NY-ESO-1 TCR- or PDE4B2&NY-ESO-1 TCR-transduced CD8 T cells, were co-cultured for 48 hours with NY-ESO-1-presenting melanoma cells A375 in various concentrations of $PGE_2$ or of Forskolin and the presence of IFNγ in the co-culture supernatants was assessed via the ELISA kit (88-7316-88, Thermo Fisher Scientific) according to manufacturer's instructions. Co-cultures took place in flat bottom 96 well plates into which $1 \times 10^5$ A375 cells as well as $1 \times 10^5$ $TCR^+$ of alive T cells, or corresponding numbers of eGFP-/PDE4B2-transduced T cells were added per well.

Cytotoxicity Assay

Rested eGFP-, PDE4B2-, eGFP&NY-ESO-1 TCR- or PDE4B2&NY-ESO-1 TCR-transduced CD4 or CD8 T cells, were co-cultured with A375 cells, in presence or absence of $PGE_2$, for 47 or 44 hours respectively. The co-cultures, monitored by the IncuCyte instrument, took place in flat bottom 96 well plates into which $1 \times 10^4$ A375 tumor cells as well as $25 \times 10^3$ $TCR^+$ of alive T cells, or corresponding numbers of eGFP-/PDE4B2-transduced T cells, were added per well. The A375 tumor cells employed were engineered to express the nuclear fluorescent protein mCherry in order to enable their direct detection in the wells.

Results and Discussion

Figure 21:
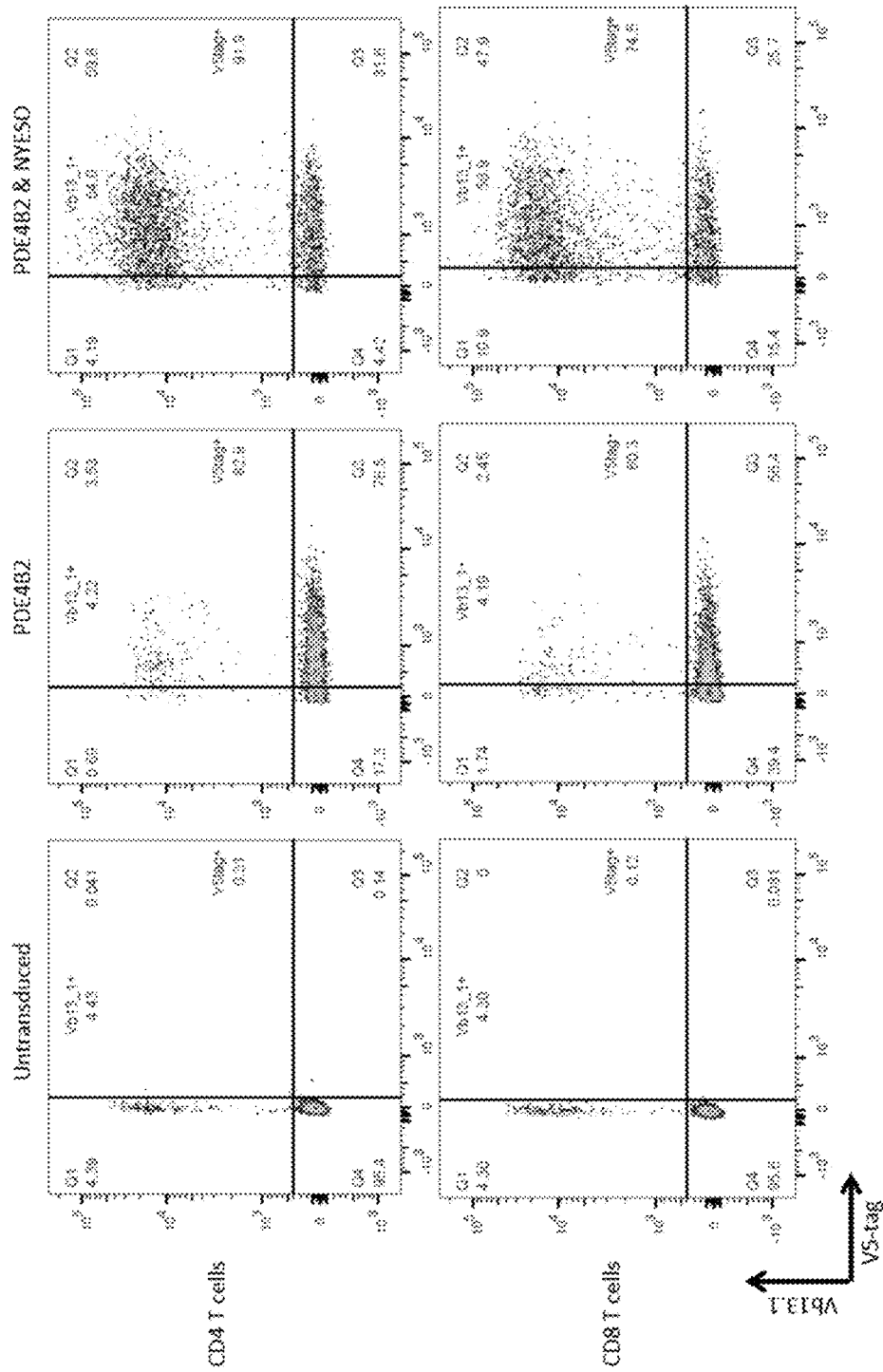
FIG. 21 demonstrates that primary human T cells can be effectively transduced to express exogenous Phosphodiesterase 4B2 (PDE4B2) or co-transduced to express exogenous PDE4B2 and the NY-ESO-1 TCR variant β-I53F. Depicted are untransduced, PDE4B2-transduced as well as PDE4B2&NY-ESO-1 TCR-transduced CD4+ and CD8+ T cells interrogated via flow cytometry at day 7 for the expression of exogenous PDE4B2 or of the NY-ESO-1 TCR variant β-I53F.

Expression of exogenous PDE4B2 or co-expression of exogenous PDE4B2 and the NY-ESO-1 TCR variant β-I53F in primary human T cells was confirmed by flow cytometry (FIG. 21). Since the NY-ESO-1 TCR comprises the Vβ13.1 variant of the TCR β chain, presence of the former can be inferred, although not entirely accurately, via detection of Vβ13.1.

Figure 22:
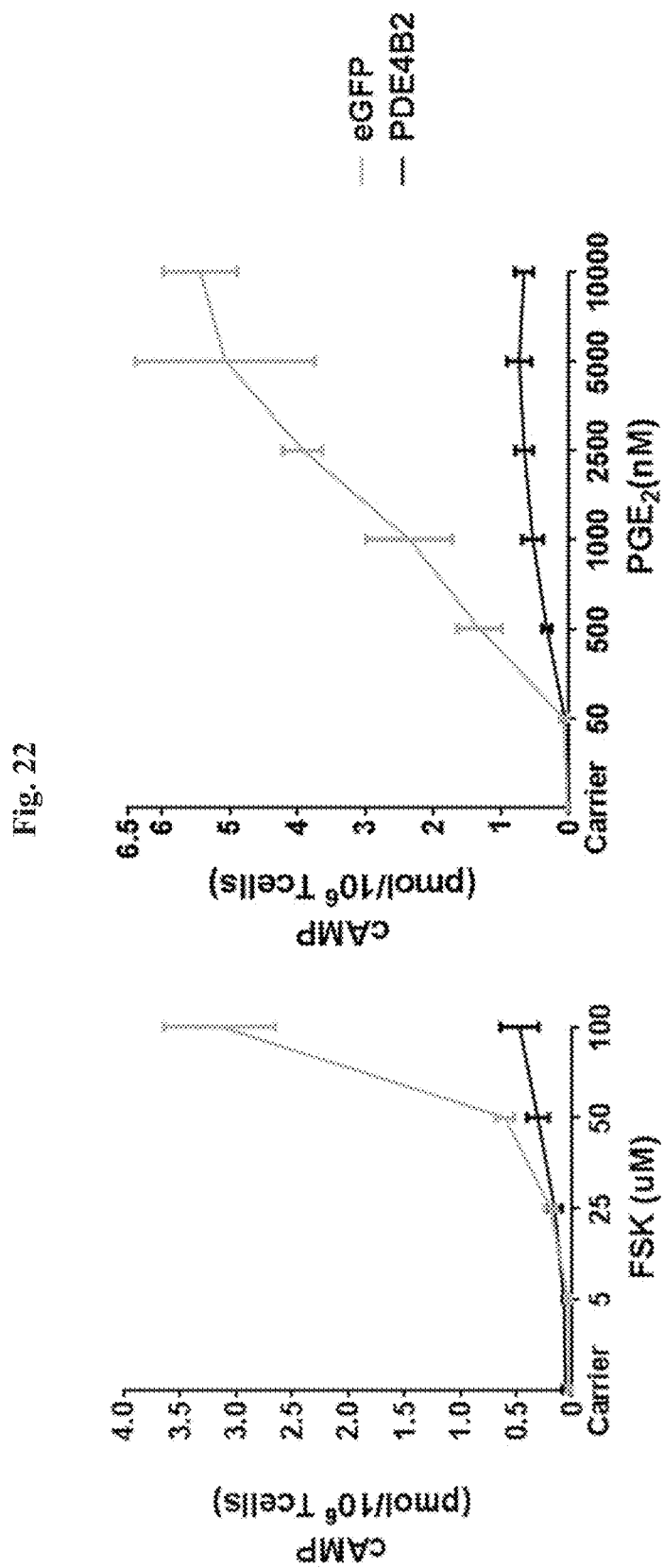
FIG. 22 demonstrates that PDE4B2 overexpression prevents intracellular cAMP accumulation. Depicted are the intracellular cAMP levels of rested eGFP (gray lines)- or PDE4B2 (black lines)-transduced CD4 T cells upon 1 hour of exposure to Forskolin (Fsk) or PGE$_2$. Following the treatments, T cells were lysed and cAMP levels were quantified via ELISA. Results shown are from a single experiment where all the cAMP measurements were performed in triplicate. Error bars represent standard deviation (SD).

Intracellular cAMP levels of rested eGFP- or PDE4B2-transduced CD4 T cells was determined upon 1 hour of exposure to Fsk or PGE2. Following the treatments, T cells were lysed and cAMP levels were quantified via ELISA. The results show that PDE4B2 overexpression prevents intracellular cAMP accumulation (FIG. 22).

Figure 23B:
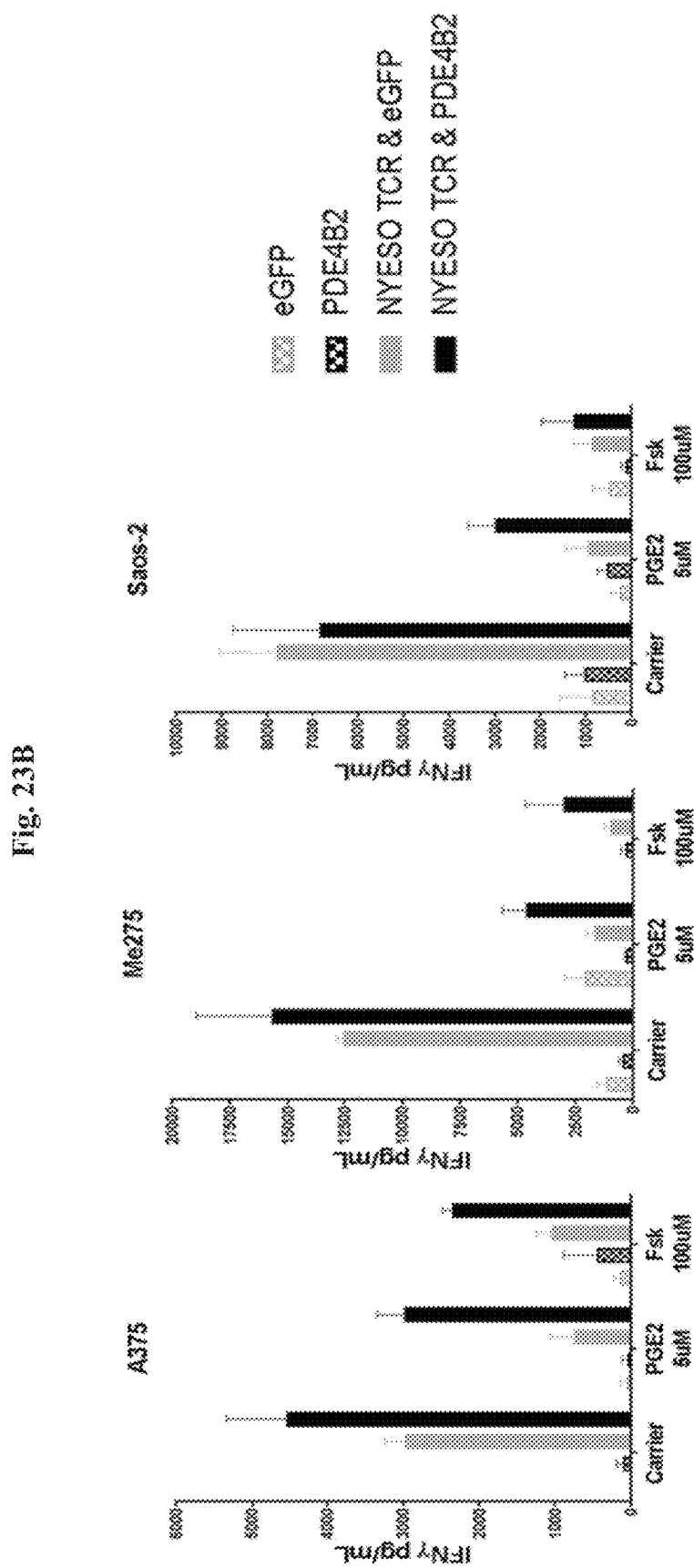

The capacity of rested eGFP- or PDE4B2-transduced CD4 T cells to produce IFNγ, or TNF-α was determined via intracellular cytokine staining (ICS) 7 hours upon stimulation with or without plate-bound aCD3 and soluble aCD28 in the presence of $PGE_2$ or Forskolin. The secretion of IFNγ by rested eGFP-, PDE4B2-, eGFP&NY-ESO-1 TCR- or PDE4B2&NY-ESO-1 TCR-transduced CD8 T cells in response to 48 hours co-culture with the NY-ESO-1-presenting melanoma cells A375 in the presence of $PGE_2$ or of Forskolin was assessed via ELISA. Both results show that PDE4B2 overexpression promotes Th-1 cytokine production under conditions that induce intracellular cAMP accumulation (FIGS. 23A, 23B).

Figure 24:
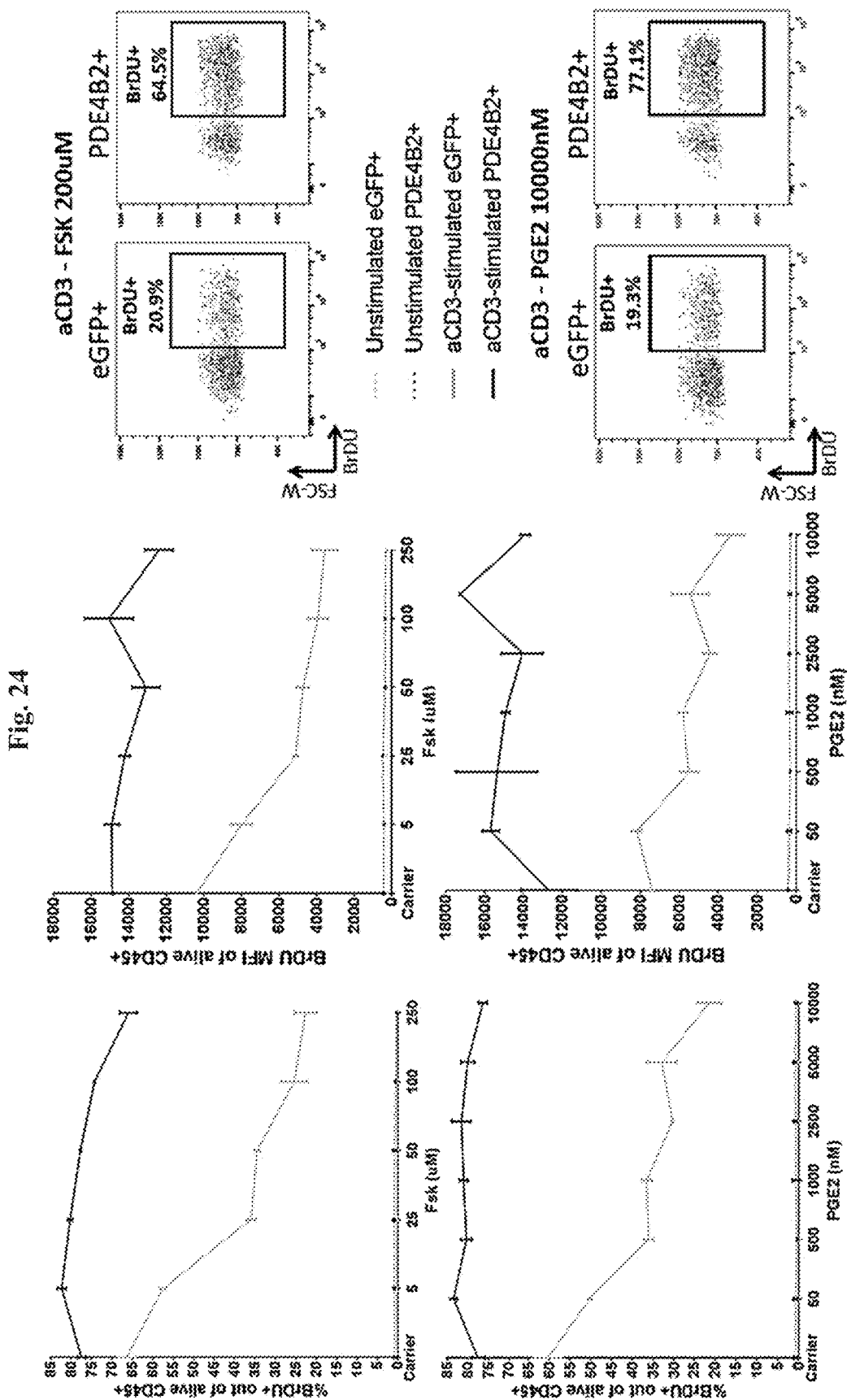
FIG. 24 demonstrates that PDE4B2 overexpression promotes proliferation under conditions that induce intracellular cAMP accumulation. The capacity of eGFP-(gray) or PDE4B2-transduced (black) CD4 T cells to proliferate was determined via BrDU incorporation assay. T cells were re-stimulated with plate-bound αCD3 (continuous lines), or without (dotted lines) in presence of PGE$_2$ or Forskolin for 48 hours. Depicted are the percentages of BrDU+ cells (graphs on the left) within alive CD45+ lymphocytes, the BrDU MFI of these populations (graphs on the middle) as well as representative plots. Results shown are from a single experiment where all conditions were performed in duplicate. Error bars represent SD.

The capacity of eGFP- or PDE4B2-transduced CD4 T cells to proliferate was determined via BrDU incorporation assay. T cells were re-stimulated with or without plate-bound αCD3 in presence of $PGE_2$ or Forskolin for 48 hours. The results show that PDE4B2 overexpression promotes proliferation under conditions that induce intracellular cAMP accumulation (FIG. 24).

Figure 25:
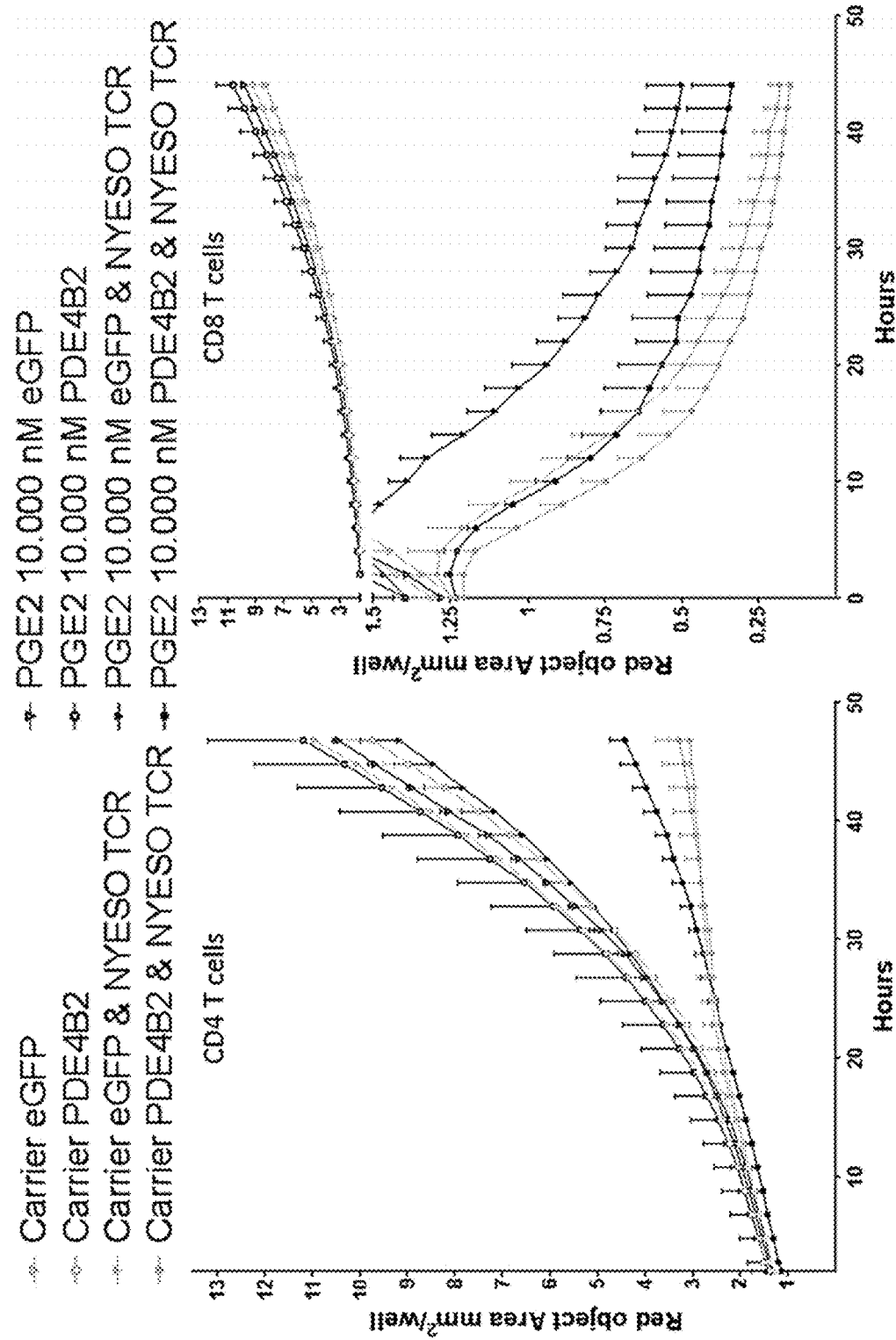
FIG. 25 demonstrates that PDE4B2 overexpression promotes cytotoxicity in presence of PGE$_2$. The capacity of rested eGFP (open triangles)-, PDE4B2 (open circles)-, eGFP&NY-ESO-1 TCR (closed triangles)- or PDE4B2&NY-ESO-1 TCR (closed circles)-transduced CD4 (left graph) or CD8 (right graph) T cells to curb the expansion of the NY-ESO-1-presenting melanoma cells A375 in the presence of PGE$_2$ (black lines) or absence (gray lines) was assessed by IncuCyte. Depicted are the red object area values which correspond to mm$^2$ occupied by nuclei of A375 cells per well. Results shown are from a single experiment where all conditions were performed in triplicate. Four different planes per well were incorporated into the analysis. Error bars represent SD.

The capacity of rested eGFP-, PDE4B2-, eGFP&NY-ESO-1 TCR- or PDE4B2&NY-ESO-1 TCR-transduced CD4 or CD8 T cells to curb the expansion of the NY-ESO-1-presenting melanoma cells A375 in the presence or absence of $PGE_2$ was assessed by IncuCyte. As shown in FIG. 25, PDE4B2 overexpression promotes cytotoxicity of T cells in presence of $PGE_2$.

REFERENCES

1. Dunn, S. M., Rizkallah, P. J., Baston, E., Mahon, T., Cameron, B., Moysey, R., Gao, F., Sami, M., Boulter, J., Li, Y., and Jakobsen, B. K. (2006) Directed evolution of human T cell receptor CDR2 residues by phage display dramatically enhances affinity for cognate peptide-MHC without increasing apparent cross-reactivity. Protein Sci 15, 710-721.
2. Robbins, P. F., Morgan, R. A., Feldman, S. A., Yang, J. C., Sherry, R. M., Dudley, M. E., Wunderlich, J. R., Nahvi, A. V., Helman, L. J., Mackall, C. L., Kammula, U. S., Hughes, M. S., Restifo, N. P., Raffeld, M., Lee, C. C., Levy, C. L., Li, Y. F., El-Gamil, M., Schwarz, S. L., Laurencot, C., and Rosenberg, S. A. (2011) Tumor regression in patients with metastatic synovial cell sarcoma and melanoma using genetically engineered lymphocytes reactive with NY-ESO-1. J Clin Oncol 29, 917-924.
3. Rapoport, A. P., Stadtmauer, E. A., Binder-Scholl, G. K., Goloubeva, O., Vogl, D. T., Lacey, S. F., Badros, A. Z., Garfall, A., Weiss, B., Finklestein, J., Kulikovskaya, I., Sinha, S. K., Kronsberg, S., Gupta, M., Bond, S., Melchiori, L., Brewer, J. E., Bennett, A. D., Gerry, A. B., Pumphrey, N. J., Williams, D., Tayton-Martin, H. K., Ribeiro, L., Holdich, T., Yanovich, S., Hardy, N., Yared, J., Kerr, N., Philip, S., Westphal, S., Siegel, D. L., Levine, B. L., Jakobsen, B. K., Kalos, M., and June, C. H. (2015) NY-ESO-1-specific TCR-engineered T cells mediate sustained antigen-specific antitumor effects in myeloma. Nat Med 21, 914-921.
4. Chen, J. L., Stewart-Jones, G., Bossi, G., Lissin, N. M., Wooldridge, L., Choi, E. M., Held, G., Dunbar, P. R., Esnouf, R. M., Sami, M., Boulter, J. M., Rizkallah, P., Renner, C., Sewell, A., van der Merwe, P. A., Jakobsen, B. K., Griffiths, G., Jones, E. Y., and Cerundolo, V. (2005) Structural and kinetic basis for heightened immunogenicity of T cell vaccines. J Exp Med 201, 1243-1255.
5. Zoete, V., Irving, M. B., and Michielin, O. (2010) MM-GBSA binding free energy decomposition and T cell receptor engineering. Journal of molecular recognition. JMR 23, 142-152.
6. Zoete, V., and Michielin, O. (2007) Comparison between computational alanine scanning and per-residue binding free energy decomposition for protein-protein association using MM-GBSA: application to the TCR-p-MHC complex. Proteins 67, 1026-1047.
7. Zoete, V., Meuwly, M., and Karplus, M. (2005) Study of the insulin dimerization: binding free energy calculations and per-residue free energy decomposition. Proteins 61, 79-93.
8. Pettersen, E. F., Goddard, T. D., Huang, C. C., Couch, G. S., Greenblatt, D. M., Meng, E. C., and Ferrin, T. E. (2004) UCSF Chimera—a visualization system for exploratory research and analysis. J Comput Chem 25, 1605-1612.
9. Dull, T., Zufferey, R., Kelly, M., Mandel, R. J., Nguyen, M., Trono, D., and Naldini, L. (1998) A third-generation lentivirus vector with a conditional packaging system. J Virol 72, 8463-8471.
10. Schmid, D. A., Irving, M. B., Posevitz, V., Hebeisen, M., Posevitz-Fejfar, A., Sarria, J. C., Gomez-Eerland, R., Thome, M., Schumacher, T. N., Romero, P., Speiser, D. E., Zoete, V., Michielin, O., and Rufer, N. (2010) Evidence for a TCR affinity threshold delimiting maximal CD8 T cell function. Journal of immunology 184, 4936-4946.
11. Chang, H. C., Bao, Z., Yao, Y., Tse, A. G., Goyarts, E. C., Madsen, M., Kawasaki, E., Brauer, P. P., Sacchettini, J. C., Nathenson, S. G., and et al. (1994) A general method for facilitating heterodimeric pairing between two proteins: application to expression of alpha and beta T-cell receptor extracellular segments. Proc Natl Acad Sci USA 91, 11408-11412.
12. Boulter, J. M., Glick, M., Todorov, P. T., Baston, E., Sami, M., Rizkallah, P., and Jakobsen, B. K. (2003) Stable, soluble T-cell receptor molecules for crystallization and therapeutics. Protein Eng 16, 707-711.
13. Altman, J. D., Moss, P. A., Goulder, P. J., Barouch, D. H., McHeyzer-Williams, M. G., Bell, J. I., McMichael, A. J., and Davis, M. M. (1996) Phenotypic analysis of antigen-specific T lymphocytes. Science 274, 94-96.
14. Irving, M., Zoete V., Hebeisen M., Schmid D., Baumgartner P., Guillaume P., Romero P., Speiser D., Luescher I., Rufer N., Michielin O., (2012) Interplay between T Cell Receptor Binding Kinetics and the Level of Cognate Peptide Presented by Major Histocompatibility Complexes Governs CD8+ T Cell Responsiveness. JBC 287, 23068-23078.
15. Chen, Y. T., Scanlan, M. J., Sahin, U., Türeci, O., Gure, A. O., Tsang, S., Williamson, B., Stockert, E., Pfreundschuh, M., and Old L. J. (1997) A testicular antigen aberrantly expressed in human cancers detected by autologous antibody screening. Proc Natl Acad Sci USA 94, 1914-1918.

16. Mellman, I., G. Coukos, and G. Dranoff, Cancer immunotherapy comes of age. Nature, 2011. 480: p. 480.
17. Restifo, N. P., M. E. Dudley, and S. A. Rosenberg, Adoptive immunotherapy for cancer: harnessing the T cell response. Nature Reviews Immunology, 2012. 12: p. 269.
18. Rosenberg, S. A., et al., Durable complete responses in heavily pretreated patients with metastatic melanoma using T-cell transfer immunotherapy. Clin Cancer Res, 2011. 17(13): p. 4550-7.
19. Robbins, P. F., et al., Tumor regression in patients with metastatic synovial cell sarcoma and melanoma using genetically engineered lymphocytes reactive with NY-ESO-1. J Clin Oncol, 2011. 29(7): p. 917-24.
20. Kochenderfer, J. N., et al., B-cell depletion and remissions of malignancy along with cytokine-associated toxicity in a clinical trial of anti-CD19 chimeric-antigen-receptor-transduced T cells. Blood, 2012. 119: p. 2709-2720.
21. Gust, J., et al., Endothelial Activation and Blood-Brain Barrier Disruption in Neurotoxicity after Adoptive Immunotherapy with CD19 CAR-T Cells. Cancer Discovery, 2017. 7: p. 1404-1419.
22. Zou, W., Immunosuppressive networks in the tumour environment and their therapeutic relevance. Nature Reviews Cancer, 2005. 5: p. 263.
23. Baruch, E. N., et al., Adoptive T cell therapy: An overview of obstacles and opportunities. Cancer, 2017. 123(S11): p. 2154-2162.
24. Zhang, H. and J. Chen, Current status and future directions of cancer immunotherapy. Journal of Cancer, 2018. 9(10): p. 1773-1781.
25. Kunert, A. and R. Debets, Engineering T cells for adoptive therapy: outsmarting the tumor. Current Opinion in Immunology, 2018. 51: p. 133-139.
26. Yoon, D. H., et al., Incorporation of Immune Checkpoint Blockade into Chimeric Antigen Receptor T Cells (CAR-Ts): Combination or Built-In CAR-T. International journal of molecular sciences, 2018. 19(2): p. 340.
27. Noy, R. and J. W. Pollard, Tumor-associated macrophages: from mechanisms to therapy. Immunity, 2014. 41(1): p. 49-61.
28. Fridlender, Z. G. and S. M. Albelda, Tumor-associated neutrophils: friend or foe? Carcinogenesis, 2012. 33(5): p. 949-55.
29. Mach, N., et al., Differences in dendritic cells stimulated in vivo by tumors engineered to secrete granulocyte-macrophage colony-stimulating factor or Flt3-ligand. Cancer Res, 2000. 60(12): p. 3239-46.
30. Ushach, I. and A. Zlotnik, Biological role of granulocyte macrophage colony-stimulating factor (GM-CSF) and macrophage colony-stimulating factor (M-CSF) on cells of the myeloid lineage. Journal of Leukocyte Biology, 2016. 100: p. 481-489.
31. Becher, B., S. Tugues, and M. Greter, GM-CSF: From Growth Factor to Central Mediator of Tissue Inflammation. Immunity, 2016. 45: p. 963-973.
32. Hercus, T. R., et al., The granulocyte-macrophage colony-stimulating factor receptor: linking its structure to cell signaling and its role in disease. Blood. 2009. 114: p. 1289-1298.
33. Shi, Y., et al., Granulocyte-macrophage colony-stimulating factor (GM-CSF) and T-cell responses: what we do and don't know. Cell Res. 2006. 16(2):126-33.
34. Arellano, M. and S. Lonial. Clinical uses of GM-CSF, a critical appraisal and update. in Biologics: Targets & Therapy. Biologics. 2008; 2(1):13-27.
35. Gupta, R. and L. A. Emens, GM-CSF-secreting vaccines for solid tumors: moving forward. Discovery medicine, 2010. 10(50): p. 52-60.
36. Mookerjee, A., M. Graciotti, and L. Kandalaft, A cancer vaccine with dendritic cells differentiated with GM-CSF and IFNα and pulsed with a squaric acid treated cell lysate improves T cell priming and tumor growth control in a mouse model. BioImpacts: BI, 2018. 8(3): p. 211-221.
37. Shi, F. S., et al., Granulocyte-macrophage colony-stimulating factor (GM-CSF) secreted by cDNA-transfected tumor cells induces a more potent antitumor response than exogenous GM-CSF. Cancer Gene Ther, 1999. 6(1): p. 81-8.
38. Nasi, M. L., et al., Intradermal injection of granulocyte-macrophage colony-stimulating factor (GM-CSF) in patients with metastatic melanoma recruits dendritic cells. Cytokines Cell Mol Ther, 1999. 5(3): p. 139-44.
39. Lawson, D. H., et al., Randomized, Placebo-Controlled, Phase III Trial of Yeast-Derived Granulocyte-Macrophage Colony-Stimulating Factor (GM-CSF) Versus Peptide Vaccination Versus GM-CSF Plus Peptide Vaccination Versus Placebo in Patients With No Evidence of Disease After Complete Surgical Resection of Locally Advanced and/or Stage IV Melanoma: A Trial of the Eastern Cooperative Oncology Group-American College of Radiology Imaging Network Cancer Research Group (E4697). J Clin Oncol, 2015. 33(34): p. 4066-76.
40. Antman, K. S., et al., Effect of recombinant human granulocyte-macrophage colony-stimulating factor on chemotherapy-induced myelosuppression. N Engl J Med, 1988. 319(10): p. 593-8.
41. Pylayeva-Gupta, Y., et al., Cancer Cell Oncogenic Kras-Induced GM-CSF Production Promotes the Development of Pancreatic Neoplasia. Cancer Cell, 2012. 21: p. 836-847.
42. Bobisse, S. et al. Reprogramming T lymphocytes for melanoma adoptive immunotherapy by T-cell receptor gene transfer with lentiviral vectors. Cancer Res. 69, 9385-9394 (2009).
43. Reddy Chichili, V. P., Kumar, V. & Sivaraman, J. Linkers in the structural biology of protein-protein interactions. Protein Sci. 22, 153-167 (2013).
44. Lamers, C. H. J. et al. Retroviral vectors for clinical immunogene therapy are stable for up to 9 years. Cancer Gene Ther. 15, 268-274 (2008).

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All patents, applications, publications, test methods, literature, and other materials cited herein are hereby incorporated by reference in their entirety as if physically present in this specification.

What is claimed is:

1. A polynucleotide encoding a modified T cell receptor (TCR), wherein the modified TCR comprises a single amino acid substitution within a complementarity determining region (CDR) 2 of a beta chain of the modified TCR relative to a CDR2 of a beta chain of an unsubstituted wild-type (WT) TCR, wherein the single amino acid substitution is I53F and wherein the modified TCR binds to cancer antigen NY-ESO-$1_{157\text{-}165}$ epitope (SEQ ID NO: 8).

2. The polynucleotide of claim 1, wherein outside of the CDR2 of the beta chain of the modified TCR, the beta chain sequence of the modified TCR comprises an amino acid sequence at least 80% identical to the beta chain of the unsubstituted WT TCR.

3. The polynucleotide of claim 1, wherein the beta chain of the modified TCR comprises the amino acid sequence of the beta chain of the unsubstituted WT TCR with the single amino acid substitution in the CDR2.

4. The polynucleotide of claim 1, wherein the beta chain of the unsubstituted WT TCR comprises the amino acid sequence of SEQ ID NO: 1.

5. The polynucleotide of claim 1, wherein the modified TCR binds to the cancer antigen at a higher binding affinity than the WT TCR.

6. The polynucleotide of claim 5, wherein the binding affinity of the modified TCR to the cancer antigen is about 5 to about 75 times, about 10 to about 75 times, about 25 to about 75 times, about 40 to about 75 times, about 40 to about 60 times, about 40 to about 50 times, or about 50 times higher as compared to the binding affinity of the WT TCR to the cancer antigen.

7. The polynucleotide of claim 5, wherein the modified TCR binds to the cancer antigen with a dissociation constant (KD) between about 0.30 μM and about 4.5 μM, between about 0.30 UM and about 2 μM, between about 2 μM and about 3 μM, between about 3 μM and about 4 μM, about 0.41 μM, or about 3.89 μM.

8. The polynucleotide of claim 1, wherein the beta chain of the modified TCR is encoded by the nucleotide sequence of SEQ ID NO: 12 or a nucleotide sequence that has at least 80% sequence identity to SEQ ID NO: 12.

9. The polynucleotide of claim 1, wherein the polynucleotide is operably linked to at least one regulatory element for expression of the modified TCR.

10. The polynucleotide of claim 9, wherein the at least one regulatory element is a promoter.

11. The polynucleotide of claim 1, which is a DNA molecule.

12. The polynucleotide of claim 1, which is an RNA molecule or a derivative thereof.

13. A recombinant vector comprising the polynucleotide of claim 1, wherein optionally the polynucleotide is operably linked to at least one regulatory element for expression of the modified T cell receptor (TCR).

14. A modified T cell receptor (TCR), comprising a) a beta chain of the modified TCR encoded by the polynucleotide of claim 1, and optionally b) an alpha chain.

15. The modified TCR of claim 14, comprising an alpha chain comprising the amino acid sequence of SEQ ID NO: 7 and a beta chain comprising the amino acid sequence of SEQ ID NO: 3.

16. A bifunctional molecule comprising the modified T cell receptor (TCR) of claim 14 and an immune effector polypeptide that specifically binds to a cell surface protein on a T cell.

17. A pharmaceutical composition comprising a host cell comprising the modified TCR of claim 14, or a bifunctional molecule comprising the modified TCR of claim 14, and a pharmaceutically acceptable carrier and/or excipient.

18. A method for stimulating or enhancing an immune response in a mammal in need thereof comprising administering to said mammal an effective amount of
   i) a host cell comprising the modified T cell receptor (TCR) of claim 14, ii) a bifunctional molecule comprising the modified TCR of claim 14, or iii) a pharmaceutical composition comprising the host cell (i) or the bifunctional molecule (ii), and a pharmaceutically acceptable carrier and/or excipient.

19. A method of treatment of a cancer in a subject in need thereof, comprising administering to the subject an effective amount of i) a host cell comprising the modified T cell receptor (TCR) of claim 14, ii) a bifunctional molecule comprising the modified TCR of claim 14, or iii) a pharmaceutical composition comprising the host cell (i) or the bifunctional molecule (ii), and a pharmaceutically acceptable carrier and/or excipient.

20. An isolated host cell comprising i) the polynucleotide of claim 1, ii) a recombinant vector comprising the polynucleotide of claim 1, or iii) a modified TCR comprising a) a beta chain of the modified TCR encoded by the polynucleotide of claim 1, and optionally b) an alpha chain .

21. The isolated host cell of claim 20, further engineered to express one or more exogenous molecule(s), wherein optionally the one or more exogenous molecule(s) is a soluble receptor and/or antigen binding protein.

22. A method of producing a host cell expressing a modified T cell receptor (TCR), comprising genetically engineering the host cell with the polynucleotides of claim 1 or a vector comprising the polynucleotide of claim 1.

\* \* \* \* \*

UNITED STATES PATENT AND TRADEMARK OFFICE
CERTIFICATE OF CORRECTION

| | | |
|---|---|---|
| PATENT NO. | : 12,473,346 B2 | Page 1 of 1 |
| APPLICATION NO. | : 17/440136 | |
| DATED | : November 18, 2025 | |
| INVENTOR(S) | : George Coukos et al. | |

It is certified that error appears in the above-identified patent and that said Letters Patent is hereby corrected as shown below:

In the Claims

At Column 125, Line 33 - In Claim 1, please remove the space between "(TCR)" and the following ";".

At Column 125, Line 65 - In Claim 7, please correct the term "0.30 UM" to "0.30 μM".

At Column 127, Line 22 - In Claim 20, please remove the space immediately following "alpha chain".

Signed and Sealed this
Sixth Day of January, 2026

John A. Squires
*Director of the United States Patent and Trademark Office*